US009996233B2

(12) United States Patent
Bernstein et al.

(10) Patent No.: US 9,996,233 B2
(45) Date of Patent: Jun. 12, 2018

(54) DEVICE, METHOD, AND GRAPHICAL USER INTERFACE FOR NAVIGATING USER INTERFACE HIERARCHIES

(71) Applicant: Apple Inc., Cupertino, CA (US)

(72) Inventors: Jeffrey Traer Bernstein, San Francisco, CA (US); Julian Missig, Redwood City, CA (US); Avi E. Cieplinski, San Francisco, CA (US)

(73) Assignee: APPLE INC., Cupertino, CA (US)

( * ) Notice: Subject to any disclaimer, the term of this patent is extended or adjusted under 35 U.S.C. 154(b) by 68 days.

(21) Appl. No.: 14/856,522

(22) Filed: Sep. 16, 2015

(65) Prior Publication Data

US 2016/0004429 A1 Jan. 7, 2016

Related U.S. Application Data

(63) Continuation of application No. 14/608,895, filed on Jan. 29, 2015, which is a continuation of application No. PCT/US2013/069472, filed on Nov. 11, 2013.
(Continued)

(51) Int. Cl.
*G06F 3/00* (2006.01)
*G06F 3/0484* (2013.01)
(Continued)

(52) U.S. Cl.
CPC ........ *G06F 3/04842* (2013.01); *G06F 3/0414* (2013.01); *G06F 3/0482* (2013.01);
(Continued)

(58) Field of Classification Search
CPC ....................................... G06F 3/0481–3/0489
See application file for complete search history.

(56) References Cited

U.S. PATENT DOCUMENTS 4,864,520 A 9/1989 Setoguchi et al.
5,184,120 A 2/1993 Schultz
(Continued)

FOREIGN PATENT DOCUMENTS

AU 2016100649 A4 6/2016
CN 1808362 A 7/2006
(Continued)

OTHER PUBLICATIONS

Bautisa, "Microsoft Mathematics Tutorial 7—The Ink Input", <URL:http://mathandmultimedia.com/2012/05/23/microsoft-math-tutorial-7-ink>, May 23, 2012, 3 pages.
(Continued)

*Primary Examiner* — Steven B Theriault
(74) *Attorney, Agent, or Firm* — Morgan, Lewis & Bockius LLP

(57) ABSTRACT

An electronic device with a touch-sensitive surface, a display, and one or more sensors to detect intensity of contacts displaying a lower-level user interface that is part of a user interface hierarchy, where the hierarchy includes at least three levels, including the lower-level user interface, an intermediate-level user interface and a higher-level user interface. The device also, while displaying the lower-level user interface, detects an input on a portion of the device that is associated with user interface hierarchy navigation and, in response to detecting the input, in accordance with a determination that the input meets first transition criteria, the device replaces display of the lower-level user interface with display of the intermediate-level user interface and in accordance with a determination that the input meets second transition criteria, the device replaces display of the lower-level user interface with display of the higher-level user interface.

60 Claims, 86 Drawing Sheets

Related U.S. Application Data

(60) Provisional application No. 61/778,125, filed on Mar. 12, 2013, provisional application No. 61/747,278, filed on Dec. 29, 2012.

(51) Int. Cl.
  *G06F 3/0482* (2013.01)
  *G06F 3/0483* (2013.01)
  *G06F 3/0488* (2013.01)
  *G06F 3/041* (2006.01)
  *G06F 3/0481* (2013.01)

(52) U.S. Cl.
  CPC .......... *G06F 3/0483* (2013.01); *G06F 3/0488* (2013.01); *G06F 3/04817* (2013.01); *G06F 3/04847* (2013.01); *G06F 3/04883* (2013.01); G06F 2203/04105 (2013.01)

(56) References Cited

U.S. PATENT DOCUMENTS

| | | |
|---|---|---|
| 5,374,787 A | 12/1994 | Miller et al. |
| 5,428,730 A | 6/1995 | Baker et al. |
| 5,463,722 A | 10/1995 | Venolia |
| 5,510,813 A | 4/1996 | Makinwa et al. |
| 5,555,354 A | 9/1996 | Strasnick et al. |
| 5,559,301 A | 9/1996 | Bryan, Jr. et al. |
| 5,627,914 A | 5/1997 | Pagallo |
| 5,710,896 A | 1/1998 | Seidl |
| 5,717,438 A | 2/1998 | Kim et al. |
| 5,793,360 A | 8/1998 | Fleck et al. |
| 5,793,377 A | 8/1998 | Moore |
| 5,801,692 A | 9/1998 | Muzio et al. |
| 5,805,144 A | 9/1998 | Scholder et al. |
| 5,805,167 A | 9/1998 | Van Cruyningen |
| 5,809,267 A | 9/1998 | Moran et al. |
| 5,819,293 A | 10/1998 | Comer et al. |
| 5,825,352 A | 10/1998 | Bisset et al. |
| 5,844,560 A | 12/1998 | Crutcher et al. |
| 5,872,922 A | 2/1999 | Hogan et al. |
| 5,946,647 A | 8/1999 | Miller et al. |
| 6,002,397 A | 12/1999 | Jaaskelainen, Jr. |
| 6,031,989 A | 2/2000 | Cordell |
| 6,088,019 A | 7/2000 | Rosenberg |
| 6,088,027 A | 7/2000 | Konar et al. |
| 6,111,575 A | 8/2000 | Martinez et al. |
| 6,121,960 A | 9/2000 | Carroll et al. |
| 6,180,894 B1 | 1/2001 | Chao et al. |
| 6,208,329 B1 | 3/2001 | Ballare |
| 6,208,340 B1 | 3/2001 | Amin et al. |
| 6,219,034 B1 | 4/2001 | Elbing et al. |
| 6,227,743 B1 | 5/2001 | Robb |
| 6,243,080 B1 | 6/2001 | Molne |
| 6,252,594 B1 | 6/2001 | Xia et al. |
| 6,266,684 B1 | 7/2001 | Kraus et al. |
| 6,323,846 B1 | 11/2001 | Westerman et al. |
| 6,347,997 B1 | 2/2002 | Armstrong |
| 6,396,523 B1 | 5/2002 | Segal et al. |
| 6,400,303 B2 | 6/2002 | Armstrong |
| 6,429,846 B2 | 8/2002 | Rosenberg et al. |
| 6,448,977 B1 | 9/2002 | Braun et al. |
| 6,456,778 B2 | 9/2002 | Armstrong |
| 6,459,442 B1 | 10/2002 | Edwards et al. |
| 6,469,691 B1 | 10/2002 | Armstrong |
| 6,470,078 B1 | 10/2002 | Armstrong |
| 6,489,978 B1 | 12/2002 | Gong et al. |
| 6,504,527 B1 | 1/2003 | Armstrong |
| 6,512,530 B1 | 1/2003 | Rzepkowski et al. |
| 6,532,000 B2 | 3/2003 | Armstrong |
| 6,551,357 B1 | 4/2003 | Madduri |
| 6,559,831 B1 | 5/2003 | Armstrong |
| 6,563,487 B2 | 5/2003 | Martin et al. |
| 6,567,102 B2 | 5/2003 | Kung |
| 6,583,798 B1 | 6/2003 | Hoek et al. |
| 6,590,568 B1 | 7/2003 | Astala et al. |
| 6,661,438 B1 | 12/2003 | Shiraishi et al. |
| 6,670,952 B2 | 12/2003 | Jaeger et al. |
| 6,735,307 B1 | 5/2004 | Volckers |
| 6,750,890 B1 | 6/2004 | Sugimoto |
| 6,822,635 B2 | 11/2004 | Shahoian et al. |
| 6,891,551 B2 | 5/2005 | Keely et al. |
| 6,904,405 B2 | 6/2005 | Suominen |
| 6,906,697 B2 | 6/2005 | Rosenberg |
| 6,919,927 B1* | 7/2005 | Hyodo ............... H04N 1/00411 348/333.02 |
| 7,138,983 B2 | 11/2006 | Wakai et al. |
| 7,259,752 B1 | 8/2007 | Simmons |
| 7,312,791 B2* | 12/2007 | Hoshino ................ F16M 11/10 345/173 |
| 7,411,575 B2 | 8/2008 | Hill et al. |
| 7,479,949 B2 | 1/2009 | Jobs et al. |
| 7,532,206 B2 | 5/2009 | Morrison et al. |
| 7,533,352 B2 | 5/2009 | Chew et al. |
| 7,552,397 B2 | 6/2009 | Holecek et al. |
| 7,577,530 B2 | 8/2009 | Vignalou-Marche |
| 7,614,008 B2 | 11/2009 | Ording |
| 7,619,616 B2 | 11/2009 | Rimas Ribikauskas et al. |
| 7,629,966 B2 | 12/2009 | Anson |
| 7,656,413 B2 | 2/2010 | Khan et al. |
| 7,683,889 B2 | 3/2010 | Rimas Ribikauskas et al. |
| 7,743,348 B2 | 6/2010 | Robbins et al. |
| 7,760,187 B2 | 7/2010 | Kennedy |
| 7,787,026 B1 | 8/2010 | Flory et al. |
| 7,797,642 B1 | 9/2010 | Karam et al. |
| 7,801,950 B2 | 9/2010 | Eisenstadt et al. |
| 7,812,826 B2 | 10/2010 | Ording et al. |
| 7,890,862 B2 | 2/2011 | Kompe et al. |
| 7,903,090 B2* | 3/2011 | Soss ..................... G06F 3/0414 345/173 |
| 7,952,566 B2 | 5/2011 | Poupyrev et al. |
| 7,956,847 B2 | 6/2011 | Christie |
| 7,966,352 B2 | 6/2011 | Madan et al. |
| 7,973,778 B2* | 7/2011 | Chen ..................... G06F 3/0412 178/18.03 |
| 8,040,142 B1 | 10/2011 | Bokma et al. |
| 8,059,104 B2 | 11/2011 | Shahoian et al. |
| 8,106,856 B2 | 1/2012 | Matas et al. |
| 8,125,440 B2 | 2/2012 | Guyot-Sionnest et al. |
| 8,125,492 B1 | 2/2012 | Wainwright et al. |
| RE43,448 E | 6/2012 | Kimoto et al. |
| 8,209,628 B1 | 6/2012 | Davidson |
| 8,271,900 B2 | 9/2012 | Walizaka et al. |
| 8,363,020 B2 | 1/2013 | Li et al. |
| 8,390,583 B2 | 3/2013 | Forutanpour et al. |
| 8,423,089 B2* | 4/2013 | Song ................... G06F 3/04886 345/173 |
| 8,446,376 B2* | 5/2013 | Levy .................... G06F 3/0488 345/173 |
| 8,453,057 B2 | 5/2013 | Stallings et al. |
| 8,456,431 B2 | 6/2013 | Victor |
| 8,466,889 B2* | 6/2013 | Tong ..................... G06F 3/016 178/18.01 |
| 8,482,535 B2 | 7/2013 | Pryor |
| 8,508,494 B2 | 8/2013 | Moore |
| 8,542,205 B1* | 9/2013 | Keller .................. G06F 3/0488 345/173 |
| 8,553,092 B2 | 10/2013 | Tezuka et al. |
| 8,581,870 B2 | 11/2013 | Bokma et al. |
| 8,587,542 B2 | 11/2013 | Moore |
| 8,593,415 B2 | 11/2013 | Han et al. |
| 8,593,420 B1 | 11/2013 | Buuck |
| 8,625,882 B2 | 1/2014 | Backlund et al. |
| 8,638,311 B2 | 1/2014 | Kang et al. |
| 8,665,227 B2* | 3/2014 | Gunawan ............. G06F 1/1626 345/169 |
| 8,669,945 B2 | 3/2014 | Coddington |
| 8,674,932 B2 | 3/2014 | Armstrong |
| 8,698,765 B1 | 4/2014 | Keller |
| 8,717,305 B2 | 5/2014 | Williamson et al. |
| 8,743,069 B2 | 6/2014 | Morton et al. |
| 8,769,431 B1 | 7/2014 | Prasad |
| 8,773,389 B1 | 7/2014 | Freed |
| 8,788,964 B2 | 7/2014 | Shin et al. |

(56) References Cited

U.S. PATENT DOCUMENTS

| | | | |
|---|---|---|---|
| 8,793,577 B2 | 7/2014 | Schellingerhout et al. | |
| 8,799,816 B2 | 8/2014 | Wells et al. | |
| 8,816,989 B2 | 8/2014 | Nicholson et al. | |
| 8,854,316 B2 | 10/2014 | Shenfield | |
| 8,872,729 B2 | 10/2014 | Lyons et al. | |
| 8,872,773 B2 | 10/2014 | Mak et al. | |
| 8,875,044 B2 | 10/2014 | Ozawa et al. | |
| 8,881,062 B2 | 11/2014 | Kim et al. | |
| 8,914,732 B2 | 12/2014 | Jun et al. | |
| 8,952,987 B2 | 2/2015 | Momeyer et al. | |
| 8,959,430 B1 | 2/2015 | Spivak et al. | |
| 8,976,128 B2 | 3/2015 | Moore | |
| 9,026,932 B1 | 5/2015 | Dixon | |
| 9,030,419 B1* | 5/2015 | Freed | G06F 3/0416 345/156 |
| 9,030,436 B2 | 5/2015 | Ikeda | |
| 9,046,999 B1 | 6/2015 | Teller et al. | |
| 9,063,563 B1 | 6/2015 | Gray et al. | |
| 9,069,460 B2 | 6/2015 | Moore | |
| 9,086,755 B2* | 7/2015 | Cho | G06F 3/0416 |
| 9,092,058 B2 | 7/2015 | Kasahara et al. | |
| 9,098,188 B2 | 8/2015 | Kim | |
| 9,116,571 B2 | 8/2015 | Zeliff et al. | |
| 9,122,364 B2* | 9/2015 | Kuwabara | G06F 3/041 |
| 9,146,914 B1 | 9/2015 | Dhaundiyal | |
| 9,148,618 B2 | 9/2015 | Matas et al. | |
| 9,164,779 B2* | 10/2015 | Brakensiek | G06F 9/4445 |
| 9,170,607 B2 | 10/2015 | Bose et al. | |
| 9,170,649 B2 | 10/2015 | Ronkainen | |
| 9,218,105 B2 | 12/2015 | Mansson et al. | |
| 9,244,562 B1* | 1/2016 | Rosenberg | G06F 3/04847 |
| 9,244,576 B1 | 1/2016 | Vadagave et al. | |
| 9,244,601 B2 | 1/2016 | Kim et al. | |
| 9,246,487 B2 | 1/2016 | Casparian et al. | |
| 9,262,002 B2 | 2/2016 | Momeyer et al. | |
| 9,304,668 B2 | 4/2016 | Rezende et al. | |
| 9,307,112 B2 | 4/2016 | Molgaard et al. | |
| 9,349,552 B2 | 5/2016 | Huska et al. | |
| 9,361,018 B2 | 6/2016 | Defazio et al. | |
| 9,389,718 B1 | 7/2016 | Letourneur | |
| 9,389,722 B2* | 7/2016 | Matsuki | G06F 3/041 |
| 9,400,581 B2 | 7/2016 | Bokma et al. | |
| 9,405,367 B2 | 8/2016 | Jung et al. | |
| 9,417,754 B2 | 8/2016 | Smith | |
| 9,423,938 B1 | 8/2016 | Morris | |
| 9,436,344 B2* | 9/2016 | Kuwabara | G06F 3/048 |
| 9,448,694 B2 | 9/2016 | Sharma et al. | |
| 9,451,230 B1 | 9/2016 | Henderson et al. | |
| 9,471,145 B2 | 10/2016 | Langlois et al. | |
| 9,477,393 B2 | 10/2016 | Zambetti et al. | |
| 9,542,013 B2 | 1/2017 | Dearman | |
| 9,547,525 B1 | 1/2017 | Trainor et al. | |
| 9,569,093 B2 | 2/2017 | Lipman et al. | |
| 9,600,114 B2* | 3/2017 | Milam | G06F 3/0414 |
| 9,600,116 B2* | 3/2017 | Tao | G06F 3/0414 |
| 9,612,741 B2 | 4/2017 | Brown et al. | |
| 9,671,943 B2 | 6/2017 | Van der Velden | |
| 9,733,716 B2 | 8/2017 | Shaffer | |
| 9,760,241 B1 | 9/2017 | Lewbel | |
| 2001/0024195 A1 | 9/2001 | Hayakawa et al. | |
| 2001/0045965 A1 | 11/2001 | Orbanes et al. | |
| 2002/0008691 A1 | 1/2002 | Hanajima et al. | |
| 2002/0015064 A1 | 2/2002 | Robotham et al. | |
| 2002/0109678 A1 | 8/2002 | Marmolin et al. | |
| 2002/0140680 A1 | 10/2002 | Lu | |
| 2002/0140740 A1 | 10/2002 | Chen | |
| 2002/0149630 A1 | 10/2002 | Kitainik et al. | |
| 2002/0180763 A1 | 12/2002 | Kung | |
| 2002/0186257 A1 | 12/2002 | Cadiz et al. | |
| 2003/0001869 A1 | 1/2003 | Nissen | |
| 2003/0086496 A1 | 5/2003 | Zhang et al. | |
| 2003/0112269 A1 | 6/2003 | Lentz et al. | |
| 2003/0117440 A1 | 6/2003 | Hellyar et al. | |
| 2003/0122779 A1 | 7/2003 | Martin et al. | |
| 2003/0151589 A1 | 8/2003 | Bensen et al. | |
| 2003/0184574 A1 | 10/2003 | Phillips et al. | |
| 2003/0189552 A1 | 10/2003 | Chuang et al. | |
| 2003/0189647 A1 | 10/2003 | Kang | |
| 2003/0206169 A1 | 11/2003 | Springer et al. | |
| 2003/0222915 A1 | 12/2003 | Marion et al. | |
| 2004/0021643 A1* | 2/2004 | Hoshino | G06F 3/016 345/173 |
| 2004/0056849 A1 | 3/2004 | Lohbihler et al. | |
| 2004/0108995 A1* | 6/2004 | Hoshino | F16M 11/10 345/173 |
| 2004/0138849 A1 | 7/2004 | Schmidt et al. | |
| 2004/0150631 A1* | 8/2004 | Fleck | G06F 3/038 345/179 |
| 2004/0150644 A1 | 8/2004 | Kincaid et al. | |
| 2004/0174399 A1 | 9/2004 | Wu et al. | |
| 2004/0219969 A1 | 11/2004 | Casey et al. | |
| 2004/0267877 A1 | 12/2004 | Shiparo et al. | |
| 2005/0012723 A1 | 1/2005 | Pallakoff | |
| 2005/0039141 A1 | 2/2005 | Burke et al. | |
| 2005/0091604 A1 | 4/2005 | Davis | |
| 2005/0110769 A1 | 5/2005 | DaCosta et al. | |
| 2005/0114785 A1 | 5/2005 | Finnigan et al. | |
| 2005/0125742 A1 | 6/2005 | Grotjohn et al. | |
| 2005/0132297 A1 | 6/2005 | Milic-Frayling et al. | |
| 2005/0134578 A1 | 6/2005 | Chambers et al. | |
| 2005/0183017 A1 | 8/2005 | Cain | |
| 2005/0184973 A1 | 8/2005 | Lum et al. | |
| 2005/0190280 A1 | 9/2005 | Haas et al. | |
| 2005/0204295 A1 | 9/2005 | Voorhees et al. | |
| 2005/0223338 A1 | 10/2005 | Partanen | |
| 2005/0229112 A1 | 10/2005 | Clay et al. | |
| 2005/0289476 A1 | 12/2005 | Tokkonen | |
| 2006/0022955 A1 | 2/2006 | Kennedy | |
| 2006/0022956 A1 | 2/2006 | Lengeling et al. | |
| 2006/0026535 A1 | 2/2006 | Hotelling et al. | |
| 2006/0026536 A1 | 2/2006 | Hotelling et al. | |
| 2006/0031776 A1 | 2/2006 | Glein et al. | |
| 2006/0036971 A1 | 2/2006 | Mendel et al. | |
| 2006/0059436 A1 | 3/2006 | Nurmi | |
| 2006/0067677 A1 | 3/2006 | Tokiwa et al. | |
| 2006/0101347 A1 | 5/2006 | Runov et al. | |
| 2006/0109252 A1 | 5/2006 | Kolmykov-Zotov et al. | |
| 2006/0109256 A1 | 5/2006 | Grant et al. | |
| 2006/0119586 A1 | 6/2006 | Grant et al. | |
| 2006/0132455 A1* | 6/2006 | Rimas-Ribikauskas | G06F 3/0414 345/173 |
| 2006/0132456 A1 | 6/2006 | Anson | |
| 2006/0132457 A1 | 6/2006 | Rimas-Ribikauskas et al. | |
| 2006/0136834 A1 | 6/2006 | Cao et al. | |
| 2006/0136845 A1 | 6/2006 | Rimas-Ribikauskas et al. | |
| 2006/0161861 A1 | 7/2006 | Holecek et al. | |
| 2006/0161870 A1 | 7/2006 | Hotelling et al. | |
| 2006/0190834 A1 | 8/2006 | Marcjan | |
| 2006/0195438 A1 | 8/2006 | Galuten | |
| 2006/0197753 A1 | 9/2006 | Hotelling | |
| 2006/0212812 A1 | 9/2006 | Simmons et al. | |
| 2006/0213754 A1 | 9/2006 | Jarrett et al. | |
| 2006/0224989 A1 | 10/2006 | Pettiross et al. | |
| 2006/0274042 A1 | 12/2006 | Krah et al. | |
| 2006/0282778 A1 | 12/2006 | Barsness et al. | |
| 2006/0284858 A1 | 12/2006 | Rekimoto | |
| 2006/0290681 A1 | 12/2006 | Ho et al. | |
| 2007/0004461 A1 | 1/2007 | Bathina et al. | |
| 2007/0024595 A1* | 2/2007 | Baker | G06F 3/03547 345/173 |
| 2007/0024646 A1 | 2/2007 | Saarinen et al. | |
| 2007/0080953 A1 | 4/2007 | Lii | |
| 2007/0113681 A1 | 5/2007 | Nishimura et al. | |
| 2007/0115264 A1 | 5/2007 | Yu et al. | |
| 2007/0120835 A1 | 5/2007 | Sato | |
| 2007/0124699 A1 | 5/2007 | Michaels | |
| 2007/0152959 A1 | 7/2007 | Peters | |
| 2007/0157173 A1 | 7/2007 | Klein et al. | |
| 2007/0168369 A1 | 7/2007 | Bruns | |
| 2007/0168890 A1 | 7/2007 | Zhao et al. | |
| 2007/0176904 A1 | 8/2007 | Russo | |
| 2007/0182999 A1 | 8/2007 | Anthony et al. | |
| 2007/0186178 A1 | 8/2007 | Schiller | |

(56) References Cited

U.S. PATENT DOCUMENTS

| | | |
|---|---|---|
| 2007/0222768 A1 | 9/2007 | Geurts et al. |
| 2007/0229455 A1 | 10/2007 | Martin et al. |
| 2007/0229464 A1 | 10/2007 | Hotelling et al. |
| 2007/0236450 A1 | 10/2007 | Colgate et al. |
| 2007/0236477 A1 | 10/2007 | Ryu et al. |
| 2007/0245241 A1 | 10/2007 | Bertram et al. |
| 2007/0257821 A1 | 11/2007 | Son et al. |
| 2007/0270182 A1 | 11/2007 | Gulliksson et al. |
| 2007/0294295 A1 | 12/2007 | Finkelstein et al. |
| 2007/0299923 A1 | 12/2007 | Skelly et al. |
| 2008/0001924 A1 | 1/2008 | de los Reyes et al. |
| 2008/0024459 A1* | 1/2008 | Poupyrev ............... G06F 3/016 345/173 |
| 2008/0034306 A1 | 2/2008 | Ording |
| 2008/0034331 A1 | 2/2008 | Josephsoon et al. |
| 2008/0036743 A1 | 2/2008 | Westerman et al. |
| 2008/0051989 A1 | 2/2008 | Welsh |
| 2008/0052945 A1 | 3/2008 | Matas et al. |
| 2008/0066010 A1 | 3/2008 | Brodersen et al. |
| 2008/0094367 A1 | 4/2008 | Van De Ven et al. |
| 2008/0094398 A1 | 4/2008 | Ng et al. |
| 2008/0106523 A1 | 5/2008 | Conrad |
| 2008/0109753 A1 | 5/2008 | Karstens |
| 2008/0136790 A1 | 6/2008 | Hio |
| 2008/0155415 A1 | 6/2008 | Yoon et al. |
| 2008/0163119 A1 | 7/2008 | Kim et al. |
| 2008/0168395 A1 | 7/2008 | Ording et al. |
| 2008/0168403 A1 | 7/2008 | Westerman et al. |
| 2008/0168404 A1 | 7/2008 | Ording |
| 2008/0202824 A1 | 8/2008 | Philipp et al. |
| 2008/0204427 A1* | 8/2008 | Heesemans ........... G06F 3/0414 345/174 |
| 2008/0219493 A1 | 9/2008 | Tadmor |
| 2008/0222569 A1 | 9/2008 | Champion et al. |
| 2008/0244448 A1 | 10/2008 | Goering et al. |
| 2008/0259046 A1 | 10/2008 | Carsanaro |
| 2008/0263452 A1 | 10/2008 | Tomkins |
| 2008/0284866 A1 | 11/2008 | Mizutani |
| 2008/0294984 A1 | 11/2008 | Ramsay et al. |
| 2008/0297475 A1* | 12/2008 | Woolf ................ G06F 3/0233 345/163 |
| 2008/0303799 A1 | 12/2008 | Schwesig et al. |
| 2008/0307335 A1 | 12/2008 | Chaudhri et al. |
| 2008/0307359 A1 | 12/2008 | Louch et al. |
| 2008/0317378 A1 | 12/2008 | Steinberg et al. |
| 2008/0320419 A1 | 12/2008 | Matas et al. |
| 2009/0002392 A1 | 1/2009 | Hou et al. |
| 2009/0007017 A1 | 1/2009 | Anzures et al. |
| 2009/0037846 A1 | 2/2009 | Spalink et al. |
| 2009/0046110 A1 | 2/2009 | Sadler et al. |
| 2009/0058828 A1 | 3/2009 | Jiang et al. |
| 2009/0061837 A1 | 3/2009 | Chaudhri et al. |
| 2009/0066668 A1 | 3/2009 | Kim et al. |
| 2009/0073118 A1 | 3/2009 | Yamaji et al. |
| 2009/0083665 A1 | 3/2009 | Anttila et al. |
| 2009/0085878 A1 | 4/2009 | Heubel et al. |
| 2009/0085881 A1 | 4/2009 | Keam |
| 2009/0085886 A1 | 4/2009 | Huang et al. |
| 2009/0089293 A1 | 4/2009 | Garritano et al. |
| 2009/0100343 A1 | 4/2009 | Lee et al. |
| 2009/0102804 A1 | 4/2009 | Wong et al. |
| 2009/0102805 A1 | 4/2009 | Meijer et al. |
| 2009/0140985 A1* | 6/2009 | Liu ................... G06F 3/011 345/168 |
| 2009/0158198 A1 | 6/2009 | Hayter et al. |
| 2009/0160793 A1* | 6/2009 | Rekimoto ............ G06F 3/0414 345/173 |
| 2009/0160814 A1* | 6/2009 | Li ................ G06F 3/04883 345/173 |
| 2009/0167507 A1 | 7/2009 | Maenpaa |
| 2009/0167508 A1 | 7/2009 | Fadell et al. |
| 2009/0167704 A1 | 7/2009 | Terlizzi et al. |
| 2009/0167728 A1 | 7/2009 | Geaghan et al. |
| 2009/0169061 A1 | 7/2009 | Anderson et al. |
| 2009/0187824 A1 | 7/2009 | Hinckley et al. |
| 2009/0198767 A1 | 8/2009 | Jakobson et al. |
| 2009/0219294 A1 | 9/2009 | Young et al. |
| 2009/0225037 A1 | 9/2009 | Williamson et al. |
| 2009/0228842 A1 | 9/2009 | Westerman et al. |
| 2009/0237374 A1* | 9/2009 | Li ................ G06F 3/0414 345/174 |
| 2009/0247112 A1 | 10/2009 | Lundy et al. |
| 2009/0247230 A1 | 10/2009 | Lundy et al. |
| 2009/0256947 A1 | 10/2009 | Ciurea et al. |
| 2009/0259975 A1 | 10/2009 | Asai et al. |
| 2009/0267906 A1 | 10/2009 | Schroderus |
| 2009/0276730 A1 | 11/2009 | Aybes et al. |
| 2009/0280860 A1 | 11/2009 | Dahlke |
| 2009/0282360 A1 | 11/2009 | Park et al. |
| 2009/0288032 A1 | 11/2009 | Chang et al. |
| 2009/0293009 A1 | 11/2009 | Meserth et al. |
| 2009/0303187 A1 | 12/2009 | Pallakoff |
| 2009/0307633 A1 | 12/2009 | Haughay, Jr. et al. |
| 2009/0322893 A1 | 12/2009 | Stallings et al. |
| 2010/0007926 A1 | 1/2010 | Imaizumi et al. |
| 2010/0011304 A1 | 1/2010 | Van Os |
| 2010/0013613 A1 | 1/2010 | Weston |
| 2010/0013777 A1 | 1/2010 | Baudisch et al. |
| 2010/0017710 A1* | 1/2010 | Kim ................ G06F 3/0414 715/702 |
| 2010/0026640 A1 | 2/2010 | Kim et al. |
| 2010/0026647 A1 | 2/2010 | Abe et al. |
| 2010/0039446 A1 | 2/2010 | Hillis et al. |
| 2010/0044121 A1 | 2/2010 | Simon et al. |
| 2010/0057235 A1 | 3/2010 | Wang et al. |
| 2010/0058231 A1 | 3/2010 | Duarte et al. |
| 2010/0061637 A1 | 3/2010 | Mochizuki et al. |
| 2010/0070908 A1 | 3/2010 | Mori et al. |
| 2010/0073329 A1 | 3/2010 | Raman et al. |
| 2010/0083116 A1 | 4/2010 | Akifusa et al. |
| 2010/0085302 A1 | 4/2010 | Fairweather et al. |
| 2010/0085314 A1 | 4/2010 | Kwok |
| 2010/0085317 A1 | 4/2010 | Park et al. |
| 2010/0088596 A1 | 4/2010 | Griffin et al. |
| 2010/0088639 A1 | 4/2010 | Yach et al. |
| 2010/0090988 A1 | 4/2010 | Park |
| 2010/0110082 A1 | 5/2010 | Myrick et al. |
| 2010/0111434 A1 | 5/2010 | Madden |
| 2010/0127983 A1 | 5/2010 | Irani et al. |
| 2010/0128002 A1* | 5/2010 | Stacy ................ G06F 3/016 345/174 |
| 2010/0138776 A1 | 6/2010 | Korhonen |
| 2010/0148999 A1* | 6/2010 | Casparian ............ G06F 3/0202 341/34 |
| 2010/0149096 A1 | 6/2010 | Migos et al. |
| 2010/0153879 A1 | 6/2010 | Rimas-Ribikauskas et al. |
| 2010/0156813 A1 | 6/2010 | Duarte et al. |
| 2010/0156818 A1 | 6/2010 | Burrough et al. |
| 2010/0156823 A1 | 6/2010 | Paleczny et al. |
| 2010/0156825 A1 | 6/2010 | Sohn et al. |
| 2010/0171713 A1 | 7/2010 | Kwok et al. |
| 2010/0175023 A1 | 7/2010 | Gatlin et al. |
| 2010/0180225 A1 | 7/2010 | Chiba et al. |
| 2010/0194693 A1 | 8/2010 | Selin et al. |
| 2010/0199227 A1 | 8/2010 | Xiao et al. |
| 2010/0211872 A1 | 8/2010 | Rolston et al. |
| 2010/0214239 A1 | 8/2010 | Wu |
| 2010/0214257 A1 | 8/2010 | Wussler et al. |
| 2010/0225604 A1 | 9/2010 | Homma et al. |
| 2010/0231534 A1 | 9/2010 | Chaudhri et al. |
| 2010/0235726 A1 | 9/2010 | Ording et al. |
| 2010/0235735 A1 | 9/2010 | Ording et al. |
| 2010/0235746 A1 | 9/2010 | Anzures |
| 2010/0251168 A1 | 9/2010 | Fujita et al. |
| 2010/0271312 A1 | 10/2010 | Alameh et al. |
| 2010/0271500 A1 | 10/2010 | Park et al. |
| 2010/0277419 A1 | 11/2010 | Ganey et al. |
| 2010/0277496 A1 | 11/2010 | Kawanishi et al. |
| 2010/0281379 A1 | 11/2010 | Meaney et al. |
| 2010/0281385 A1 | 11/2010 | Meaney et al. |
| 2010/0289807 A1 | 11/2010 | Yu et al. |
| 2010/0302177 A1 | 12/2010 | Kim et al. |
| 2010/0302179 A1 | 12/2010 | Ahn et al. |

(56) References Cited

U.S. PATENT DOCUMENTS

| | | |
|---|---|---|
| 2010/0306702 A1 | 12/2010 | Warner |
| 2010/0308983 A1 | 12/2010 | Conte et al. |
| 2010/0309147 A1 | 12/2010 | Fleizach et al. |
| 2010/0313124 A1 | 12/2010 | Privault et al. |
| 2010/0313156 A1 | 12/2010 | Louch et al. |
| 2010/0313158 A1 | 12/2010 | Lee et al. |
| 2010/0313166 A1 | 12/2010 | Nakayama et al. |
| 2010/0315345 A1* | 12/2010 | Laitinen ............... G06F 3/016 345/173 |
| 2010/0315417 A1 | 12/2010 | Cho et al. |
| 2010/0315438 A1 | 12/2010 | Horodezky et al. |
| 2010/0321301 A1* | 12/2010 | Casparian ............. G06F 3/016 345/168 |
| 2010/0325578 A1 | 12/2010 | Mital et al. |
| 2011/0010626 A1 | 1/2011 | Fino et al. |
| 2011/0018695 A1* | 1/2011 | Bells ...................... G06F 3/016 340/407.2 |
| 2011/0035145 A1 | 2/2011 | Yamasaki |
| 2011/0050576 A1 | 3/2011 | Forutanpour et al. |
| 2011/0050588 A1* | 3/2011 | Li ......................... G06F 3/0414 345/173 |
| 2011/0050591 A1 | 3/2011 | Kim et al. |
| 2011/0050594 A1 | 3/2011 | Kim et al. |
| 2011/0050629 A1* | 3/2011 | Homma ................ G06F 3/0414 345/174 |
| 2011/0050630 A1 | 3/2011 | Ikeda |
| 2011/0050653 A1* | 3/2011 | Miyazawa ............ G06F 3/0482 345/179 |
| 2011/0054837 A1 | 3/2011 | Ikeda |
| 2011/0055135 A1 | 3/2011 | Dawson et al. |
| 2011/0055741 A1 | 3/2011 | Jeon et al. |
| 2011/0057886 A1 | 3/2011 | Ng et al. |
| 2011/0057903 A1* | 3/2011 | Yamano ................ G06F 3/0237 345/174 |
| 2011/0061029 A1 | 3/2011 | Yeh et al. |
| 2011/0063248 A1 | 3/2011 | Yoon |
| 2011/0069012 A1 | 3/2011 | Martensson |
| 2011/0069016 A1 | 3/2011 | Victor |
| 2011/0074697 A1 | 3/2011 | Rapp et al. |
| 2011/0080350 A1 | 4/2011 | Almalki et al. |
| 2011/0084910 A1 | 4/2011 | Almalki et al. |
| 2011/0087982 A1 | 4/2011 | McCann et al. |
| 2011/0087983 A1 | 4/2011 | Shim |
| 2011/0093815 A1 | 4/2011 | Gobeil |
| 2011/0093817 A1 | 4/2011 | Song et al. |
| 2011/0107272 A1 | 5/2011 | Aquilar |
| 2011/0116716 A1 | 5/2011 | Kwon et al. |
| 2011/0122087 A1 | 5/2011 | Jang et al. |
| 2011/0126139 A1 | 5/2011 | Jeong et al. |
| 2011/0138295 A1 | 6/2011 | Momchilov et al. |
| 2011/0141031 A1 | 6/2011 | McCullough et al. |
| 2011/0141052 A1 | 6/2011 | Bernstein et al. |
| 2011/0144777 A1 | 6/2011 | Firkins et al. |
| 2011/0145752 A1 | 6/2011 | Fagans |
| 2011/0145753 A1 | 6/2011 | Prakash |
| 2011/0145764 A1 | 6/2011 | Higuchi et al. |
| 2011/0149138 A1 | 6/2011 | Watkins |
| 2011/0163971 A1 | 7/2011 | Wagner et al. |
| 2011/0164042 A1 | 7/2011 | Chaudhri |
| 2011/0167369 A1 | 7/2011 | van Os |
| 2011/0169765 A1 | 7/2011 | Aono |
| 2011/0175830 A1 | 7/2011 | Miyazawa et al. |
| 2011/0179368 A1 | 7/2011 | King et al. |
| 2011/0179381 A1 | 7/2011 | King |
| 2011/0181538 A1 | 7/2011 | Aono |
| 2011/0181751 A1 | 7/2011 | Mizumori |
| 2011/0185299 A1 | 7/2011 | Hinckley et al. |
| 2011/0185300 A1 | 7/2011 | Hinckley et al. |
| 2011/0185316 A1 | 7/2011 | Reid et al. |
| 2011/0193788 A1 | 8/2011 | King et al. |
| 2011/0193809 A1 | 8/2011 | Walley et al. |
| 2011/0193881 A1 | 8/2011 | Rydenhag |
| 2011/0197160 A1 | 8/2011 | Kim et al. |
| 2011/0201387 A1 | 8/2011 | Paek et al. |
| 2011/0202834 A1 | 8/2011 | Mandryk et al. |
| 2011/0202853 A1 | 8/2011 | Mujkic |
| 2011/0202879 A1 | 8/2011 | Stovicek et al. |
| 2011/0205163 A1 | 8/2011 | Hinckley et al. |
| 2011/0209088 A1 | 8/2011 | Hinckley et al. |
| 2011/0209093 A1 | 8/2011 | Hinckley et al. |
| 2011/0209097 A1 | 8/2011 | Hinckley et al. |
| 2011/0209099 A1 | 8/2011 | Hinckley et al. |
| 2011/0209104 A1 | 8/2011 | Hinckley et al. |
| 2011/0210931 A1 | 9/2011 | Shai |
| 2011/0215914 A1 | 9/2011 | Edwards |
| 2011/0221684 A1 | 9/2011 | Rydenhag |
| 2011/0221776 A1 | 9/2011 | Shimotani et al. |
| 2011/0231789 A1 | 9/2011 | Bukurak et al. |
| 2011/0238690 A1 | 9/2011 | Arrasvouri et al. |
| 2011/0239110 A1 | 9/2011 | Garrett et al. |
| 2011/0242029 A1 | 10/2011 | Kasahara et al. |
| 2011/0248916 A1 | 10/2011 | Griffin et al. |
| 2011/0248948 A1* | 10/2011 | Griffin .................. G06F 3/041 345/174 |
| 2011/0252346 A1 | 10/2011 | Chaudhri |
| 2011/0252357 A1 | 10/2011 | Chaudhri |
| 2011/0252362 A1 | 10/2011 | Cho et al. |
| 2011/0258537 A1 | 10/2011 | Rives et al. |
| 2011/0263298 A1 | 10/2011 | Park |
| 2011/0267530 A1 | 11/2011 | Chun |
| 2011/0279381 A1 | 11/2011 | Tong et al. |
| 2011/0279395 A1 | 11/2011 | Kuwabara et al. |
| 2011/0279852 A1 | 11/2011 | Oda et al. |
| 2011/0285656 A1 | 11/2011 | Yaksick et al. |
| 2011/0285659 A1 | 11/2011 | Kuwabara et al. |
| 2011/0291945 A1 | 12/2011 | Ewing, Jr. et al. |
| 2011/0291951 A1 | 12/2011 | Tong |
| 2011/0296334 A1 | 12/2011 | Ryu et al. |
| 2011/0296351 A1 | 12/2011 | Ewing, Jr. et al. |
| 2011/0304559 A1 | 12/2011 | Pasquero |
| 2011/0304577 A1 | 12/2011 | Brown et al. |
| 2011/0310049 A1 | 12/2011 | Homma et al. |
| 2012/0005593 A1 | 1/2012 | Park et al. |
| 2012/0011437 A1 | 1/2012 | James et al. |
| 2012/0013541 A1 | 1/2012 | Boka et al. |
| 2012/0013542 A1 | 1/2012 | Shenfield |
| 2012/0019448 A1* | 1/2012 | Pitkanen .............. G06F 1/1662 345/173 |
| 2012/0026110 A1 | 2/2012 | Yamano |
| 2012/0036441 A1 | 2/2012 | Basir et al. |
| 2012/0036556 A1 | 2/2012 | LeBeau et al. |
| 2012/0038580 A1 | 2/2012 | Sasaki |
| 2012/0044153 A1 | 2/2012 | Arrasvouri et al. |
| 2012/0056837 A1 | 3/2012 | Park et al. |
| 2012/0056848 A1 | 3/2012 | Yamano et al. |
| 2012/0062564 A1 | 3/2012 | Miyashita et al. |
| 2012/0062732 A1 | 3/2012 | Marman et al. |
| 2012/0066630 A1 | 3/2012 | Kim et al. |
| 2012/0066648 A1 | 3/2012 | Rolleston et al. |
| 2012/0081375 A1 | 4/2012 | Robert et al. |
| 2012/0084689 A1 | 4/2012 | Ledet et al. |
| 2012/0084713 A1 | 4/2012 | Desai et al. |
| 2012/0089932 A1 | 4/2012 | Kano et al. |
| 2012/0089942 A1 | 4/2012 | Gammon |
| 2012/0089951 A1 | 4/2012 | Cassidy |
| 2012/0092355 A1 | 4/2012 | Yamamoto et al. |
| 2012/0096393 A1 | 4/2012 | Shim et al. |
| 2012/0096400 A1 | 4/2012 | Cho |
| 2012/0098780 A1 | 4/2012 | Fujisawa et al. |
| 2012/0102437 A1 | 4/2012 | Worley et al. |
| 2012/0105358 A1 | 5/2012 | Momeyer et al. |
| 2012/0105367 A1* | 5/2012 | Son ...................... G06F 3/0414 345/174 |
| 2012/0113007 A1 | 5/2012 | Koch et al. |
| 2012/0113023 A1 | 5/2012 | Koch et al. |
| 2012/0126962 A1 | 5/2012 | Ujii et al. |
| 2012/0131495 A1 | 5/2012 | Goossens et al. |
| 2012/0139864 A1* | 6/2012 | Sleeman ............... G06F 3/044 345/174 |
| 2012/0146945 A1 | 6/2012 | Miyazawa et al. |
| 2012/0147052 A1 | 6/2012 | Homma et al. |
| 2012/0154328 A1 | 6/2012 | Kono |
| 2012/0154329 A1 | 6/2012 | Shinozaki |

(56) References Cited

U.S. PATENT DOCUMENTS

| | | |
|---|---|---|
| 2012/0159380 A1 | 6/2012 | Kocienda et al. |
| 2012/0169646 A1 | 7/2012 | Berkes et al. |
| 2012/0169716 A1 | 7/2012 | Mihara |
| 2012/0176403 A1 | 7/2012 | Cha et al. |
| 2012/0179967 A1 | 7/2012 | Hayes |
| 2012/0182226 A1 | 7/2012 | Tuli |
| 2012/0183271 A1 | 7/2012 | Forutanpour et al. |
| 2012/0206393 A1 | 8/2012 | Hillis et al. |
| 2012/0216114 A1 | 8/2012 | Privault et al. |
| 2012/0218203 A1 | 8/2012 | Kanki |
| 2012/0235912 A1 | 9/2012 | Laubach |
| 2012/0240044 A1 | 9/2012 | Johnson et al. |
| 2012/0249575 A1 | 10/2012 | Krolczyk et al. |
| 2012/0249853 A1 | 10/2012 | Krolczyk et al. |
| 2012/0256846 A1 | 10/2012 | Mak |
| 2012/0256847 A1 | 10/2012 | Mak et al. |
| 2012/0256857 A1 | 10/2012 | Mak |
| 2012/0257071 A1 | 10/2012 | Prentice |
| 2012/0260220 A1 | 10/2012 | Griffin |
| 2012/0274591 A1 | 11/2012 | Rimas-Ribikauskas et al. |
| 2012/0274662 A1 | 11/2012 | Kim et al. |
| 2012/0284673 A1 | 11/2012 | Lamb et al. |
| 2012/0293449 A1 | 11/2012 | Dietz |
| 2012/0293551 A1* | 11/2012 | Momeyer ............. G06F 3/0488 345/633 |
| 2012/0299859 A1 | 11/2012 | Kinoshita |
| 2012/0304108 A1 | 11/2012 | Jarrett et al. |
| 2012/0304132 A1 | 11/2012 | Sareen et al. |
| 2012/0304133 A1 | 11/2012 | Nan et al. |
| 2012/0306748 A1* | 12/2012 | Fleizach ................ G06F 3/033 345/161 |
| 2012/0306764 A1 | 12/2012 | Kamibeppu |
| 2012/0306765 A1 | 12/2012 | Moore |
| 2012/0306772 A1 | 12/2012 | Tan et al. |
| 2012/0306778 A1 | 12/2012 | Wheeldreyer et al. |
| 2012/0306927 A1 | 12/2012 | Lee et al. |
| 2012/0311429 A1 | 12/2012 | Decker et al. |
| 2012/0311437 A1 | 12/2012 | Weeldreyer et al. |
| 2012/0311498 A1* | 12/2012 | Kluttz .................. G06F 3/0481 715/825 |
| 2013/0002561 A1 | 1/2013 | Wakasa |
| 2013/0016042 A1 | 1/2013 | Makinen et al. |
| 2013/0016122 A1 | 1/2013 | Bhatt et al. |
| 2013/0019158 A1 | 1/2013 | Watanabe |
| 2013/0019174 A1 | 1/2013 | Gil et al. |
| 2013/0031514 A1 | 1/2013 | Gabbert |
| 2013/0036386 A1 | 2/2013 | Park et al. |
| 2013/0044062 A1 | 2/2013 | Bose et al. |
| 2013/0047100 A1 | 2/2013 | Kroeger et al. |
| 2013/0050131 A1 | 2/2013 | Lee et al. |
| 2013/0050143 A1 | 2/2013 | Kim et al. |
| 2013/0061172 A1 | 3/2013 | Huang et al. |
| 2013/0063389 A1 | 3/2013 | Moore |
| 2013/0067383 A1 | 3/2013 | Kataoka et al. |
| 2013/0067513 A1 | 3/2013 | Takami |
| 2013/0067527 A1 | 3/2013 | Ashbook et al. |
| 2013/0074003 A1 | 3/2013 | Dolenc |
| 2013/0077804 A1 | 3/2013 | Glebe et al. |
| 2013/0082824 A1 | 4/2013 | Colley |
| 2013/0086056 A1 | 4/2013 | Dyor et al. |
| 2013/0093691 A1* | 4/2013 | Moosavi ............. G06F 3/04883 345/173 |
| 2013/0093764 A1 | 4/2013 | Andersson et al. |
| 2013/0097520 A1 | 4/2013 | Lewin et al. |
| 2013/0097521 A1 | 4/2013 | Lewin et al. |
| 2013/0097534 A1 | 4/2013 | Lewin et al. |
| 2013/0097539 A1 | 4/2013 | Mansson et al. |
| 2013/0097556 A1 | 4/2013 | Louch |
| 2013/0097562 A1 | 4/2013 | Kermoian et al. |
| 2013/0106766 A1 | 5/2013 | Yilmaz et al. |
| 2013/0111398 A1 | 5/2013 | Lu et al. |
| 2013/0113715 A1 | 5/2013 | Grant et al. |
| 2013/0113720 A1 | 5/2013 | Van Eerd et al. |
| 2013/0120295 A1* | 5/2013 | Kim ........................ G06F 3/01 345/173 |
| 2013/0120306 A1 | 5/2013 | Furukawa |
| 2013/0135243 A1 | 5/2013 | Hirsch et al. |
| 2013/0135499 A1 | 5/2013 | Song |
| 2013/0141364 A1* | 6/2013 | Lynn ...................... G06F 3/041 345/173 |
| 2013/0141396 A1 | 6/2013 | Lynn et al. |
| 2013/0145313 A1 | 6/2013 | Roh et al. |
| 2013/0154948 A1 | 6/2013 | Schediwy et al. |
| 2013/0154959 A1 | 6/2013 | Lindsay et al. |
| 2013/0155018 A1* | 6/2013 | Dagdeviren ........ G06F 3/03543 345/174 |
| 2013/0159893 A1 | 6/2013 | Lewis et al. |
| 2013/0162667 A1 | 6/2013 | Eskolin et al. |
| 2013/0169549 A1* | 7/2013 | Seymour ............... G06F 3/0488 345/173 |
| 2013/0174049 A1 | 7/2013 | Townsend et al. |
| 2013/0174089 A1 | 7/2013 | Ki |
| 2013/0174094 A1 | 7/2013 | Heo et al. |
| 2013/0174179 A1 | 7/2013 | Park et al. |
| 2013/0179840 A1 | 7/2013 | Fisher et al. |
| 2013/0191791 A1 | 7/2013 | Rydenhag et al. |
| 2013/0194217 A1 | 8/2013 | Lee et al. |
| 2013/0194480 A1 | 8/2013 | Fukata et al. |
| 2013/0198690 A1 | 8/2013 | Barsoum et al. |
| 2013/0212515 A1 | 8/2013 | Eleftheriou |
| 2013/0212541 A1 | 8/2013 | Dolenc et al. |
| 2013/0215079 A1 | 8/2013 | Johnson et al. |
| 2013/0222274 A1 | 8/2013 | Mori et al. |
| 2013/0222671 A1 | 8/2013 | Tseng et al. |
| 2013/0227419 A1 | 8/2013 | Lee et al. |
| 2013/0227450 A1 | 8/2013 | Na et al. |
| 2013/0232402 A1 | 9/2013 | Lu et al. |
| 2013/0234929 A1 | 9/2013 | Libin |
| 2013/0239057 A1 | 9/2013 | Ubillos et al. |
| 2013/0249814 A1 | 9/2013 | Zeng |
| 2013/0257793 A1 | 10/2013 | Zeliff et al. |
| 2013/0257817 A1* | 10/2013 | Yliaho .................. G06F 3/0414 345/177 |
| 2013/0265246 A1 | 10/2013 | Tae |
| 2013/0268875 A1 | 10/2013 | Han et al. |
| 2013/0278520 A1 | 10/2013 | Weng et al. |
| 2013/0305184 A1 | 11/2013 | Kim et al. |
| 2013/0307792 A1 | 11/2013 | Andres et al. |
| 2013/0321340 A1 | 12/2013 | Seo et al. |
| 2013/0321457 A1 | 12/2013 | Bauermeister et al. |
| 2013/0325342 A1 | 12/2013 | Pylappan et al. |
| 2013/0326420 A1 | 12/2013 | Liu et al. |
| 2013/0326421 A1 | 12/2013 | Jo |
| 2013/0328770 A1 | 12/2013 | Parham |
| 2013/0332836 A1 | 12/2013 | Cho |
| 2013/0332892 A1 | 12/2013 | Matsuki |
| 2013/0339909 A1 | 12/2013 | Ha |
| 2014/0002355 A1 | 1/2014 | Lee et al. |
| 2014/0002374 A1 | 1/2014 | Hunt et al. |
| 2014/0002386 A1 | 1/2014 | Rosenberg et al. |
| 2014/0026098 A1* | 1/2014 | Gilman ................ G06F 3/0482 715/810 |
| 2014/0028571 A1 | 1/2014 | St. Clair |
| 2014/0028601 A1 | 1/2014 | Moore |
| 2014/0049491 A1 | 2/2014 | Nagar et al. |
| 2014/0055367 A1 | 2/2014 | Dearman et al. |
| 2014/0055377 A1 | 2/2014 | Kim |
| 2014/0059460 A1 | 2/2014 | Ho |
| 2014/0059485 A1 | 2/2014 | Lehrian et al. |
| 2014/0063316 A1 | 3/2014 | Lee et al. |
| 2014/0063541 A1 | 3/2014 | Yamazaki |
| 2014/0072281 A1 | 3/2014 | Cho et al. |
| 2014/0078318 A1 | 3/2014 | Alameh |
| 2014/0078343 A1 | 3/2014 | Dai et al. |
| 2014/0082536 A1* | 3/2014 | Costa .................... G06F 3/0488 715/765 |
| 2014/0092025 A1 | 4/2014 | Pala et al. |
| 2014/0092030 A1 | 4/2014 | Van der Velden |
| 2014/0108936 A1 | 4/2014 | Khosropour et al. |
| 2014/0109016 A1 | 4/2014 | Ouyang et al. |
| 2014/0111456 A1 | 4/2014 | Kashiwa et al. |
| 2014/0111670 A1 | 4/2014 | Lord et al. |

(56) References Cited

U.S. PATENT DOCUMENTS

| | | |
|---|---|---|
| 2014/0118268 A1 | 5/2014 | Kuscher |
| 2014/0139471 A1 | 5/2014 | Matsuki |
| 2014/0152581 A1 | 6/2014 | Case et al. |
| 2014/0157203 A1* | 6/2014 | Jeon .................... G06F 3/0482 715/840 |
| 2014/0160063 A1 | 6/2014 | Yairi et al. |
| 2014/0160073 A1 | 6/2014 | Matsuki |
| 2014/0164955 A1 | 6/2014 | Thiruvidam et al. |
| 2014/0164966 A1 | 6/2014 | Kim et al. |
| 2014/0165006 A1 | 6/2014 | Chaudhri et al. |
| 2014/0168093 A1* | 6/2014 | Lawrence ............. G06F 3/0414 345/173 |
| 2014/0168153 A1 | 6/2014 | Deichmann et al. |
| 2014/0173517 A1 | 6/2014 | Chaudhri |
| 2014/0184526 A1 | 7/2014 | Cho |
| 2014/0201660 A1 | 7/2014 | Clausen et al. |
| 2014/0210753 A1 | 7/2014 | Lee et al. |
| 2014/0210758 A1 | 7/2014 | Park et al. |
| 2014/0210798 A1 | 7/2014 | Wilson |
| 2014/0229888 A1 | 8/2014 | Ko et al. |
| 2014/0237408 A1 | 8/2014 | Ohlsson et al. |
| 2014/0245202 A1 | 8/2014 | Yoon et al. |
| 2014/0245367 A1 | 8/2014 | Sasaki et al. |
| 2014/0267114 A1 | 9/2014 | Lisseman et al. |
| 2014/0267135 A1 | 9/2014 | Chhabra |
| 2014/0267362 A1 | 9/2014 | Kocienda et al. |
| 2014/0282084 A1 | 9/2014 | Murarka et al. |
| 2014/0282214 A1 | 9/2014 | Shirzadi et al. |
| 2014/0300569 A1 | 10/2014 | Matsuki et al. |
| 2014/0304651 A1 | 10/2014 | Johansson et al. |
| 2014/0306897 A1 | 10/2014 | Cueto |
| 2014/0306899 A1 | 10/2014 | Hicks |
| 2014/0310638 A1 | 10/2014 | Lee et al. |
| 2014/0313130 A1 | 10/2014 | Yamano et al. |
| 2014/0333551 A1 | 11/2014 | Kim et al. |
| 2014/0333561 A1 | 11/2014 | Bull et al. |
| 2014/0344765 A1 | 11/2014 | Hicks et al. |
| 2014/0354845 A1 | 12/2014 | Molgaard et al. |
| 2014/0354850 A1 | 12/2014 | Kosaka et al. |
| 2014/0359438 A1 | 12/2014 | Matsuki |
| 2014/0359528 A1 | 12/2014 | Murata |
| 2014/0365945 A1 | 12/2014 | Karunamuni et al. |
| 2014/0380247 A1 | 12/2014 | Tecarro et al. |
| 2015/0015763 A1 | 1/2015 | Lee et al. |
| 2015/0020036 A1 | 1/2015 | Kim et al. |
| 2015/0026584 A1 | 1/2015 | Kobayakov et al. |
| 2015/0026592 A1 | 1/2015 | Mohammed et al. |
| 2015/0029149 A1* | 1/2015 | Andersson ............. G06F 3/048 345/174 |
| 2015/0033184 A1 | 1/2015 | Kim et al. |
| 2015/0042588 A1 | 2/2015 | Park |
| 2015/0046876 A1 | 2/2015 | Goldenberg |
| 2015/0049033 A1 | 2/2015 | Kim et al. |
| 2015/0058723 A1 | 2/2015 | Cieplinski et al. |
| 2015/0062046 A1 | 3/2015 | Cho et al. |
| 2015/0062052 A1 | 3/2015 | Bernstein et al. |
| 2015/0062068 A1 | 3/2015 | Shih et al. |
| 2015/0067495 A1 | 3/2015 | Bernstein et al. |
| 2015/0067496 A1 | 3/2015 | Missig et al. |
| 2015/0067497 A1 | 3/2015 | Cieplinski et al. |
| 2015/0067513 A1 | 3/2015 | Zambetti et al. |
| 2015/0067519 A1 | 3/2015 | Missig et al. |
| 2015/0067534 A1 | 3/2015 | Choi et al. |
| 2015/0067559 A1 | 3/2015 | Missig et al. |
| 2015/0067560 A1 | 3/2015 | Cieplinski et al. |
| 2015/0067563 A1 | 3/2015 | Bernstein et al. |
| 2015/0067596 A1 | 3/2015 | Brown et al. |
| 2015/0067601 A1 | 3/2015 | Bernstein et al. |
| 2015/0067602 A1 | 3/2015 | Bernstein et al. |
| 2015/0067605 A1 | 3/2015 | Zambetti et al. |
| 2015/0071547 A1 | 3/2015 | Keating et al. |
| 2015/0116205 A1 | 4/2015 | Westerman et al. |
| 2015/0121218 A1 | 4/2015 | Kim et al. |
| 2015/0121225 A1 | 4/2015 | Somasundaram et al. |
| 2015/0128092 A1 | 5/2015 | Lee et al. |
| 2015/0135109 A1 | 5/2015 | Zambetti et al. |
| 2015/0138126 A1 | 5/2015 | Westerman |
| 2015/0138155 A1 | 5/2015 | Bernstein et al. |
| 2015/0139605 A1 | 5/2015 | Wiklof |
| 2015/0143273 A1 | 5/2015 | Bernstein et al. |
| 2015/0143284 A1 | 5/2015 | Bennett et al. |
| 2015/0149899 A1 | 5/2015 | Bernstein et al. |
| 2015/0149964 A1 | 5/2015 | Bernstein et al. |
| 2015/0149967 A1* | 5/2015 | Bernstein ............. G06F 3/0482 715/854 |
| 2015/0153929 A1 | 6/2015 | Bernstein et al. |
| 2015/0160729 A1 | 6/2015 | Nakagawa |
| 2015/0185840 A1 | 7/2015 | Golyshko et al. |
| 2015/0193099 A1 | 7/2015 | Murphy |
| 2015/0193951 A1 | 7/2015 | Lee et al. |
| 2015/0205495 A1 | 7/2015 | Koide et al. |
| 2015/0234446 A1 | 8/2015 | Nathan et al. |
| 2015/0234493 A1 | 8/2015 | Parivar et al. |
| 2015/0253866 A1 | 9/2015 | Amm et al. |
| 2015/0268813 A1 | 9/2015 | Bos |
| 2015/0321607 A1 | 11/2015 | Cho et al. |
| 2015/0332107 A1 | 11/2015 | Paniaras |
| 2015/0378519 A1 | 12/2015 | Brown et al. |
| 2015/0378982 A1 | 12/2015 | McKenzie et al. |
| 2015/0381931 A1 | 12/2015 | Uhma et al. |
| 2016/0004393 A1 | 1/2016 | Faaborg et al. |
| 2016/0004427 A1 | 1/2016 | Zambetti et al. |
| 2016/0004428 A1 | 1/2016 | Bernstein et al. |
| 2016/0004430 A1 | 1/2016 | Missig et al. |
| 2016/0004431 A1 | 1/2016 | Bernstein et al. |
| 2016/0004432 A1 | 1/2016 | Bernstein et al. |
| 2016/0011771 A1 | 1/2016 | Cieplinski |
| 2016/0019718 A1 | 1/2016 | Mukkamala et al. |
| 2016/0021511 A1 | 1/2016 | Jin et al. |
| 2016/0041750 A1 | 2/2016 | Cieplinski et al. |
| 2016/0048326 A1 | 2/2016 | Kim et al. |
| 2016/0062466 A1 | 3/2016 | Moussette et al. |
| 2016/0062619 A1 | 3/2016 | Reeve et al. |
| 2016/0070401 A1 | 3/2016 | Kim et al. |
| 2016/0132139 A1 | 5/2016 | Du et al. |
| 2016/0188181 A1* | 6/2016 | Smith .................... G06F 3/048 715/765 |
| 2016/0196028 A1 | 7/2016 | Kenney et al. |
| 2016/0210025 A1 | 7/2016 | Bernstein et al. |
| 2016/0224220 A1 | 8/2016 | Ganguly |
| 2016/0259412 A1 | 9/2016 | Flint et al. |
| 2016/0259413 A1 | 9/2016 | Anzures et al. |
| 2016/0259495 A1 | 9/2016 | Butcher et al. |
| 2016/0259496 A1 | 9/2016 | Butcher et al. |
| 2016/0259497 A1 | 9/2016 | Foss et al. |
| 2016/0259498 A1 | 9/2016 | Foss et al. |
| 2016/0259499 A1 | 9/2016 | Kocienda et al. |
| 2016/0259516 A1 | 9/2016 | Kudurshian et al. |
| 2016/0259517 A1 | 9/2016 | Butcher et al. |
| 2016/0259518 A1 | 9/2016 | King et al. |
| 2016/0259519 A1 | 9/2016 | Foss et al. |
| 2016/0259527 A1 | 9/2016 | Kocienda et al. |
| 2016/0259528 A1 | 9/2016 | Foss et al. |
| 2016/0259536 A1 | 9/2016 | Kudurshian et al. |
| 2016/0259548 A1 | 9/2016 | Ma |
| 2016/0274686 A1 | 9/2016 | Ruiz et al. |
| 2016/0274728 A1 | 9/2016 | Luo et al. |
| 2016/0274761 A1 | 9/2016 | Ruiz et al. |
| 2016/0283054 A1 | 9/2016 | Suzuki |
| 2016/0320906 A1 | 11/2016 | Bokma et al. |
| 2016/0334960 A1 | 11/2016 | Brown et al. |
| 2016/0357305 A1 | 12/2016 | Wells et al. |
| 2016/0357368 A1 | 12/2016 | Federighi et al. |
| 2016/0357389 A1 | 12/2016 | Dakin et al. |
| 2016/0357390 A1 | 12/2016 | Federighi et al. |
| 2016/0357404 A1 | 12/2016 | Alonso Ruiz et al. |
| 2016/0360116 A1 | 12/2016 | Penha et al. |
| 2017/0045981 A1 | 2/2017 | Karunamuni et al. |
| 2017/0046039 A1 | 2/2017 | Karunamuni et al. |
| 2017/0046058 A1 | 2/2017 | Karunamuni et al. |
| 2017/0046059 A1 | 2/2017 | Karunamuni et al. |
| 2017/0046060 A1 | 2/2017 | Karunamuni et al. |
| 2017/0075520 A1 | 3/2017 | Bauer et al. |
| 2017/0075562 A1 | 3/2017 | Bauer et al. |

(56) References Cited

U.S. PATENT DOCUMENTS

| | | | |
|---|---|---|---|
| 2017/0075563 A1 | 3/2017 | Bauer et al. | |
| 2017/0109011 A1 | 4/2017 | Jiang | |
| 2017/0139565 A1 | 5/2017 | Choi | |
| 2018/0024681 A1 | 1/2018 | Bernstein et al. | |

FOREIGN PATENT DOCUMENTS

| | | |
|---|---|---|
| CN | 101118469 A | 2/2008 |
| CN | 101202866 A | 6/2008 |
| CN | 101222704 A | 7/2008 |
| CN | 101320303 A | 12/2008 |
| CN | 100524183 | 8/2009 |
| CN | 101593077 A | 12/2009 |
| CN | 101809526 A | 8/2010 |
| CN | 102004593 A | 4/2011 |
| CN | 102112946 A | 6/2011 |
| CN | 102160021 A | 8/2011 |
| CN | 102385478 A | 3/2012 |
| CN | 102438092 A | 5/2012 |
| CN | 102483677 A | 5/2012 |
| CN | 102662573 A | 9/2012 |
| CN | 102841677 A | 12/2012 |
| CN | 103097992 A | 5/2013 |
| DE | 100 59 906 A1 | 6/2002 |
| EP | 0 859 307 A1 | 3/1998 |
| EP | 0 880 090 A2 | 11/1998 |
| EP | 1 028 583 A1 | 8/2000 |
| EP | 1406150 A1 | 4/2004 |
| EP | 1 674 977 A2 | 6/2006 |
| EP | 1 882 902 A1 | 1/2008 |
| EP | 2 000 896 A2 | 12/2008 |
| EP | 2 017 701 A1 | 1/2009 |
| EP | 2 028 583 A2 | 2/2009 |
| EP | 2 141 574 A2 | 1/2010 |
| EP | 2 175 357 A1 | 4/2010 |
| EP | 2 196 893 A2 | 6/2010 |
| EP | 2 214 087 A1 | 8/2010 |
| EP | 2 226 715 A2 | 9/2010 |
| EP | 2 299 351 A2 | 3/2011 |
| EP | 2 302 496 A1 | 3/2011 |
| EP | 2 375 309 A1 | 10/2011 |
| EP | 2 375 314 A1 | 10/2011 |
| EP | 2 386 935 A1 | 11/2011 |
| EP | 2 407 868 A1 | 1/2012 |
| EP | 2 420 924 A2 | 2/2012 |
| EP | 2 426 580 A2 | 3/2012 |
| EP | 2 447 818 A1 | 5/2012 |
| EP | 2 527 966 A2 | 11/2012 |
| EP | 2 530 677 A2 | 12/2012 |
| EP | 2 541 376 A1 | 1/2013 |
| EP | 2 555 500 A1 | 2/2013 |
| EP | 2 568 359 A2 | 3/2013 |
| EP | 2 615 535 A1 | 7/2013 |
| EP | 2 631 737 A1 | 8/2013 |
| EP | 2 674 846 A2 | 12/2013 |
| EP | 2 733 578 A2 | 5/2014 |
| EP | 2 808 764 A1 | 12/2014 |
| EP | 2 809 058 A1 | 12/2014 |
| EP | 2 813 938 A1 | 12/2014 |
| GB | 2 402 105 A | 12/2004 |
| JP | 58-182746 | 10/1983 |
| JP | H07-151512 A | 6/1995 |
| JP | H08-227341 A | 9/1996 |
| JP | H09-269883 A | 10/1997 |
| JP | H09-330175 A | 12/1997 |
| JP | H11-203044 A | 7/1999 |
| JP | 2001-202192 A | 7/2001 |
| JP | 2002-149312 A | 5/2002 |
| JP | 2003-157131 A | 5/2003 |
| JP | 2003-186597 A | 7/2003 |
| JP | 2004-054861 A | 2/2004 |
| JP | 2004-062648 A | 2/2004 |
| JP | 2004-070492 A | 3/2004 |
| JP | 2004-086733 A | 3/2004 |
| JP | 2005-031786 A | 2/2005 |
| JP | 2005-092386 A | 4/2005 |
| JP | 2005-135106 A | 5/2005 |
| JP | 2005-157842 A | 6/2005 |
| JP | 2005-196810 A | 7/2005 |
| JP | 2006-185443 A | 7/2006 |
| JP | 2007-116384 A | 5/2007 |
| JP | 2007-264808 A | 10/2007 |
| JP | 2008-009759 A | 1/2008 |
| JP | 2008-015890 A | 1/2008 |
| JP | 2008-033739 A | 2/2008 |
| JP | 2008-146453 A | 6/2008 |
| JP | 2008-537615 | 9/2008 |
| JP | 2008 305174 A | 12/2008 |
| JP | 2009-500761 | 1/2009 |
| JP | 2009-211704 A | 9/2009 |
| JP | 2009-217543 A | 9/2009 |
| JP | 2010-009321 A | 1/2010 |
| JP | 2010-503130 A | 1/2010 |
| JP | 2010-055274 A | 3/2010 |
| JP | 2010-097353 A | 4/2010 |
| JP | 2010-146507 A | 7/2010 |
| JP | 2010-152716 A | 7/2010 |
| JP | 2010-176174 A | 8/2010 |
| JP | 2010-176337 A | 8/2010 |
| JP | 2010-181934 A | 8/2010 |
| JP | 2010-541071 A | 12/2010 |
| JP | 2011-501307 A | 1/2011 |
| JP | 2011-048666 A | 3/2011 |
| JP | 2011-048686 A | 3/2011 |
| JP | 2011-048762 A | 3/2011 |
| JP | 2011-048832 A | 3/2011 |
| JP | 2011-053831 A | 3/2011 |
| JP | 2011-053972 A | 3/2011 |
| JP | 2011-053973 A | 3/2011 |
| JP | 2011-053974 A | 3/2011 |
| JP | 2011-059821 A | 3/2011 |
| JP | 2011-070342 A | 4/2011 |
| JP | 2011-100290 A | 5/2011 |
| JP | 2011-107823 A | 6/2011 |
| JP | 2011-123773 A | 6/2011 |
| JP | 2011-141868 A | 7/2011 |
| JP | 2011 192179 A | 9/2011 |
| JP | 2011-192215 A | 9/2011 |
| JP | 2011-242386 A | 12/2011 |
| JP | 2011-253556 A | 12/2011 |
| JP | 2011-257941 A | 12/2011 |
| JP | 2011-530101 A | 12/2011 |
| JP | 2012-027940 A | 2/2012 |
| JP | 2012-043266 A | 3/2012 |
| JP | 2012-043267 A | 3/2012 |
| JP | 2012-053754 | 3/2012 |
| JP | 2012-053926 A | 3/2012 |
| JP | 2012-073873 A | 4/2012 |
| JP | 2012-509605 A | 4/2012 |
| JP | 2012-093820 A | 5/2012 |
| JP | 2012-123564 A | 6/2012 |
| JP | 2012-128825 A | 7/2012 |
| JP | 2013-030050 A | 2/2013 |
| JP | 2013-058149 A | 3/2013 |
| JP | 2013-080521 A | 5/2013 |
| JP | 2013-529339 A | 7/2013 |
| JP | 2013-542488 A | 11/2013 |
| JP | 2014-130567 A | 7/2014 |
| JP | 2014-140112 A | 7/2014 |
| JP | 2014-519109 A | 8/2014 |
| JP | 2015-153420 A | 8/2015 |
| KR | 2006-0071353 A | 6/2006 |
| KR | 2008-0045143 A | 4/2008 |
| KR | 2008-0054346 A | 6/2008 |
| KR | 2010 0046087 | 6/2010 |
| KR | 2010 0133246 A | 12/2010 |
| KR | 2011 0086501 A | 7/2011 |
| KR | 20120103670 | 9/2012 |
| KR | 2013 0099647 A | 9/2013 |
| KR | 2014 0016495 A | 2/2014 |
| KR | 2014 0043760 A | 4/2014 |
| KR | 2014 0079110 A | 6/2014 |
| KR | 20150021977 A | 3/2015 |
| WO | WO 2005/106637 A2 | 11/2005 |

(56) References Cited

FOREIGN PATENT DOCUMENTS

| WO | WO 2006/013485 A2 | 2/2006 |
|---|---|---|
| WO | WO 2006/042309 A1 | 4/2006 |
| WO | WO 2006/094308 A2 | 9/2006 |
| WO | WO 2007/121557 A1 | 11/2007 |
| WO | WO 2008/030976 A2 | 3/2008 |
| WO | WO 2008/064142 A2 | 5/2008 |
| WO | WO 2009/155981 A1 | 12/2009 |
| WO | WO 2009/158549 A2 | 12/2009 |
| WO | WO 2010/013876 A1 | 2/2010 |
| WO | WO 2010/090010 A1 | 8/2010 |
| WO | WO 2010/122813 A1 | 10/2010 |
| WO | WO 2011/024389 A1 | 3/2011 |
| WO | WO 2011/024465 A1 | 3/2011 |
| WO | WO 2011/093045 A1 | 8/2011 |
| WO | WO 2011/105009 A1 | 9/2011 |
| WO | WO 2011/105091 A | 9/2011 |
| WO | WO 2011/108190 A1 | 9/2011 |
| WO | WO 2011/115187 A1 | 9/2011 |
| WO | WO 2011/121375 A1 | 10/2011 |
| WO | WO 2012/021417 A1 | 2/2012 |
| WO | WO 2012/037664 | 3/2012 |
| WO | WO 2012/096804 A2 | 7/2012 |
| WO | WO 2012/108213 A1 | 8/2012 |
| WO | WO 2012/114760 A1 | 8/2012 |
| WO | WO 2012/150540 A2 | 11/2012 |
| WO | WO 2013/169299 A1 | 11/2013 |
| WO | WO 2013/169845 A1 | 11/2013 |
| WO | WO 2013/169849 A2 | 11/2013 |
| WO | WO 2013/169851 A2 | 11/2013 |
| WO | WO 2013/169853 A1 | 11/2013 |
| WO | WO 2013/169854 A2 | 11/2013 |
| WO | WO 2013/169870 A1 | 11/2013 |
| WO | WO 2013/169875 A2 | 11/2013 |
| WO | WO 2013/169877 A2 | 11/2013 |
| WO | WO 2013/169882 A2 | 11/2013 |
| WO | WO 2013/173838 A2 | 11/2013 |
| WO | WO 2014/105275 A1 | 7/2014 |
| WO | WO 2014/105276 A1 | 7/2014 |
| WO | WO 2014/105277 A1 | 7/2014 |
| WO | WO 2014/105278 A1 | 7/2014 |
| WO | WO 2014/105279 A1 | 7/2014 |
| WO | WO 2014/129655 A1 | 8/2014 |
| WO | WO 2014/149473 A1 | 9/2014 |
| WO | WO 2014/200733 A1 | 12/2014 |

OTHER PUBLICATIONS

Davidson, et al., "Extending 2D Object Arrangement with Pressure-Sensitive Layering Cues", Proceedings of the 21st Annual ACM Symposium on User Interface Software and Technology, Oct. 19, 2008, 4 pages.
Dinwiddie, et al., "Combined-User Interface for Computers, Television, Video Recorders, and Telephone, Etc", ip.com Journal, Aug. 1, 1990, 3 Pages.
Forlines, et al., "Glimpse: a Novel Input Model for Multi-level Devices", Chi '05 Extended Abstracts on Human Factors in Computing Systems, Apr. 2, 2005, 4 pages.
Harrison, "Stylus-Based Interface with Full Mouse Emulation", IBM Technical Disclosure Bulletin, vol. 34, No. 10B, Mar. 1, 1992, 3 pages.
Kaaresoja, et al., "Snap-Crackle-Pop: Tactile Feedback for Mobile Touch Screens", Proceedings of Eurohaptics vol. 2006, Jul. 3, 2006, 2 pages.
Minsky, "Computational Haptics *The Sandpaper* System for Synthesizing Texture for a Force-Feedback Display," Massachusetts Institute of Technology, Jun. 1978, 217 pages.
O'Hara, et al., "Pressure-Sensitive Icons", ip.com Journal, Jun. 1, 1990, 2 Pages.
Quinn, et al., "Zoofing! Faster List Selections with Pressure-Zoom-Flick-Scrolling", Proceedings of the 21st Annual Conference of the Australian Computer-Human Interaction Special Interest Group on Design, Nov. 23, 2009, ACM Press, vol. 411, 8 pages.
Rekimoto, et al., "PreSense: Interaction Techniques for Finger Sensing Input Devices", Proceedings of the 16th Annual ACM Symposium on User Interface Software and Technology, Nov. 30, 2003, 10 pages.
Rekimoto, et al., "PreSenseII: Bi-directional Touch and Pressure Sensing Interactions with Tactile Feedback", Conference on Human Factors in Computing Systems Archive, ACM, Apr. 22, 2006, 6 pages.
Song, et al., "Grips and Gestures on a Multi-Touch Pen," The ACM CHI Conference on Human Factors in Computing Systems, <URL:research.microsoft.com/pubs/.../gripsandgenstures%20mtpen-chi201>, May 7-12, 2011, 10 pages.
Office Action, dated Jul. 15, 2015, received in Australian Patent Application No. 2013259606, which corresponds with U.S. Appl. No. 14/536,426, 3 pages.
Office Action, dated Jul. 17, 2015, received in Australian Patent Application No. 2013259613, which corresponds with U.S. Appl. No. 14/536,646, 5 pages.
Office Action, dated Aug. 27, 2015, received in Australian Patent Application No. 2013259614, which corresponds with U.S. Appl. No. 14/536,141, 4 pages.
Office Action, dated Jul. 9, 2015, received in Australian Patent Application No. 2013259630, which corresponds with U.S. Appl. No. 14/536,203, 3 pages.
Office Action, dated Aug. 10, 2015, received in Australian Patent Application No. 2013259637, which corresponds with U.S. Appl. No. 14/536,203, 3 pages.
Office Action, dated Aug. 18, 2015, received in Australian Patent Application No. 2013259642, which corresponds with U.S. Appl. No. 14/536,291, 3 pages.
International Search Report and Written Opinion dated May 26, 2014, received in International Application No. PCT/US2013/040053, which corresponds to U.S. Appl. No. 14/535,671, 32 pages.
International Preliminary Report on Patentability dated Nov. 20, 2014, received in International Application No. PCT/US2013/040053, which corresponds to U.S. Appl. No. 14/535,671, 26 pages.
Invitation to Pay Additional Fees dated Feb. 10, 2014, received in International Application No. PCT/US2013/069472, which corresponds to U.S. Appl. No. 14/608,895, 6 pages.
International Search Report and Written Opinion dated Apr. 7, 2014, received in International Application No. PCT/US2013/069472, which corresponds to U.S. Appl. No. 14/608,895, 24 pages.
International Preliminary Report on Patentability, dated Jun. 30, 2015, received in International Patent Application No. PCT/US2013/069472, which corresponds with U.S. Appl. No. 14/608,895, 18 pages.
International Search Report and Written Opinion dated Aug. 7, 2013, received in International Application No. PCT/US2013/040054, which corresponds to U.S. Appl. No. 14/536,235, 12 pages.
International Preliminary Report on Patentability dated Nov. 20, 2014, received in International Application No. PCT/US2013/040054, which corresponds to U.S. Appl. No. 14/536,235, 11 pages.
International Search Report and Written Opinion dated Aug. 7, 2013, received in International Application No. PCT/US2013/040056, which corresponds to U.S. Appl. No. 14/536,367, 12 pages.
International Preliminary Report on Patentability dated Nov. 20, 2014, received in International Application No. PCT/US2013/040056, which corresponds to U.S. Appl. No. 14/536,367, 11 pages.
International Search Report and Written Opinion dated Aug. 6, 2013, received in International Application No. PCT/US2013/040058, which corresponds to U.S. Appl. No. 14/536,426, 12 pages.
International Preliminary Report on Patentability dated Nov. 20, 2014, received in International Application No. PCT/US2013/040058, which corresponds to U.S. Appl. No. 14/536,426, 11 pages.
Invitation to Pay Additional Fees dated Sep. 25, 2013, received in International Application No. PCT/US2013/040061, which corresponds to U.S. Appl. No. 14/536,464, 6 pages.
International Search Report and Written Opinion dated Feb. 5, 2014, received in International Application No. PCT/US2013/040061, which corresponds to U.S. Appl. No. 14/536,464, 30 pages.
International Preliminary Report on Patentability dated Nov. 20, 2014, received in International Application No. PCT/US2013/040061, which corresponds to U.S. Appl. No. 14/536,464, 26 pages.

(56) References Cited

OTHER PUBLICATIONS

Invitation to Pay Additional Fees dated Oct. 8, 2013, received in International Application No. PCT/US2013/040067, which corresponds to U.S. Appl. No. 14/536,644, 8 pages.
International Search Report and Written Opinion dated May 8, 2014, received in International Application No. PCT/US2013/040067, which corresponds to U.S. Appl. No. 14/536,644, 45 pages.
International Preliminary Report on Patentability dated Nov. 20, 2014, received in International Application No. PCT/US2013/040067, which corresponds to U.S. Appl. No. 14/536,644, 36 pages.
International Search Report and Written Opinion dated Mar. 12, 2014, received in International Application No. PCT/US2013/069479, which corresponds with U.S. Appl. No. 14/608,926, 14 pages.
International Search Report and Written Opinion dated Aug. 7, 2013, received in International Application No. PCT/US2013/040070, which corresponds to U.S. Appl. No. 14/535,646, 12 pages.
International Preliminary Report on Patentability dated Nov. 20, 2014, received in International Application No. PCT/US2013/040070, which corresponds to U.S. Appl. No. 14/535,646, 10 pages.
Invitation to Pay Additional Fees dated Oct. 28, 2013, received in International Application No. PCT/US2013/040072, which corresponds to U.S. Appl. No. 14/536,141, 7 pages.
International Search Report and Written Opinion dated Apr. 7, 2014, received in International Application No. PCT/US2013/040072, which corresponds to U.S. Appl. No. 14/536,141, 38 pages.
International Preliminary Report on Patentability dated Nov. 20, 2014, received in International Application No. PCT/US2013/040072, which corresponds to U.S. Appl. No. 14/536,141, 32 pages.
Invitation to Pay Additional Fees dated Feb. 14, 2014, received in International Application No. PCT/US2013/069483, which corresponds with U.S. Appl. No. 14/608,942, 7 pages.
International Search Report and Written Opinion dated Apr. 7, 2014, received in International Application No. PCT/US2013/069483, which corresponds with U.S. Appl. No. 14/608,942, 18 pages.
International Preliminary Report on Patentability, dated Jun. 30, 2015, received in International Application No. PCT/2013/069483, which corresponds to U.S. Appl. No. 14/608,942, 13 pages.
Invitation to Pay Additional Fees dated Oct. 28, 2013, received in International Application No. PCT/US2013/040087, which corresponds to U.S. Appl. No. 14/536,166, 8 pages.
International Search Report and Written Opinion dated Mar. 3, 2014, received in International Application No. PCT/US2013/040087, which corresponds to U.S. Appl. No. 14/536,166, 35 pages.
International Preliminary Report on Patentability dated Nov. 20, 2014, received in International Application No. PCT/2013/040087, which corresponds to U.S. Appl. No. 14/536,166, 29 pages.
International Search Report and Written Opinion dated Aug. 7, 2013, received in International Application No. PCT/US2013/040093, which corresponds to U.S. Appl. No. 14/536,203, 11 pages.
International Preliminary Report on Patentability dated Nov. 20, 2014, received in International Application No. PCT/2013040093, which corresponds to U.S. Appl. No. 14,536,203, 9 pages.
Invitation to Pay Additional Fees dated Apr. 17, 2014, received in International Application No. PCT/US2013/069484, which corresonds with U.S. Appl. No. 14/608,965, 7 pages.
International Search Report and Written Opinion dated Jul. 9, 2014, received in International Application No. PCT/US2013/069484, which coresonds with U.S. Appl. No. 14/608,965, 17 pages.
International Preliminary Report on Patentability, dated Jun. 30, 2015, received in International Patent Application No. PCT/US2013/069484, which corresponds with U.S. Appl. No. 14/608,965, 12 pages.
Invitation to Pay Additional Fees dated Sep. 25, 2013, received in International Application No. PCT/US2013/040098, which corresponds to U.S. Appl. No. 14/536,247, 8 pages.
International Search Report and Written Opinion dated Feb. 5, 2014, received in International Application No. PCT/US2013/040098, which corresponds to U.S. Appl. No. 14/536,247, 35 pages.
International Preliminary Report on Patentability dated Nov. 20, 2014, received in International Application No. PCT/2013/040098, which corresponds to U.S. Appl. No. 14/536,247, 27 pages.
Invitation to Pay Additional Fees dated Aug. 7, 2013, received in International Application No. PCT/US2013/040101, which corresponds to U.S. Appl. No. 14/536,267, 7 pages.
International Search Report and Written Opinion dated Jan. 27, 2014, received in International Application No. PCT/US2013/040101, which corresponds to U.S. Appl. No. 14/536,267, 30 pages.
International Preliminary Report on Patentability dated Nov. 20, 2014, received in International Application No. PCT/2013/040101, which corresponds to U.S. Appl. No. 14/536,267, 24 pages.
Invitation to Pay Additional Fees dated Aug. 7, 2013, received in International Application No. PCT/US2013/040108, which corresponds to U.S. Appl. No. 14/536,291, 6 pages.
International Search Report and Written Opinion dated Jan. 8, 2014, received in International Application No. PCT/US2013/040108, which corresponds to U.S. Appl. No. 14/536,291, 30 pages.
International Preliminary Report on Patentability dated Nov. 20, 2014, received in International Application No. PCT/2013/040108, which corresponds to U.S. Appl. No. 14/536,291, 25 pages.
Invitation to Pay Additional Fees dated Apr. 1, 2014, received in International Application No. PCT/US2013/069486, which corresponds with U.S. Appl. No. 14/608,985, 7 pages.
International Search Report and Written Opinion dated Jun. 2, 2014, received in International Application No. PCT/US2013/069486, which corresponds with U.S. Appl. No. 14/608,985, 7 pages.
International Preliminary Report on Patentability, dated Jun. 30, 2015, received in International Patent Application No. PCT/US2013/069486, which corresponds with U.S. Appl. No. 14/608,985, 19 pages.
International Search Report and Written Opinion dated Mar. 6, 2014, received in International Application No. PCT/US2013/069489, which corresponds with U.S. Appl. No. 14/609,006, 12 pages.
International Preliminary Report on Patentability, dated Jun. 30, 2015, received in International Patent Application No. PCT/US2013/069489, which corresponds with U.S. Appl. No. 14/609,006, 10 pages.
International Search Report and Written Opinion dated Sep. 30, 2014, received in International Application No. PCT/US2014/047303, which corresponds with U.S. Appl. No. 14/030,682, 10 pages.
Agarwal, "How to Copy and Paste Text on Windows Phone 8," Guiding Tech, http://web.archive.org/web20130709204246/http://www.guidingtech.com/20280/copy-paste-text-windows-phone-8/, Jul. 9, 2013, 10 pages.
Azundris, "A Fire in the Sky," http://web.archive.org/web/20140722062639/http://blog.azundrix.com/archives/168-A-fire-in-the-sky.html, Jul. 22, 2014, 8 pages.
B-log—betriebsraum weblog, "Extremely Efficient Menu Selection: Marking Menus for the Flash Platform," http://www.betriebsraum.de/blog/2009/12/11/extremely-efficient-menu-selection-marking -for-the-flash-platform, Dec. 11, 2009, 9 pages.
Clark, "Global Moxie, Touch Means a Renaissance for Radial Menus," http://globalmoxie.com/blog/radial-menus-for-touch-ui~print.shtml, Jul. 17, 2012, 7 pages.
CrackBerry Forums, Windows 8 Bezel Control and Gestures, http://wwwforums.crackberry.com/blackberry-playbook-f222/windows-8-bezel-control-gestures-705129/, Mar. 1, 2012, 8 pages.
Crook, "Microsoft Patenting Multi-Screen, Milti-Touch Gesures," http://techcrunch.com/2011/08/25/microsoft-awarded-patents-for-multi-screen-multi-touch-gestures/, Aug. 25, 2011, 8 pages.
cvil.ly—a design blog, Interesting Touch Interactions on Windows 8, http://cvil.ly/2011/06/04/interesting-touch-interactions-on-windows-8/, Jun. 4, 2011, 3 pages.
Drinkwater, "Glossary: Pre/Post Alarm Image Buffer," http://www.networkwebcams.com/ip-camera-learning-center/2008/07/17/glossary-prepost-alarm-image-buffer/, Jul. 17, 2008, 1 page.
Fenlon, "The Case for Bezel Touch Gestures on Apple's iPad," http://www.tested.com/tech/tablets/3104-the case-for-bezel-touch-gestures-on-apples-ipad/, Nov. 2, 2011, 6 pages.

(56) References Cited

OTHER PUBLICATIONS

Flixel, "Cinemagraph Pro for Mac", https://flixel.com/products/mac/cinemagraph-pro, 2014, 7 pages.
Flock, "Cinemagraphics: What It Looks Like When a Photo Moves," http://www.washingtonpost.com/blogs/blowpost/post/cinemagraphs-what-it-looks-like-when-a-photo-moves/2011/07-08/gl@AONez3H.blog.html, Jul. 12, 2011, 3 pages.
Flowplayer, "Slowmotion: Flowplayer," https://web.archive.org/web/20150226191526/http://flash.flowplayer.org/plugins/streaming/slowmotion.html, Feb. 26, 2015, 4 pages.
HTC, "HTC One (M7)," Wikipedia, the free encyclopedia, https://en.wikipedia.org/wiki/HTC_One_(M7), Mar. 2013, 20 pages.
IBM et al., "Pressure-Sensitive Icons", IBM Technical Disclosure Bulletin, vol. 33, No. 1B, Jun. 1, 1990, 3 pages.
iCIMS Recruiting Software, "Blackberry Playbook Review," http://www.tested.com/tech.tablets/5749-blackberry-playbook-review/, 2015, 11 pages.
Kronfli, "HTC Zoe Comes to Goole Play, Here's Everthing You Need to Know," Know Your Mobile, http://www.knowyourmobile.com/htc/htc-one/19550/what-htc-zoe, Aug. 14, 2014, 5 pages.
Laurie, "The Power of the Right Click," http://vlaurie.com/right-click/customize-context-menu.html, 2002-2016, 3 pages.
McRitchie, "Internet Explorer Right-Click Menus," http://web.archive.org/web-201405020/http://dmcritchie.mvps.org/ie/rightie6.htm, May 2, 2014, 10 pages.
Microsoft, "Use Radial Menus to Display Commands in OneNote for Windows 8," https://support.office.com/en-us/article/Use-radial-menues-to-display-OneNote-commands-0d75f03f-cde7-493a-a8a0b2ed6f99fbe2, 2016, 5 pages.
Pallenberg, "Wow, the new iPad had gestures." https://plus.google.com/+SaschaPallenberg/posts/aaJtJogu8ac, Mar. 7, 2012, 2 pages.
PoliceOne.com, "COBAN Technoligies Pre-Event Buffer & Fail Safe Feature," http://www.policeone.com/police-products/police-technology/mobile-computures/videos/5955587-COBAN-Technologies-Pre-Event, Nov. 11, 2010, 2 pages.
Pradeep, "Android App Development—Microsoft Awarded With Patents on Gestures Supported on Windows 8," http://mspoweruser.com/microsoft-awarded-with-patents-on-gestures-supported-on-windows-8/, Aug. 25, 2011, 16 pages.
"Quickly Preview Songs in Windows Media Player 12 in Windows 7," Quickly Preview Songs in Windows Media Player 12 in Windows 7. How-to Geek, Apr. 28, 2010, Web. May 8, 2010, http://web.archive.org/web/20100502013134/http://www.howtogeek.com/howto/16157/quickly-preview-songs-in-windows-media-center-12-in-windows-7>, 6 pages.
Sony, "Intelligent Scene Recognition," https://www.sony-asia.com/article/252999/section/product/product/dsc-t77, downloaded on May 20, 2016, 5 pages.
Sony, "Sony Xperia Z1", Wikipedia, the free encyclopedia, https://en.wikipedia.org/wiki/Sony_Xperia_Z1, Sep. 2013, 10 pages.
Stross, "Wearing a Badge, and a Video Camera," The New York Times, http://www.nytimes.com/2013/04/07/business/wearable-video-cameras-for-police-offers.html?R=0, Apr. 6, 2013, 4 pages.
Taser, "Taser Axon Body Camera User Manual," https://www.tasercom/images/support/downloads/product-resourses/axon_body_product_manual.pdf, Oct. 1, 2013, 24 pages.
Tidwell, "Designing Interfaces," O'Reilly Media, Inc., USA, Nov. 2005, 348 pages.
Wikipedia, "AirDrop,", Wikipedia, the free encyclopedia, http://en.wikipedia.org/wiki/AirDrop, May 17, 2016, 5 pages.
Wikipedia, "Cinemagraph," Wikipedia, the free encyclopedia, http://en.wikipedia.org/wiki/Cinemagraph, Last Modified Mar. 16, 2016, 2 pages.
Wikipedia, "Context Menu," Wikipedia, the free encyclopedia https://en.wikipedia.org/wiki/Context menu, Last Modified May 15, 2016, 4 pages.
Wikipedia, "Mobile Ad Hoc Network," Wikipedia, the free encyclopedia, http://en.wikipedia.org/wiki/Mobile_ad_hoc_network, May 20, 2016, 4 pages.
Wikipedia, "Pie Menu," Wikipedia, the free encyclopedia, http://en.wikipedia.org/wiki/Pie_menu, Last Modified Jun. 4, 2016, 3 pages.
Wikipedia, "Quick Look," from Wikipedia, the free encyclopedia, https://en.wikipedia.org/wiki/Quick_Look, Last Modified Jan. 15, 2016, 3 pages.
YouTube, "Blackberry Playbook bezel interaction," https://www.youtube.com/watch?v=YGkzFqnOwXI, Jan. 10, 2011, 2 pages.
Office Action, dated Dec. 18, 2015, received in Australian Patent Application No. 2013368440, which corresponds with U.S. Appl. No. 14/536,426, 3 pages.
Office Action, dated Apr. 5, 2016, received in Korean Patent Application No. 10-2015-7018851, which corresponds with U.S. Appl. No. 14/536,426, 7 pages.
Office Action, dated Dec. 17, 2015, received in U.S. Appl. No. 14/536,426, 28 pages.
Office Action, dated May 6, 2016, received in U.S. Appl. No. 14/536,426, 23 pages.
Notice of Allowance, dated May 23, 2016, received in Australian Patent Application No. 2013259606, which corresponds with U.S. Appl. No. 14/536,426, 3 pages.
Office Action, dated Nov. 18, 2015, received in Australian Patent Application No. 2015101231, which corresponds with U.S. Appl. No. 14/536,426, 3 pages.
Office Action, dated Mar. 4, 2016, received in Japanese Patent Application No. 2015-511644, which corresponds with U.S. Appl. No. 14/536,426, 3 pages.
Office Action, dated Feb. 1, 2016, received in Australian Patent Application No. 2013368441, which corresponds with U.S. Appl. No. 14/608,926, 3 pages.
Notice of Allowance, dated Mar. 30, 2016, received in Australian Patent Application No. 2013368441, which corresponds with U.S. Appl. No. 14/608,926, 1 page.
Office Action, dated Apr. 21, 2016, received in European Patent Application No. 13795392.3, which corresponds with U.S. Appl. No. 14/608,926, 6 pages.
Office Action, dated May 6, 2016, received in European Patent Application No. 13795392.3, which corresponds with U.S. Appl. No. 14/608,926, 6 pages.
Office Action, dated Mar. 14, 2016, received in Japanese Patent Application No. 2015-549392, which corresponds with U.S. Appl. No. 14/608,926, 4 pages.
Office Action, dated May 12, 2016, received in Korean Patent Application No. 10-2015-7018853, which corresponds with U.S. Appl. No. 14/608,926, 4 pages.
Office Action, dated May 31, 2016, received in Australian Patent Application No. 2013259613, which corresponds with U.S. Appl. No. 14/536,646, 4 pages.
Office Action, dated Nov. 12, 2015, received in European Patent Application No. 13724102.2, which corresponds with U.S. Appl. No. 14/536,646, 6 pages.
Office Action, dated May 31, 2016, received in European Patent Application No. 13724102.2, which corresponds with U.S. Appl. No. 14/536,646, 5 pages.
Office Action, dated Feb. 29, 2016, received in Japanese Patent Application No. 2015-511645, which corresponds with U.S. Appl. No. 14/536,646, 5 pages.
Office Action, dated Jan. 7, 2016, received in European Patent Application No. 13726053.5, which corresponds with U.S. Appl. No. 14/536,141, 10 pages.
Office Action, dated Feb. 29, 2016, received in Japanese Patent Application No. 2015-511646, which corresponds with U.S. Appl. No. 14/536,141, 3 pages.
Office Action, dated Jan. 29, 2016, received in Australian Patent Application No. 2013368443, which corresponds with U.S. Appl. No. 14/536,141, 3 pages.
Notice of Allowance, dated Mar. 11, 2016, received in Australian Patent Application No. 2013368443, which corresponds with U.S. Appl. No. 14/536,141, 2 pages.
Office Action, dated Apr. 5, 2016, received in Korean Patent Application No. 102015-7018448, which corresponds with U.S. Appl. No. 14/536,141, 6 pages.

(56) References Cited

OTHER PUBLICATIONS

Notice of Allowance, dated Jun. 15, 2016, received in Australian Patent Applicatin No. 2013259630, which corresponds with U.S. Appl. No. 14/536,203, 3 pages.
Office Action, dated Nov. 11, 2015, received in European Patent Application No. 13724104.8, which corresponds with U.S. Appl. No. 14/536,203, 5 pages.
Office Action, dated May 31, 2016, received in European Patent Application No. 13724104.8, which corresponds with U.S. Appl. No. 14/536,203, 5 pages.
Office Action, dated Feb. 15, 2016, received in Japanese Patent Application No. 2015-511650, which corresponds with U.S. Appl. No. 14/536,203, 5 pages.
Office Action, dated Dec. 4, 2015, received in Korean Patent Application No. 2014-7034520, which corresponds with U.S. Appl. No. 14/536,203, 4 pages.
Notice of Allowance, dated Jun. 28, 2016, received in Australian Patent Application No. 2013259637, which corresponds with U.S. Appl. No. 14/536,267, 3 pages.
Office Action, dated Jan. 29, 2016, received in Japanese Patent Application No. 2015-511652, which corresponds with U.S. Appl. No. 14/536,267, 3 pages.
Office Action, dated Dec. 4, 2015, received in Korean Patent Application No. 2014-7034530, which corresponds with U.S. Appl. No. 14/536,267, 3 pages.
Office Action, dated Jan. 7, 2016, received in European Patent Application No. 13724107.1, which corresponds with U.S. Appl. No. 14/052,515, 11 pages.
Office Action, dated Mar. 8, 2016, received in Japanese Patent Application No. 2015-511655, which corresponds with U.S. Appl. No. 14/536,291, 4 pages.
Office Action, dated Jan. 15, 2016, received in Australian Patent Application No. 2013368445, which corresponds with U.S. Appl. No. 14/608,985, 3 pages.
Office Action, dated Apr. 25, 2016, received in Japanese Patent Application No. 2015-550384, which corresponds with U.S. Appl. No. 14/608,985, 4 pages.
Office Action, dated Mar. 31, 2016, received in U.S. Appl. No. 14/864,737, 17 pages.
Office Action, dated Apr. 5, 2016, received in Danish Patent Application No. 201500577, which corresponds with U.S. Appl. No. 14/864,737, 7 pages.
Office Action, dated Jun. 27, 2016, received in U.S. Appl. No. 14/866,981, 22 pages.
Office Action, dated May 10, 2016, received in Australian Patent Application No. 2016100254, which corresponds with U.S. Appl. No. 14/866,981, 6 pages.
Office Action, dated Mar. 18, 2016, received in Danish Patent Application No. 201500575, which corresponds with U.S. Appl. No. 14/866,981, 9 pages.
Office Action, dated May 19, 2016, received in Australian Patent Application No. 2016100251, which corresponds with U.S. Appl. No. 14/866,159, 5 pages.
Office Action, dated Mar. 9, 2016, received in Danish Patent Application No. 201500574, which corresponds with U.S. Appl. No. 14/866,159, 11 pages.
Patent Certificate, dated Jun. 9, 2016, received in Australian Patent Application No. 2016100247, which corresponds with U.S. Appl. No. 14/868,078, 1 page.
Office Action, dated Mar. 30, 2016, received in Danish Patent Application No. 201500588, which corresponds with U.S. Appl. No. 14/868,078, 9 pages.
Office Action, dated May 9, 2016, received in U.S. Appl. No. 14/863,432, 26 pages.
Office Action, dated Apr. 4, 2016, received in Danish Patent Application No. 201500582, which corresponds with U.S. Appl. No. 14,863,432, 10 pages.
Office Action, dated Mar. 22, 2016, received in Danish Patent Application No. 201500576, which corresponds with U.S. Appl. No. 14/866,989, 10 pages.
Notice of Allowance, dated Jun. 8, 2016, received in Danish Patent Application No. 201500576, which corresponds with U.S. Appl. No. 14/866,989, 2 pages.
Office Action, dated Mar. 28, 2016, received in U.S. Appl. No. 14/869,899, 17 pages.
Office Action (Interview Summary), dated Jun. 28, 2016, received in U.S. Appl. No. 14/869,899, 5 pages.
Office Action, dated Feb. 3, 2016, received in Danish Patent Application No. 201500592, which corresponds with U.S. Appl. No. 14/869,899, 9 pages.
Office Action, dated Mar. 4, 2016, received in U.S. Appl. No. 14/866,992, 30 pages.
Office Action, dated Mar. 18, 2016, received in Danish Patent Application No. 201500593, which corresponds with U.S. Appl. No. 14/866,992, 10 pages.
Office Action, dated Jun. 27, 2016, received in Danish Patent Application No. 201500593, which corresponds with U.S. Appl. No. 14/866,992, 7 pages.
Office Action, dated Nov. 30, 2015, received in U.S. Appl. No. 14/845,217, 24 pages.
Final Office Action, dated Apr. 22, 2016, received in U.S. Appl. No. 14/845,217, 36 pages.
Office Action, dated Feb. 3, 2016, received in U.S. Appl. No. 14/856,517, 36 pages.
Office Action, dated Feb. 11, 2016, received in U.S. Appl. No. 14/856,519, 34 pages.
Office Action, dated Feb. 1, 2016, received in U.S. Appl. No. 14/857,645, 15 pages.
Final Office Action, dated Jun. 16, 2016, received in U.S. Appl. No. 14/857,645, 12 pages.
Office Action, dated Jan. 25, 2016, received in U.S. Appl. No. 14,864,580, 29 pages.
Notice of Allowance, dated May 17, 2016, received in U.S. Appl. No. 14/152,971, 9 pages.
Office Action, dated Apr. 8, 2016, received in Danish Patent Application No. 201500584, which corresponds with U.S. Appl. No. 14/864,580, 9 pages.
Office Action, dated Apr. 19, 2016, received in U.S. Appl. No. 14/864,627, 9 pages.
Office Action, dated Apr. 8, 2016, received in Danish Patent Application No. 201500585, which corresponds with U.S. Appl. No. 14/864,627, 9 pages.
Office Action, dated Mar. 29, 2016, received in U.S. Appl. No. 14/866,361, 22 pages.
Office Action, dated Jun. 10, 2016, received in Australian Patent Application No. 2016100292, which corresponds with U.S. Appl. No. 14/866,361, 4 pages.
Office Action, dated Apr. 7, 2016, received in Danish Patent Application No. 201500579, which corresponds with U.S. Appl. No. 14/866,361, 10 pages.
Office Action, dated Mar. 22, 2016, received in Danish Patent Application No. 201500587, which corresponds with U.S. Appl. No. 14/866,987, 8 pages.
Notice of Allowance, dated Jun. 10, 2016, received in Danish Patent Application No. 201500587, which corresponds with U.S. Appl. No. 14/866,987, 2 pages.
Office Action, dated Apr. 1, 2016, received in Danish Patent Application No. 201500589, which corresponds with U.S. Appl. No. 14/866,989, 8 pages.
Notice of Allowance, dated Jun. 10, 2016, received in Danish Patent Application No. 201500589, which corresponds with U.S. Appl. No. 14/866,989, 2 pages.
Office Action, dated Apr. 11, 2016, received in U.S. Appl. No. 14/871,236, 23 pages.
Office Action, dated Jun. 28, 2016, received in U.S. Appl. No. 14/871,236, 21 pages.
Office Action, dated Apr. 8, 2016, received in Danish Patent Application No. 201500595, which corresponds with U.S. Appl. No. 14/871,236, 12 pages.
Office Action, dated May 26, 2016, received in Danish Patent Application No. 201500595, which corresponds with U.S. Appl. No. 14/871,236, 14 pages.

(56) References Cited

OTHER PUBLICATIONS

Office Action, dated Apr. 6, 2016, received in Danish Patent Application No. 201500596, which corresponds with U.S. Appl. No. 14/870,882, 7 pages.
Office Action, dated Jun. 9, 2016, received in Danish Patent Application No. 201500596, which corresponds with U.S. Appl. No. 14/870,882, 9 pages.
Office Action, dated Apr. 7, 2016, received in Danish Patent Application No. 201500597, which corresponds with U.S. Appl. No. 14/871,227, 7 pages.
Notice of Allowance, dated Jun. 21, 2016, received in Danish Patent Application No. 201500597, which corresponds with U.S. Appl. No. 14/871,227, 2 pages.
Office Action, dated Apr. 18, 2016, received in Danish Patent Application No. 201500601, which corresponds with U.S. Appl. No. 14/871,336, 8 pages.
Notice of Allowance, dated Apr. 18, 2016, received in Danish Patent Application No. 201500600, which corresponds with U.S. Appl. No. 14/871,462, 7 pages.
Office Action, dated Apr. 29, 2016, received in U.S. Appl. No. 14/867,823, 28 pages.
Office Action, dated Mar. 18, 2016, received in Danish Patent Application No. 201500594, which corresponds with U.S. Appl. No. 14/867,823, 10 pages.
Office Action, dated May 10, 2016, received in U.S. Appl. No. 14/867,892, 28 pages.
Office Action, dated Mar. 21, 2016, received in Danish Patent Application No. 201500598, which corresponds with U.S. Appl. No. 14/867,892, 9 pages.
Office Action, dated May 23, 2016, received in Australian Patent Application No. 2016100253, which corresponds with U.S. Appl. No. 14/867,990, 5 pages.
Office Action, dated Mar. 18, 2016, received in Danish Patent Application No. 201500581, which corresponds with U.S. Appl. No. 14/867,990, 9 pages.
Extended European Search Report, dated Nov. 6, 2015, received in European Patent Application No. 15183980.0, which corresponds with U.S. Appl. No. 14/536,426, 7 pages.
International Search Report and Written Opinion, dated Apr. 25, 2016, received in International Patent Application No. PCT/US2016/018758, which corresponds with U.S. Appl. No. 14/866,159, 15 pages.
Angelov, "Sponsor Flip Wall With Jquery & CSS", Tutorialzine. N.p., Mar. 24, 2010. Web. http://tutorialzine.com/2010/03/sponsor-wall-slip-jquery-css/, Mar. 24, 2010, 8 pages.
Anonymous, "Nokia 808 PureView screenshots", retrieved from Internet; no URL, Nov. 12, 2012, 8 pages.
Anonymous, "Nokia 808 PureView User Guide," http://download-fds.webapps.microsoft.com/supportFiles/phones/files/pdf_guides/devices/808/Nokia_808_UG_en_APAC.pdf, Jan. 1, 2012, 144 pages.
Anonymous, "Notifications, Android 4.4 and Lower", Android Developers, https://developer.android.com/design/patterns/notifications_k.html, May 24, 2015, 9 pages.
Bolluyt, "5 Apple Watch Revelations from Apple's New WatchKit", http://www.cheatsheet.com/tecnology/5-apple-watch-revelations-from-apples-new-watchkit.html/?a=viewall, Nov. 22, 2014, 3 pages.
Cohen, Cinemagraphs are Animated Gifs for Adults, http://www.tubefilter.com/2011/07/10/cinemagraph, Jul. 10, 2011, 3 pages.
Dzyre, "10 Android Notification Features You Can Fiddle With", http://www.hongkiat.com/blog/android-notification-features, Mar. 10, 2014, 10 pages.
Elliot, "Mac System 7", YouTube. Web. Mar. 8, 2017, http://www.youtube.com/watch?v=XLv22hfuuik, Aug. 3, 2011, 1 page.
Farshad, "SageThumbs—Preview and Convert Pictures From Windows Context Menu", https://web.addictivetips.com/windows-tips/sagethumbs-preview-and-convert-photos-from-windows-context-menu, Aug. 8, 2011, 5 pages.

Flaherty, "Is Apple Watch's Pressure-Sensitive Screen a Bigger Deal Than the Gadget Itself?", http://www.wired.com/2014/09/apple-watchs-pressure-sensitive-screen-bigger-deal-gadget, Sep. 15, 2014, 3 pages.
Gardner, "Recenz—Recent Apps in One Tap", You Tube, https://www.youtube.com/watch?v-qailSHRgsTo, May 15, 2015, 1 page.
Gonzalo et al., "Zliding: Fluid Zooming and Sliding for High Precision Parameter Manipulation", Department of Computer Science, University of Toronto, Seattle, Washington, Oct. 23, 2005, 10 pages.
Grant, "Android's Notification Center", https://www.objc.io/issues/11-android/android-notifications, Apr. 30, 2014, 26 pages.
iPhoneOperator, "Wasser Liveeffekt fur Homescreen & Lockscreen—Aquaboard (Cydia)", http://www.youtube.com/watch?v=fG9YMF-mB0Q, Sep. 22, 2012, 3 pages.
iPodHacks 142: "Water Ripple Effects on the Home and Lock Screen: AquaBoard Cydia Tweak Review", YouTube, https://www.youtube.comwatch?v-Auu_uRaYHJs, Sep. 24, 2012, 3 pages.
Kiener, "Force Touch on iPhone", https://www.youtube.com/watch?v=CEMmnsU5fC8, Aug. 4, 2015, 4 pages.
Kost, "LR3—Deselect All Images But One", Julieanne Kost's Blog, blogs.adobe.com/jkost/2011/12/lr3-deselect-all-images-but-one.html, Dec. 22, 2011, 1 page.
Kumar, "How to Enable Ripple Effect on Lock Screen of Galaxy S2", YouTube, http, http://www.youtube.com/watch?v+B9-4M5abLXA, Feb. 12, 2013, 3 pages.
Matthew, "How to Preview Photos and Images From Right-Click Context Menue in Windows [Tip]", https://dottech.org/159009/add-image-preview-in-windows-context-menu-tip, Jul. 4, 2014, 5 pages.
Microsoft, "Lumia—How to Personalize Your Start Screen", https://www.youtube.com/watch?v=6GI5Z3TrSEs, Nov. 11, 2014, 3 pages.
Mitroff, "Google Android 5.0 Lollipop," http://www.cnet.com/products/google-android-5-0-lollipop, Mar. 12, 2015, 5 pages.
Mohr, "Do Not Disturb—The iPhone Feature You Should Be Using", http.www.wonderoftech.com/do-not-disturb-iphone, Jul. 14, 2014, 30 pages.
Nacca, "NiLS Lock Screen Notifications / Floating Panel—Review", https://www.youtube.com/watch?v=McT4QnS9TDY, Feb. 3, 2014, 4 pages.
Nikon, "Scene Recognition System and Advanced SRS," http://www.nikonusa.com/en.Learn-And-Explore/Article/ftlzi4rr/Scene-Recognition-System.html, Jul. 22, 2015, 2 pages.
Phonebuff, "How to Pair Bluetooth on the iPhone", https://www.youtube.com/watch?v=LudNwEar9A8, Feb. 8, 2012, 3 pages.
VGJFeliz, "How to Master Android Lollipop Notifications in Four Minutes!", https://www.youtube.com/watch?v=S-zBRG7GJgs, Feb. 8, 2015, 5 pages.
Office Action, dated Mar. 15, 2017, received in U.S. Appl. No. 14/535,671, 13 pages.
Office Action, dated Oct. 18, 2016, received in Australian Patent Application No. 2013368440, which corresponds with U.S. Appl. No. 14/536,426, 3 pages.
Notice of Allowance, dated Dec. 20, 2016, received in Australian Patent Application No. 2013368440, which corresponds with U.S. Appl. No. 14/536,426, 3 pages.
Office Action, dated Jul. 21, 2016, received in European Patent Application No. 13795391.5, which corresponds with U.S. Appl. No. 14/536,426, 9 pages.
Office Action, dated Sep. 13, 2016, received in Japanese Patent Application No. 2015-547948, which corresponds with U.S. Appl. No. 14/536,426, 5 pages.
Patent, dated May 12, 2017, received in Japanese Patent Application No. 2015547948, which corresponds with U.S. Appl. No. 14/536,426, 3 pages.
Office Action, dated Feb. 24, 2017, received in Korean Patent Application No. 10-2015-7018851, which corresponds with U.S. Appl. No. 14/536,426, 3 pages.
Office Action, dated Apr. 5, 2017, received in U.S. Appl. No. 14/536,367, 16 pages.
Certificate of Grant, dated Sep. 15, 2016, received in Australian Patent Australian Patent Application No. 2013259606, which corresponds with U.S. Appl. No. 14/536,426, 1 page.

(56) References Cited

OTHER PUBLICATIONS

Decision to Grant, dated Jul. 14, 2016, received in European Patent Application No. 13724100.6, which corresponds with U.S. Appl. No. 14/536,426, 1 page.
Letters Patent, dated Aug. 10, 2016, received in European Patent Application No. 13724100.6, which corresponds with U.S. Appl. No. 14/536,426, 1 page.
Office Action, dated Jan. 20, 2017, received in European Patent Application No. 15183980.0, which corresponds with U.S. Appl. No. 14/536,426, 5 pages.
Office Action, dated Feb. 6, 2017, received in Japanese Patent Application No. 2015-511644, which corresponds with U.S. Appl. No. 14/536,426, 6 pages.
Office Action, dated Mar. 9, 2017, received in U.S. Appl. No. 14/536,464, 21 pages.
Certificate of Grant, dated Jul. 29, 2016, received in Australian Patent Application No. 2013368441, which corresponds with U.S. Appl. No. 14/608,926, 1 page.
Office Action, dated Jan. 3, 2017, received in Australian Patent Application No. 2016201451, which corresponds with U.S. Appl. No. 14/608,926, 3 pages.
Office Action, dated Nov. 11, 2016, received in European Patent Application No. 13795392.3, which corresponds with U.S. Appl. No. 14/608,926, 6 pages.
Notice of Allowance, dated Jan. 17, 2017, received in Japanese Patent Application No. 2015-549392, which corresponds with U.S. Appl. No. 14/608,926, 2 pages.
Patent, dated Feb. 17, 2017, received in Japanese Patent Application No. 2015549392, which corresponds with U.S. Appl. No. 14/608,926, 3 pages.
Notice of Allowance, dated Mar. 31, 2017, received in Korean Patent Application No. 2015-7018853, which corresponds with U.S. Appl. No. 14/608,926, 4 pages.
Notice of Allowance, dated Jul. 5, 2016, received in Australian Patent Application No. 2013259613, which corresponds with U.S. Appl. No. 14/536,646, 3 pages.
Office Action, dated Dec. 1, 2016, received in Chinese Patent Application No. 2013800362059, which corresponds with U.S. Appl. No. 14/536,646, 3 pages.
Notice of Allowance, dated Jan. 4, 2017, received in European Patent Application No. 13724102.2, which corresponds with U.S. Appl. No. 14/536,646, 5 pages.
Patent, dated May 26, 2017, received in European Patent Application No. 13724102.2, which corresponds with U.S. Appl. No. 14/536,646, 1 page.
Notice of Allowance, dated Dec. 22, 2016, received in Japanese Patent Application No. 2015-511645, which corresponds with U.S. Appl. No. 14/536,646, 2 pages.
Office Action, dated Apr. 3, 2017, received in U.S. Appl. No. 14/536,141, 11 pages.
Office Action, dated Mar. 3, 2017, received in Chinese Patent Application No. 201380035893.7, which corresponds with U.S. Appl. No. 14/536,646, 8 pages.
Notice of Allowance, dated Aug. 15, 2016, received in Australian Patent Application No. 2013259614, which corresponds with U.S. Appl. No. 14/536,141, 1 page.
Office Action, dated Aug. 31, 2016, received in European Patent Application No. 13726053.5, which corresponds with U.S. Appl. No. 14/536,141, 10 pages.
Office Action, dated Oct. 25, 2016, received in Japanese Patent Application No. 2015-511646, which corresponds with U.S. Appl. No. 14/536,141, 6 pages.
Office Action, dated Dec. 8, 2016, received in U.S. Appl. No. 14/608,942, 9 pages.
Certificate of Grant, dated Jul. 7, 2016, received in Australian Patent Application No. 2013368443, which corresponds with U.S. Appl. No. 14/608,942, 3 pages.
Office Action, dated Mar. 29, 2017, received in Australian patent Application No. 2016201303, which corresponds with U.S. Appl. No. 14/608,942, 3 pages.

Office Action, dated Oct. 7, 2016, received in European Patent Application No. 13798464.7, which corresponds with U.S. Appl. No. 14/608,942, 7 pages.
Office Action, dated Jul. 4, 2016, received in Japanese Patent Application No. 2015-549393, which corresponds with U.S. Appl. No. 14/608,942, 4 pages.
Office Action, dated Feb. 24, 2017, received in Korean Patent Application No. 2015-7018448, which corresponds with U.S. Appl. No. 14/608,942, 4 pages.
Office Action, dated Aug. 1, 2016, received in U.S. Appl. No. 14/536,203, 14 pages.
Notice of Allowance, dated Feb. 1, 2017, received in U.S. Appl. No. 14/536,203, 9 pages.
Certificate of Grant, dated Oct. 21, 2016, received in Australian Patent Application No. 2013259630, which corresponds with U.S. Appl. No. 14/536,203, 3 pages.
Notice of Allowance, dated Aug. 5, 2016, received in Japanese Patent Application No. 2015-511650, which corresponds with U.S. Appl. No. 14/536,203, 4 pages.
Certificate of Patent, dated Sep. 9, 2016, received in Japanese Patent Application No. 2015-511650, which corresponds with U.S. Appl. No. 14/536,203, 3 pages.
Notice of Allowance, dated Sep. 1, 2016, received in Korean Patent Application No. 2014-7034520, which corresponds with U.S. Appl. No. 14/536,203, 5 pages.
Office Action, dated Feb. 6, 2017, received in Korean Patent Application No. 2016-7033834, which corresponds with U.S. Appl. No. 14/536,203, 4 pages.
Office Action, dated Jul. 22, 2016, received in European Office Action No. 13798465.4, which corresponds with U.S. Appl. No. 14/608,965, 8 pages.
Office Action, dated Oct. 20, 2016, received in U.S. Appl. No. 14/536,247, 10 pages.
Final Office Action, dated Mar. 24, 2017, received in U.S. Appl. No. 14/536,247, 14 pages.
Office Action, dated Mar. 24, 2017, received in U.S. Appl. No. 14/536,267, 12 pages.
Certificate of Grant, dated Oct. 21, 2016, received in Australian Patent Application No. 2013259637, which corresponds with U.S. Appl. No. 14/536,267, 3 pages.
Office Action, dated Mar. 24, 2017, received in Australian Patent Application No. 2016204411, which corresponds with U.S. Appl. No. 14/536,267, 3 pages.
Office Action, dated Dec. 9, 2016, received in Chinese Patent Application No. 2016120601564130, which corresponds with U.S. Appl. No. 14/536,267, 4 pages.
Notice of Allowance, dated Sep. 26, 2016, received in Japanese Patent Application No. 2015-511652, which corresponds with U.S. Appl. No. 14/536,267, 5 pages.
Office Action, dated Mar. 3, 2017, received in Japanese Patent Application No. 2016-125839, which corresponds with U.S. Appl. No. 14/536,267, 6 pages.
Notice of Allowance, dated Sep. 1, 2016, received in Korean Patent Application No. 2014-7034530, which corresponds with U.S. Appl. No. 14/536,267, 3 pages.
Office Action, dated Jan. 5, 2017, received in Korean Patent Application No. 20167029533, which corresponds with U.S. Appl. No. 14/536,267, 2 pages.
Office Action, dated Apr. 7, 2017, received in U.S. Appl. No. 14/536,291, 11 pages.
Office Action, dated Jul. 25, 2016, received in Australian Patent Application No. 2013259642, which corresponds with U.S. Appl. No. 14/536,291, 3 pages.
Office Action, dated Aug. 10, 2016, received in Australian Patent Application No. 2013259642, which corresponds with U.S. Appl. No. 14/536,291, 4 pages.
Innovation Patent, dated Sep. 1, 2016, received in Australian Patent Application No. 2016101481, which corresponds with U.S. Appl. No. 14/536,291, 1 page.
Office Action, dated Sep. 29, 2016, received in Australian Patent Application No. 2016101481, which corresponds with U.S. Appl. No. 14/536,291, 3 pages.

(56) References Cited

OTHER PUBLICATIONS

Office Action, dated Aug. 22, 2016, received in European Patent Application No. 13724107.1, which corresponds with U.S. Appl. No. 14/536,291, 7 pages.
Office Action, dated Mar. 23, 2017, received in European Patent Application No. 13724107.1, which corresponds with U.S. Appl. No. 14/536,291, 8 pages.
Final Office Action, dated Dec. 22, 2016, received in-Japanese Patent Application No. 2015-511655, which corresponds with U.S. Appl. No. 14/536,291, 3 pages.
Notice of Allowance, dated Jan. 18, 2017, received in Australian Patent Application No. 2013368445, which corresponds with U.S. Appl. No. 14/608,985, 3 pages.
Office Action, dated Jul. 25, 2016, received in European Patent Application No. 13811032.5, which corresponds with U.S. Appl. No. 14/608,985, 8 pages.
Office Action, dated Feb. 27, 2017, received in European Patent Application No. 13811032.5, which corresponds with U.S. Appl. No. 14/608,985, 6 pages.
Notice of Allowance, dated Jan. 24, 2017, received in Japanese Patent Application No. 2015-550384, which corresponds with U.S. Appl. No. 14/608,985, 5 pages.
Patent, dated Feb. 24, 2017, received in Japanese Patent Application No. 2015-550384, which corresponds with U.S. Appl. No. 14/608,985, 2 pages.
Office Action, dated Nov. 4, 2016, received in Korean Patent Application No. 10-2015-7019984, which corresponds with U.S. Appl. No. 14/608,985, 8 pages.
Office Action, dated Mar. 24, 2017, received in U.S. Appl. No. 14/609,006, 13 pages.
Office Action, dated Jan. 19, 2017, received in U.S. Appl. No. 14/609,042, 12 pages.
Notice of Allowance, dated Feb. 27, 2017, received in U.S. Appl. No. 14/864,737, 9 pages.
Notice of Allowance, dated Jul. 1, 2016, received in Chinese Patent Application No. 201620214376.7, which corresponds with U.S. Appl. No. 14/864,737, 3 pages.
Patent, dated Aug. 3, 2016, received in Chinese Patent Application No. 201620214376.7, which corresponds with U.S. Appl. No. 14/864,737, 5 pages.
Certificate of Registration, dated Jun. 20, 2016, received in German Patent Application No. 202016001845.1, which corresponds with U.S. Appl. No. 14/864,737, 3 pages.
Office Action and Search Report, dated Apr. 5, 2016, received in Danish Patent Application No. 201500577, which corresponds with U.S. Appl. No. 14/864,737, 7 pages.
Intention to Grant, dated Aug. 2, 2016, received in Danish Patent Application No. 201500577, which corresponds with U.S. Appl. No. 14/864,737, 2 pages.
Office Action, dated May 18, 2017, received in Dutch Patent Application No. 2016452, which corresponds with U.S. Appl. No. 14/864,737, 22 pages.
Notice of Allowance, dated Oct. 24, 2016, received in U.S. Appl. No. 14/866,981, 7 pages.
Notice of Allowance, dated Feb. 10, 2017, received in U.S. Appl. No. 14/866,981, 5 pages.
Patent, dated Nov. 2, 2016, received in Australian Patent Application No. 2016100254, which corresponds with U.S. Appl. No. 14/866,981, 1 page.
Notice of Allowance, dated Jul. 27, 2016, received in Chinese Patent Application No. 201620176169.7, which corresponds with U.S. Appl. No. 14/866,981, 3 pages.
Patent, dated Sep. 28, 2016, received in Chinese Patent Application No. 201620176169.7, which corresponds with U.S. Appl. No. 14/866,981, 4 pages.
Certificate of Registration, dated Jun. 20, 2016, received in German Patent Application No. 202016001514.2, which corresponds with U.S. Appl. No. 14/864,737, 3 pages.

Office Action and Search Report, dated Mar. 18, 2016, received in Danish Patent Application No. 201500575, which corresponds with U.S. Appl. No. 14/866,981, 9 pages.
Office Action, dated Dec. 5, 2016, received in Danish Patent Application No. 201500575, which corresponds with U.S. Appl. No. 14/866,981, 3 pages.
Office Action, dated Jul. 5, 2016, received in Chinese Patent Application No. 201620186008.6, which corresponds with U.S. Appl. No. 14/866,159, 3 pages.
Certificate of Registration, dated Jun. 16, 2016, received in German Patent No. 202016001483.9, which corresponds with U.S. Appl. No. 14/866,159, 3 pages.
Office Action (Search Report), dated Mar. 9, 2016, received in Danish Patent Application No. 201500574, which corresponds with U.S. Appl. No. 14/866,159, 11 pages.
Office Action, dated Sep. 27, 2016, received in Danish Patent Application No. 201500574, which corresponds with U.S. Appl. No. 14/866,159, 4 pages.
Office Action, dated Mar. 14, 2017, received in Danish Patent Application No. 201500574, which corresponds with U.S. Appl. No. 14/866,159, 5 pages.
Innovation Patent, dated Aug. 4, 2016, received in Australian Patent Application No. 2016101201, which corresponds with U.S. Appl. No. 14/686,078, 1 page.
Office Action, dated Oct. 12, 2016, received in Australian Patent Application No. 2016101201, which corresponds with U.S. Appl. No. 14/686,078, 3 pages.
Notice of Allowance, dated Oct. 1, 2016, received in Chinese Patent Application No. 201620175847.8, which corresponds with U.S. Appl. No. 14/686,078, 1 page.
Certificate of Registration, dated Jun. 30, 2016, received in German Patent Application No. 20201600156.9, which corresponds with U.S. Appl. No. 14/868,078, 3 pages.
Office Action, dated Sep. 2, 2016, received in Danish Patent Application No. 201500588, which corresponds with U.S. Appl. No. 14/868,078, 4 pages.
Notice of Allowance, dated Jan. 30, 2017, received in received in Danish Patent Application No. 201500588, which corresponds with U.S. Appl. No. 14/868,078, 2 pages.
Office Action, dated May 18, 2017, received in Dutch Patent Application No. 2016376, which corresponds with U.S. Appl. No. 14/868,078, 15 pages.
Notice of Allowance, dated Nov. 14, 2016, received in U.S. Appl. No. 14/863,432, 7 pages.
Office Action, dated Aug. 19, 2016, received in Australian Patent Application No. 2016100647, which corresponds with U.S. Appl. No. 14/863,432, 5 pages.
Notice of Allowance, dated Jan. 12, 2017, received in Chinese Patent Application No. 201620470063.8, which corresponds with U.S. Appl. No. 14/863,432, 1 page.
Office Action, dated Apr. 4, 2016, received in Danish Patent Application No. 201500582, which corresponds with U.S. Appl. No. 14/863,432, 10 pages.
Office Action, dated Oct. 7, 2016, received in Danish Patent Application No. 201500582, which corresponds with U.S. Appl. No. 14/863,432, 6 pages.
Office Action, dated May 18, 2017, received in Dutch Patent Application No. 2016801, which corresponds with U.S. Appl. No. 14/863,432, 34 pages.
Office Action, dated Oct. 13, 2016, received in U.S. Appl. No. 14/866,511, 27 pages.
Final Office Action, dated Jan. 27, 2017, received in U.S. Appl. No. 14/866,511, 26 pages.
Patent, dated Aug. 8, 2016, received in Australian Patent Application 2016100653, corresponds with U.S. Appl. No. 14/866,511, 1 page.
Notice of Allowance, dated Jan. 12, 2017, received in Chinese Patent Application No. 201620470281.1, which corresponds with U.S. Appl. No. 14/866,511, 1 page.
Office Action, dated Mar. 22, 2016, received in Danish Patent Application No. 201500576, which corresponds with U.S. Appl. No. 14/866,511, 10 pages.

(56) References Cited

OTHER PUBLICATIONS

Intention to Grant, dated Jun. 8, 2016, received in Danish Patent Application No. 201500576, which corresponds with U.S. Appl. No. 14/866,511, 2 pages.
Grant, dated Aug. 26, 2016, received in Danish Patent Application No. 201500576, which corresponds with U.S. Appl. No. 14/866,511, 2 pages.
Patent, dated Jan. 23, 2017, received in Danish Patent Application No. 201500576, which corresponds with U.S. Appl. No. 14/866,511, 3 pages.
Office Action, dated May 10, 2016, received in U.S. Appl. No. 14/866,489, 15 pages.
Final Office Action, dated Sep. 16, 2016, received in U.S. Appl. No. 14/866,489, 24 pages.
Notice of Allowance, dated Apr. 27, 2017, received in U.S. Appl. No. 16/866,489, 27 pages.
Office Action, dated Jun. 28, 2016 received in U.S. Appl. No. 14/869,899, 5 pages.
Final Office Action, dated Sep. 2, 2016, received in U.S. Appl. No. 14/869,899, 22 pages.
Notice of Allowance, dated Feb. 28, 2017, received in U.S. Appl. No. 14/869,899, 9 pages.
Innovation Patent, dated Aug. 25, 2016, received in Australian Patent Application No. 2016101438, which corresponds with U.S. Appl. No. 14/869,899, 1 page.
Certificate of Examination, dated Oct. 11, 2016, received in Australian Patent Application No. 2016101438, which corresponds with U.S. Appl. No. 14/869,899, 1 page.
Office Action, dated Oct. 7, 2016, received in Danish Patent Application No. 201500592, which corresponds with U.S. Appl. No. 14/869,899, 6 pages.
Office Action, dated Nov. 22, 2016, received in Danish Patent Application No. 201670594, which corresponds with U.S. Appl. No. 14/869,899, 9 pages.
Final Office Action, dated Jul. 29, 2016, received in U.S. Appl. No. 14/866,992, 35 pages.
Innovation Patent, dated Sep. 22, 2016, received in Australian Patent Application No. 2016101418, which corresponds with U.S. Appl. No. 14/866,992, 1 page.
Office Action, dated Nov. 22, 2016, received in Australian Patent Application No. 2016101418, which corresponds with U.S. Appl. No. 14/866,992, 7 pages.
Office Action, dated Feb. 7, 2017, received in Australian Patent Application No. 2016101418, which corresponds with U.S. Appl. No. 14/866,992, 5 pages.
Office Action, dated Feb. 6, 2017, received in Danish Patent Application No. 201500593, which corresponds with U.S. Appl. No. 14/866,992, 4 pages.
Notice of Allowance, dated Aug. 26, 2016, received in U.S. Appl. No. 14/845,217, 5 pages.
Notice of Allowance, dated Jan. 4, 2017, received in U.S. Appl. No. 14/845,217, 5 pages.
Final Office Action, dated Jul. 13, 2016, received in U.S. Appl. No. 14/856,517, 30 pages.
Final Office Action, dated Jul. 15, 2016, received in U.S. Appl. No. 14/856,519, 31 pages.
Notice of Allowance, dated Oct. 24, 2016, received in U.S. Appl. No. 14/857,645, 6 pages.
Office Action, dated Mar. 31, 2017, received in U.S. Appl. No. 14/857,700, 14 pages.
Notice of Allowance, dated Aug. 4, 2016, received in U.S. Appl. No. 14/864,580, 9 pages.
Notice of Allowance, dated Dec. 28, 2016, received in U.S. Appl. No. 14/864,580, 8 pages.
Office Action, dated Aug. 19, 2016, received in Australian Patent Application No. 2016100648, which corresponds with U.S. Appl. No. 14/864,580, 6 pages.
Notice of Allowance, dated Nov. 8, 2016, received in Chinese Patent Application No. 201620470247.4, which corresponds with U.S. Appl. No. 14/864,580, 3 pages.
Certificate of Registration, dated Oct. 14, 2016, received in German Patent Application No. 202016000003234.9, which corresponds with U.S. Appl. No. 14/864,580, 3 pages.
Office Action, dated Oct. 7, 2016, received in Danish Patent Application No. 201500584, which corresponds with U.S. Appl. No. 14/864,580, 3 pages.
Notice of Allowance, dated Nov. 23, 2016, received in U.S. Appl. No. 14/864,601, 12 pages.
Notice of Allowance, dated Jan. 31, 2017, received in U.S. Appl. No. 14/864,627, 7 pages.
Office Action, dated Oct. 7, 2016, received in Danish Patent Application No. 201500585, which corresponds with U.S. Appl. No. 14/864,627, 3 pages.
Office Action, dated May 4, 2017, received in Danish Patent Application No. 201500585, which corresponds with U.S. Appl. No. 14/864,627, 4 pages.
Notice of Allowance, dated Jul. 19, 2016, received in U.S. Appl. No. 14/866,361, 8 pages.
Certificate of Examination, dated Dec. 8, 2016, received in Australian Patent Application No. 2016100292, which corresponds with U.S. Appl. No. 14/866,361, 1 page.
Notice of Allowance/Grant, dated Jul. 1, 2016, received in Chinese Patent Application No. 201620251706.X, which corresponds with U.S. Appl. No. 14/866,361, 3 pages.
Letters Patent, dated Aug. 3, 2016, received in Chinese Patent Application No. 201620251706.X, which corresponds with U.S. Appl. No. 14/866,361, 3 pages.
Certificate of Registration, dated Jun. 24, 2016, received in German Patent Application No. 202016001819.2, which corresponds with U.S. Appl. No. 14/866,361, 3 pages.
Office Action, dated Oct. 28, 2016, received in Danish Patent Application No. 201500579, which corresponds with U.S. Appl. No. 14/866,361, 3 pages.
Patent, dated Aug. 8, 2016, received in Australian Patent Application No. 2016100649, which corresponds with U.S. Appl. No. 14/866,987, 1 page.
Office Action, dated Oct. 19, 2016, received in Chinese Patent Application No. 2016201470246.X, which corresponds with U.S. Appl. No. 14/866,987, 4 pages.
Patent, dated May 3, 2017, received in Chinese Patent Application No. 2016201470246.X, which corresponds with U.S. Appl. No. 14/866,987, 2 pages.
Patent, dated Sep. 19, 2016, received in German Patent Application No. 202016002908.9, which corresponds with U.S. Appl. No. 14/866,987, 3 pages.
Notice of Allowance, dated Nov. 1, 2016, received in Danish Patent Application No. 201500587, which corresponds with U.S. Appl. No. 14/866,987, 2 pages.
Office Action, dated Sep. 9, 2016, received in Danish Patent Application No. 201670463, which corresponds with U.S. Appl. No. 14/866,987, 7 pages.
Office Action, dated Jan. 31, 2017, received in Danish Patent Application No. 201670463, which corresponds with U.S. Appl. No. 14/866,987, 3 pages.
Office Action, dated Apr. 19, 2017, received in Danish Patent Application No. 201670463, which corresponds with U.S. Appl. No. 14/866,987, 3 pages.
Certificate of Exam, dated Jul. 21, 2016, received in Australian Patent Application No. 2016100652, which corresponds with U.S. Appl. No. 14/866,989, 1 page.
Notice of Allowance, dated Nov. 1, 2016, received in Danish Patent Application No. 201500589, which corresponds with U.S. Appl. No. 14/866,989, 2 pages.
Final Office Action, dated Nov. 4, 2016, received in U.S. Appl. No. 14/871,236, 24 pages.
Notice of Allowance, dated Feb. 28, 2017, received in U.S. Appl. No. 14/871,236, 9 pages.
Innovation Patent, dated Aug. 25, 2016, received in Australian Patent Application No. 2016101433, which corresponds with U.S. Appl. No. 14/871,236, 1 page.
Office Action, dated Oct. 14, 2016, received in Australian Patent Application No. 2016101433, which corresponds with U.S. Appl. No. 14/871,236, 3 pages.

(56) References Cited

OTHER PUBLICATIONS

Office Action, dated Sep. 30, 2016, received in Danish Patent Application No. 201500595, which corresponds with U.S. Appl. No. 14/871,236, 10 pages.
Innovation Patent, dated Aug. 25, 2016, received in Australian Patent Application No. 2016101436, which corresponds with U.S. Appl. No. 14/871,236, 1 pages.
Office Action, dated Oct. 31, 2016, received in Australian Patent Application No. 2016101438, which corresponds with U.S. Appl. No. 14/871,236, 6 pages.
Office Action, dated Oct. 17, 2016, received in Australian Patent Application No. 2016203040, which corresponds with U.S. Appl. No. 14/871,227, 7 pages.
Office Action, dated Oct. 18, 2016, received in Australian Patent Application No. 2016101431, which corresponds with U.S. Appl. No. 14/871,227, 3 pages.
Office Action, dated Apr. 13, 2017, received in Australian Patent Application No. 2016101431, which corresponds with U.S. Appl. No. 14/871,227, 4 pages.
Patent, dated Sep. 26, 2016, received in Danish Patent Application No. 201500597, which corresponds with U.S. Appl. No. 14/871,227, 7 pages.
Office Action, dated Mar. 24, 2017, received in Japanese Patent Application No. 2016-533201, which corresponds with U.S. Appl. No. 14/871,227, 6 pages.
Office Action, dated Oct. 14, 2016, received in Australian Patent Application No. 2016101437, which corresponds with U.S. Appl. No. 14/871,336, 2 pages.
Office Action, dated Apr. 11, 2017, received in Australian Patent Application No. 2016101437, which corresponds with U.S. Appl. No. 14/871,336, 4 pages.
Office Action, dated Oct. 18, 2016, received in Danish Patent Application No. 201500601, which corresponds with U.S. Appl. No. 14/871,336, 3 pages.
Notice of Allowance, dated Mar. 23, 2017, received in Danish Patent Application No. 201500601, which corresponds with U.S. Appl. No. 14/871,336, 2 pages.
Innovation Patent, dated Aug. 25, 2016, received in Australian Patent Application No. 2016101435, which corresponds with U.S. Appl. No. 14/871,462, 1 page.
Office Action, dated Oct. 4, 2016, received in Australian Patent Application No. 2016101435, which corresponds with U.S. Appl. No. 14/871,462, 3 pages.
Office Action, dated Oct. 4, 2016, received in Australian Patent Application No. 2016231505, which corresponds with U.S. Appl. No. 14/871,462, 3 pages.
Grant, dated Aug. 30, 2016, received in Danish Patent Application No. 201500600, which corresponds with U.S. Appl. No. 14/871,462, 2 pages.
Office Action, dated Mar. 13, 2017, received in Japanese Patent Application No. 2016-183289, which corresponds with U.S. Appl. No. 14/871,462, 5 pages.
Final Office Action, dated Sep. 28, 2016, received in U.S. Appl. No. 14/867,823, 31 pages.
Office Action, dated Sep. 7, 2016, received in Danish Patent Application No. 201500594, which corresponds with U.S. Appl. No. 14/867,823, 4 pages.
Final Office Action, dated Nov. 2, 2016, received in U.S. Appl. No. 14/867,892, 48 pages.
Office Action, dated Sep. 14, 2016, received in Danish Patent Application No. 201500598, which corresponds with U.S. Appl. No. 14/867,892, 4 pages.
Office Action, dated May 4, 2017, received in Danish Patent Application No. 201500598, which corresponds with U.S. Appl. No. 14/867,892, 4 pages.
Office Action, dated Mar. 1, 2017, received in U.S. Appl. No. 14/869,855, 14 pages.
Office Action, dated Feb. 9, 2017, received in U.S. Appl. No. 14/869,873, 17 pages.
Office Action, dated Jul. 5, 2016, received in Chinese Patent Application No. 201620176221.9, which corresponds with U.S. Appl. No. 14/867,990, 4 pages.
Office Action, dated Oct. 25, 2016, received in Chinese Patent Application No. 201620176221.9, which corresponds with U.S. Appl. No. 14/867,990, 7 pages.
Certificate of Registration, dated Jun. 16, 2016, received in German Patent No. 202016001489.8, which corresponds with U.S. Appl. No. 14/867,990, 3 pages.
Office Action, dated Sep. 26, 2016, received in Danish Patent Application No. 201500581, which corresponds with U.S. Appl. No. 14/867,990, 5 pages.
Office Action, dated May 3, 2017, received in Danish Patent Application No. 201500581, which corresponds with U.S. Appl. No. 14/867,990, 5 pages.
Office Action, dated Nov. 25, 2016, received in U.S. Appl. No. 15/081,771, 17 pages.
Final Office Action, dated May 1, 2017, received in U.S. Appl. No. 15/136,782, 18 pages.
Office Action, dated Jan. 20, 2017, received in U.S. Appl. No. 15/231,745, 21 pages.
Office Action, dated Oct. 17, 2016, received in Danish Patent Application No. 201670587, which corresponds with U.S. Appl. No. 15/231,745, 9 pages.
Office Action, dated Dec. 14, 2016, received in Danish Patent Application No. 201670590, which corresponds with U.S. Appl. No. 15/231,745, 9 pages.
Office Action, dated Nov. 10, 2016, received in Danish Patent Application No. 201670591, which corresponds with U.S. Appl. No. 15/231,745, 12 pages.
Office Action, dated Oct. 26, 2016, received in Danish Patent Application No. 201670592, which corresponds with U.S. Appl. No. 15/231,745, 8 pages.
Office Action, dated Jan. 5, 2017, received in Danish Patent Application No. 201670592, which corresponds with U.S. Appl. No. 15/231,745, 3 pages.
Office Action, dated Oct. 12, 2016, received in Danish Patent Application No. 201670593, which corresponds with U.S. Appl. No. 15/231,745, 7 pages.
Extended European Search Report, dated Oct. 7, 2016, received in European Patent Application No. 16177863.4, which corresponds with U.S. Appl. No. 14/536,267, 12 pages.
Extended European Search Report, dated Mar. 15, 2017, received in European Patent Application No. 17153418.3, which corresponds with U.S. Appl. No. 14/536,648, 7 pages.
International Search Report and Written Opinion, dated Oct. 14, 2016, received in International Patent Application No. PCT/US2016/020697, which corresponds with U.S. Appl. No. 14/866,981, 21 pages.
International Search Report and Written Opinion, dated Jul. 21, 2016, received in International Patent Application No. PCT/US2016/019913, which corresponds with U.S. Appl. No. 14/868,078, 16 pages.
International Search Report and Written Opinion, dated Oct. 31, 2016, received in International Patent Application No. PCT/US2016/033578, which corresponds with U.S. Appl. No. 14/863,432, 36 pages.
International Search Report and Written Opinion, dated Nov. 14, 2016, received in International Patent Application No. PCT/US2016/033541, which corresponds with U.S. Appl. No. 14/866,511, 29 pages.
International Search Report and Written Opinion, dated Aug. 29, 2016, received in International Patent Application No. PCT/US2016/021400, which corresponds with U.S. Appl. No. 14/869,899, 48 pages.
International Search Report and Written Opinion, dated Jan. 12, 2017, received in International Patent No. PCT/US2016/046419, which corresponds with U.S. Appl. No. 14/866,992, 23 pages.
International Search Report and Written Opinion, dated Dec. 15, 2016, received in International Patent Application No. PCT/US2016/046403, which corresponds with U.S. Appl. No. 15/009,661, 17 pages.

(56) References Cited

OTHER PUBLICATIONS

International Search Report and Written Opinion, dated Feb. 27, 2017, received in International Patent Application No. PCT/US2016/046407, which corresponds with U.S. Appl. No. 15/009,688, 30 pages.
Extended European Search Report, dated Dec. 21, 2016, received in European Patent Application No. 16189790.5, which corresponds with U.S. Appl. No. 14/871,462, 8 pages.
International Search Report and Written Opinion, dated Jan. 3, 2017, received in International Patent Application No. PCT/US2016/046214, which corresponds with U.S. Appl. No. 15/231,745, 25 pages.
Brownlee, "Android 5.0 Lollipop Feature Review!", https//www.youtube.com/watch?v=pEDQ1z1-PvU, Oct. 27, 2014, 5 pages.
Google-Chrome, "Android 5.0 Lollipop", http://androidlover.net/android-os/android-5-0-lollipop/android-5-0-lollipop-recent-apps-card-google-search.html, Oct. 19, 2014, 10 pages.
Sood, "MultitaskingGestures", http://cydia.saurik.com/package/org.thebigboxx.multitaskinggestures/, Mar. 3, 2014, 2 pages.
YouTube, "How to Master Android Lollipop Notifications in Four Minutes!", Video Gadgets Journal (VGJFelix), https://www.youtube.com/watch?v=S-zBRG7GGJgs, Feb. 8, 2015, 4 pages.
YouTube, "Multitasking Gestures: Zephyr Like Gestures on iOS", https://www.youtube.com/watch?v=Jcod-f7Lw0I, Jan. 27, 2014, 3 pages.
Office Action, dated Jun. 29, 2017, received in U.S. Appl. No. 14/608,895, 30 pages.
Patent, dated May 12, 2017, received in Japanese Patent Application No. 2015-547948, which corresponds with U.S. Appl. No. 14/536,426, 3 pages.
Patent, dated May 26, 2017, received in Korean Patent Application No. 2015-7018851, which corresponds with U.S. Appl. No. 14/536,426, 3 pages.
Office Action, dated Jul. 26, 2017, received in U.S. Appl. No. 14/536,235, 14 pages.
Office action, dated Aug. 3, 2017, received in U.S. Appl. No. 14/536,426, 10 pages.
Office Action, dated May 15, 2017, received in Australian Patent Application No. 2016216580, which corresponds with U.S. Appl. No. 14/536,426, 3 pages.
Office Action, dated Aug. 21, 2017, received in European Patent Application No. 15183980.0, which corresponds with U.S. Appl. No. 14/536,426, 3 pages.
Final Office Action, dated Aug. 25, 2017, received in U.S. Appl. No. 14/536,464, 30 pages.
Office Action, dated May 4, 2017, received in Chinese Patent Application No. 201380068414.1, which corresponds with U.S. Appl. No. 14/608,926, 5 pages.
Office Action, dated Jul. 4, 2017, received in European Patent Application No. 13795392.3, which corresponds with U.S. Appl. No. 14/608,926, 4 pages.
Patent, dated Jun. 30, 2017, received in Korean Patent Application No. 2015-7018853, which corresponds with U.S. Appl. No. 14/608,926, 3 pages.
Office Action, dated Aug. 22, 2017, received in Korean Patent Application No. 20177018250, which corresponds with U.S. Appl. No. 14/608,926, 2 pages.
Patent, dated May 26, 2017, received in European Patent Application No. 13724102.2, which corresponds with U.S. Appl. No. 14,536,646, 1 page.
Office Action, dated Jul. 21, 2017, received in Australian Patent Application No. 2016262773, which corresponds with U.S. Appl. No. 14/536,141, 3 pages.
Notice of Allowance, dated Jun. 30, 2017, received in Japanese Patent Application No. 2015-511646, which corresponds with U.S. Appl. No. 14/536,141, 5 pages.
Patent, dated Jul. 28, 2017, received in Japanese Patent Application No. 2015-511646, which corresponds with U.S. Appl. No. 14/536,141, 3 pages.
Notice of Allowance, dated May 12, 2017, received in U.S. Appl. No. 14/608,942, 10 pages.
Office Action, dated Jun. 16, 2017, received in Chinese Patent Application No. 201380068295.X, which corresponds with U.S. Appl. No. 14/608,942, 6 pages.
Notice of Allowance, dated May 12, 2017, received in Japanese Patent Application No. 2015-549393, which corresponds with U.S. Appl. No. 14/608,942, 5 pages.
Patent, dated Jun. 16, 2017, received in Japanese Patent Application No. 2015-549393, which corresponds with U.S. Appl. No. 14/608,942, 3 pages.
Office Action, dated Jul. 17, 2017, received in U.S. Appl. No. 14/536,166, 19 pages.
Office Action, dated Jul. 4, 2017, received in Australian Patent Application No. 2016238917, which corresponds with U.S. Appl. No. 14/536,203, 5 pages.
Office Action, dated Jun. 23, 2017, received in Japanese Patent Application No. 2016173113, which corresponds with U.S. Appl. No. 14/536,203, 5 pages.
Notice of Allowance, dated Sep. 1, 2017, received in Korean Patent Application No. 2016-7029533, which corresponds with U.S. Appl. No. 14/536,267, 4 pages.
Office Action, dated Jul. 21, 2017, received in Australian Patent Application No. 2016216658, which corresponds with U.S. Appl. No. 14/536,291, 3 pages.
Patent, dated May 18, 2017, received in Australian Patent Application No. 2013368445, which corresponds with U.S. Appl. No. 14/608,985, 1 page.
Office Action, dated May 19, 2017, received in Chinese Patent Application No. 201380068399.0, which corresponds with U.S. Appl. No. 14/608,985, 5 pages.
Office Action, dated Apr. 19, 2017, received in U.S. Appl. No. 14/536,296, 12 pages.
Office Action, dated Jul. 21, 2017, received in Australian Patent Application No. 2016247194, which corresponds with U.S. Appl. No. 14/536,648, 3 pages.
Notice of Allowance, dated Jul. 10, 2017, received in U.S. Appl. No. 14/609,042, 8 pages.
Notice of Allowance, dated Jun. 19, 2017, received in U.S. Appl. No. 14/864,737, 8 pages.
Office Action, dated May 15, 2017, received in Japanese Patent Application No. 2016-558331, which corresponds with U.S. Appl. No. 14/864,737, 5 pages.
Notice of Allowance, dated Jun. 23, 2017, received in Japanese Patent Application No. 2016-558331, which corresponds with U.S. Appl. No. 14/864,737, 5 pages.
Patent, dated Jul. 28, 2017, received in Japanese Patent Application No. 2016-558331, which corresponds with U.S. Appl. No. 14/864,737, 3 pages.
Office Action, dated Jul. 7, 2017, received in Danish Patent Application No. 201500575, 4 pages.
Office Action, dated Jul. 6, 2017, received in Danish Patent Application No. 201500574, which corresponds with U.S. Appl. No. 14/866,159, 3 pages.
Notice of Allowance, dated May 2, 2017, received in received in Danish Patent Application No. 201500588, which corresponds with U.S. Appl. No. 14/868,078, 2 pages.
Notice of Allowance, dated Apr. 27, 2017, received in U.S. Appl. No. 14/863,432, 7 pages.
Office Action, dated Jun. 12, 2017, received in Danish Patent Application No. 201500582, which corresponds with U.S. Appl. No. 14/863,432, 5 pages.
Grant, dated Jul. 21, 2017, received in Dutch Patent Application No. 2016801, which corresponds with U.S. Appl. No. 14/871,227, 8 pages.
Office Action, dated Jun. 9, 2017, received in Japanese Patent Application No. 2016558214, which corresponds with U.S. Appl. No. 14/866,511, 6 pages.
Notice of Allowance, dated Jul. 14, 2017, received in Japanese Patent Application No. 2016558214, which corresponds with U.S. Appl. No. 14/866,511, 5 pages.

(56) References Cited

OTHER PUBLICATIONS

Patent, dated Aug. 18, 2017, received in Japanese Patent Application No. 2016558214, which corresponds with U.S. Appl. No. 14/866,511, 3 pages.
Notice of Allowance, dated Apr. 27, 2017, received in U.S. Appl. No. 14/866,489, 27 pages.
Notice of Allowance, dated Jul. 6, 2017, received in U.S. Appl. No. 14/866,489, 12 pages.
Office Action, dated Jul. 3, 2017, received in Danish Patent Application No. 201500592, which corresponds with U.S. Appl. No. 14/869,899, 5 pages.
Office Action, dated Apr. 13, 2017, received in U.S. Appl. No. 14/866,992, 34 pages.
Office Action, dated May 2, 2017, received in U.S. Appl. No. 14/856,517, 34 pages.
Office Action, dated May 18, 2017, received in U.S. Appl. No. 14/856,519, 35 pages.
Office Action, dated Jun. 9, 2017, received in U.S. Appl. No. 14/856,520, 36 pages.
Office Action, dated Jun. 30, 2017, received in U.S. Appl. No. 14/856,522, 22 pages.
Notice of Allowance, dated Jun. 16, 2017, received in in U.S. Appl. No. 14/857,645, 5 pages.
Office Action, dated May 5, 2017, received in Danish Patent Application No. 201500584, which corresponds with U.S. Appl. No. 14/864,580, 3 pages.
Notice of Allowance, dated Apr. 20, 2017, received in U.S. Appl. No. 14/864,601, 13 pages.
Office Action, dated Jun. 15, 2017, received in Danish Patent Application No. 201500579, which corresponds with U.S. Appl. No. 14/866,361, 2 pages.
Office Action, dated Jul. 31, 2017, received in Japanese Patent Application No. 2017126445, which corresponds with U.S. Appl. No. 14/866,987, 6 pages.
Office Action, dated Jun. 16, 2017, received in Japanese Patent Application No. 2016-233450, which corresponds with U.S. Appl. No. 14/866,989, 6 pages.
Office Action, dated Jun. 15, 2017, received in Danish Patent Application No. 201500595, which corresponds with U.S. Appl. No. 14/871,236, 4 pages.
Office Action, dated Sep. 1, 2017, received in U.S. Appl. No. 14/870,754, 22 pages.
Office Action, dated Sep. 1, 2017, received in U.S. Appl. No. 14/870,988, 14 pages.
Office Action, dated Aug. 4, 2017, received in Japanese Patent Application No. 2016-533201, which corresponds with U.S. Appl. No. 14/871,227, 6 pages.
Office Action, dated Apr. 20, 2017, received in Chinese Patent Application No. 201621044346.2, which corresponds with U.S. Appl. No. 14/871,462, 3 pages.
Office Action, dated May 11, 2017, received in U.S. Appl. No. 14/867,823, 42 pages.
Office Action, dated May 15, 2017, received in Danish Patent Application No. 201500594, which corresponds with U.S. Appl. No. 14/867,823, 4 pages.
Office Action, dated Jul. 6, 2017, received in U.S. Appl. No. 14/867,892, 55 pages.
Final Office Action, dated Aug. 18, 2017, received in U.S. Appl. No. 14/869,873, 20 pages.
Final Office Action, dated Jun. 2, 2017, received in U.S. Appl. No. 15/081,771, 17 pages.
Office Action, dated Aug. 29, 2017, received in Korean Patent Application No. 2017-7014536, which corresponds with U.S. Appl. No. 15/081,771, 5 pages.
Office Action, dated May 23, 2017, received in Danish Patent Application No. 201770190, which corresponds with U.S. Appl. No. 15/136,782, 7 pages.
Office Action, dated Jun. 29, 2017, received in Danish Patent Application No. 201670587, which corresponds with U.S. Appl. No. 15/231,745, 4 pages.

Office Action, dated Jul. 6, 2017, received in Danish Patent Application No. 201670590, which corresponds with U.S. Appl. No. 15/231,745, 3 pages.
Office Action, dated Jul. 27, 2017, received in Australian Patent Application No. 2017100535, which corresponds with U.S. Appl. No. 15/272,341, 4 pages.
Office Action, dated Aug. 4, 2017, received in Danish Patent Application No. 201770377, 9 pages.
Office Action, dated Aug. 30, 2017, received in U.S. Appl. No. 15/655,749, 22 pages.
Search Report, dated Apr. 13, 2017, received in Dutch Patent Application No. 2016452, which corresponds with U.S. Appl. No. 14/864,737, 22 pages.
Search Report, dated Jun. 22, 2017, received in Dutch Patent Application No. 2016375, which corresponds with U.S. Appl. No. 14/866,981, 17 pages.
Search Report, dated Jun. 19, 2017, received in Dutch Patent Application No. 2016377, which corresponds with U.S. Appl. No. 14/866,159, 13 pages.
Search Report, dated Apr. 13, 2017, received in Dutch Patent Application No. 2016376, which corresponds with U.S. Appl. No. 14/868,078, 15 pages.
Search Report, dated Apr. 18, 2017, received in Dutch Patent Application No. 2016801, which corresponds with U.S. Appl. No. 14/863,432, 34 pages.
Extended European Search Report, dated Jun. 22, 2017, received in European Patent Application No. 16189421.7, which corresponds with U.S. Appl. No. 14/866,987, 7 pages.
Extended European Search Report, dated Jun. 8, 2017, received in European Patent Application No. 16189425.8, which corresponds with U.S. Appl. No. 14/866,989, 8 pages.
Extended European Search Report, dated Jul. 25, 2017, received in European Patent Application No. 17171972.7, which corresponds with U.S. Appl. No. 14/870,882, 12 pages.
Extended European Search Report, dated Jul. 25, 2017, received in European Patent Application No. 17172266.3, which corresponds with U.S. Appl. No. 14/871,336, 9 pages.
Anonymous, "Google Android 5.0 Release Date, Specs and Editors Hands on Review—CNET", http://www.cnet.com/products/google-an-android-5-0-lollipop/, Mar. 12, 2015, 10 pages.
VisioGuy, "Getting a Handle on Selecting and Subselecting Visio Shapes", http://www.visguy.com/2009/10/13/getting-a-handle-on-selecting-and-subselecting-visio-shapes/, Oct. 13, 2009, 18 pages.
YouTube, "Recentz—Recent Apps in a Tap", https://www.youtube.com/watch?v=qailSHRgsTo, May 15, 2015, 1 page.
Office Action, dated Nov. 30, 2017, received in U.S. Appl. No. 14/535,671, 21 pages.
Certificate of Grant, dated Apr. 29, 2017, received in Australian Patent Application No. 2013368440, which corresponds with U.S. Appl. No. 14/536,426, 3 pages.
Office Action, dated Nov. 6, 2017, received in Chinese Patent Application No. 201380068493.6, which corresponds with U.S. Appl. No. 14/608,895, 5 pages.
Notice of Allowance, dated Nov. 30, 2017, received in U.S. Appl. No. 14/536,367, 9 pages.
Office Action, dated Sep. 19, 2017, received in Chinese Patent Application No. 201380035982.1, which corresponds with U.S. Appl. No. 14/536,426, 5 pages.
Office Action, dated Sep. 20, 2017, received in Chinese Patent Application No. 201510566550.4, which corresponds with U.S. Appl. No. 14/536,426, 11 pages.
Certificate of Grant, dated Nov. 10, 2017, received in Hong Kong Patent Application No. 15107535,0, which corresponds with U.S. Appl. No. 14/536,426, 2 pages.
Office Action, dated Sep. 25, 2017, received in U.S. Appl. No. 14/536,644, 29 pages.
Office Action, dated Oct. 19, 2017, received in U.S. Appl. No. 14/608,926, 14 pages.
Notice of Allowance, dated Oct. 9, 2017, received in Chinese Patent Application No. 2013800362059, which corresponds with U.S. Appl. No. 14/536,646, 3 pages.
Office Action, dated Oct. 19, 2017, received in U.S. Appl. No. 14/536,646, 21 pages.

(56) References Cited

OTHER PUBLICATIONS

Notice of Allowance, dated Sep. 20, 2017, received in U.S. Appl. No. 14/536,141, 10 pages.
Office Action, dated Oct. 25, 2017, received in Chinese Patent Application No. 201380035977.0, which corresponds with U.S. Appl. No. 14/536,203, 5 pages.
Notice of Allowance, dated Oct. 30, 2017, received in Korean Patent Application No. 2016-7033834, which corresponds with U.S. Appl. No. 14/536,203, 5 pages.
Office Action, dated Oct. 20, 2017, received in U.S. Appl. No. 14/608,965, 14 pages.
Office action, dated Oct. 11, 2017, received in Chinese Patent Application No. 201380074060.1, which corresponds with U.S. Appl. No. 14/608,965, 5 pages.
Notice of Allowance, dated Nov. 22, 2017, received in U.S. Appl. No. 14/536,247, 6 pages.
Notice of Allowance, dated Nov. 9, 2017, received in U.S. Appl. No. 14/536,267, 8 pages.
Office Action, dated Sep. 13, 2017, received in European Patent Application No. 16177863.4, which corresponds with U.S. Appl. No. 14/536,267, 6 pages.
Notice of Allowance, dated Nov. 17, 2017, received in Japanese Patent Application No. 2016-125839, which corresponds with U.S. Appl. No. 14/536,267, 5 pages.
Notice of Allowance, dated Dec. 1, 2017, received in U.S. Appl. No. 14/536,291, 19 pages.
Office Action, dated Oct. 23, 2017, received in Chinese Patent Application No. 201380035986.X, which corresponds with U.S. Appl. No. 14/536,291, 9 pages.
Office Action, dated Oct. 19, 2017, received in U.S. Appl. No. 14/608,985, 13 pages.
Notice of Allowance, dated Sep. 19, 2017, received in Chinese Patent Application No. 201380068399.0, which corresponds with U.S. Appl. No. 14/608,985, 3 pages.
Summons, dated Oct. 6, 2017, received in European Patent Application No. 13811032.5, which corresponds with U.S. Appl. No. 14/608,985, 6 pages.
Notice of Allowance, dated Sep. 19, 2017, received in Korean Patent Application No. 2015-7019984, which corresponds with U.S. Appl. No. 14/608,985, 4 pages.
Final Office Action, dated Sep. 21, 2017, received in U.S. Appl. No. 14/609,006, 17 pages.
Final Office Action, dated Nov. 2, 2017, received in U.S. Appl. No. 14/536,296, 13 pages.
Office Action, dated Nov. 1, 2017, received in U.S. Appl. No. 14/536,648, 22 pages.
Office Action, dated Nov. 30, 2017, received in U.S. Appl. No. 14/857,636, 19 pages.
Patent, dated Jul. 12, 2017, received in Dutch Patent Application No. 2016452, which corresponds with U.S. Appl. No. 14/864,737, 2 pages.
Patent, dated Sep. 7, 2017, received in Dutch Patent Application No. 2016377, which corresponds with U.S. Appl. No. 14/866,159, 4 pages.
Office Action, dated Oct. 6, 2017, received in U.S. Appl. No. 14/868,078, 40 pages.
Notice of Allowance, dated Sep. 1, 2017, received in Australian Patent Application No. 2016229421, which corresponds with U.S. Appl. No. 14/868,078, 3 pages.
Patent, dated Sep. 11, 2017, received in Danish Patent Application No. 201500588, which corresponds with U.S. Appl. No. 14/868,078, 5 pages.
Patent, dated Jul. 12, 2017, received in Dutch Patent Application No. 2016376, which corresponds with U.S. Appl. No. 14/868,078, 2 pages.
Notice of Allowance, dated Sep. 18, 2017, received in U.S. Appl. No. 14/863,432, 8 pages.
Notice of Allowance, dated Oct. 4, 2017, received in U.S. Appl. No. 14/866,511, 37 pages.
Office Action, dated Nov. 24, 2017, received in European Patent Application No. 16727900.9, which corresponds with U.S. Appl. No. 14/866,511, 5 pages.
Final Office Action, dated Oct. 3, 2017, received in U.S. Appl. No. 14/866,992, 37 pages.
Office Action, dated Sep. 5, 2017, received in Danish Patent Application No. 201500593, which corresponds with U.S. Appl. No. 14/866,992, 6 pages.
Final Office Action, dated Oct. 4, 2017, received in U.S. Appl. No. 14/856,517, 33 pages.
Final Office Action, dated Nov. 15, 2017, received in U.S. Appl. No. 14/856,519, 31 pages.
Office Action, dated Sep. 22, 2017, received in Japanese Patent Application No. 2017-029201, which corresponds with U.S. Appl. No. 14/857,636 8 pages.
Office Action, dated Dec. 1, 2017, received in U.S. Appl. No. 14/857,663, 15 pages.
Final Office Action, dated Oct. 11, 2017, received in U.S. Appl. No. 14/857,700, 13 pages.
Notice of Allowance, dated Sep. 29, 2017, received in Danish Patent Application No. 201670463, which corresponds with U.S. Appl. No. 14/866,987, 2 pages.
Patent, dated Nov. 6, 2017, received in Danish Patent Application No. 201670463, which corresponds with U.S. Appl. No. 14/866,987, 6 pages.
Notice of Allowance, dated Sep. 22, 2017, received in Japanese Patent Application No. 2016-233449, which corresponds with U.S. Appl. No. 14/866,987, 5 pages.
Patent, dated Oct. 27, 2017, received in Japanese Patent Application No. 2016-233449, which corresponds with U.S. Appl. No. 14/866,987, 3 pages.
Office Action, dated Nov. 29, 2017, received in U.S. Appl. No. 14/866,989, 31 pages.
Office Action, dated Nov. 14, 2017, received in U.S. Appl. No. 14/870,882, 25 pages.
Notice of Allowance, dated Oct. 31, 2017, received in Danish Patent Application No. 201500596, which corresponds with U.S. Appl. No. 14/870,882, 2 pages.
Office Action, dated Nov. 22, 2017, received in U.S. Appl. No. 14/871,227, 24 pages.
Office Action, dated Oct. 16, 2017, received in Australian Patent Application No. 2016203040, which corresponds with U.S. Appl. No. 14/871,227, 5 pages.
Office Action, dated Oct. 26, 2017, received in U.S. Appl. No. 14/871,336, 22 pages.
Office Action, dated Oct. 16, 2017, received in U.S. Appl. No. 14/871,462, 26 pages.
Office Action, dated Sep. 29, 2017, received in Australian Patent Application No. 2016231505, which corresponds with U.S. Appl. No. 14/871,462, 5 pages.
Innovation Patent, dated Oct. 11, 2017, received in Australian Patent Application No. 2016231505, which corresponds with U.S. Appl. No. 14/871,462, 1 page.
Office Action, dated Nov. 13, 2017, received in Japanese Patent Application No. 2016-183289, which corresponds with U.S. Appl. No. 14/871,462, 5 pages.
Final Office Action, dated Nov. 29, 2017, received in U.S. Appl. No. 14/867,823, 47 pages.
Office Action, dated Oct. 31, 2017, received in Danish Patent Application No. 201500598, which corresponds with U.S. Appl. No. 14/867,892, 2 pages.
Final Office Action, dated Oct. 10, 2017, received in U.S. Appl. No. 14/869,855, 16 pages.
Notice of Allowance, dated Dec. 4, 2017, received in U.S. Appl. No. 15/081,771, 10 pages.
Notice of Allowance, dated Oct. 20, 2017, received in U.S. Appl. No. 15/136,782, 9 pages.
Notice of Allowance, dated Jul. 6, 2017, received in U.S. Appl. No. 15/231,745, 18 pages.
Patent, dated Oct. 30, 2017, received in Danish Patent Application No. 201670593, which corresponds with U.S. Appl. No. 15/231,745, 3 pages.

(56) References Cited

OTHER PUBLICATIONS

Office Action, dated Oct. 16, 2017, received in Danish Patent Application No. 201770710, 10 pages.
Office Action, dated Oct. 31, 2017, received in U.S. Appl. No. 15/723,069, 7 pages.
Extended European Search Report, dated Nov. 24, 2017, received in European Patent Application No. 17186744.3, which corresponds with U.S. Appl. No. 14/536,291, 10 pages.
Extended European Search Report, dated Oct. 17, 2017, received in European Patent Application No. 17184437.6, Which corresponds with U.S. Appl. No. 14/868,078, 8 pages.
Extended European Search Report, dated Oct. 10, 2017, received in European Patent Application No. 17188507.2, which corresponds with U.S. Appl. No. 14/866,361, 9 pages.
Extended European Search Report, dated Sep. 11, 2017, received in European Patent Application No. 17163309.2, which corresponds with U.S. Appl. No. 14/866,987, 8 pages.
MacKenzie et al., "The Tactile Touchpad", Chi '97 Extended Abstracts on Human Factors in Computing Systems Looking to the Future, Chi '97, Mar. 22, 1997, 5 pages.c.
YouTube, "HTC One Favorite Camera Features", http://www.youtube.com/watch?v=sUYHfcjl4RU, Apr. 28, 2013, 3 pages.
Notice of Allowance, dated Dec. 8, 2017, received in Japanese Patent Application No. 2015-511644, which corresponds with U.S. Appl. No. 14/536,426, 6 pages.
Patent, dated Jan. 12, 2018, received in Japanese Patent Application No. 2015-511644, which corresponds with U.S. Appl. No. 14/536,426, 3 pages.
Notice of Acceptance, dated Dec. 20, 2017, received in Australian Patent Application No. 2016201451, which corresponds with U.S. Appl. No. 14/608,926, 3 pages.
Notice of Allowance, dated Dec. 29, 2017, received in Korean Patent Application No. 2017-7018250, which corresponds with U.S. Appl. No. 14/608,926, 3 pages.
Office Action, dated Dec. 6, 2017, received in European Patent Application No. 13724104.8, which corresponds with U.S. Appl. No. 14/536,203, 9 pages.
Notice of Allowance, dated Jan. 12, 2018, received in Japanese Patent Application No. 2016173113, which corresponds with U.S. Appl. No. 14/536,203, 5 pages.
Patent, dated Jan. 23, 2018, received in Korean Patent Application No. 2016-7033834, which corresponds with U.S. Appl. No. 14/536,203, 4 pages.
Office Action, dated Jan. 25, 2018, received in European Patent Application No. 13724106.3, which corresponds with U.S. Appl. No. 14/536,267, 5 pages.
Patent, dated Dec. 1, 2017, received in Korean Patent Application No. 2016-7029533, which corresponds with U.S. Appl. No. 14/536,267, 2 pages.
Patent, dated Dec. 19, 2017, received in Korean Patent Application No. 2015-7019984, which correspds with U.S. Appl. No. 14/608,985, 3 pages.
Office Action, dated Dec. 15, 2017, received in U.S. Appl. No. 14/866,159, 35 pages.
Office Action, dated Jan. 10, 2018, received in Danish Patent Application No. 201500574, which corresponds with U.S. Appl. No. 14/866,159, 2 pages.
Certificate of Grant, dated Jan. 3, 2018, received in Australian Patent Application No. 2016229421, which corresponds with U.S. Appl. No. 14/868,078, 1 page.
Office Action, dated Dec. 14, 2017, received in Danish Patent Application No. 201670594, which corresponds with U.S. Appl. No. 14/869,899, 3 pages.
Office Action, dated Jan. 29, 2018, received in U.S. Appl. No. 14/866,992, 44 pages.
Office Action, dated Jan. 19, 2018, received in Australian Patent Application No. 201761478, which corresponds with U.S. Appl. No. 14/866,992, 6 pages.
Office Action, dated Jan. 18, 2018, received in U.S. Appl. No. 15/009,676, 21 Pages.
Notice of Allowance, dated Jan. 31, 2018, received in U.S. Appl. No. 14/856,519, 9 pages.
Office Action, dated Jan. 17, 2018, received in Australian Patent Application No. 2017202816, which corresponds with U.S. Appl. No. 14/857,636, 3 pages.
Office Action, dated Dec. 15, 2017, received in Danish Patent Application No. 201500584, which corresponds with U.S. Appl. No. 14/864,580, 4 pages.
Office Action, dated Dec. 15, 2017, received in Danish Patent Application No. 201500585, which corresponds with U.S. Appl. No. 14/864,627, 5 pages.
Office Action, dated Jan. 4, 2018, received in Danish Patent Application No. 201500579, which corresponds with U.S. Appl. No. 14/866,361, 2 pages.
Office Action, dated Jan. 22, 2018, received in U.S. Appl. No. 14/866,987, 22 pages.
Notice of Allowance, dated Jan. 4, 2018, received in Japanese Patent Application No. 2016-533201, which corresponds with U.S. Appl. No. 14/871,227, 4 pages.
Office Action, dated Jan. 23, 2018, received in Danish Patent Application No. 201500594, which corresponds with U.S. Appl. No. 14/867,823, 8 pages.
Final Office Action, dated Dec. 14, 2017, received in U.S. Appl. No. 14/867,892, 53 pages.
Office Action, dated Jan. 23, 2018, received in U.S. Appl. No. 14/869,855, 24 pages.
Office Action, dated Jan. 18, 2018, received in U.S. Appl. No. 14/869,873, 25 pages.
Office Action, dated Jan. 11, 2018, received in U.S. Appl. No. 14/869,997, 17 pages.
Notice of Allowance, dated Jan. 17, 2018, received in U.S. Appl. No. 14/867,990, 12 pages.
Office Action, dated Dec. 12, 2017, received in U.S. Appl. No. 15/009,668, 32 pages.
Office Action, dated Feb. 1, 2018, received in Australian Patent Application No. 2017202058, which corresponds with U.S. Appl. No. 15/081,771, 4 pages.
Office Action, dated Jan. 26, 2018, received in Japanese Patent Application No. 2017-086460, which corresponds with U.S. Appl. No. 15/081,771, 6 pages.
Office Action, dated Jan. 8, 2018, received in Danish Patent Application No. 201770190, which corresponds with U.S. Appl. No. 15/136,782, 2 pages.
Office Action, dated Jan. 10, 2018, received in Danish Patent Application No. 201670590, which corresponds with U.S. Appl. No. 15/231,745, 2 pages.
Notice of Allowance, dated Dec. 21, 2017, received in U.S. Appl. No. 15/723,069, 7 pages.
Patent, Nov. 16, 2017, received in Dutch Patent Application No. 2016375, which corresponds with U.S. Appl. No. 14/866,981, 2 pages.
Final Office Action, dated Nov. 16, 2017, received in U.S. Appl. No. 14/856,520, 41 pages.
Patent, dated Oct. 30, 2017, Danish Patent Application No. 201500601, which corresponds with U.S. Appl. No. 14/871,336, 5 pages.
Easton-Ellett, "Three Free Cydia Utilities to Remove IOS Notification Badges", http://www.ijailbreak.com/cydia/three-free-cydia-utilities-to-remove-ios-notification-badges, Apr. 14, 2012, 2 pages.
iPhoneHacksTV, "Confero allows you to easily manage your Badge notifications—iPhone Hacks", youtube, https://www.youtube.com/watch?v=JCk61pnL4SU, Dec. 26, 2014.
Mahdi, "Confero now available in Cydia, bring a new way to manage Notification badges [Jailbreak Tweak]", http://www.iphonehacks.com/2015/01/confero-tweak-manage-notification-badges.html, Jan. 1, 2015, 2 pages.
Ritchie, "How to see all the unread message notifications on your iPhone, all at one, all in the same place/iMore", https://www.imore.com/how-see-all-unread-message-notifications-your-iphone-all-once-all-same-place, Feb. 22, 2014, 2 pages.
Office Action, dated Mar. 9, 2018, received in European Patent Application No. 13795391.5, which corresponds with U.S. Appl. No. 14/536,426, 4 pages.

(56) References Cited

OTHER PUBLICATIONS

Intention to Grant, dated Mar. 9, 2018, received in European Patent Application No. 15183980.0, which corresponds with U.S. Appl. No. 14/536,426, 5 pages.
Notice of Allowance, dated Feb. 8, 2018, received in Chinese Patent Application No. 201380068414.1, which corresponds with U.S. Appl. No. 14/608,926, 2 pages.
Oral Summons, dated Feb. 13, 2017, received in European Patent Application No. 13795392.3, which corresponds with U.S. Appl. No. 14/608,926, 11 pages.
Office Action, dated Feb. 2, 2018, received in Chinese Patent Application No. 201380035893.7, which corresponds with U.S. Appl. No. 14/536,141, 5 pages.
Office Action, dated Apr. 9, 2018, received in European Patent Application No. 13726053.5, which corresponds with U.S. Appl. No. 14/536,141, 9 pages.
Notice of Acceptance, dated Mar. 7, 2018, received in Australian Patent Application No. 2016201303, which corresponds with U.S. Appl. No. 14/608,942, 3 pages.
Office Action, dated Mar. 28, 2018, received in Chinese Patent Application No. 201380068295.X, which corresponds with U.S. Appl. No. 14/608,942, 5 pages.
Notice of Allowance, dated Apr. 4, 2018, received in Chinese Patent Application No. 201380035977.0, which corresponds with U.S. Appl. No. 14/536,203, 3 pages.
Patent, dated Feb. 16, 2018, received in Japanese Patent Application No. 2016173113, which corresponds with U.S. Appl. No. 14/536,203, 3 pages.
Oral Proceedings, dated Mar. 7, 2018, received in European Office Action No. 13798465.4, which corresponds with U.S. Appl. No. U.S. Appl. No. 14/608,965, 5 pages.
Notice of Acceptance, dated Feb. 27, 2018, received in Australian Patent Application No. 2016204411, which corresponds with U.S. Appl. No. 14/536,267, 3 pages.
Notice of Allowance, dated Jan. 29, 2018, received in Chinese Patent Application No. 201380035968.1, which corresponds with U.S. Appl. No. 14/536,267, 3 pages.
Patent, dated Apr. 20, 2018, received in Chinese Patent Application No. 201380035968.1, which corresponds with U.S. Appl. No. 14/536,267, 4 pages.
Decision to grant, dated Mar. 29, 2018, received in European Patent Application No. 16710871.1, which corresponds with U.S. Appl. No. 14/864,737, 2 pages.
Office Action, dated Feb. 14, 2018, received in Korean Patent Application No. 2017-7030129, which corresponds with U.S. Appl. No. 14/864,737, 17 pages.
Notice of Allowance, dated Mar. 21, 2018, received in Danish Patent Application No. 201500574, which corresponds with U.S. Appl. No. 14/866,159, 2 pages.
Office Action, dated Jan. 29, 2018, received in Danish Patent Application No. 201500592, which corresponds with U.S. Appl. No. 14/869,899, 2 pages.
Notice of Allowance, dated Apr. 24, 2018, received in Danish Patent Application No. 201500592, which corresponds with U.S. Appl. No. 14/869,899, 2 pages.
Office Action, dated Mar. 26, 2018, received in Australian Patent Application No. 2016304890, which corresponds with U.S. Appl. No. 14/866,992, 3 pages.
Decision to Grant, dated Apr. 19, 2018, received in Dutch Patent Application No. 2019214, which corresponds with U.S. Appl. No. 14/864,601, 2 pages.
Notice of Allowance, dated Mar. 16, 2018, received in Danish Patent Application No. 201500579, which corresponds with U.S. Appl. No. 14/866,361, 2 pages.
Notice of Allowance, dated Mar. 6, 2018, received in Japanese Patent Application No. 2017-126445, which corresponds with U.S. Appl. No. 14/866,987, 5 pages.
Office Action, dated Feb. 26, 2018, received in Australian Patent Application No. 2017201079, which corresponds with U.S. Appl. No. 14/866,989, 6 pages.
Patent, dated Mar. 9, 2018, received in Japanese Patent Application No. 2016-233450, which corresponds with U.S. Appl. No. 14/866,989, 4 pages.
Notice of Allowance, dated Feb. 5, 2018, received in Japanese Patent Application No. 2016-233450, which corresponds with U.S. Appl. No. 14/866,989, 5 pages.
Office Action, dated Jan. 29, 2018, received in Danish Patent Application No. 201500595, which corresponds with U.S. Appl. No. 14/871,236, 2 pages.
Patent, dated Jan. 29, 2018, received in Danish Patent Application No. 201500596, which corresponds with U.S. Appl. No. 14/870,882, 4 pages.
Patent, dated Feb. 9, 2018, received in Japanese Patent Application No. 2016-533201, which corresponds with U.S. Appl. No. 14/871,227, 4 pages.
Office Action, dated Feb. 20, 2018, received in Korean Patent Application No. 2016-7019816, which corresponds with U.S. Appl. No. 14/871,227, 8 pages.
Office Action, dated Apr. 2, 2018, received in Japanese Patent Application No. 2018-020324, which corresponds with U.S. Appl. No. 14/874,336, 4 pages.
Notice of Allowance, dated Jan. 26, 2018, received in Danish Patent Application No. 201500598, which corresponds with U.S. Appl. No. 14/867,892, 2 pages.
Office Action, dated Feb. 19, 2018, received in Danish Patent Application No. 201500581, which corresponds with U.S. Appl. No. 14/867,990, 4 pages.
Notice of Allowance, dated Mar. 19, 2018, received in Danish Patent Application No. 201770190, which corresponds with U.S. Appl. No. 15/136,782, 2 pages.
Office Action, dated Feb. 22, 2018, received in Danish Patent Application No. 201670587, which corresponds with U.S. Appl. No. 15/231,745, 4 pages.
Office Action, dated Apr. 11, 2018, received in Danish Patent Application No. 201670591, which corresponds with U.S. Appl. No. 15/231,745, 3 pages.
Office Action, dated Jan. 30, 2018, received in Danish Patent Application No. 201670592, which corresponds with U.S. Appl. No. 15/231,745, 2 pages.
Notice of Allowance, dated Mar. 27, 2018, received in Danish Patent Application No. 201670592, which corresponds with U.S. Appl. No. 15/231,745, 2 pages.
Notice of Acceptance, dated Mar. 2, 2018, received in Australian Patent Application No. 2018200705, which corresponds with U.S. Appl. No. 15/272,327, 3 pages.
Notice of Acceptance, dated Mar. 2, 2018, received in Australian Patent Application No. 2016304832, which corresponds with U.S. Appl. No. 15/272,345, 3 pages.
Office Action, dated Apr. 20, 2018, received in European Patent Application No. 16756862.5, 15 pages.
Search Report, dated Feb. 15, 2018, received in Dutch Patent Application No. 2019215, which corresponds with U.S. Appl. No. 14/864,529, 13 pages.
Search Report, dated Feb. 15, 2018, received in Dutch Patent Application No. 2019214, which corresponds with U.S. Appl. No. 14/864,601, 12 pages.
Extended European Search Report, dated Mar. 2, 2018, received in European Patent Application No. 17206374.5, which corresponds with U.S. Appl. No. 15/272,343, 11 pages.
Final Office Action, dated Feb. 22, 2018, received in U.S. Appl. No. 14/608,895, 20 pages.
Final Office Action, dated Feb. 26, 2018, received in U.S. Appl. No. 14/536,235, 13 pages.
Office Action, dated Feb. 12, 2018, received in U.S. Appl. No. 14/536,464, 33 pages.
Notice of Allowance, dated Feb. 28, 2018, received in U.S. Appl. No. 14/536,166, 5 pages.
Notice of Allowance, dated Apr. 20, 2018, received in U.S. Appl. No. 14/608,985, 5 pages.
Office Action, dated Mar. 20, 2018, received in U.S. Appl. No. 14/609,006, 13 pages.
Notice of Allowance, dated Mar. 14, 2018, received in U.S. Appl. No. 14/536,296, 8 pages.

(56) References Cited

OTHER PUBLICATIONS

Office Action, dated Feb. 12, 2018, received in U.S. Appl. No. 15/009,661, 36 pages.
Office Action, dated Mar. 13, 2018, received in U.S. Appl. No. 15/009,688, 10 pages.
Notice of Allowance, dated Feb. 12, 2018, received in U.S. Appl. No. 14/857,700, 13 pages.
Notice of Allowance, dated Apr. 9, 2018, received in U.S. Appl. No. 14/857,700, 7 pages.
Notice of Allowance, dated Apr. 19, 2018, received in U.S. Appl. No. 14/864,529, 11 pages.
Final Office Action, dated Mar. 9, 2018, received in U.S. Appl. No. 14/870,754, 19 pages.
Final Office Action, dated Apr. 20, 2018, received in U.S. Appl. No. 14/870,882, 7 pages.
Final Office Action, dated Feb. 16, 2018, received in U.S. Appl. No. 14/870,988, 18 pages.
Final Office Action, dated Mar. 15, 2018, received in U.S. Appl. No. 14/871,336, 23 pages.
Notice of Allowance, dated Apr. 18, 2018, received in U.S. Appl. No. 14/867,823, 10 pages.
Office Action, dated Apr. 24, 2018, received in U.S. Appl. No. 14/867,892, 63 pages.
Office Action, dated Feb. 28, 2018, received in U.S. Appl. No. 14/869,261, 26 pages.
Notice of Allowance, dated Mar. 30, 3018, received in U.S. Appl. No. 14/867,990, 5 pages.
Office Action, dated Apr. 19, 2018, received in U.S. Appl. No. 14/869,703, 19 pages.
Office Action, dated March 7, 2018, received in U.S. Appl. No. 15/482,618, 7 pages.
Office Action, dated Apr. 23, 2018, received in U.S. Appl. No. 15/499,693, 29 pages.

* cited by examiner

7900

```
┌─────────────────────────────────────────────────────────────────┐
│  Display, on the display, a lower-level user interface that is part of a user  │──7902
│                          interface hierarchy                          │
│  ┌───────────────────────────────────────────────────────────┐  │
│  │  The hierarchy includes at least three levels, including the lower-level  │──7904
│  │  user interface, an intermediate-level user interface and a higher-level  │
│  │  user interface; the intermediate-level user interface is above the lower- │
│  │  level user interface in the hierarchy; and the higher-level user interface │
│  │  is above both the intermediate-level user interface and the lower-level  │
│  │                user interface in the hierarchy.                │
│  │ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ │
│  │ │  The hierarchy includes exactly three levels in order from highest │ │──7906
│  │ │  to lowest: the higher-level user interface; the intermediate-level │ │
│  │ │       user interface; and the lower-level user interface       │ │
│  │ │ ─ ─ ─ ─ ─ ─ ─ ─ ─ ─ ─ ─ ─ ─ ─ ─ ─ ─ ─ ─ ─ ─ ─ ─ ─ ─ ─ ─ ─ │
│  │ │  The higher-level user interface is adjacent to the intermediate- │ │──7908
│  │ │  level user interface in the hierarchy; and the intermediate-level │ │
│  │ │  user interface is adjacent to the lower-level user interface in the │ │
│  │ │                       hierarchy.                       │ │
│  │ │ ─ ─ ─ ─ ─ ─ ─ ─ ─ ─ ─ ─ ─ ─ ─ ─ ─ ─ ─ ─ ─ ─ ─ ─ ─ ─ ─ ─ ─ │
│  │ │        The hierarchy includes more than three levels        │ │──7910
│  │ │ ─ ─ ─ ─ ─ ─ ─ ─ ─ ─ ─ ─ ─ ─ ─ ─ ─ ─ ─ ─ ─ ─ ─ ─ ─ ─ ─ ─ ─ │
│  │ │   The lower-level and intermediate-level user interfaces are user   │ │──7912
│  │ │    interfaces in a single application; and the higher-level user    │ │
│  │ │           interface is an application launch user interface           │ │
│  │ │ ─ ─ ─ ─ ─ ─ ─ ─ ─ ─ ─ ─ ─ ─ ─ ─ ─ ─ ─ ─ ─ ─ ─ ─ ─ ─ ─ ─ ─ │
│  │ │     The lower-level, intermediate-level and higher-level user     │ │──7914
│  │ │        interfaces are user interfaces in a single application        │ │
│  │ │ ─ ─ ─ ─ ─ ─ ─ ─ ─ ─ ─ ─ ─ ─ ─ ─ ─ ─ ─ ─ ─ ─ ─ ─ ─ ─ ─ ─ ─ │
│  │ │    The lower-level user interface is a media presentation interface;    │ │──7916
│  │ │  the intermediate-level user interface is a media collection display    │ │
│  │ │  interface of a media player application; and the higher-level user    │ │
│  │ │  interface is an application launch user interface that includes an    │ │
│  │ │           icon representing the media player application.           │ │
│  │ │ ─ ─ ─ ─ ─ ─ ─ ─ ─ ─ ─ ─ ─ ─ ─ ─ ─ ─ ─ ─ ─ ─ ─ ─ ─ ─ ─ ─ ─ │
│  │ │   The lower-level user interface is a subfolder; the intermediate-   │ │──7918
│  │ │   level user interface is a folder containing the subfolder; and the   │ │
│  │ │   higher-level user interface is an application launch interface that   │ │
│  │ │                 includes an icon representing the folder.                 │ │
│  └───────────────────────────────────────────────────────────┘  │
└─────────────────────────────────────────────────────────────────┘
```

```
┌─────────────────────────────────────────────────────────────────┐
│  Display, on the display, a lower-level user interface that is part of a user    │──8202
│                        interface hierarchy                                        │
│  ┌───────────────────────────────────────────────────────────┐  │
│  │ The hierarchy includes at least three levels, including the lower-  │──8204
│  │ level user interface, an intermediate-level user interface and a higher-level │
│  │ user interface; the intermediate-level user interface is above the lower-│
│  │ level user interface in the hierarchy; and the higher-level user interface│
│  │ is above both the intermediate-level user interface and the lower-level │
│  │                 user interface in the hierarchy.                    │
│  │ ┌─ ─ ─ ─ ─ ─ ─ ─ ─ ─ ─ ─ ─ ─ ─ ─ ─ ─ ─ ─ ─ ─ ─ ─ ─ ─ ─ ─┐ │
│  │ │ The hierarchy includes exactly three levels in order from highest │──8206
│  │ │ to lowest: the higher-level user interface; the intermediate-level│ │
│  │ │      user interface; and the lower-level user interface          │ │
│  │ └─ ─ ─ ─ ─ ─ ─ ─ ─ ─ ─ ─ ─ ─ ─ ─ ─ ─ ─ ─ ─ ─ ─ ─ ─ ─ ─ ─┘ │
│  │ ┌─ ─ ─ ─ ─ ─ ─ ─ ─ ─ ─ ─ ─ ─ ─ ─ ─ ─ ─ ─ ─ ─ ─ ─ ─ ─ ─ ─┐ │
│  │ │  The higher-level user interface is adjacent to the intermediate- │──8208
│  │ │  level user interface in the hierarchy; and the intermediate-level│ │
│  │ │  user interface is adjacent to the lower-level user interface in the│
│  │ │                         hierarchy.                              │ │
│  │ └─ ─ ─ ─ ─ ─ ─ ─ ─ ─ ─ ─ ─ ─ ─ ─ ─ ─ ─ ─ ─ ─ ─ ─ ─ ─ ─ ─┘ │
│  └───────────────────────────────────────────────────────────┘  │
│  ┌─ ─ ─ ─ ─ ─ ─ ─ ─ ─ ─ ─ ─ ─ ─ ─ ─ ─ ─ ─ ─ ─ ─ ─ ─ ─ ─ ─ ─ ─┐ │
│  │           The hierarchy includes more than three levels              │──8210
│  └─ ─ ─ ─ ─ ─ ─ ─ ─ ─ ─ ─ ─ ─ ─ ─ ─ ─ ─ ─ ─ ─ ─ ─ ─ ─ ─ ─ ─ ─┘ │
│  ┌─ ─ ─ ─ ─ ─ ─ ─ ─ ─ ─ ─ ─ ─ ─ ─ ─ ─ ─ ─ ─ ─ ─ ─ ─ ─ ─ ─ ─ ─┐ │
│  │ The lower-level and intermediate-level user interfaces are user      │──8212
│  │  interfaces in a single application; and the higher-level user       │
│  │         interface is an application launch user interface            │
│  └─ ─ ─ ─ ─ ─ ─ ─ ─ ─ ─ ─ ─ ─ ─ ─ ─ ─ ─ ─ ─ ─ ─ ─ ─ ─ ─ ─ ─ ─┘ │
│  ┌─ ─ ─ ─ ─ ─ ─ ─ ─ ─ ─ ─ ─ ─ ─ ─ ─ ─ ─ ─ ─ ─ ─ ─ ─ ─ ─ ─ ─ ─┐ │
│  │  The lower-level, intermediate-level and higher-level user           │──8214
│  │       interfaces are user interfaces in a single application         │
│  └─ ─ ─ ─ ─ ─ ─ ─ ─ ─ ─ ─ ─ ─ ─ ─ ─ ─ ─ ─ ─ ─ ─ ─ ─ ─ ─ ─ ─ ─┘ │
│  ┌─ ─ ─ ─ ─ ─ ─ ─ ─ ─ ─ ─ ─ ─ ─ ─ ─ ─ ─ ─ ─ ─ ─ ─ ─ ─ ─ ─ ─ ─┐ │
│  │ The lower-level user interface is a media presentation interface;    │──8216
│  │ the intermediate-level user interface is a media collection display  │
│  │ interface of a media player application; and the higher-level user   │
│  │ interface is an application launch user interface that includes an   │
│  │           icon representing the media player application.            │
│  └─ ─ ─ ─ ─ ─ ─ ─ ─ ─ ─ ─ ─ ─ ─ ─ ─ ─ ─ ─ ─ ─ ─ ─ ─ ─ ─ ─ ─ ─┘ │
│  ┌─ ─ ─ ─ ─ ─ ─ ─ ─ ─ ─ ─ ─ ─ ─ ─ ─ ─ ─ ─ ─ ─ ─ ─ ─ ─ ─ ─ ─ ─┐ │
│  │  The lower-level user interface is a subfolder; the intermediate-    │──8218
│  │  level user interface is a folder containing the subfolder; and the  │
│  │  higher-level user interface is an application launch interface that │
│  │              includes an icon representing the folder.               │
│  └─ ─ ─ ─ ─ ─ ─ ─ ─ ─ ─ ─ ─ ─ ─ ─ ─ ─ ─ ─ ─ ─ ─ ─ ─ ─ ─ ─ ─ ─┘ │
└─────────────────────────────────────────────────────────────────┘
                                  ↓
                                 (A)
```

Figure 9A

DEVICE, METHOD, AND GRAPHICAL USER INTERFACE FOR NAVIGATING USER INTERFACE HIERARCHIES

RELATED APPLICATIONS

This application is a continuation of U.S. application Ser. No. 14/608,895, filed Jan. 29, 2015, which is a continuation of PCT Patent Application Serial No. PCT/US2013/069472, filed on Nov. 11, 2013, entitled "Device, Method, and Graphical User Interface for Navigating User Interface Hierarchies," which claims the benefit of and priority to U.S. Provisional Patent Application Ser. No. 61/778,125, filed on Mar. 12, 2013, entitled "Device, Method, and Graphical User Interface for Navigating User Interface Hierarchies;" and U.S. Provisional Patent Application No. 61/747,278, filed Dec. 29, 2012, entitled "Device, Method, and Graphical User Interface for Manipulating User Interface Objects with Visual and/or Haptic Feedback," which applications are incorporated by reference herein in their entireties.

This application is also related to the following: U.S. Provisional Patent Application Ser. No. 61/778,092, filed on Mar. 12, 2013, entitled "Device, Method, and Graphical User Interface for Selecting Object within a Group of Objects;" U.S. Provisional Patent Application Ser. No. 61/778,156, filed on Mar. 12, 2013, entitled "Device, Method, and Graphical User Interface for Manipulating Framed Graphical Objects;" U.S. Provisional Patent Application Ser. No. 61/778,179, filed on Mar. 12, 2013, entitled "Device, Method, and Graphical User Interface for Scrolling Nested Regions;" U.S. Provisional Patent Application Ser. No. 61/778,171, filed on Mar. 12, 2013, entitled "Device, Method, and Graphical User Interface for Displaying Additional Information in Response to a User Contact;" U.S. Provisional Patent Application Ser. No. 61/778,191, filed on Mar. 12, 2013, entitled "Device, Method, and Graphical User Interface for Displaying User Interface Objects Corresponding to an Application;" U.S. Provisional Patent Application Ser. No. 61/778,211, filed on Mar. 12, 2013, entitled "Device, Method, and Graphical User Interface for Facilitating User Interaction with Controls in a User Interface;" U.S. Provisional Patent Application Ser. No. 61/778,239, filed on Mar. 12, 2013, entitled "Device, Method, and Graphical User Interface for Forgoing Generation of Tactile Output for a Multi-Contact Gesture;" U.S. Provisional Patent Application Ser. No. 61/778,284, filed on Mar. 12, 2013, entitled "Device, Method, and Graphical User Interface for Providing Tactile Feedback for Operations Performed in a User Interface;" U.S. Provisional Patent Application Ser. No. 61/778,287, filed on Mar. 12, 2013, entitled "Device, Method, and Graphical User Interface for Providing Feedback for Changing Activation States of a User Interface Object;" U.S. Provisional Patent Application Ser. No. 61/778,363, filed on Mar. 12, 2013, entitled "Device, Method, and Graphical User Interface for Transitioning between Touch Input to Display Output Relationships;" U.S. Provisional Patent Application Ser. No. 61/778,367, filed on Mar. 12, 2013, entitled "Device, Method, and Graphical User Interface for Moving a User Interface Object Based on an Intensity of a Press Input;" U.S. Provisional Patent Application Ser. No. 61/778,265, filed on Mar. 12, 2013, entitled "Device, Method, and Graphical User Interface for Transitioning between Display States in Response to a Gesture;" U.S. Provisional Patent Application Ser. No. 61/778,373, filed on Mar. 12, 2013, entitled "Device, Method, and Graphical User Interface for Managing Activation of a Control Based on Contact Intensity;" U.S. Provisional Patent Application Ser. No. 61/778,412, filed on Mar. 13, 2013, entitled "Device, Method, and Graphical User Interface for Displaying Content Associated with a Corresponding Affordance;" U.S. Provisional Patent Application Ser. No. 61/778,413, filed on Mar. 13, 2013, entitled "Device, Method, and Graphical User Interface for Selecting User Interface Objects;" U.S. Provisional Patent Application Ser. No. 61/778,414, filed on Mar. 13, 2013, entitled "Device, Method, and Graphical User Interface for Moving and Dropping a User Interface Object;" U.S. Provisional Patent Application Ser. No. 61/778,416, filed on Mar. 13, 2013, entitled "Device, Method, and Graphical User Interface for Determining Whether to Scroll or Select Content;" and U.S. Provisional Patent Application Ser. No. 61/778,418, filed on Mar. 13, 2013, entitled "Device, Method, and Graphical User Interface for Switching between User Interfaces," which are incorporated herein by reference in their entireties.

This application is also related to the following: U.S. Provisional Patent Application Ser. No. 61/645,033, filed on May 9, 2012, entitled "Adaptive Haptic Feedback for Electronic Devices;" U.S. Provisional Patent Application Ser. No. 61/665,603, filed on Jun. 28, 2012, entitled "Adaptive Haptic Feedback for Electronic Devices;" and U.S. Provisional Patent Application Ser. No. 61/681,098, filed on Aug. 8, 2012, entitled "Adaptive Haptic Feedback for Electronic Devices," which are incorporated herein by reference in their entireties.

TECHNICAL FIELD

This relates generally to electronic devices with touch-sensitive surfaces, including but not limited to electronic devices with touch-sensitive surfaces that detect inputs for manipulating user interfaces.

BACKGROUND

The use of touch-sensitive surfaces as input devices for computers and other electronic computing devices has increased significantly in recent years. Exemplary touch-sensitive surfaces include touch pads and touch screen displays. Such surfaces are widely used to manipulate user interface objects on a display.

Exemplary manipulations include adjusting the position and/or size of one or more user interface objects or activating buttons or opening files/applications represented by user interface objects, as well as associating metadata with one or more user interface objects or otherwise manipulating user interfaces. Exemplary user interface objects include digital images, video, text, icons, control elements such as buttons and other graphics. A user will, in some circumstances, need to perform such manipulations on user interface objects in a file management program (e.g., Finder from Apple Inc. of Cupertino, Calif.), an image management application (e.g., Aperture or iPhoto from Apple Inc. of Cupertino, Calif.), a digital content (e.g., videos and music) management application (e.g., iTunes from Apple Inc. of Cupertino, Calif.), a drawing application, a presentation application (e.g., Keynote from Apple Inc. of Cupertino, Calif.), a word processing application (e.g., Pages from Apple Inc. of Cupertino, Calif.), a website creation application (e.g., iWeb from Apple Inc. of Cupertino, Calif.), a disk authoring application (e.g., iDVD from Apple Inc. of Cupertino, Calif.), or a spreadsheet application (e.g., Numbers from Apple Inc. of Cupertino, Calif.).

But existing methods for performing these manipulations are cumbersome and inefficient. In addition, existing methods take longer than necessary, thereby wasting energy. This latter consideration is particularly important in battery-operated devices.

SUMMARY

Accordingly, there is a need for electronic devices with faster, more efficient methods and interfaces for manipulating user interfaces. Such methods and interfaces optionally complement or replace conventional methods for manipulating user interfaces. Such methods and interfaces reduce the cognitive burden on a user and produce a more efficient human-machine interface. For battery-operated devices, such methods and interfaces conserve power and increase the time between battery charges.

The above deficiencies and other problems associated with user interfaces for electronic devices with touch-sensitive surfaces are reduced or eliminated by the disclosed devices. In some embodiments, the device is a desktop computer. In some embodiments, the device is portable (e.g., a notebook computer, tablet computer, or handheld device). In some embodiments, the device has a touchpad. In some embodiments, the device has a touch-sensitive display (also known as a "touch screen" or "touch screen display"). In some embodiments, the device has a graphical user interface (GUI), one or more processors, memory and one or more modules, programs or sets of instructions stored in the memory for performing multiple functions. In some embodiments, the user interacts with the GUI primarily through finger contacts and gestures on the touch-sensitive surface. In some embodiments, the functions optionally include image editing, drawing, presenting, word processing, website creating, disk authoring, spreadsheet making, game playing, telephoning, video conferencing, e-mailing, instant messaging, workout support, digital photographing, digital videoing, web browsing, digital music playing, and/or digital video playing. Executable instructions for performing these functions are, optionally, included in a non-transitory computer readable storage medium or other computer program product configured for execution by one or more processors.

There is a need for electronic devices with faster, more efficient methods and interfaces for navigating user interface hierarchies. Such methods and interfaces may complement or replace conventional methods for navigating user interface hierarchies. Such methods and interfaces reduce the cognitive burden on a user and produce a more efficient human-machine interface. For battery-operated devices, such methods and interfaces conserve power and increase the time between battery charges.

In accordance with some embodiments, a method is performed at an electronic device with a display, a touch-sensitive surface and one or more sensors to detect intensity of contacts with the touch-sensitive surface. The method includes displaying, on the display, a lower-level user interface that is part of a user interface hierarchy, where: the hierarchy includes at least three levels, including the lower-level user interface, an intermediate-level user interface and a higher-level user interface; the intermediate-level user interface is above the lower-level user interface in the hierarchy; and the higher-level user interface is above both the intermediate-level user interface and the lower-level user interface in the hierarchy. The method further includes, while displaying the lower-level user interface, detecting an input on a portion of the device that is associated with user interface hierarchy navigation, and in response to detecting the input, in accordance with a determination that the input meets first transition criteria that include a criterion that a maximum intensity of the input is above a first intensity threshold and below a second intensity threshold, where the second intensity threshold is higher than the first intensity threshold, replacing display of the lower-level user interface with display of the intermediate-level user interface, and in accordance with a determination that the input meets second transition criteria that include a criterion that a maximum intensity of the input is above the second intensity threshold, replacing display of the lower-level user interface with display of the higher-level user interface.

In accordance with some embodiments, an electronic device includes a display unit configured to display a lower-level user interface that is part of a user interface hierarchy, where: the hierarchy includes at least three levels, including the lower-level user interface, an intermediate-level user interface and a higher-level user interface; the intermediate-level user interface is above the lower-level user interface in the hierarchy; and the higher-level user interface is above both the intermediate-level user interface and the lower-level user interface in the hierarchy, a touch-sensitive surface unit configured to receive user inputs, one or more sensor units configured to detect intensity of contacts with the touch-sensitive surface unit, and a processing unit coupled to the display unit, the touch-sensitive surface unit, and the sensor units. The processing unit is configured to, while displaying the lower-level user interface, detect an input on a portion of the device that is associated with user interface hierarchy navigation, and in response to detecting the input, in accordance with a determination that the input meets first transition criteria that include a criterion that a maximum intensity of the input is above a first intensity threshold and below a second intensity threshold, where the second intensity threshold is higher than the first intensity threshold, replace display of the lower-level user interface with display of the intermediate-level user interface, and in accordance with a determination that the input meets second transition criteria that include a criterion that a maximum intensity of the input is above the second intensity threshold, replace display of the lower-level user interface with display of the higher-level user interface.

Thus, electronic devices with displays, touch-sensitive surfaces and one or more sensors to detect intensity of contacts with the touch-sensitive surface are provided with faster, more efficient methods and interfaces for navigating user interface hierarchies, thereby increasing the effectiveness, efficiency, and user satisfaction with such devices. Such methods and interfaces may complement or replace conventional methods for navigating user interface hierarchies.

There is a need for electronic devices with faster, more efficient methods and interfaces for navigating user interface hierarchies. Such methods and interfaces may complement or replace conventional methods for navigating user interface hierarchies. Such methods and interfaces reduce the cognitive burden on a user and produce a more efficient human-machine interface. For battery-operated devices, such methods and interfaces conserve power and increase the time between battery charges.

In accordance with some embodiments, a method is performed at an electronic device with a display, a touch-sensitive surface and one or more sensors to detect intensity of contacts with the touch-sensitive surface. The method includes displaying, on the display, a lower-level user interface that is part of a user interface hierarchy, where: the hierarchy includes at least three levels, including the lower-level user interface, an intermediate-level user interface and a higher-level user interface; the intermediate-level interface is above the lower-level user interface in the hierarchy; and the higher-level user interface is above both the intermediate-level user interface and the lower-level user interface in the hierarchy. The method further includes, while displaying the lower-level user interface, detecting an input on a portion of the device that is associated with user interface hierarchy navigation and, in response to detecting the input, in accordance with a determination that the input has a duration shorter than a respective time threshold, replacing display of the lower-level user interface with display of the higher-level user interface, and in accordance with a determination that the input has a duration longer than the respective time threshold, replacing display of the lower-level user interface with display of a respective user interface in the user interface hierarchy selected in accordance with an intensity of the input.

In accordance with some embodiments, an electronic device includes a display unit configured to display a lower-level user interface that is part of a user interface hierarchy, where: the hierarchy includes at least three levels, including the lower-level user interface, an intermediate-level user interface and a higher-level user interface; the intermediate-level user interface is above the lower-level user interface in the hierarchy; and the higher-level user interface is above both the intermediate-level user interface and the lower-level user interface in the hierarchy, a touch-sensitive surface unit configured to receive user inputs, one or more sensor units configured to detect intensity of contacts with the touch-sensitive surface unit, and a processing unit coupled to the display unit, the touch-sensitive surface unit, and the sensor units. The processing unit is configured to, while displaying the lower-level user interface, detect an input on a portion of the device that is associated with user interface hierarchy navigation, and in response to detecting the input, in accordance with a determination that the input has a duration shorter than a respective time threshold, replace display of the lower-level user interface with display of the higher-level user interface, and in accordance with a determination that the input has a duration longer than the respective time threshold, replace display of the lower-level user interface with display of a respective user interface in the user interface hierarchy selected in accordance with an intensity of the input.

Thus, electronic devices with displays, touch-sensitive surfaces and one or more sensors to detect intensity of contacts with the touch-sensitive surface are provided with faster, more efficient methods and interfaces for navigating user interface hierarchies, thereby increasing the effectiveness, efficiency, and user satisfaction with such devices. Such methods and interfaces may complement or replace conventional methods for navigating user interface hierarchies.

There is a need for electronic devices with faster, more efficient methods and interfaces for gradually displaying a respective user interface on a display. Such methods and interfaces may complement or replace conventional methods for gradually displaying a respective user interface. Such methods and interfaces reduce the cognitive burden on a user and produce a more efficient human-machine interface. For battery-operated devices, such methods and interfaces conserve power and increase the time between battery charges.

In accordance with some embodiments, a method is performed at an electronic device with a display, a touch-sensitive surface and one or more sensors to detect intensity of contacts with the touch-sensitive surface. The method includes: while the display is in a low-power mode, detecting an input on the touch-sensitive surface, where detecting the input includes detecting a contact on the touch-sensitive surface and detecting a change in a characteristic of the contact. The method further includes: in response to detecting the input, in accordance with a determination that the input meets display-activation criteria, gradually displaying a respective user interface on the display in accordance with the change in the characteristic of the contact, where the respective user interface was not displayed on the display when the display was in the low-power mode.

In accordance with some embodiments, an electronic device includes a display unit configured display information; a touch-sensitive surface unit configured to receive contacts; one or more sensors units configured to detect intensity of contacts with the touch-sensitive surface unit; and a processing unit coupled to the display unit, the touch-sensitive surface unit, and the one or more sensor units. The processing unit is configured to: while the display unit is in a low-power mode, detect an input on the touch-sensitive surface unit, where detecting the input includes detecting a contact on the touch-sensitive surface unit and detecting a change in a characteristic of the contact. The processing unit it further configured to: in response to detecting the input and in accordance with a determination that the input meets display-activation criteria, gradually display a respective user interface on the display unit in accordance with the change in the characteristic of the contact, where the respective user interface was not displayed on the display unit when the display unit was in the low-power mode.

Thus, electronic devices with displays, touch-sensitive surfaces and one or more sensors to detect intensity of contacts with the touch-sensitive surface are provided with faster, more efficient methods and interfaces for gradually displaying a respective user interface on a display, for example while transitioning from a low-power mode, thereby increasing the effectiveness, efficiency, and user satisfaction with such devices. Such methods and interfaces may complement or replace conventional methods for gradually displaying a respective user interface.

In accordance with some embodiments, an electronic device includes a display, a touch-sensitive surface, optionally one or more sensors to detect intensity of contacts with the touch-sensitive surface, one or more processors, memory, and one or more programs; the one or more programs are stored in the memory and configured to be executed by the one or more processors and the one or more programs include instructions for performing the operations of any of the methods referred to in the fifth paragraph of the Description of Embodiments. In accordance with some embodiments, a graphical user interface on an electronic device with a display, a touch-sensitive surface, optionally one or more sensors to detect intensity of contacts with the touch-sensitive surface, a memory, and one or more processors to execute one or more programs stored in the memory includes one or more of the elements displayed in any of the methods referred to in fifth paragraph of the Description of Embodiments, which are updated in response to inputs, as described in any of the methods referred to in fifth paragraph of the Description of Embodiments. In accordance with some embodiments, a computer readable storage medium has stored therein instructions which when executed by an electronic device with a display, a touch-sensitive surface, and optionally one or more sensors to detect intensity of contacts with the touch-sensitive surface, cause the device to perform the operations of any of the methods referred to in fifth paragraph of the Description of Embodiments . In accordance with some embodiments, an electronic device includes: a display, a touch-sensitive surface, and optionally one or more sensors to detect intensity of contacts with the touch-sensitive surface; and means for performing the operations of any of the methods referred to in fifth paragraph of the Description of Embodiments. In accordance with some embodiments, an information processing apparatus, for use in an electronic device with a display and a touch-sensitive surface, optionally one or more sensors to detect intensity of contacts with the touch-sensitive surface, includes means for performing the operations of any of the methods referred to in fifth paragraph of the Description of Embodiments.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIGS. 6A-6D are flow diagrams illustrating a method of navigating user interface hierarchies in accordance with some embodiments.

FIGS. 9A-9E are flow diagrams illustrating a method of navigating user interface hierarchies in accordance with some embodiments.

DESCRIPTION OF EMBODIMENTS

Figure 1A:
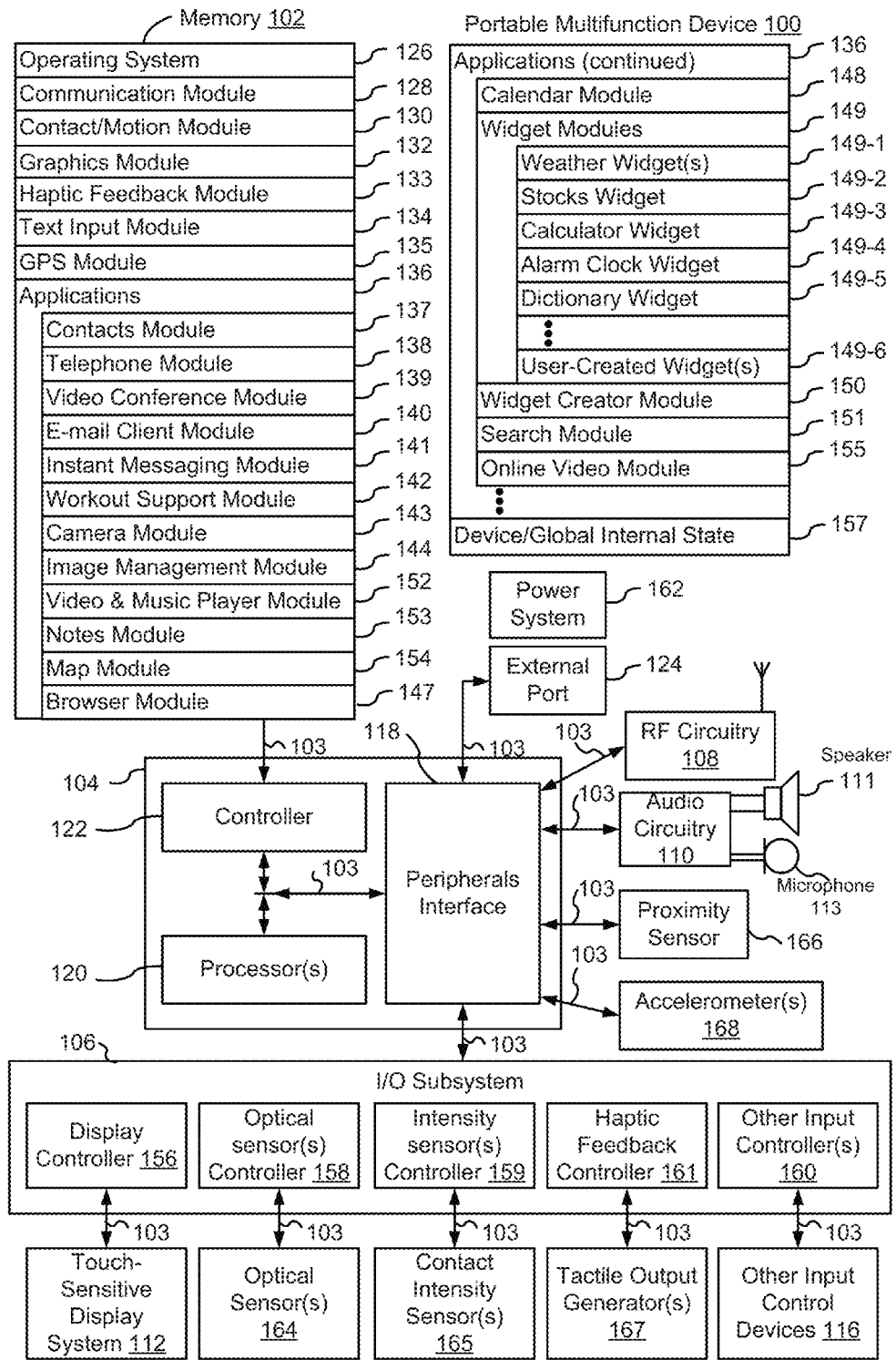
FIG. 1A is a block diagram illustrating a portable multifunction device with a touch-sensitive display in accordance with some embodiments.

The methods, devices and GUIs described herein provide visual and/or haptic feedback that makes manipulation of user interface objects more efficient and intuitive for a user. For example, in a system where the clicking action of a trackpad is decoupled from the contact intensity (e.g., contact force, contact pressure, or a substitute therefore) that is needed to reach an activation threshold, the device can generate different tactile outputs (e.g., "different clicks") for different activation events (e.g., so that clicks that accomplish a particular result are differentiated from clicks that do not produce any result or that accomplish a different result from the particular result). Additionally, tactile outputs can be generated in response to other events that are not related to increasing intensity of a contact, such as generating a tactile output (e.g., a "detent") when a user interface object is moved to a particular position, boundary or orientation, or when an event occurs at the device.

Additionally, in a system where a trackpad or touchscreen display is sensitive to a range of contact intensity that includes more than one or two specific intensity values (e.g., more than a simple on/off, binary intensity determination), the user interface can provide responses (e.g., visual or tactile cues) that are indicative of the intensity of the contact within the range. In some implementations, a pre-activation-threshold response and/or a post-activation-threshold response to an input are displayed as continuous animations. As one example of such a response, a preview of an operation is displayed in response to detecting an increase in contact intensity that is still below an activation threshold for performing the operation. As another example of such a response, an animation associated with an operation continues even after the activation threshold for the operation has been reached. Both of these examples provide a user with a continuous response to the force or pressure of a user's contact, which provides a user with visual and/or haptic feedback that is richer and more intuitive. More specifically, such continuous force responses give the user the experience of being able to press lightly to preview an operation and/or press deeply to push "past" or "through" a predefined user interface state corresponding to the operation.

Additionally, for a device with a touch-sensitive surface that is sensitive to a range of contact intensity, multiple contact intensity thresholds can be monitored by the device and different functions can be mapped to different contact intensity thresholds. This serves to increase the available "gesture space" providing easy access to advanced features for users who know that increasing the intensity of a contact at or beyond a second "deep press" intensity threshold will cause the device to perform a different operation from an operation that would be performed if the intensity of the contact is between a first "activation" intensity threshold and the second "deep press" intensity threshold. An advantage of assigning additional functionality to a second "deep press" intensity threshold while maintaining familiar functionality at a first "activation" intensity threshold is that inexperienced users who are, in some circumstances, confused by the additional functionality can use the familiar functionality by just applying an intensity up to the first "activation" intensity threshold, whereas more experienced users can take advantage of the additional functionality by applying an intensity at the second "deep press" intensity threshold.

Additionally, for a device with a touch-sensitive surface that is sensitive to a range of contact intensity, the device can provide additional functionality by allowing users to perform complex operations with a single continuous contact. For example, when selecting a group of objects, a user can move a continuous contact around the touch-sensitive surface and can press while dragging (e.g., applying an intensity greater than a "deep press" intensity threshold) to add additional elements to a selection. In this way, a user can intuitively interact with a user interface where pressing harder with a contact causes objects in the user interface to be "stickier."

Figure 5A:
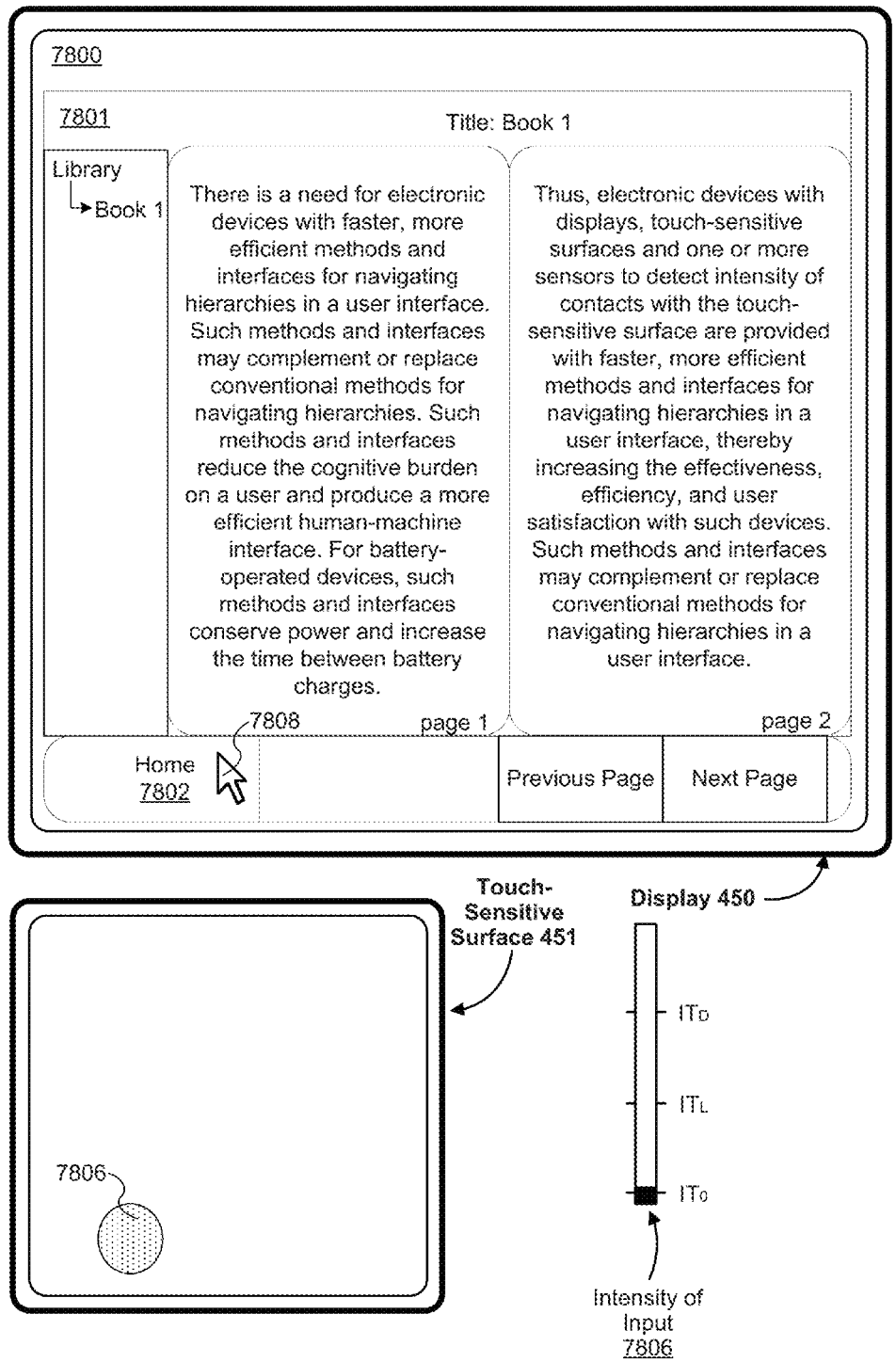
FIGS. 5A-5U illustrate exemplary user interfaces navigating user interface hierarchies in accordance with some embodiments.

A number of different approaches to providing an intuitive user interface on a device where a clicking action is decoupled from the force that is needed to reach an activation threshold and/or the device is sensitive to a wide range of contact intensities are described below. Using one or more of these approaches (optionally in conjunction with each other) helps to provide a user interface that intuitively provides users with additional information and functionality, thereby reducing the user's cognitive burden and improving the human-machine interface. Such improvements in the human-machine interface enable users to use the device faster and more efficiently. For battery-operated devices, these improvements conserve power and increase the time between battery charges. For ease of explanation, systems, methods and user interfaces for including illustrative examples of some of these approaches are described below, as follows:

Many electronic devices have graphical user interfaces that include various user interface hierarchies and it is easy for a user to lose their place within the user interface hierarchy or become confused as to how to navigate through the user interface hierarchy. The embodiments described below improve on these methods by reducing the cognitive burden on a user and produce an intuitive and efficient human-machine interface by navigating through a user interface hierarchy in accordance with an intensity of a detected input and providing visual feedback indicative of the navigation through the user interface hierarchy. In particular, FIGS. 5A-5U illustrate exemplary user interfaces for navigating a user interface hierarchy using inputs on a touch-sensitive surface. FIGS. 6A-6D are flow diagrams illustrating a method of navigating a user interface hierarchy using inputs on a touch-sensitive surface. The user interfaces in FIGS. 5A-5U are further used to illustrate the processes described below with reference to FIGS. 6A-6D.

Figure 8A:
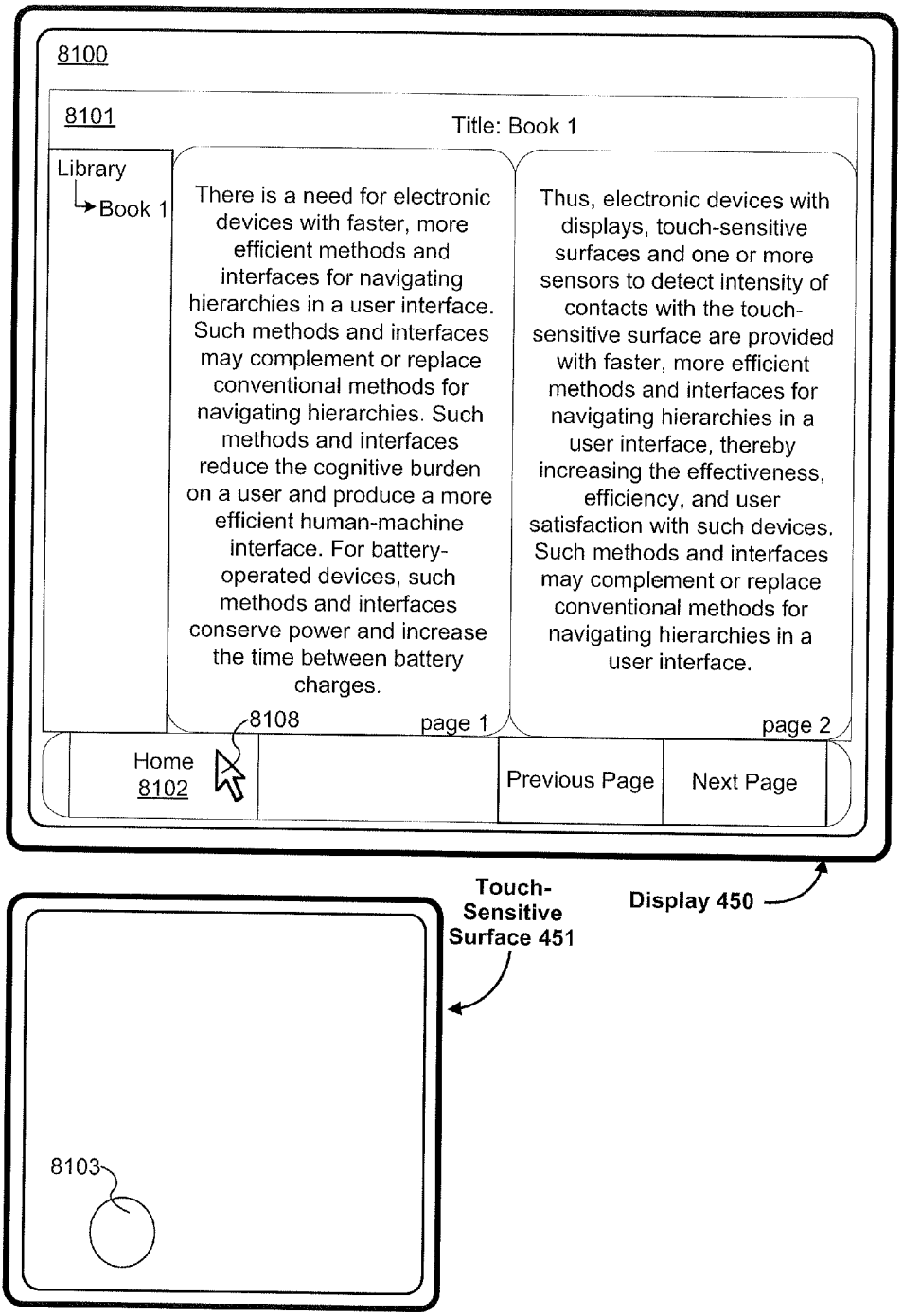
FIGS. 8A-8V illustrate exemplary user interfaces for navigating user interface hierarchies in accordance with some embodiments.

Many electronic devices have graphical user interfaces that include various user interface hierarchies and it is easy for a user to lose their place within the user interface hierarchy or become confused as to how to navigate through the user interface hierarchy. The embodiments below improve on these methods by reducing the cognitive burden on a user and produce a more intuitive and efficient human-machine interface by determining, based on a duration of a detected input, whether to navigate through a user interface hierarchy in accordance with an intensity of the detected input and provide visual feedback indicative of the navigation through the user interface hierarchy or to navigate through the user interface hierarchy using different feedback. FIGS. 8A-8V illustrate exemplary user interfaces for navigating a user interface hierarchy using inputs on a touch-sensitive surface. FIGS. 9A-9E are flow diagrams illustrating a method of navigating a user interface hierarchy using inputs on a touch-sensitive surface. The user interfaces in FIGS. 8A-8V are further used to illustrate the processes described below with reference to FIGS. 9A-9E.

Figure 11A:
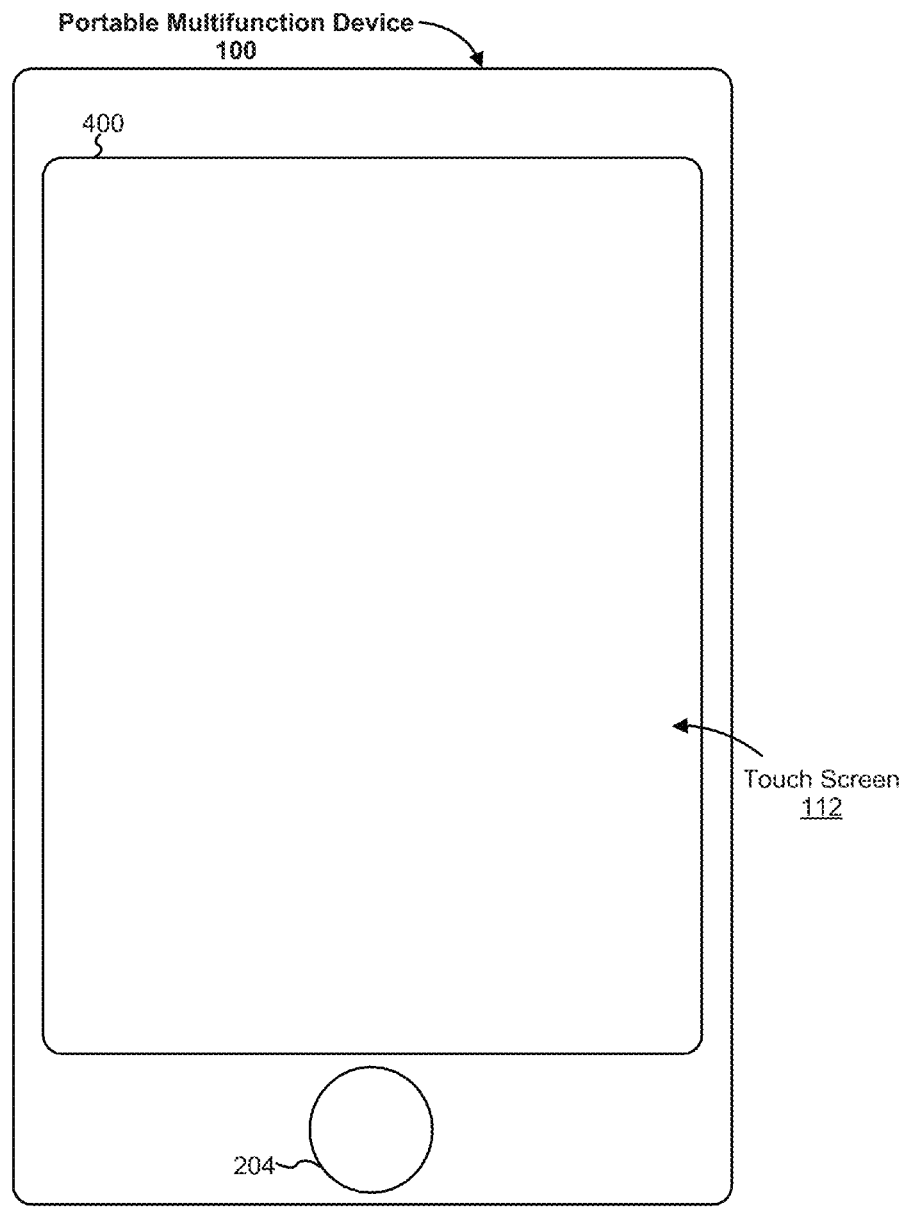
FIGS. 11A-11U illustrate exemplary user interfaces for gradually displaying a respective user interface on a display in accordance with some embodiments.

Many electronic devices display a graphical user interface on a display in response to a user action (e.g., moving a mouse or pressing a power button) subsequent to the display being in a low-power state (e.g., sleep mode or an off state) where the graphical user interface is not displayed on the display. However the transition between the low-power state and displaying the graphical user interface can be jarring to the user and/or unnecessarily consume power of the device when the user does not want the transition the device out of the low-power state. The embodiments described below improve on these methods by gradually displaying the graphical user interface in response to detecting a change in a characteristic of the contact (e.g., an increase in intensity of the contact) while a display of the device is in a low-power mode. Gradually displaying the graphical user interface in response to detecting the change in the characteristic of the contact provides an efficient and intuitive user interface that reduces the cognitive burden on the user and enables the user to cancel display of the graphical user interface if the user does not want to transition the device out of the low-power state after viewing the first portion of the gradual display of the user interface. FIGS. 11A-11U illustrate exemplary user interfaces for gradually displaying a respective user interface on a display. FIGS. 12A-12D are flow diagrams illustrating a method of gradually displaying a respective user interface on a display. The user interfaces in FIGS. 11A-11U are used to illustrate the processes in FIGS. 12A-12D.

Exemplary Devices

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touch pads), are, optionally, used. It should also be understood that, in some embodiments, the device is not a portable communications device, but is a desktop computer with a touch-sensitive surface (e.g., a touch screen display and/or a touch pad).

In the discussion that follows, an electronic device that includes a display and a touch-sensitive surface is described. It should be understood, however, that the electronic device optionally includes one or more other physical user-interface devices, such as a physical keyboard, a mouse and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive displays 112 in accordance with some embodiments. Touch-sensitive display 112 is sometimes called a "touch screen" for convenience, and is sometimes known as or called a touch-sensitive display system. Device 100 includes memory 102 (which optionally includes one or more computer readable storage mediums), memory controller 122, one or more processing units (CPU's) 120, peripherals interface 118, RF circuitry 108, audio circuitry 110, speaker 111, microphone 113, input/output (I/O) subsystem 106, other input or control devices 116, and external port 124. Device 100 optionally includes one or more optical sensors 164. Device 100 optionally includes one or more intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch sensitive surface, or to a substitute (proxy) for the force or pressure of a contact on the touch sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure and the estimated force or pressure is used to determine whether an intensity threshold has been exceeded (e.g., the intensity threshold is a pressure threshold measured in units of pressure).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application specific integrated circuits.

Memory 102 optionally includes high-speed random access memory and optionally also includes non-volatile memory, such as one or more magnetic disk storage devices, flash memory devices, or other non-volatile solid-state memory devices. Access to memory 102 by other components of device 100, such as CPU 120 and the peripherals interface 118, is, optionally, controlled by memory controller 122.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data.

In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication optionally uses any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, intensity sensor controller 159, haptic feedback controller 161 and one or more input controllers 160 for other input or control devices. The one or more input controllers 160 receive/send electrical signals from/to other input or control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, infrared port, USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output corresponds to user-interface objects.

Touch screen 112 has a touch-sensitive surface, sensor or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and converts the detected contact into interaction with user-interface objects (e.g., one or more soft keys, icons, web pages or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone®, iPod Touch®, and iPad® from Apple Inc. of Cupertino, Calif.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lens, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device, so that the touch screen display is enabled for use as a viewfinder for still and/or video image acquisition. In some embodiments, another optical sensor is located on the front of the device so that the user's image is, optionally, obtained for videoconferencing while the user views the other video conference participants on the touch screen display.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112 which is located on the front of device 100.

Device 100 optionally also includes one or more proximity sensors 166. FIG. 1A shows proximity sensor 166 coupled to peripherals interface 118. Alternately, proximity sensor 166 is coupled to input controller 160 in I/O subsystem 106. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112 which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
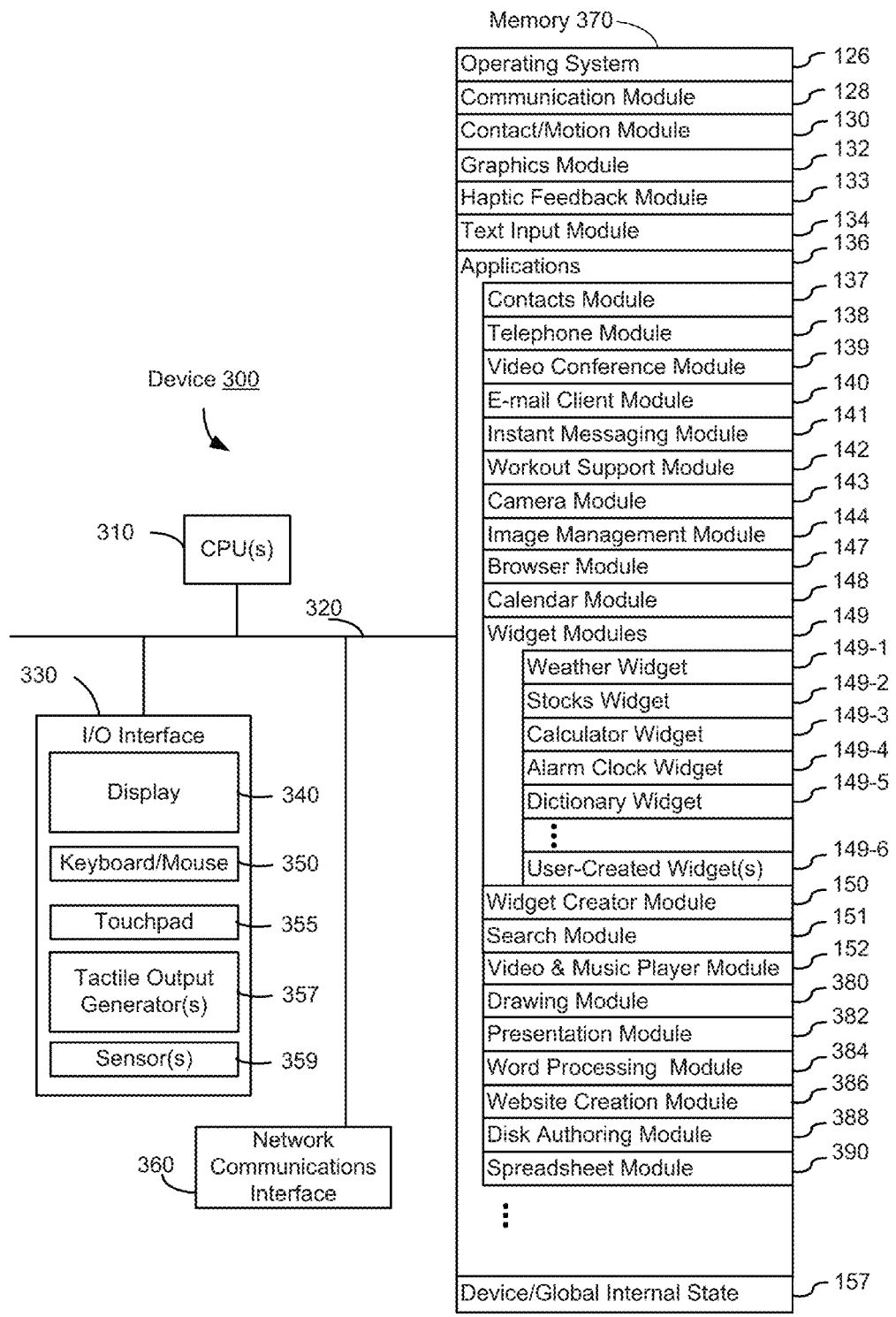
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments memory 102 stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on iPod (trademark of Apple Inc.) devices.

Contact/motion module 130 optionally detects contact with touch screen 112 (in conjunction with display controller 156) and other touch sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact) determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined thresholds values without changing the trackpad or touch screen display hardware. Additionally, in some implementations a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns and intensities. Thus, a gesture is, optionally, detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event.

Graphics module 132 includes various known software components for rendering and displaying graphics on touch screen 112 or other display, including components for changing the visual impact (e.g., brightness, transparency, saturation, contrast or other visual property) of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

Applications 136 optionally include the following modules (or sets of instructions), or a subset or superset thereof:
contacts module 137 (sometimes called an address book or contact list);
telephone module 138;
video conferencing module 139;
e-mail client module 140;
instant messaging (IM) module 141;
workout support module 142;
camera module 143 for still and/or video images;
image management module 144;
browser module 147;
calendar module 148;
widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
widget creator module 150 for making user-created widgets 149-6;
search module 151;
video and music player module 152, which is, optionally, made up of a video player module and a music player module;
notes module 153;
map module 154; and/or
online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch screen 112, display controller 156, contact module 130, graphics module 132, and text input module 134, telephone module 138 are, optionally, used to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication optionally uses any of a plurality of communications standards, protocols and technologies.

In conjunction with RF circuitry 108, audio circuitry 110, speaker 111, microphone 113, touch screen 112, display controller 156, optical sensor 164, optical sensor controller 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch screen 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages and to view received instant messages. In some embodiments, transmitted and/or received instant messages optionally include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact module 130, graphics module 132, text input module 134, GPS module 135, map module 154, and music player module 146, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store and transmit workout data.

In conjunction with touch screen 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display system controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display system controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch screen 112, display system controller 156, contact module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display system controller 156, contact module 130, graphics module 132, text input module 134, and browser module 147, the widget creator module 150 are, optionally, used by a user to create widgets (e.g., turning a user-specified portion of a web page into a widget).

In conjunction with touch screen 112, display system controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display system controller 156, contact module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact module 130, graphics module 132, and text input module 134, notes module 153 includes executable instructions to create and manage notes, to do lists, and the like in accordance with user instructions.

In conjunction with RF circuitry 108, touch screen 112, display system controller 156, contact module 130, graphics module 132, text input module 134, GPS module 135, and browser module 147, map module 154 are, optionally, used to receive, display, modify, and store maps and data associated with maps (e.g., driving directions; data on stores and other points of interest at or near a particular location; and other location-based data) in accordance with user instructions.

In conjunction with touch screen 112, display system controller 156, contact module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules are, optionally, combined or otherwise re-arranged in various embodiments. In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
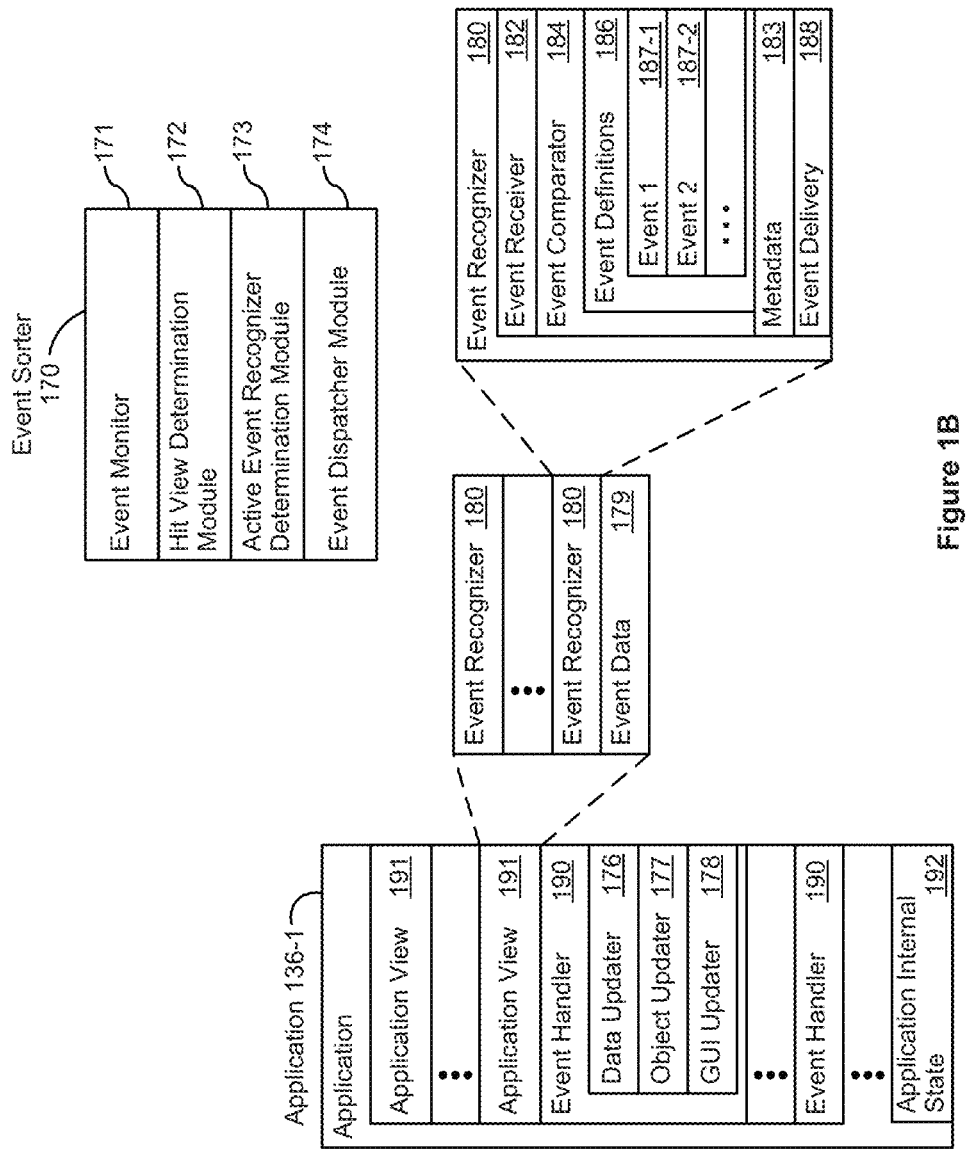
FIG. 1B is a block diagram illustrating exemplary components for event handling in accordance with some embodiments.

FIG. 1B is a block diagram illustrating exemplary components for event handling in accordance with some embodiments. In some embodiments, memory 102 (in FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripheral interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views, when touch sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (i.e., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver module 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177 or GUI updater 178 to update the application internal state 192. Alternatively, one or more of the application views 191 includes one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170, and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event 187 include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and lift-off of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event 187 also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module 145. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input-devices, not all of which are initiated on touch screens. For example, mouse movement and mouse button presses, optionally coordinated with single or multiple keyboard presses or holds; contact movements such as taps, drags, scrolls, etc., on touch-pads; pen stylus inputs; movement of the device; oral instructions; detected eye movements; biometric inputs; and/or any combination thereof are optionally utilized as inputs corresponding to sub-events which define an event to be recognized.

Figure 2:
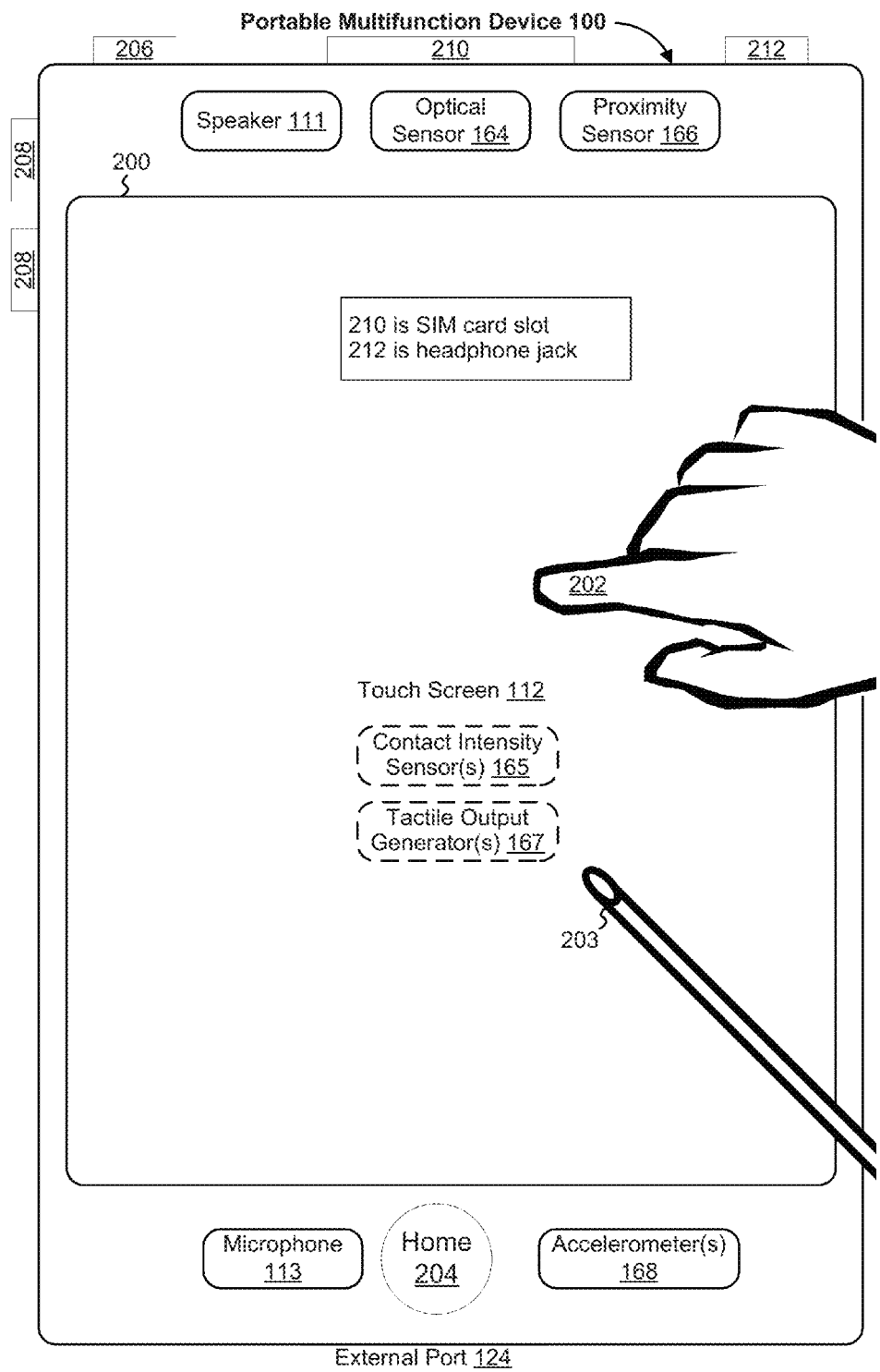
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward) and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also includes one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In one embodiment, device 100 includes touch screen 112, menu button 204, push button 206 for powering the device on/off and locking the device, volume adjustment button(s) 208, Subscriber Identity Module (SIM) card slot 210, head set jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPU's) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above identified elements in FIG. 3 are, optionally, stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules are, optionally, combined or otherwise re-arranged in various embodiments. In some embodiments, memory 370 optionally stores a subset of the modules and data structures identified above. Furthermore, memory 370 optionally stores additional modules and data structures not described above.

Attention is now directed towards embodiments of user interfaces ("UI") that is, optionally, implemented on portable multifunction device 100.

Figure 4A:
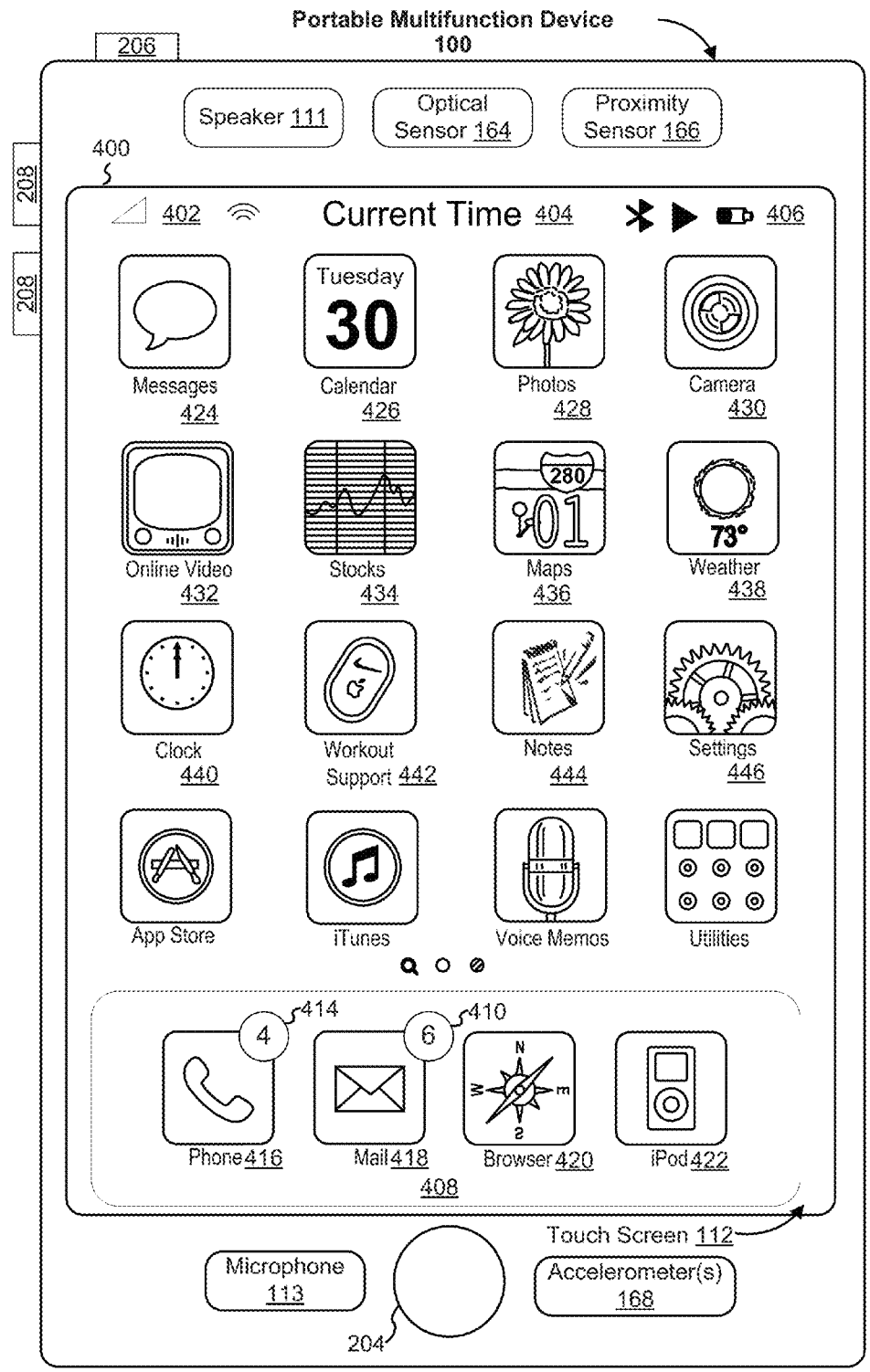
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
  Icon 416 for telephone module 138, labeled "Phone," which optionally includes an indicator 414 of the number of missed calls or voicemail messages;
  Icon 418 for e-mail client module 140, labeled "Mail," which optionally includes an indicator 410 of the number of unread e-mails;
  Icon 420 for browser module 147, labeled "Browser;" and
  Icon 422 for video and music player module 152, also referred to as iPod (trademark of Apple Inc.) module 152, labeled "iPod;" and
Icons for other applications, such as:
  Icon 424 for IM module 141, labeled "Text;"
  Icon 426 for calendar module 148, labeled "Calendar;"
  Icon 428 for image management module 144, labeled "Photos;"
  Icon 430 for camera module 143, labeled "Camera;"
  Icon 432 for online video module 155, labeled "Online Video"
  Icon 434 for stocks widget 149-2, labeled "Stocks;"
  Icon 436 for map module 154, labeled "Map;"
  Icon 438 for weather widget 149-1, labeled "Weather;"
  Icon 440 for alarm clock widget 149-4, labeled "Clock;"
  Icon 442 for workout support module 142, labeled "Workout Support;"
  Icon 444 for notes module 153, labeled "Notes;" and
  Icon 446 for a settings application or module, which provides access to settings for device 100 and its various applications 136.

It should be noted that the icon labels illustrated in FIG. 4A are merely exemplary. For example, icon 422 for video and music player module 152 are labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
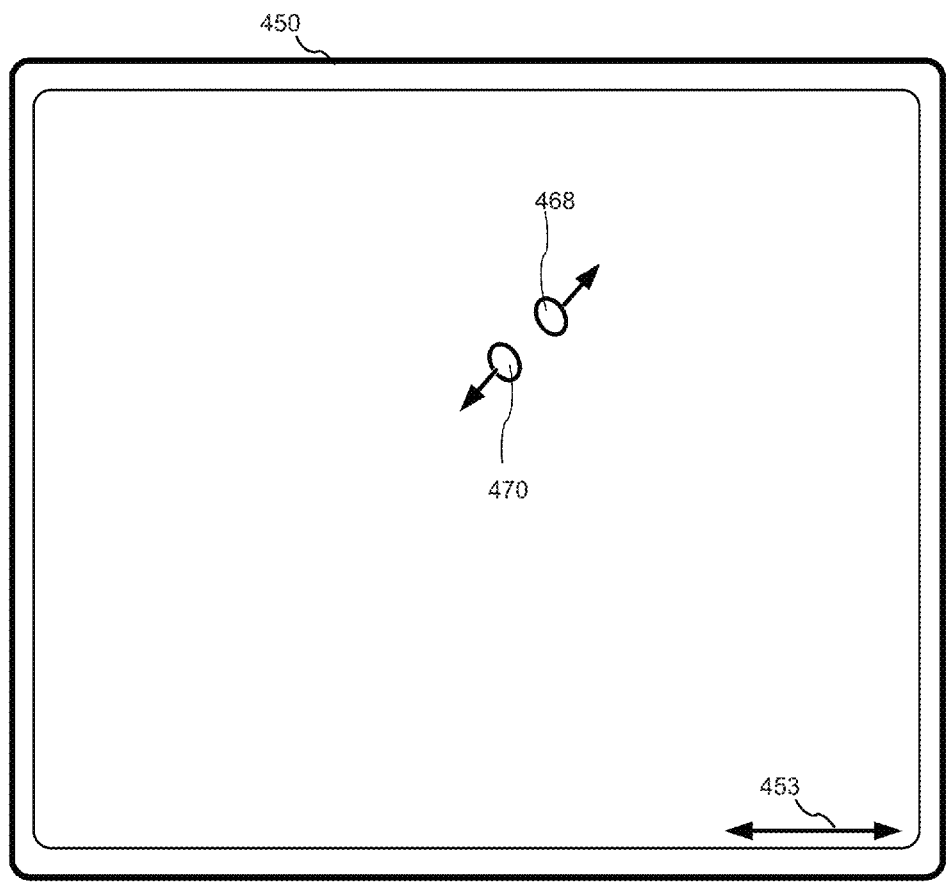
FIG. 4B illustrates an exemplary user interface for a multifunction device with a touch-sensitive surface that is separate from the display in accordance with some embodiments.
Figure 4B:
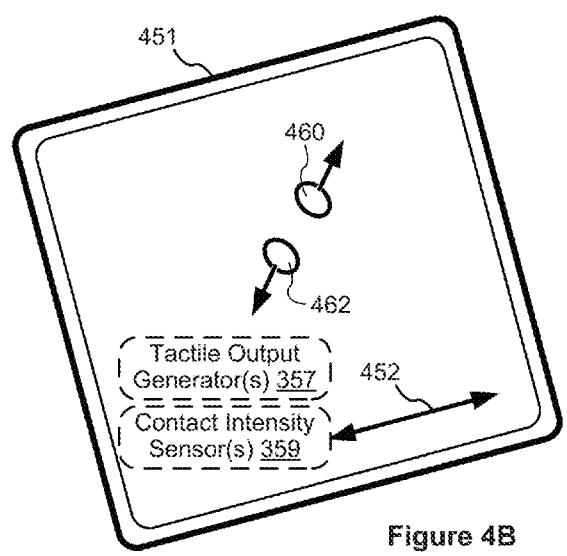

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples which follow will be given with reference to inputs on touch screen display 112 (where the touch sensitive surface and the display are combined), in some embodiments, the device detects inputs on a touch-sensitive surface that is separate from the display, as shown in FIG. 4B. In some embodiments the touch sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

As used herein, the term "focus selector" refers to an input element that indicates a current part of a user interface with which a user is interacting. In some implementations that include a cursor or other location marker, the cursor acts as a "focus selector," so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider or other user interface element), the particular user interface element is adjusted in accordance with the detected input. In some implementations that include a touch-screen display (e.g., touch-sensitive display system 112 in FIG. 1A or touch screen 112 in FIG. 4A) that enables direct interaction with user interface elements on the touch-screen display, a detected contact on the touch-screen acts as a "focus selector," so that when an input (e.g., a press input by the contact) is detected on the touch-screen display at a location of a particular user interface element (e.g., a button, window, slider or other user interface element), the particular user interface element is adjusted in accordance with the detected input. In some implementations focus is moved from one region of a user interface to another region of the user interface without corresponding movement of a cursor or movement of a contact on a touch-screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch-screen display) that is controlled by the user so as to communicate the user's intended interaction with the user interface (e.g., by indicating, to the device, the element of the user interface with which the user is intending to interact). For example, the location of a focus selector (e.g., a cursor, a contact or a selection box) over a respective button while a press input is detected on the touch-sensitive surface (e.g., a touchpad or touch screen) will indicate that the user is intending to activate the respective button (as opposed to other user interface elements shown on a display of the device).

The user interface figures described below include various intensity diagrams that show the current intensity of the contact on the touch-sensitive surface relative to one or more intensity thresholds (e.g., a contact detection intensity threshold $IT_0$, a light press intensity threshold $IT_L$, a deep press intensity threshold $IT_D$, and/or one or more other intensity thresholds). This intensity diagram is typically not part of the displayed user interface, but is provided to aid in the interpretation of the figures. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with an intensity below the light press intensity threshold (e.g., and above a nominal contact-detection intensity threshold $IT_0$ below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of intensity of the contact from an intensity below the light press intensity threshold $IT_L$ to an intensity between the light press intensity threshold $IT_L$ and the deep press intensity threshold $IT_D$ is sometimes referred to as a "light press" input. An increase of intensity of the contact from an intensity below the deep press intensity threshold $IT_D$ to an intensity above the deep press intensity threshold $IT_D$ is sometimes referred to as a "deep press" input. An increase of intensity of the contact from an intensity below the contact-detection intensity threshold $IT_0$ to an intensity between the contact-detection intensity threshold $IT_0$ and the light press intensity threshold $IT_L$ is sometimes referred to as detecting the contact on the touch-surface. A decrease of intensity of the contact from an intensity above the contact-detection intensity threshold $IT_0$ to an intensity below the contact intensity threshold $IT_0$ is sometimes referred to as detecting liftoff of the contact from the touch-surface. In some embodiments $IT_0$ is zero. In some embodiments $IT_0$ is greater than zero. In some illustrations a shaded circle or oval is used to represent intensity of a contact on the touch-sensitive surface. In some illustrations a circle or oval without shading is used represent a respective contact on the touch-sensitive surface without specifying the intensity of the respective contact.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90% or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the description of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

User Interfaces and Associated Processes

Navigating User Interface Hierarchies

Many electronic devices have graphical user interfaces that include various user interface hierarchies and it is easy for a user to lose their place within the user interface hierarchy or become confused as to how to navigate through the user interface hierarchy. For example, a media player application includes several interfaces for users to navigate between. In this example, the media player application's user interface hierarchy includes a media presentation interface, a media collection display interface, and a user interface with an application launch icon for the media player application (e.g., a home or starting interface). The embodiments below improve on these methods by reducing the cognitive burden on a user and produce an intuitive and efficient human-machine interface by navigating through a user interface hierarchy in accordance with an intensity of a detected input and providing visual feedback indicative of the navigation through the user interface hierarchy.

FIGS. 5A-5U illustrate exemplary user interfaces for navigating a user interface hierarchy using inputs on a touch-sensitive surface in accordance with some embodiments. The user interfaces in these figures are used to illustrate the processes described below, including the processes described below with reference to FIGS. 6A-6D. FIGS. 5C-5P include intensity diagrams that show the current intensity of the contact on the touch-sensitive surface relative to a plurality of intensity thresholds including a contact detection intensity threshold (e.g., "$IT_0$"), a first (light press) intensity threshold (e.g., "$IT_L$") and a second (deep press) intensity threshold (e.g., "$IT_D$").

Figure 5B:
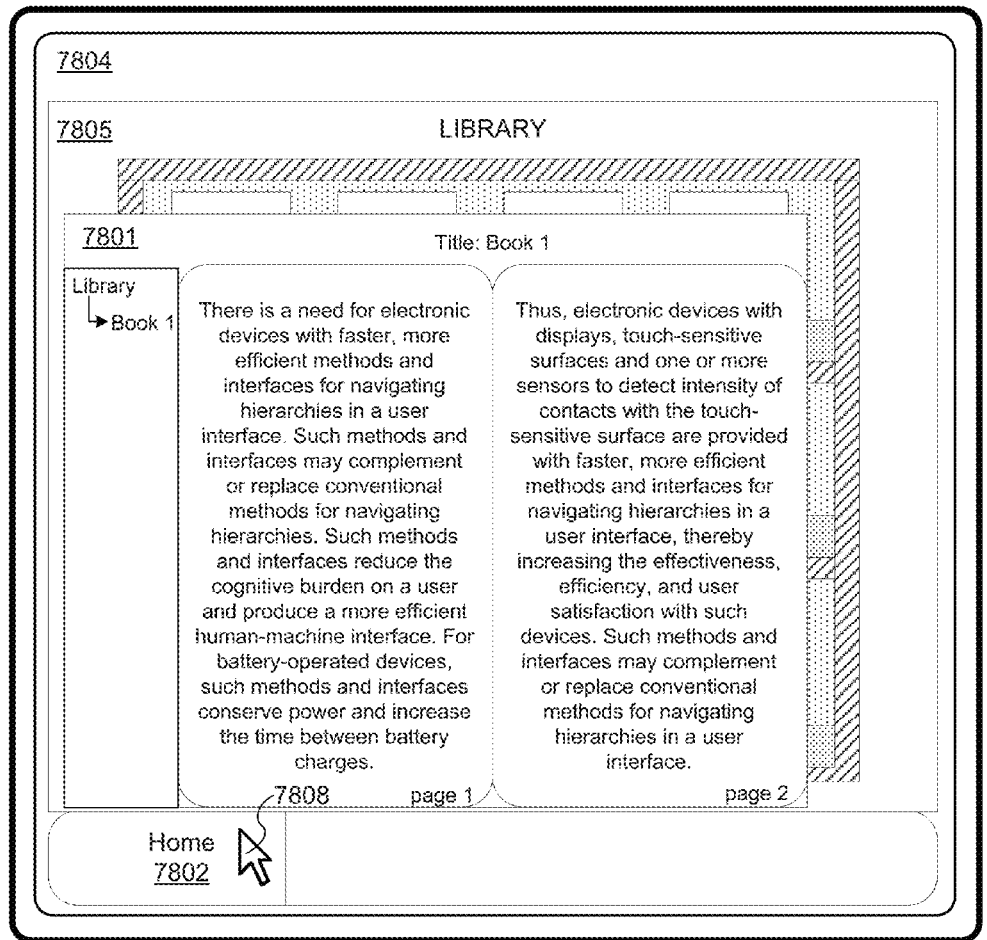
Figure 5B:
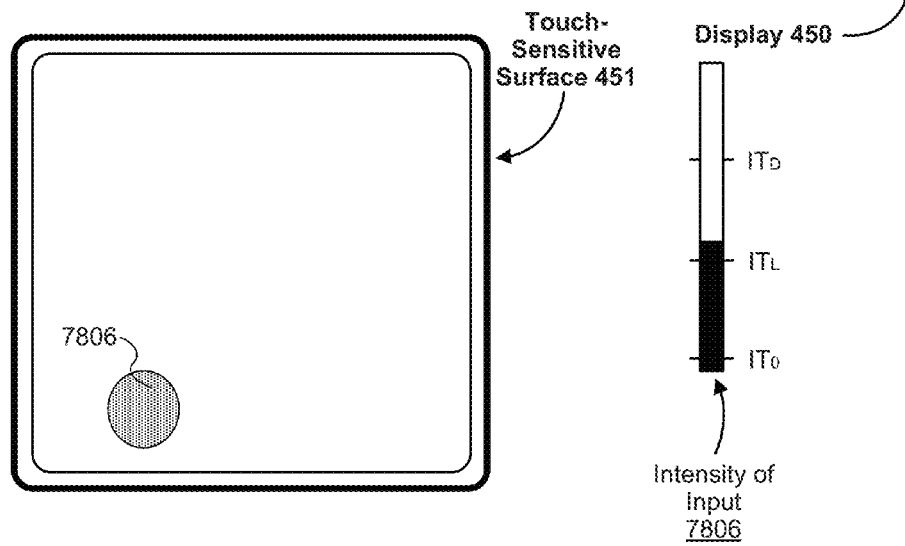
Figure 5C:
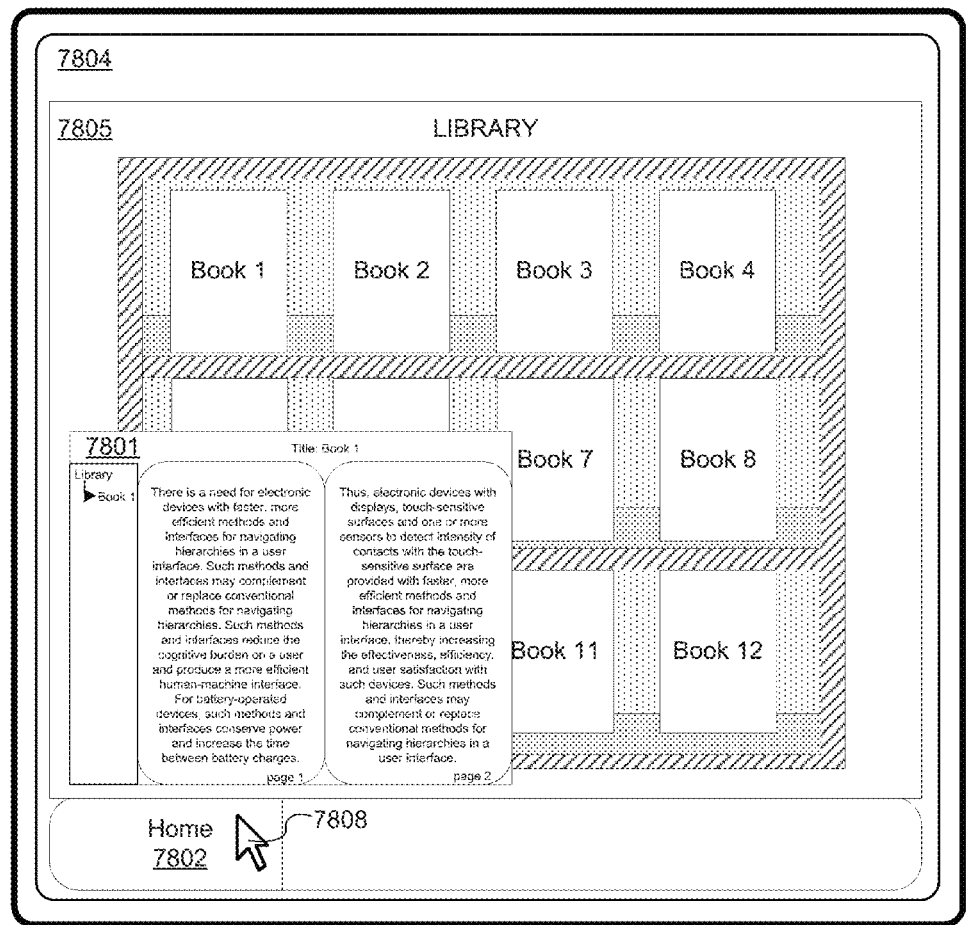
Figure 5C:
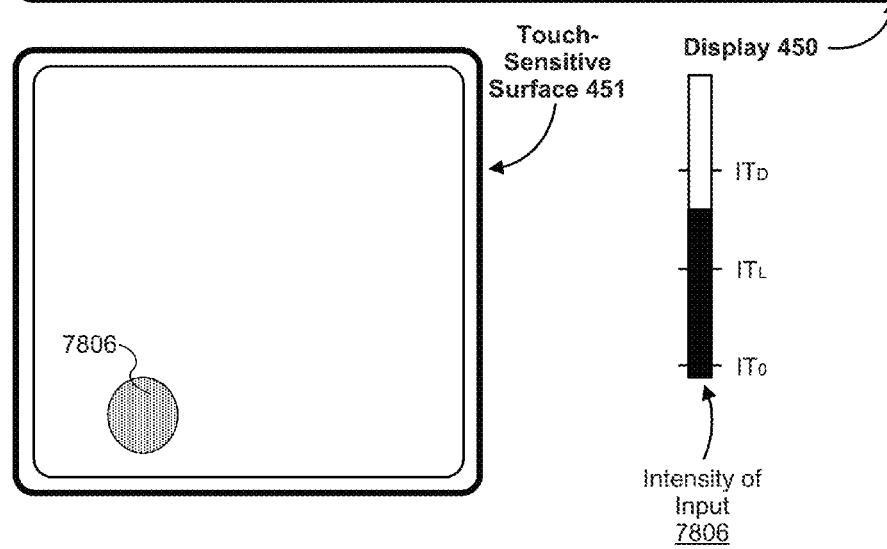
Figure 5D:
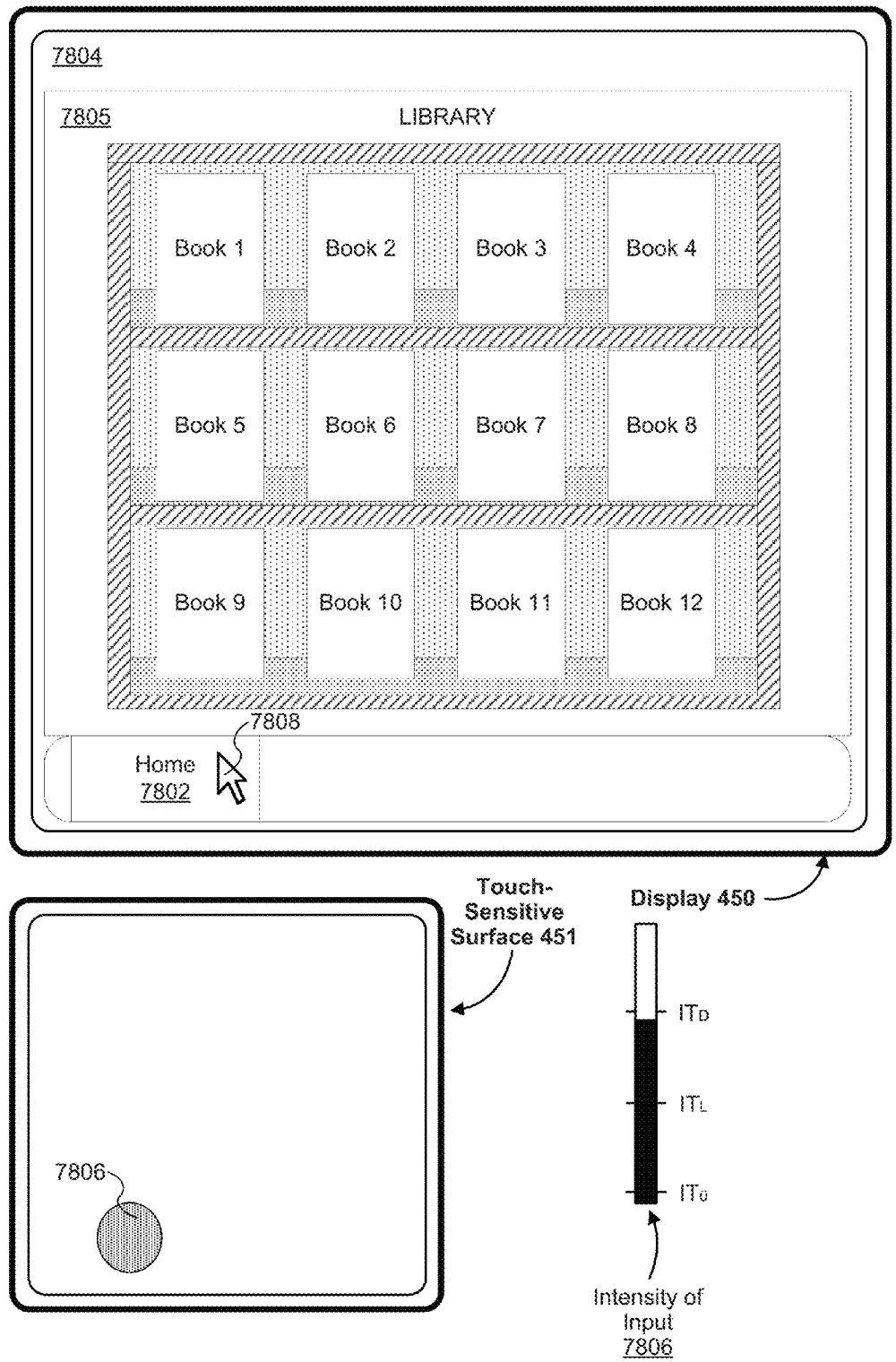
Figure 5E:
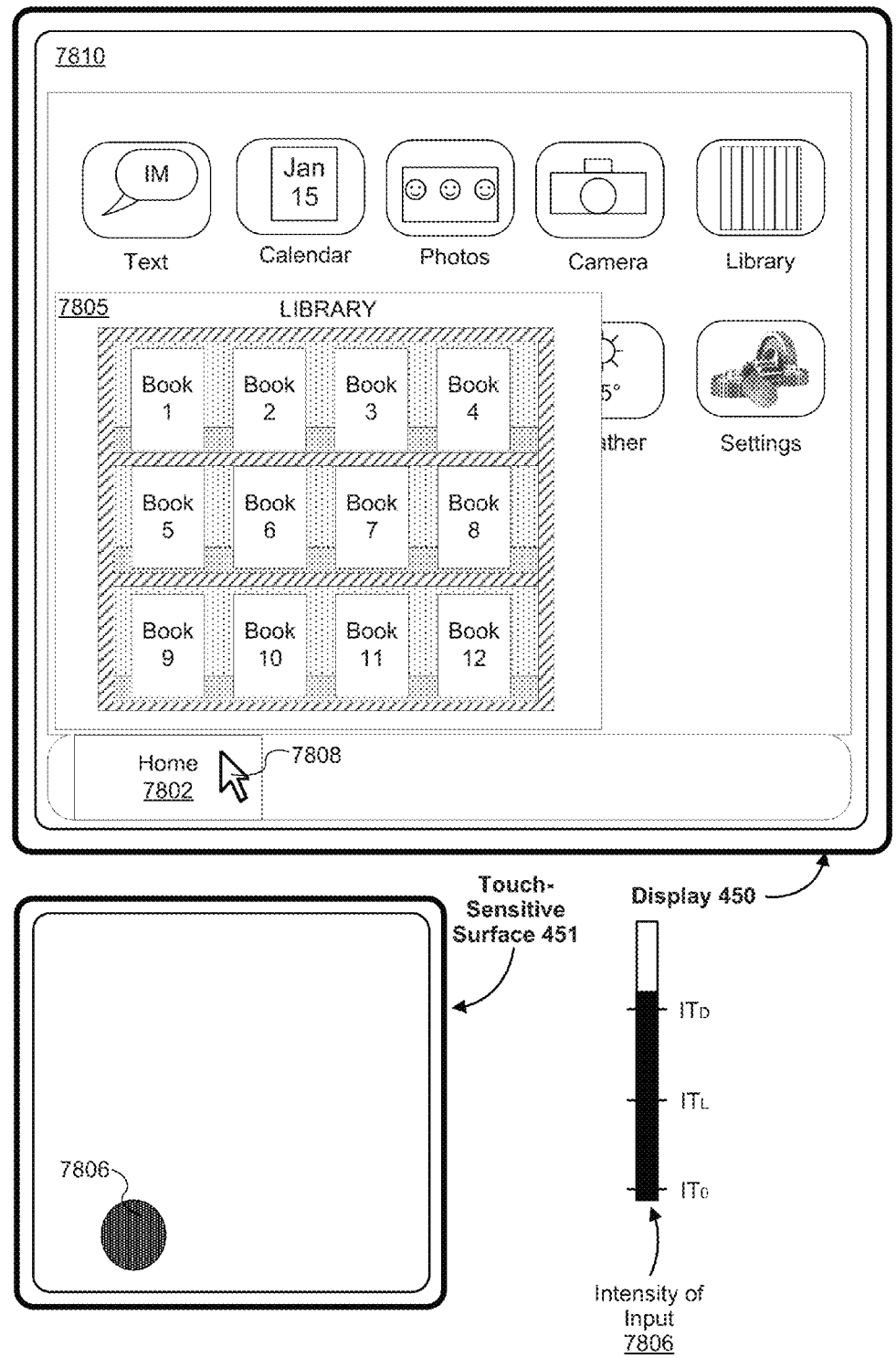
Figure 5F:
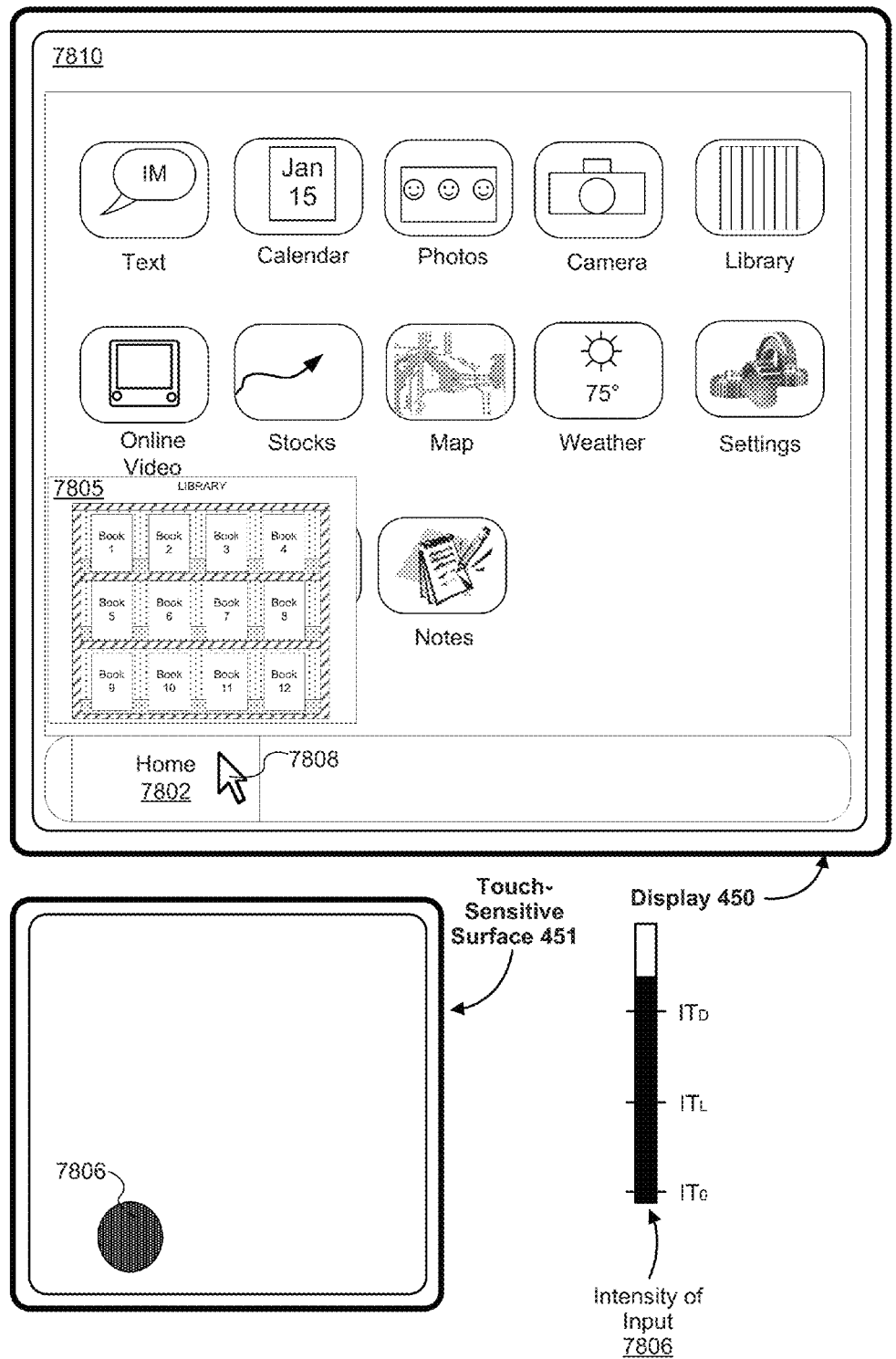
Figure 5G:
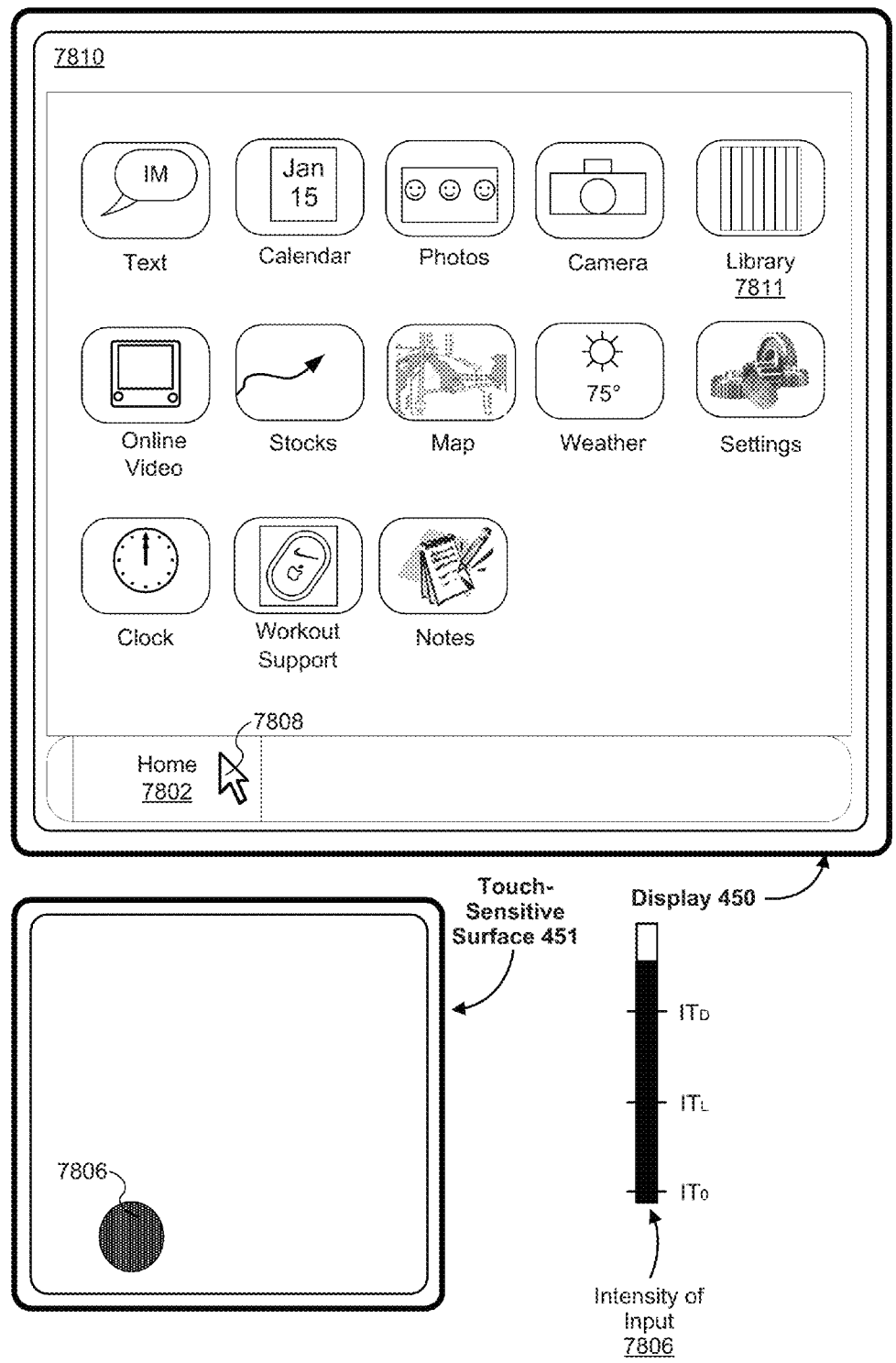

FIGS. 5A-5G illustrate an example of replacing display of a lower-level user interface with a higher-level user interface including displaying an animated transition between the lower-level user interface and the higher-level user interface. FIGS. 5A-5G illustrate user interfaces displayed on display 450 of a device (e.g., device 300) and responsive to inputs (e.g., a finger contact) on touch-sensitive surface 451. The interfaces in FIGS. 5A-5G include home icon 7802 and, in accordance with some embodiments, a cursor 7808 which is a displayed representation of a focus selector over home icon 7802, corresponding to input 7806 (e.g., a contact). FIGS. 5A-5G also shows the intensity of input 7806. In FIG. 5A, the device displays lower-level user interface 7800 that includes book 7801 and home icon 7802. FIG. 5A further illustrates input 7806 with intensity above $IT_0$ and below $IT_L$. FIGS. 5B-5C illustrate an animated transition between lower-level user interface 7800 in FIG. 5A and intermediate-level user interface 7804 in FIG. 5D. FIGS. 5B-5C further illustrate the intensity of input 7806 increasing from slightly above $IT_L$ to slightly below $IT_D$. In FIG. 5D the intensity of input 7806 is above $IT_L$ and below $IT_D$ and the device displays intermediate-level user interface 7804 that includes library 7805. FIGS. 5E-5F illustrate an animated transition between intermediate-level user interface 7804 in FIG. 5D and higher-level user interface 7810 in FIG. 5G. FIGS. 5E-5F further illustrate the intensity of input 7806 above $IT_D$. In FIG. 5G, the device displays higher-level user interface 7810, which includes library launch icon 7811 and home icon 7802. FIG. 5G further illustrates input 7806 with intensity above $IT_D$.

The lower-level and intermediate-level user interfaces are shown in FIGS. 5A-5G as full-screen user interfaces for ease of illustration. However, in some embodiments, the lower-level user interface and/or the intermediate-level user interface are non-full-screen user interfaces such as drop-down menus, pop-over menus, or other user interfaces that are displayed over at least a portion the higher-level user interface while still displaying at least a portion of the higher-level user interface. For example, in FIG. 5A, lower-level user interface 7800 is, optionally, shifted laterally or reduced in size so as to reveal at least a portion of intermediate-level user interface 7804 (shown in FIG. 5D) and/or higher-level user interface 7810 (shown in FIG. 5G). Similarly in FIG. 5D, intermediate-level user interface 7804 is, optionally, shifted laterally or reduced in size so as to reveal at least a portion of higher-level user interface 7810 (shown in FIG. 5G). Using non-full-screen user interfaces instead of or in addition to full-screen user interfaces can provide a user with helpful context and a visual indication of what will happen if and when the user provides an input that is associated with user interface hierarchy navigation (e.g., a reminder that a press input on the home button will cause the device to redisplay the home screen or the library).

In some embodiments, the device is an electronic device with a separate display (e.g., display 450) and a separate touch-sensitive surface (e.g., touch-sensitive surface 451). In some embodiments, the device is portable multifunction device 100, the display is touch-sensitive display system 112, and the touch-sensitive surface includes contact intensity sensor(s) 165 on the display (FIG. 1A).

In some embodiments, a cursor 7808 is a displayed representation of focus selector with a position on display 450 that is determined in accordance with contacts received by touch-sensitive surface 451. In other embodiments the focus selector has a different displayed representation (e.g., a magnifying glass). Alternatively, in some embodiments a representation of the focus selector is not displayed. For example, in embodiments using a touch-sensitive display system, the position of the focus selector corresponds to the location on the display of a contact or gesture. Further, the focus selector is herein defined to be "over" a user interface object when the position of the focus selector corresponds to the location on the display of the user interface object.

Figure 5H:
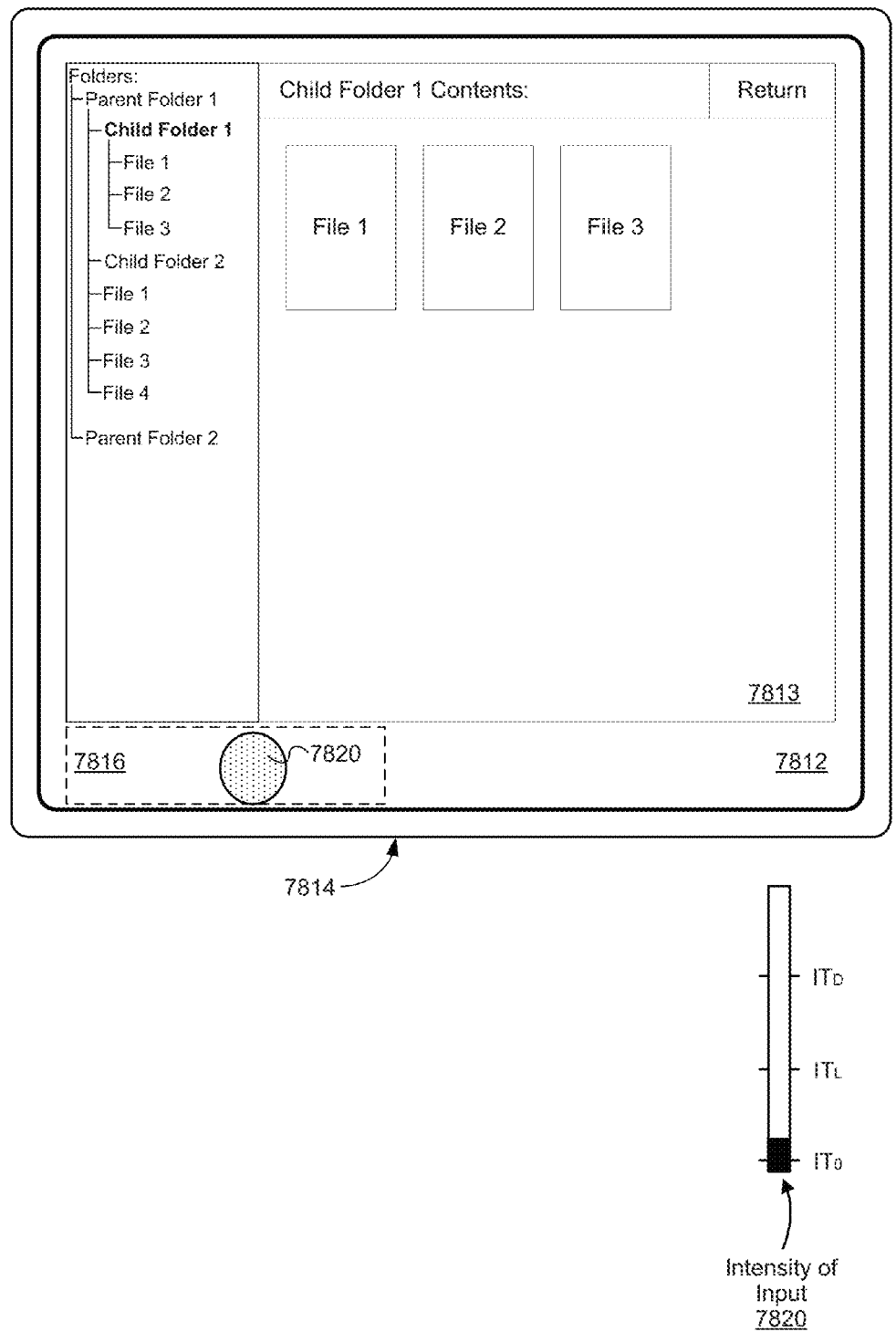
Figure 5I:
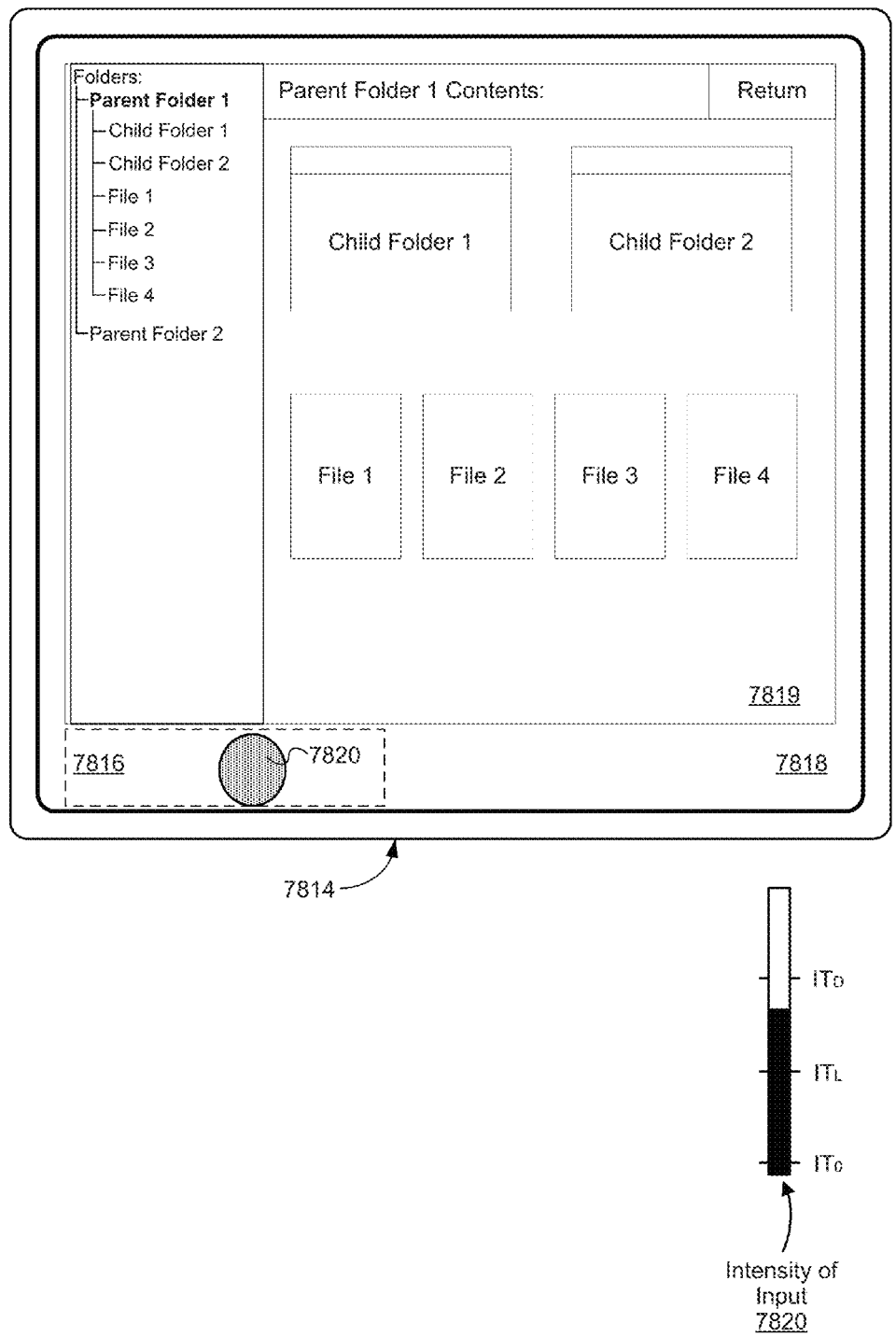
Figure 5J:
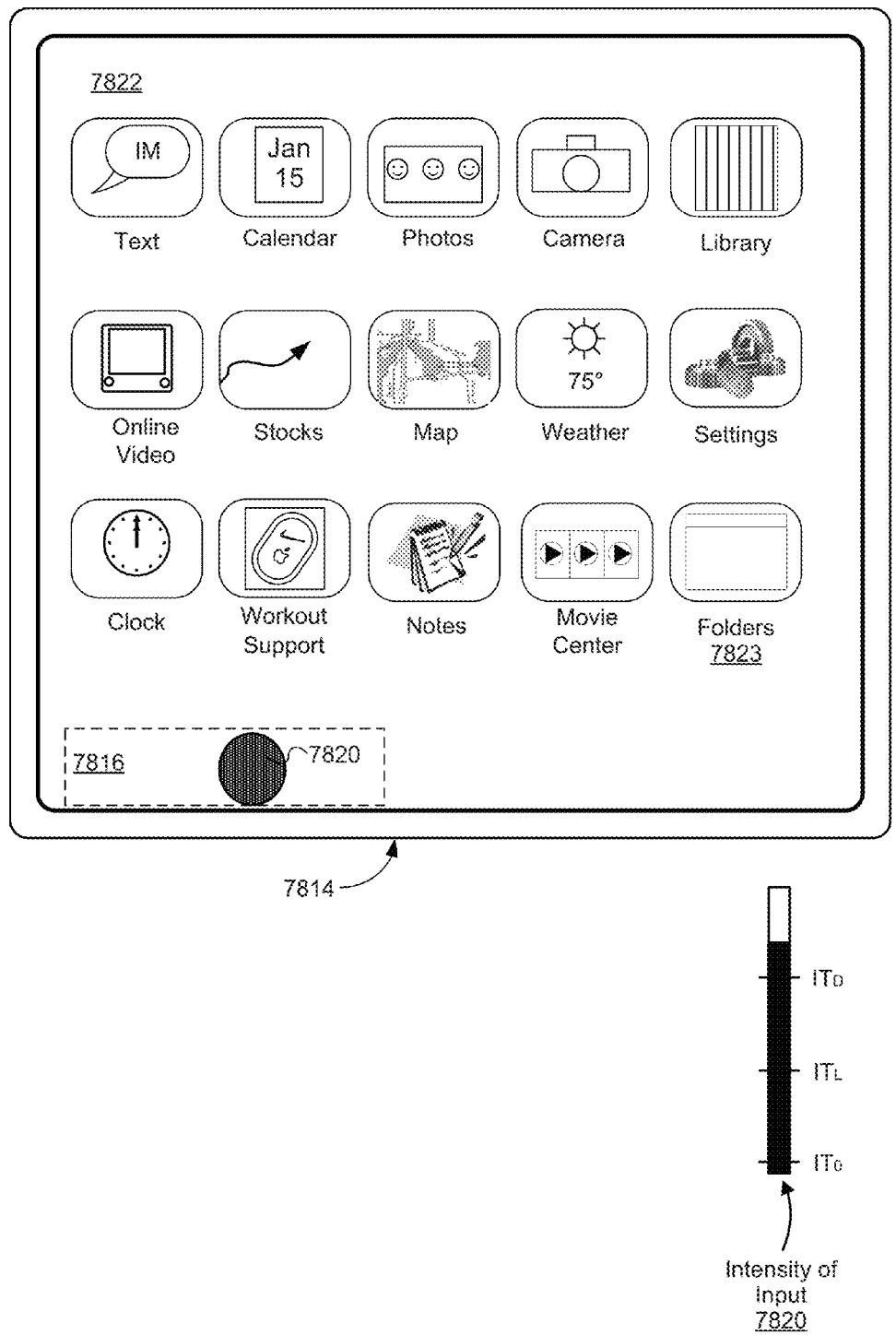

FIGS. 5H-5J illustrate an example of a user interface hierarchy that includes a portion of the touch-sensitive surface that is associated with hierarchy navigation. FIGS. 5H-5J illustrate user interfaces displayed on touch-sensitive display 7814 of a device. The interfaces in FIGS. 5H-5J include portion 7816 of touch-sensitive display 7814 that is associated with hierarchy navigation. FIGS. 5H-5J also show input 7820 over portion 7816 of touch-sensitive display 7814 and the intensity of input 7820. In FIG. 5H, the device displays lower-level user interface 7812 that includes child folder 1 contents 7813. FIG. 5H further illustrates input 7820 with intensity above $IT_0$ and below $IT_L$. In FIG. 5I, the device displays intermediate-level user interface 7818 that includes parent folder 1 contents 7819. FIG. 5I further illustrates input 7820 with intensity above $IT_L$ and below $IT_D$. In FIG. 5J, the device displays higher-level user interface 7822 that includes folders launch icon 7823. FIG. 5J further illustrates input 7820 with intensity above $IT_D$.

Figure 5K:
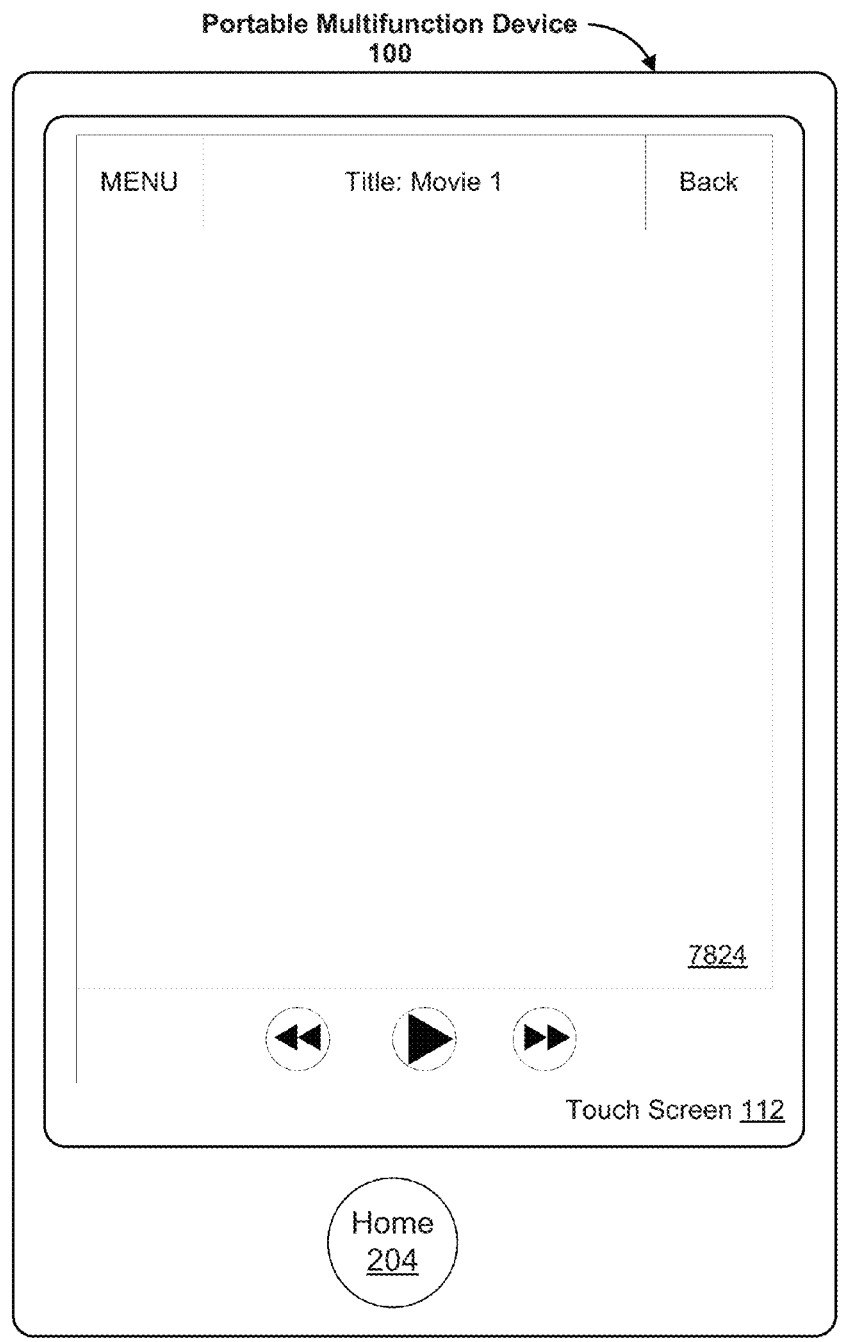
Figure 5L:
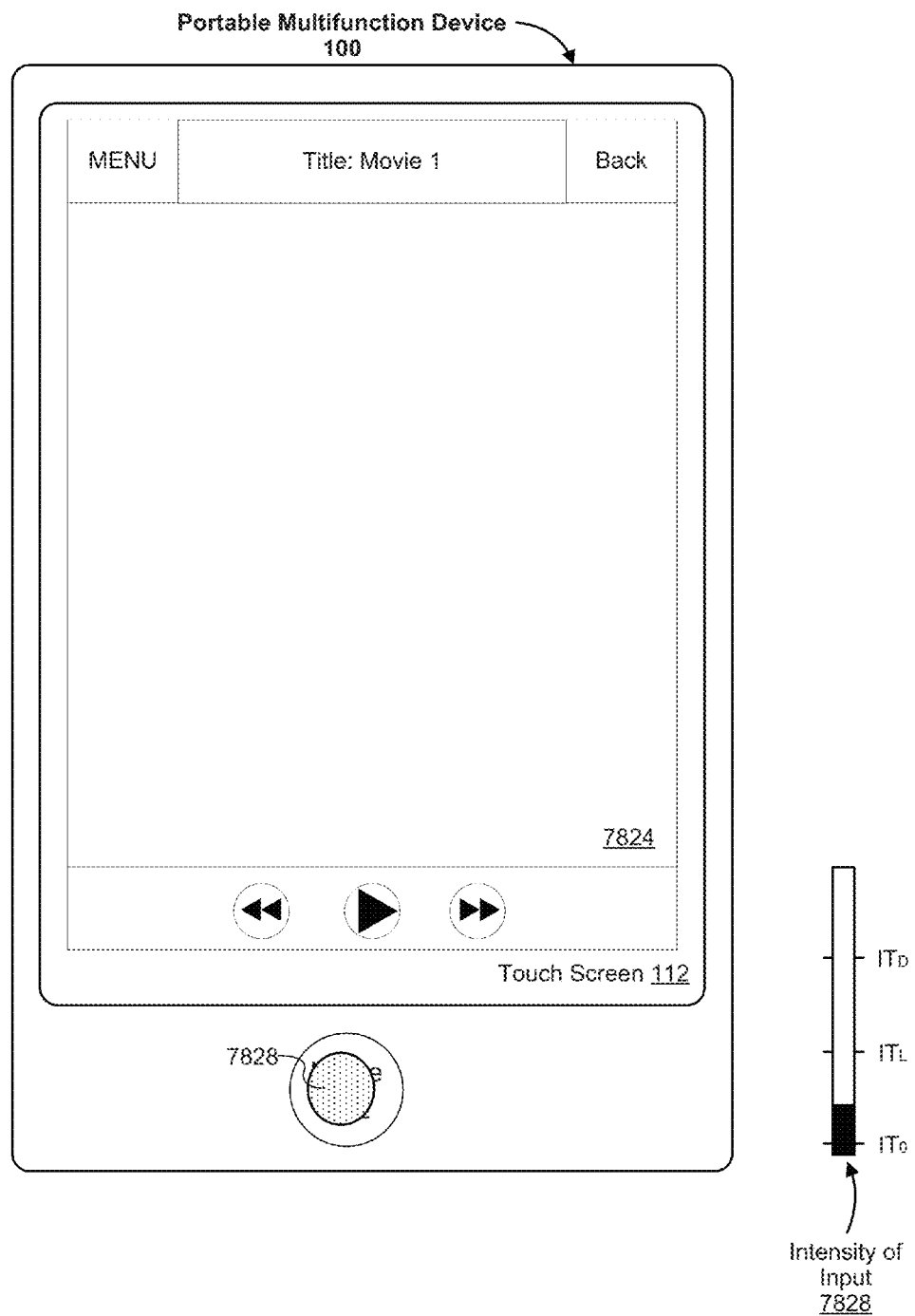
Figure 5M:
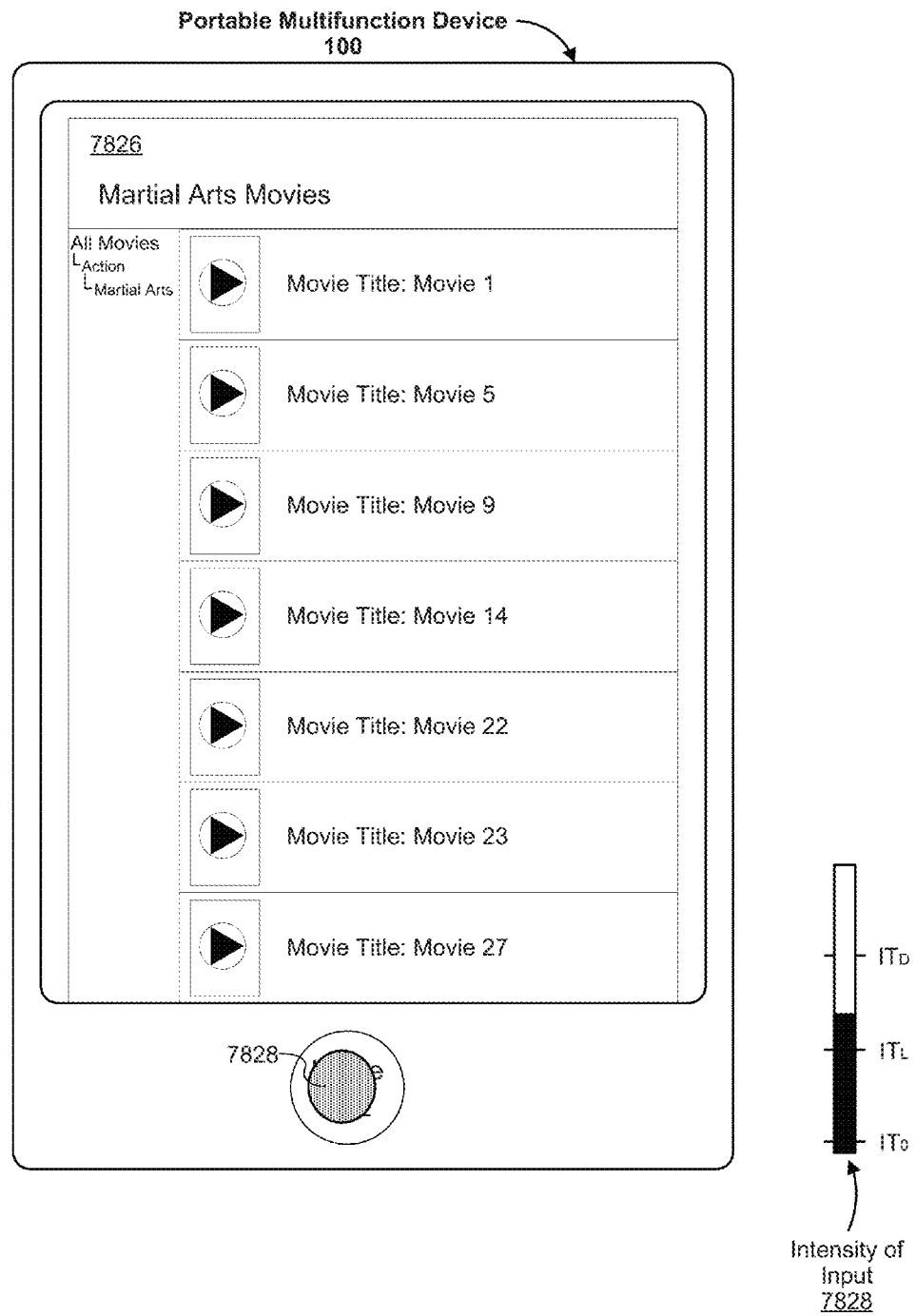
Figure 5N:
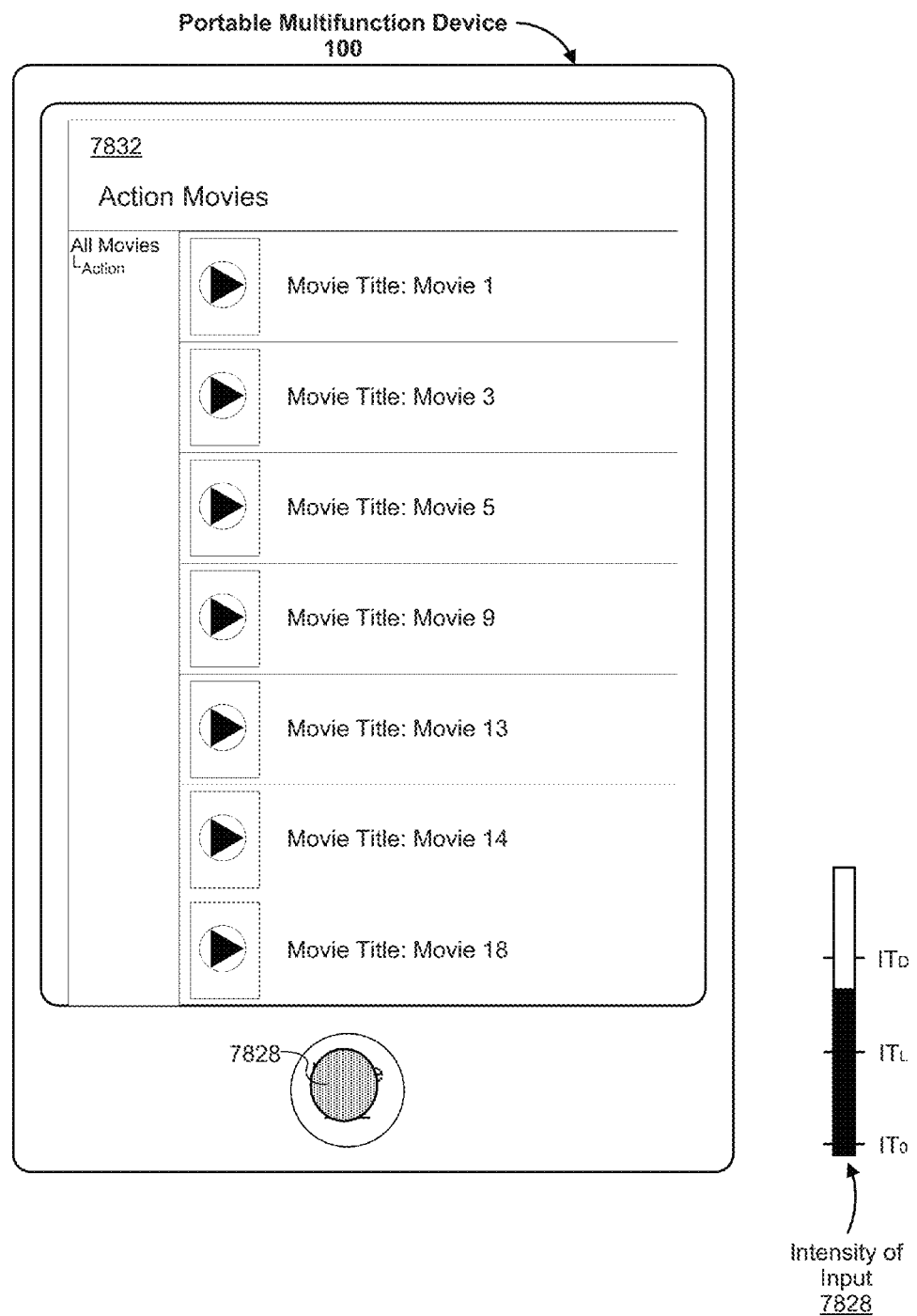
Figure 5O:
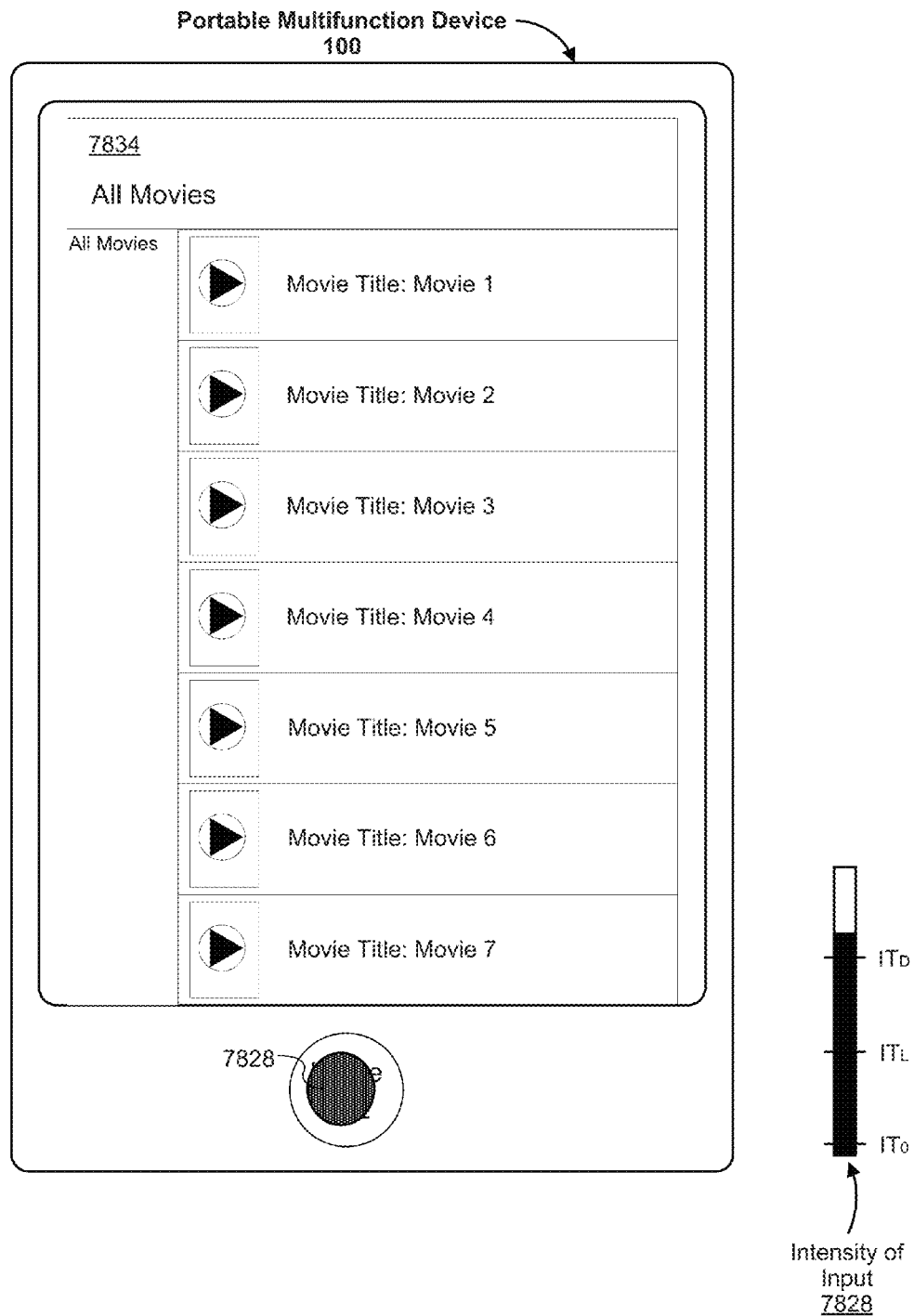
Figure 5P:
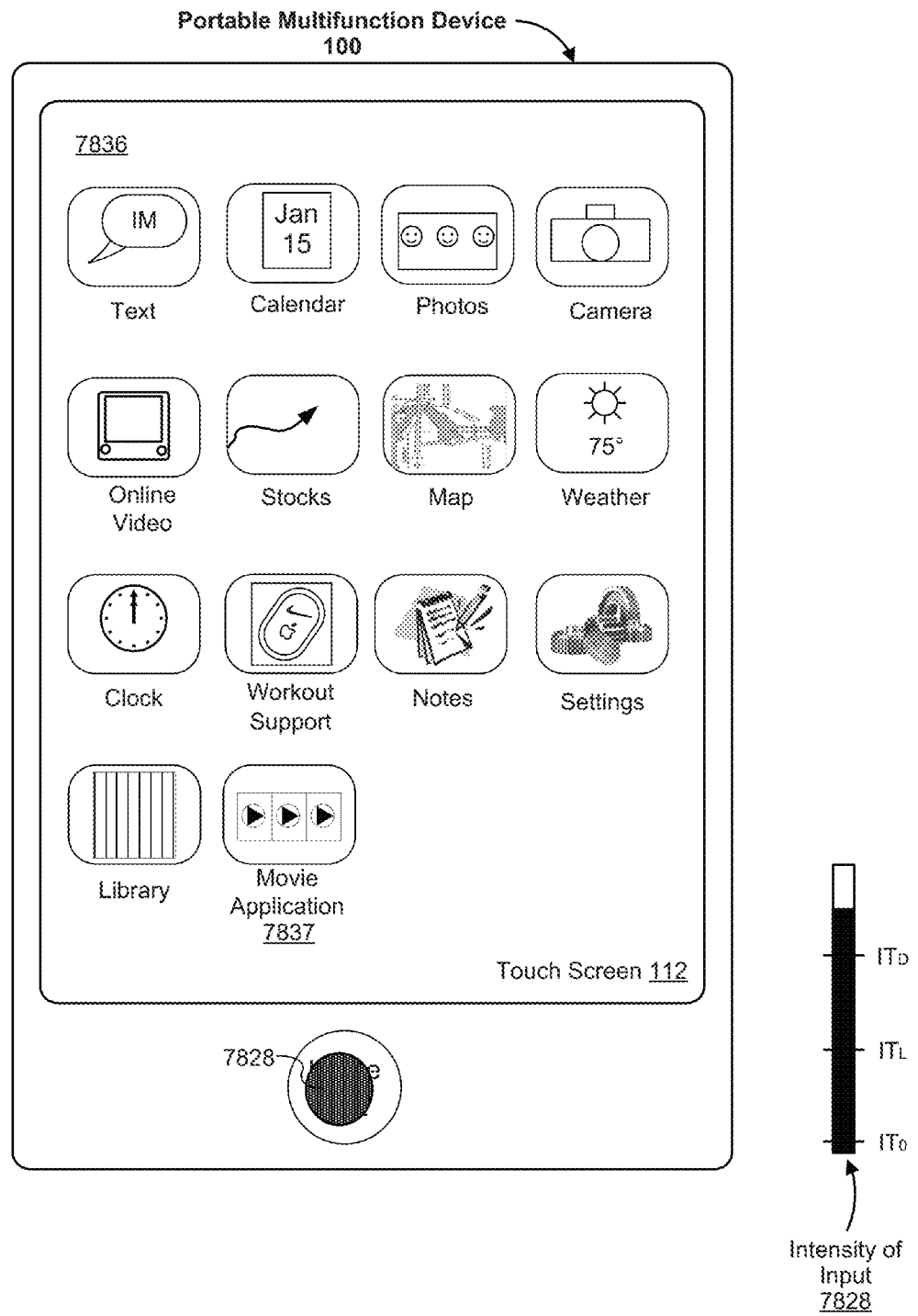

FIGS. 5K-5P illustrate an example of a user interface hierarchy that includes more than three levels. FIGS. 5K-5P illustrate user interfaces displayed on touch screen 112 of portable multifunction device 100. The device in FIGS. 5K-5P includes home button 204 associated with hierarchy navigation. In FIGS. 5K-5L, device 100 displays lower-level user interface 7824, a media presentation interface, on touch screen 112. FIG. 5L further illustrates input 7828, over home button 204, with intensity above $IT_0$ and below $IT_L$. In FIG. 5M, device 100 displays intermediate-level user interface 7826, a media collection display interface, on touch screen 112. FIG. 5M further illustrates input 7828 with intensity above $IT_L$ and below $IT_D$. In FIG. 5N, device 100 displays user interface 7832, another media collection display interface, on touch screen 112. In FIG. 5O, the device displays higher-level user interface 7834, another media collection display interface, on touch screen 112. FIG. 5O further illustrates input 7828 with intensity above $IT_D$. In FIG. 5P, the device displays user interface 7836 that includes movie application launch icon 7837 on touch screen 112.

Figure 5Q:
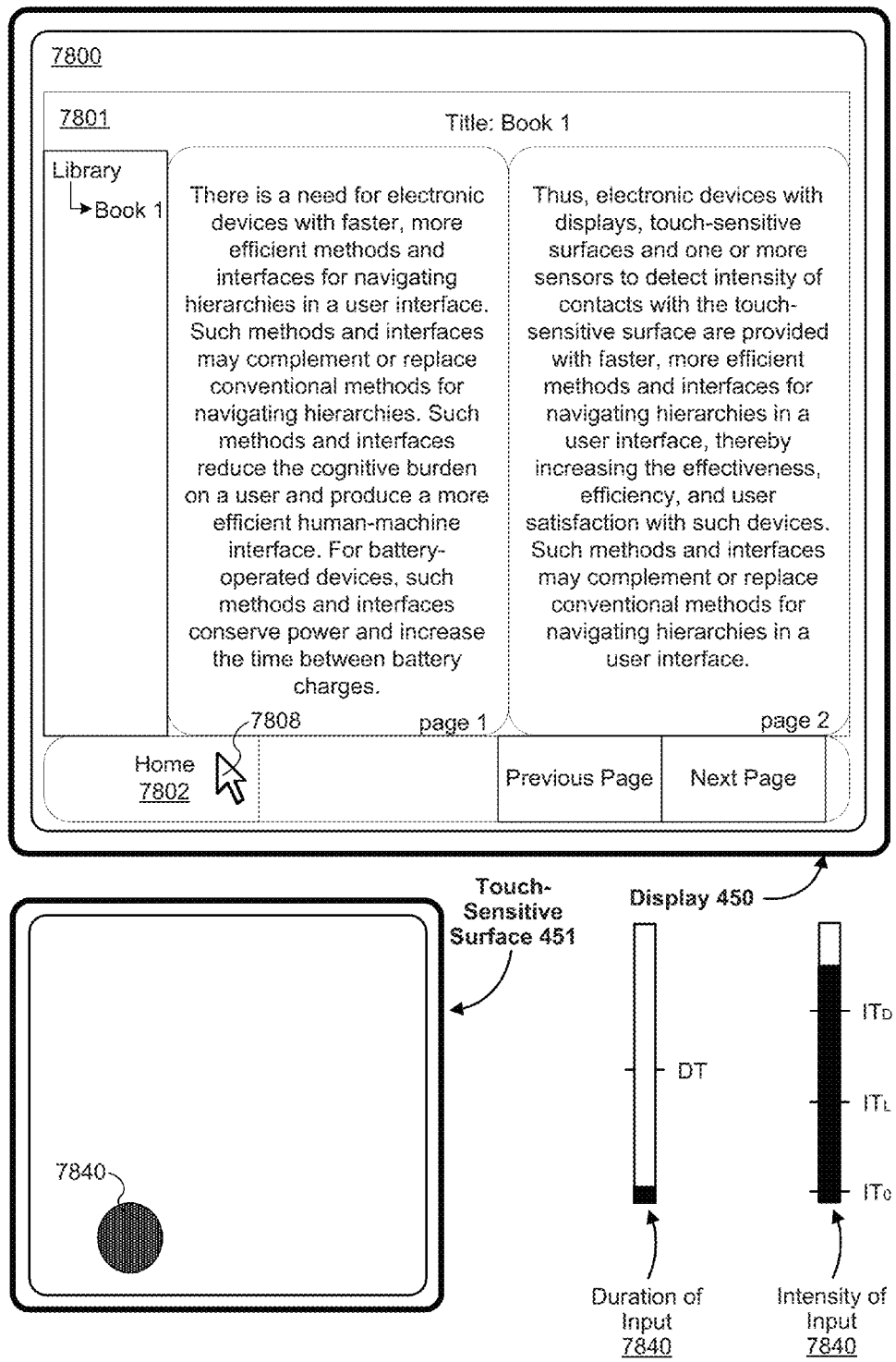
Figure 5R:
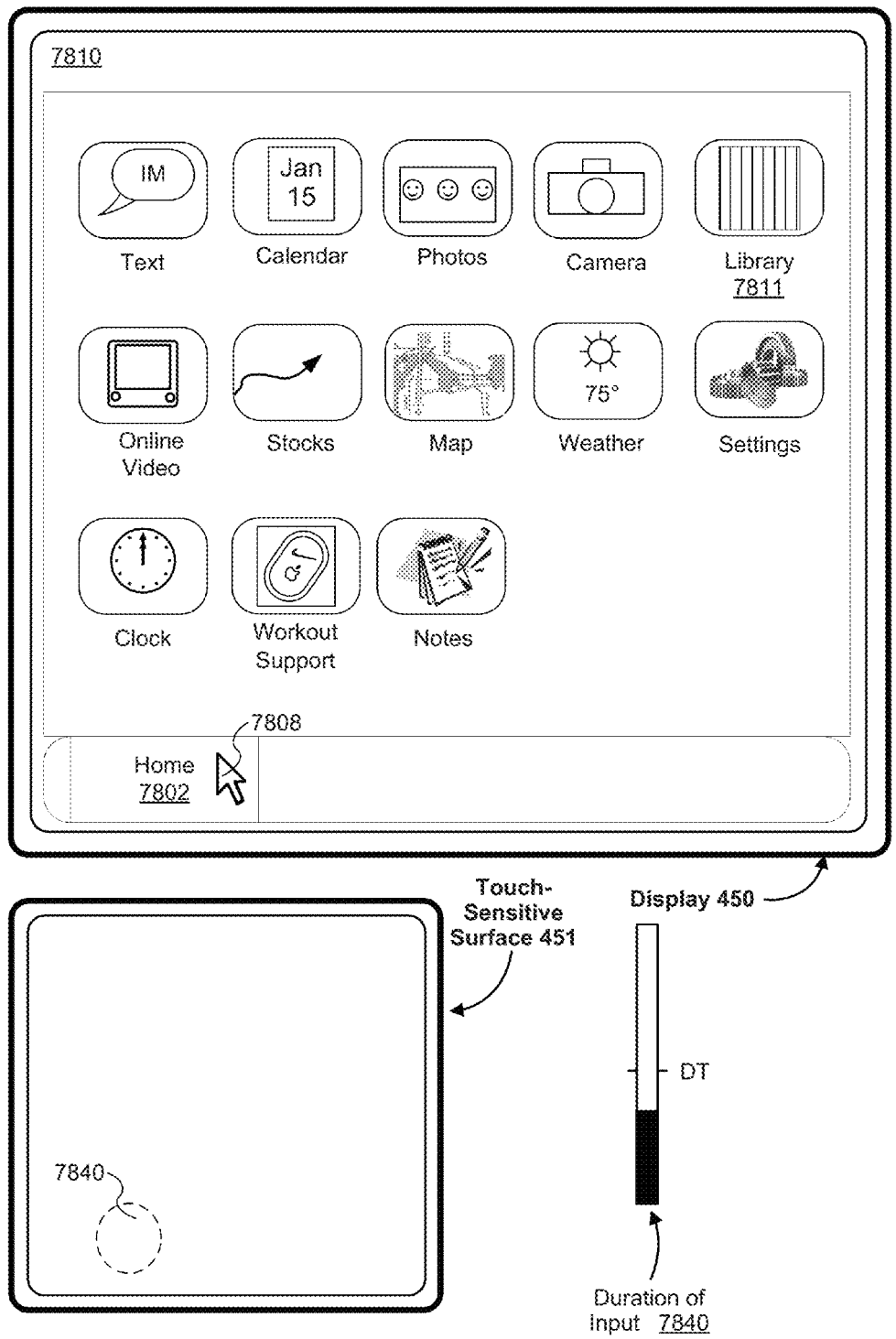
Figure 5S:
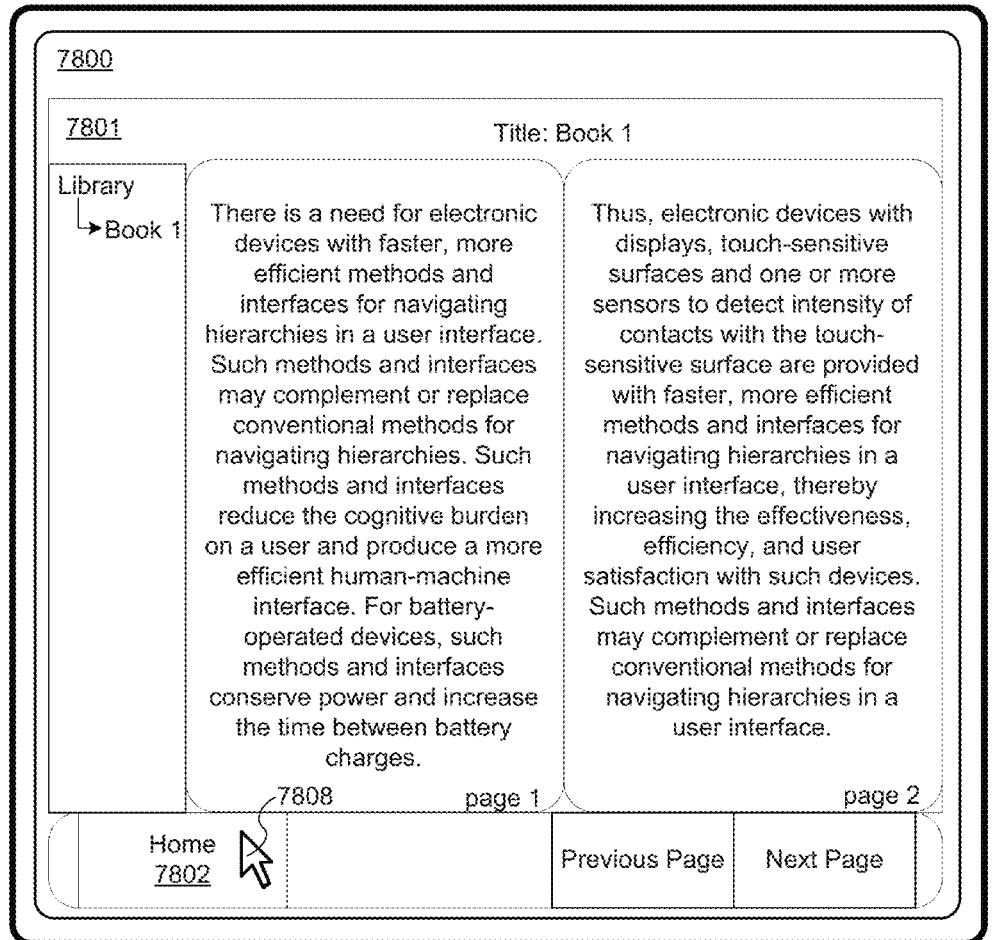
Figure 5S:
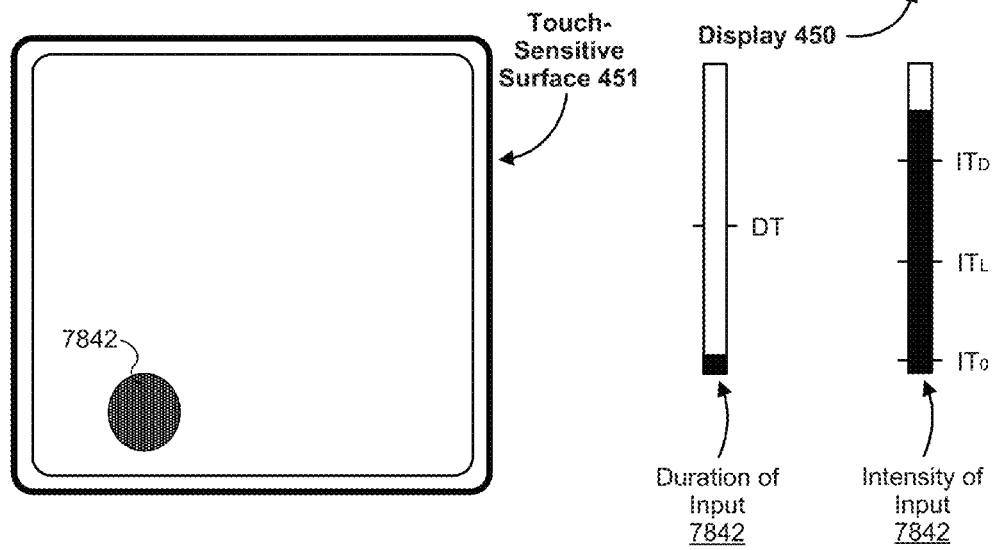
Figure 5T:
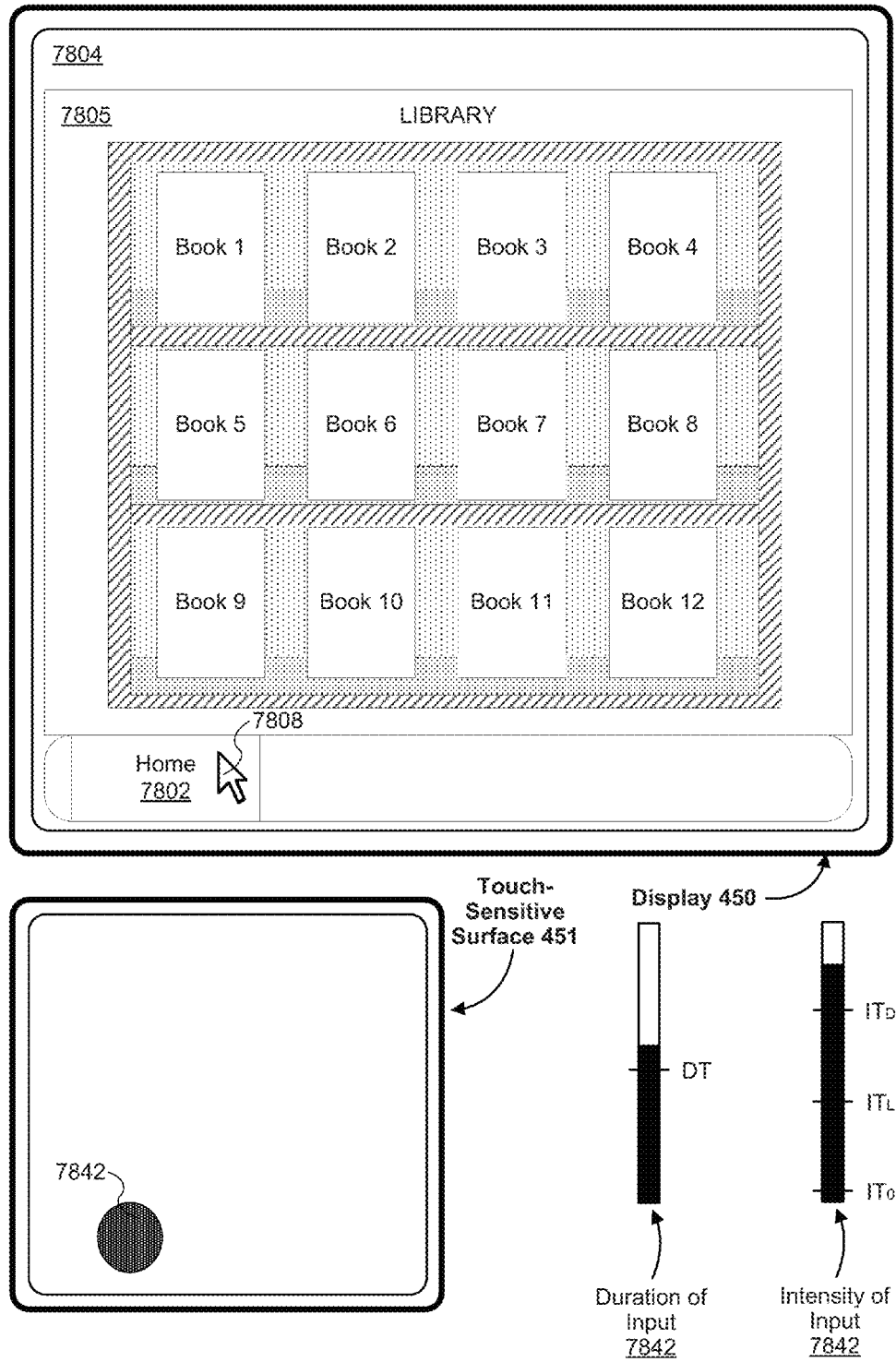
Figure 5U:
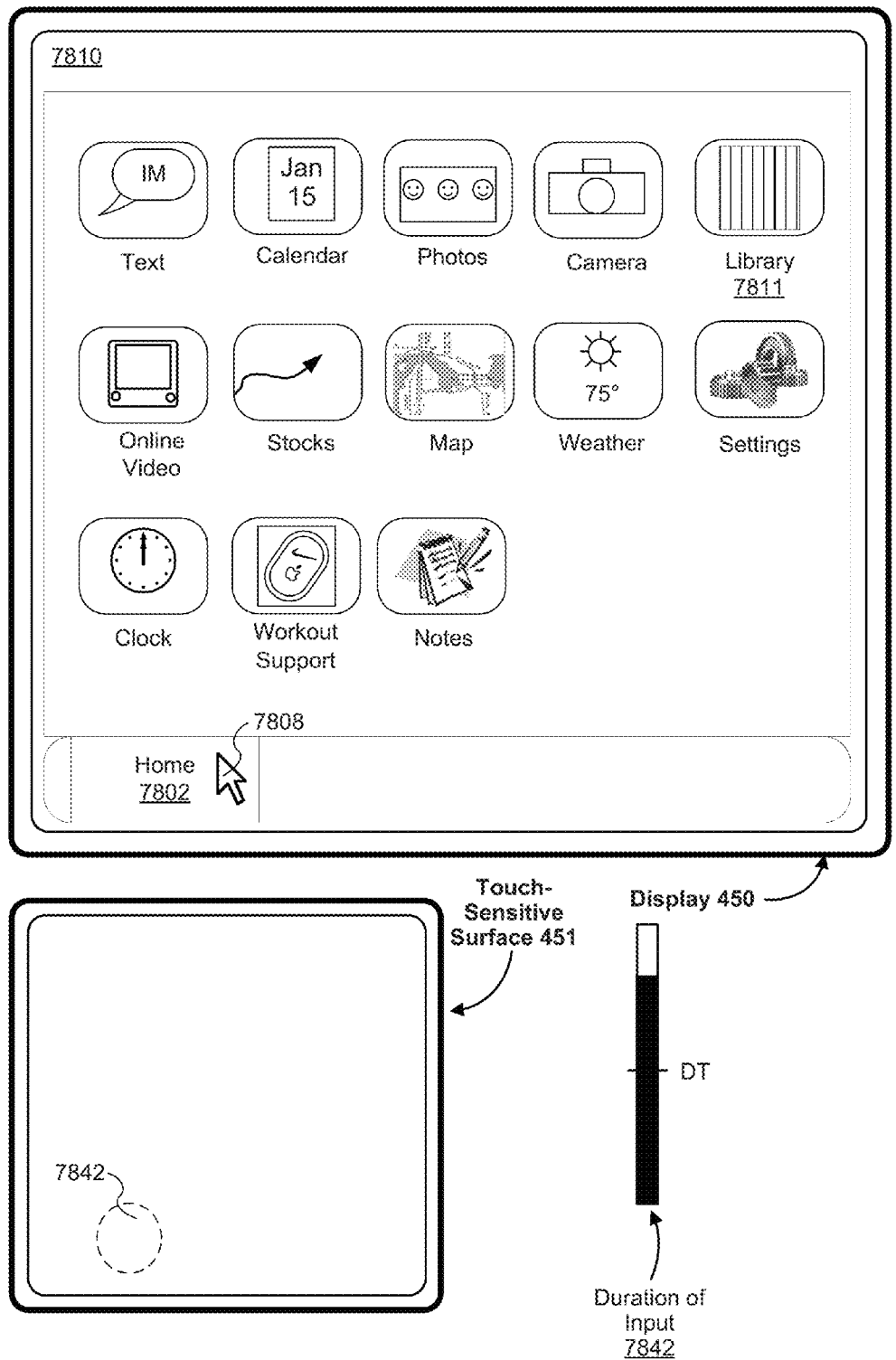
Figure 6B:
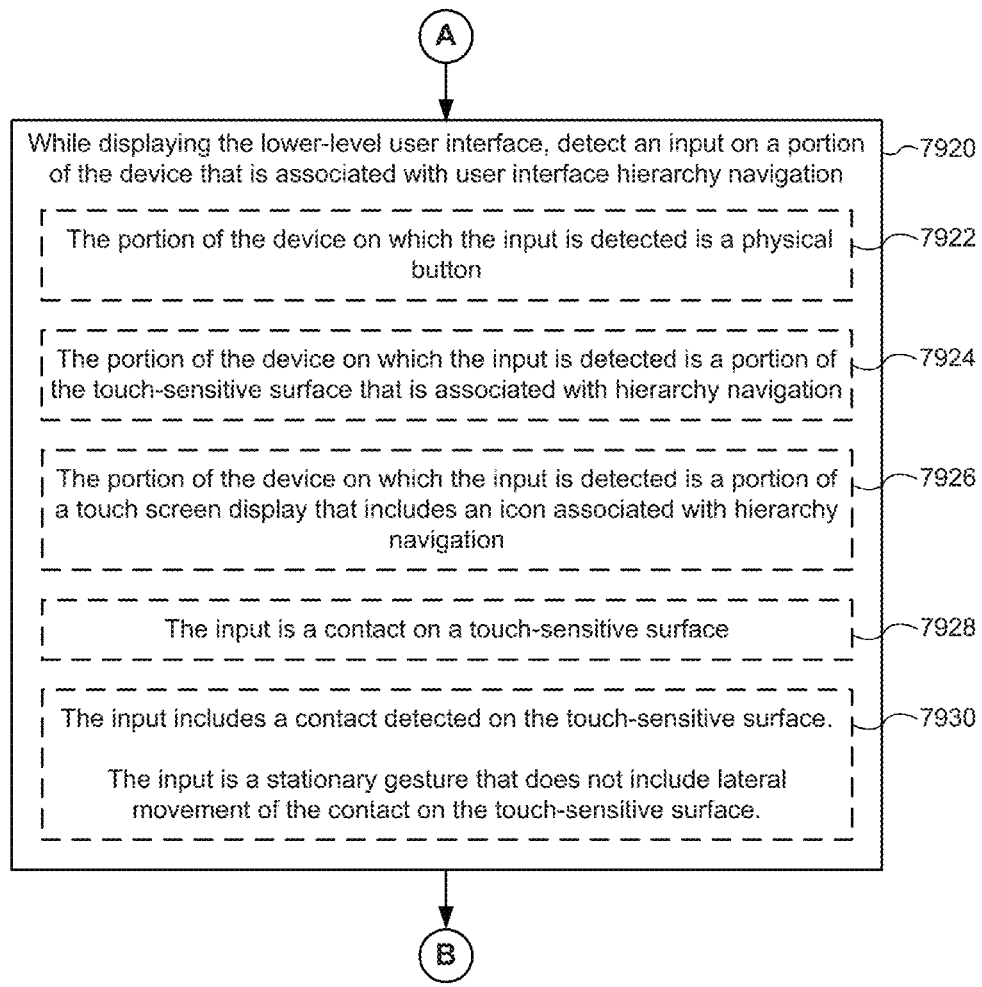
Figure 6C:
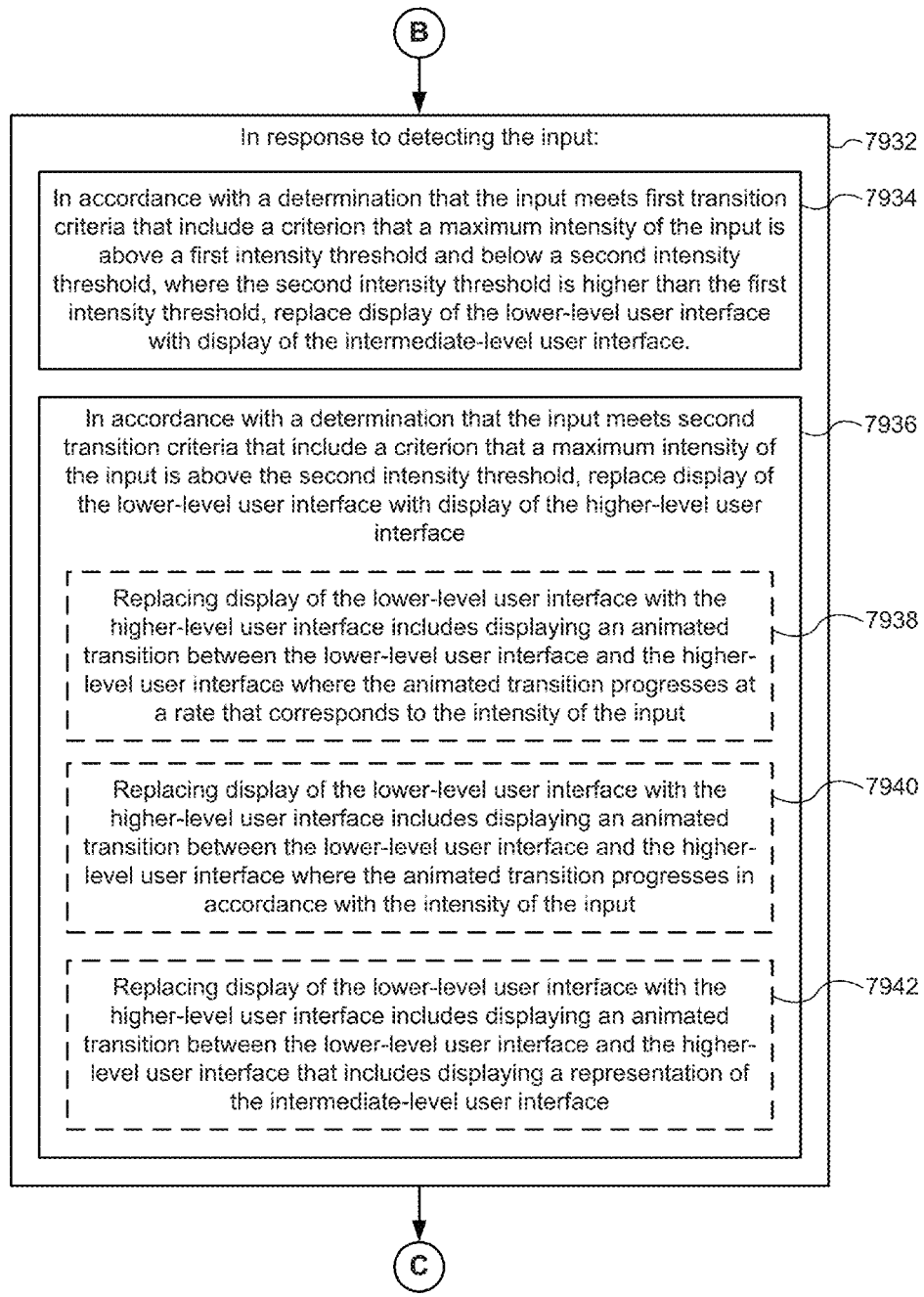
Figure 6D:
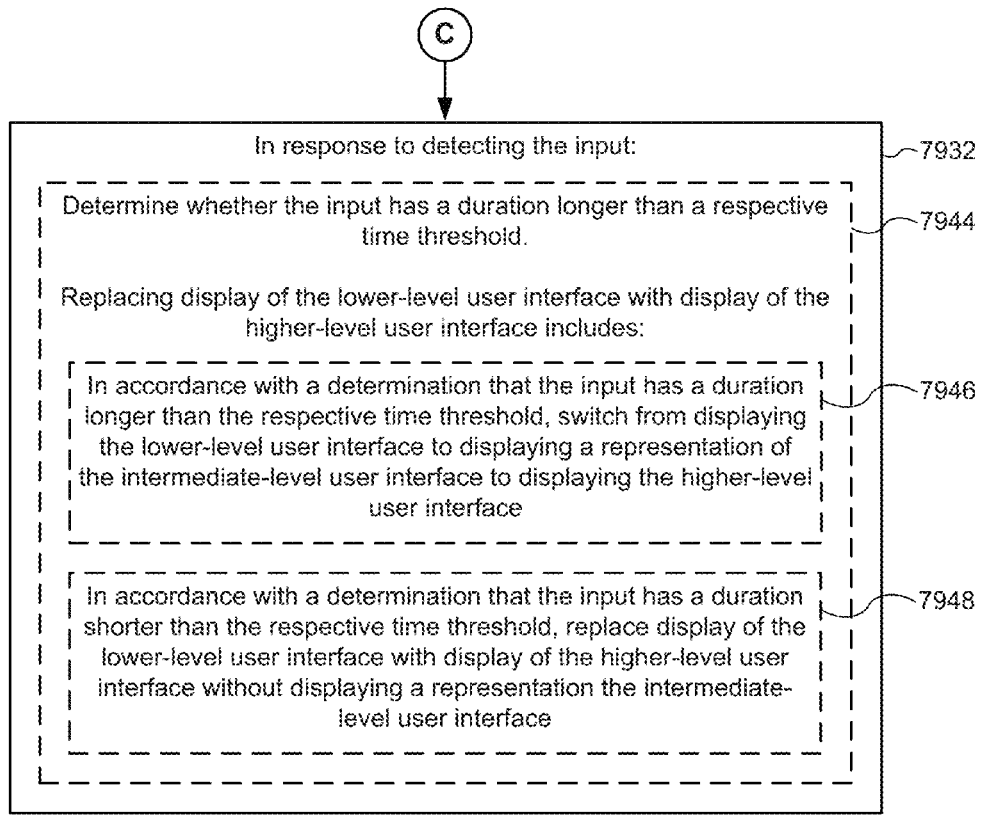

In accordance with some embodiments, FIGS. 5Q-5U illustrate examples of replacing a lower-level user interface with a higher-level user interface in accordance with the duration of an input. FIGS. 5Q-5R show input 7840 with duration below threshold DT and the device switching from display of lower-level user interface 7800 in FIG. 5Q to higher-level user interface 7810 in FIG. 5R. Conversely, FIGS. 5S-5U illustrate input 7842 with duration above threshold DT and the device switching from display of lower-level user interface 7800 in FIG. 5S to intermediate-level user interface 7804 in FIG. 5T to higher-level user interface 7810 in FIG. 5U.

FIGS. 6A-6D are flow diagrams illustrating method 7900 of navigating user interface hierarchies in accordance with some embodiments. Method 7900 is performed at an electronic device (e.g., device 300, FIG. 3, or portable multifunction device 100, FIG. 1A) with a display and a touch-sensitive surface. In some embodiments, the display is a touch screen display and the touch-sensitive surface is on the display. In some embodiments, the display is separate from the touch-sensitive surface. Some operations in method 7900 are, optionally, combined and/or the order of some operations is, optionally, changed.

As described below, method 7900 provides an intuitive way to navigate user interface hierarchies. The method reduces the cognitive burden on a user when navigating user interface hierarchies, thereby creating a more efficient human-machine interface. For battery-operated electronic devices, enabling a user to navigate user interface hierarchies faster and more efficiently conserves power and increases the time between battery charges.

The device displays (7902), on the display, a lower-level user interface that is part of a user interface hierarchy. The hierarchy includes (7904) at least three levels, including the lower-level user interface, an intermediate-level user interface and a higher-level user interface. The intermediate-level user interface is above the lower-level user interface in the hierarchy. The higher-level user interface is above both the intermediate-level user interface and the lower-level user interface in the hierarchy. In FIG. 5A, for example, the device displays lower-level user interface 7800 including book 7801. In this example, FIG. 5D illustrates intermediate-level user interface 7804 and FIG. 5G illustrates higher-level user interface 7810.

In some embodiments, the hierarchy includes (7906) exactly three levels in order from highest to lowest: the higher-level user interface; the intermediate-level user interface; and the lower-level user interface. For example, in these embodiments, lower-level user interface 7812 in FIG. 5H, intermediate-level user interface 7818 in FIG. 5I, and higher-level user interface 7822 in FIG. 5J are a complete user interface hierarchy with exactly three levels.

In some embodiments, the higher-level user interface is (7908) adjacent to the intermediate-level user interface in the hierarchy, and the intermediate-level user interface is adjacent to the lower-level user interface in the hierarchy. For example, in these embodiments, lower-level user interface 7800 in FIG. 5A is adjacent to intermediate-level user interface 7804 in FIG. 5D and higher-level user interface 7810 in FIG. 5G is adjacent to intermediate-level user interface 7804 in FIG. 5D.

In some embodiments, the hierarchy includes (7910) more than three levels. For example, one or more levels above the higher-level user interface, one or more levels between the higher-level user interface and the intermediate-level user interface, one or more levels between the intermediate-level user interface and the lower-level user interface, and/or one or more levels below the lower-level user interface, or any combination thereof. FIGS. 5L-5P, for example, illustrate a user interface hierarchy with more than three levels. FIG. 5L illustrates lower-level user interface 7824, FIG. 5M illustrates intermediate-level user interface 7826, and FIG. 5O, in these embodiments, illustrates higher-level user interface 7834. In addition, FIG. 5N illustrates user interface 7832 between intermediate-level user interface 7826 and higher-level user interface 7834 and FIG. 5P illustrates user interface 7836 above higher-level user interface 7834.

In some embodiments, the lower-level and intermediate-level user interfaces are (7912) user interfaces in a single application (e.g., a book, music, video or other media application). The higher-level user interface is an application launch user interface. (e.g., a home screen). For example, FIGS. 5A-5G illustrate a user interface hierarchy involving a book application. FIG. 5A illustrates lower-level user interface 7800 including book 7801. FIG. 5D illustrates intermediate-level user interface 7804 including book library 7805. FIG. 5G illustrates higher-level user interface 7810 including book application launch icon 7811.

In some embodiments, the lower-level, intermediate-level and higher-level user interfaces are (7914) user interfaces in a single application. FIGS. 5L-5O illustrate an example where the lower-level, intermediate-level and higher-level user interfaces are user interfaces in a single application. FIG. 5L illustrates lower-level user interface 7824, FIG. 5M illustrates intermediate-level user interface 7826, and FIG. 5O, in these embodiments, illustrates higher-level user interface 7834, all of which are user interfaces for a movie application.

In some embodiments, the lower-level user interface is (7916) a media presentation interface (e.g., text, image, video or audio playback). The intermediate-level user interface is a media collection display interface (e.g., music/book/photo/video library, reading list, or playlist) of a media player application. The higher-level user interface is an application launch user interface (e.g., desktop or home screen) that includes an icon representing the media player application. For example, FIG. 5L illustrates lower-level user interface 7824 (a media presentation interface), FIG. 5M illustrates intermediate-level user interface 7826 (a media collection display interface), and FIG. 5P, in these embodiments, illustrates higher-level user interface 7836 (an application launch user interface).

In some embodiments, the lower-level user interface is (7918) a subfolder. The intermediate-level user interface is a folder containing the subfolder. The higher-level user interface is an application launch interface (e.g., a home-screen or desktop including one or more application launch icons) that includes an icon representing the folder. For example, FIG. 5H illustrates lower-level user interface 7812 including child folder 1 contents 7813 (a subfolder), FIG. 5I illustrates intermediate-level user interface 7818 including parent folder contents 7819 (a folder containing the subfolder), and FIG. 5J illustrates higher-level user interface 7822 that includes folders icon 7823 (an application launch interface that includes an icon representing the folder).

The device, while displaying the lower-level user interface, detects (7920) an input on a portion of the device that is associated with user interface hierarchy navigation (e.g., an icon on a touch-screen display, a region on a touch-sensitive surface, or a physical button with integrated intensity sensor(s)). For example, FIG. 5A illustrates lower-level user interface 7800 displayed on display 450 and input 7806 detected on touch-sensitive surface 451. FIG. 5A further illustrates a cursor 7808 which is a displayed representation of a focus selector, corresponding to input 7806, over home icon 7802.

In some embodiments, the portion of the device on which the input is detected is (7922) a physical button (e.g., home button 204, FIG. 5K). For example, FIG. 5L illustrates input 7828 over home button 204 of portable multifunction device 100.

In some embodiments, the portion of the device on which the input is detected is (7924) a portion of the touch-sensitive surface that is associated with hierarchy navigation. For example, in FIG. 5H, input 7820 is detected over portion 7816 of user interface 7812. In this example, portion 7816 of user interface 7812 is associated with hierarchy navigation.

In some embodiments, the portion of the device on which the input is detected is (7926) a portion of a touch screen display that includes an icon associated with hierarchy navigation (e.g., a "back" button in a user interface). For example, FIG. 5A illustrates input 7806 detected on touch-sensitive surface 451. FIG. 5A further illustrates a cursor 7808 which is a displayed representation of a focus selector), corresponding to input 7806, over home icon 7802. In this example, home icon 7802 is associated with hierarchy navigation.

In some embodiments, the input is (7928) a contact on a touch-sensitive surface. For example, in FIG. 5H input 7820 (a contact) is detected on touch-sensitive display 7814.

In some embodiments, the input includes a contact detected on the touch-sensitive surface and the input is (7930) a stationary gesture (e.g., a stationary press input) that does not include lateral movement of the contact on the touch-sensitive surface. For example, in FIG. 5H the device detects input 7820 on touch-sensitive display 7814 without any lateral movement.

In response to detecting the input (7932), in accordance with a determination that the input meets first transition criteria (e.g., a single-step-transition intensity threshold) that include a criterion that a maximum intensity of the input is above a first intensity threshold (e.g., an activation intensity threshold) and below a second intensity threshold (e.g., a multi-step-transition intensity threshold), where the second intensity threshold is higher than the first intensity threshold, the device replaces (7934) display of the lower-level user interface with display of the intermediate-level user interface (which causes the device to cease to display the lower-level user interface). For example, in FIG. 5D input 7806 has intensity above $IT_L$ and below $IT_D$ and the device replaces lower-level interface 7800 (in FIG. 5A) with intermediate-level interface 7804.

In response to detecting the input (7932), in accordance with a determination that the input meets second transition criteria that include a criterion that a maximum intensity of the input is above the second intensity threshold, the device replaces (7936) display of the lower-level user interface with display of the higher-level user interface (which causes the device to cease to display the lower-level user interface). For example, in FIG. 5G input 7806 has intensity above $IT_D$ and the device replaces lower-level interface 7800 (in FIG. 5A) with higher-level interface 7810.

In some embodiments, replacing display of the lower-level user interface with the higher-level user interface includes (7938) displaying an animated transition between the lower-level user interface and the higher-level user interface where the animated transition progresses at a rate that corresponds to the intensity of the input. For example, a plurality of speeds of progressing through the animated transition are mapped to corresponding contact intensity values of a plurality of detectable contact intensity values, and the speed of progression of the animated transition increases as the intensity of the input increases. In these embodiments the animated transition illustrated in FIGS. 5A-5G progresses at a rate corresponding to the intensity of input 7806.

In some embodiments, replacing display of the lower-level user interface with the higher-level user interface includes (7940) displaying an animated transition between the lower-level user interface and the higher-level user interface where the animated transition progresses in accordance with the intensity of the input. For example, a plurality of states of the animation are mapped to corresponding contact intensity values of a plurality of detectable contact intensity values, and the animated transition progresses as the intensity of the input increases from a first intensity threshold to a second intensity threshold higher than the first intensity threshold. In these embodiments the animated transition illustrated in FIGS. 5A-5G progresses as the intensity of input 7806 increases from intensity above $IT_0$ and below $IT_L$ in FIG. 5A to intensity above $IT_D$ in FIG. 5G.

In some embodiments, replacing display of the lower-level user interface with the higher-level user interface includes (7942) displaying an animated transition between the lower-level user interface and the higher-level user interface that includes displaying a representation of the intermediate-level user interface. In these embodiments, if the transition is between two non-adjacent levels of the hierarchy (e.g., the lower-level user interface and the higher-level user interface), when displaying the animated transition, the device displays one or more interstitial user interfaces between the two non-adjacent levels of the hierarchy to provide context for the user as to the navigation within the hierarchy. For example, in accordance with these embodiments, the animated transition illustrated in FIGS. 5A-5G includes display of intermediate-level interface 7804.

In some embodiments, the device determines (7944) whether the input has a duration longer than a respective time threshold. Replacing display of the lower-level user interface with display of the higher-level user interface includes, in accordance with a determination that the input has a duration longer than the respective time threshold, switching (7946) from displaying the lower-level user interface to displaying a representation of the intermediate-level user interface to displaying the higher-level user interface. For example, in response to detecting a slow press input, the device switches from displaying the lower-level user interface to displaying the intermediate-level user interface and then to displaying the higher-level user interface. FIGS. 5S-5U, for example, illustrate input 7842 with duration above threshold DT and the device switching from display of lower-level user interface 7800 in FIG. 5S to intermediate-level user interface 7804 in FIG. 5T to higher-level user interface 7810 in FIG. 5U.

Conversely, in some embodiments, the device determines (7944) whether the input has a duration longer than a respective time threshold. Replacing display of the lower-level user interface with display of the higher-level user interface includes, in accordance with a determination that the input has a duration shorter than the respective time threshold, replacing (7948) display of the lower-level user interface with display of the higher-level user interface without displaying a representation the intermediate-level user interface For example, in response to detecting a quick tap input, the device switches directly from the lower-level user interface to the higher-level user interface. FIGS. 5Q-5R, for example, illustrate input 7840 with duration below threshold DT and the device switching from display of lower-level user interface 7800 in FIG. 5Q to higher-level user interface 7810 in FIG. 5R.

It should be understood that the particular order in which the operations in FIGS. 6A-6D have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., those listed in fifth paragraph of the Description of Embodiments) are also applicable in an analogous manner to method 7900 described above with respect to FIGS. 6A-6D. For example, the inputs, contacts, intensity thresholds, duration thresholds, user interfaces, focus selectors, icons, and buttons described above with reference to method 7900 optionally have one or more of the characteristics of the inputs, contacts, intensity thresholds, duration thresholds, user interfaces, focus selectors, icons, and buttons described herein with reference to other methods described herein (e.g., those listed in fifth paragraph of the Description of Embodiments). For brevity, these details are not repeated here.

Figure 7:
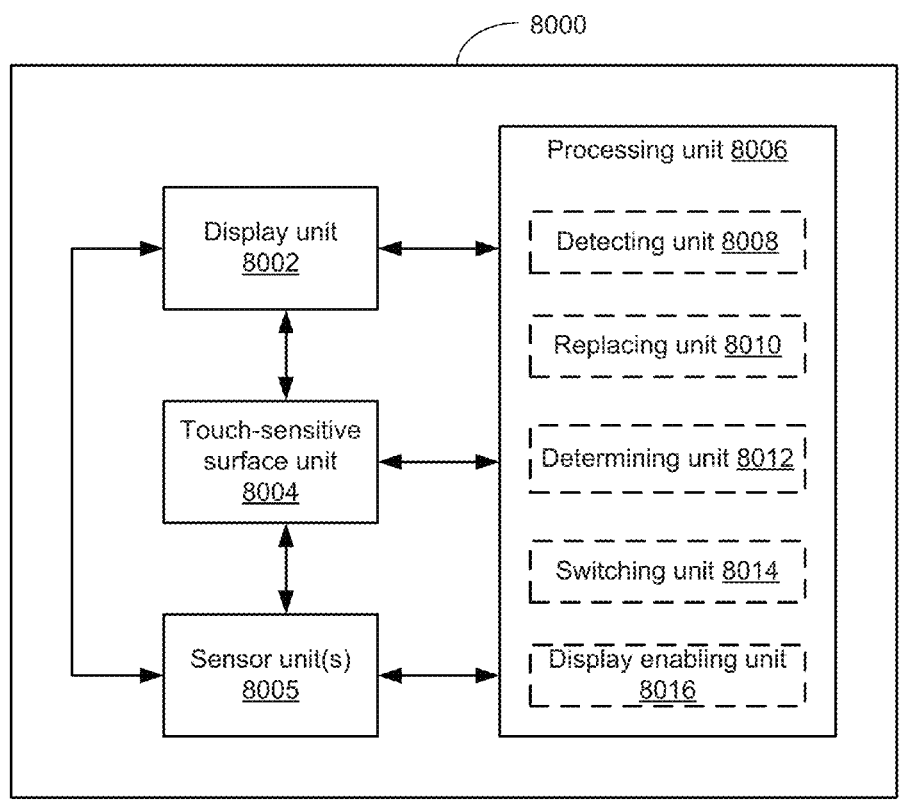
FIG. 7 is a functional block diagram of an electronic device in accordance with some embodiments.

In accordance with some embodiments, FIG. 7 shows a functional block diagram of an electronic device 8000 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 7 are, optionally, combined or separated into sub-blocks to implement the principles of the various described embodiments. Therefore, the description herein optionally supports any possible combination or separation or further definition of the functional blocks described herein.

As shown in FIG. 7, electronic device 8000 includes display unit 8002 configured to display a lower-level user interface that is part of a user interface hierarchy, where: the hierarchy includes at least three levels, including the lower-level user interface, an intermediate-level user interface and a higher-level user interface; the intermediate-level user interface is above the lower-level user interface in the hierarchy; and the higher-level user interface is above both the intermediate-level user interface and the lower-level user interface in the hierarchy. Electronic device 8000 further includes touch-sensitive surface unit 8004 configured to receive user inputs; one or more sensor units 8005 configured to detect intensity of contacts with the touch-sensitive surface unit; and a processing unit 8006 coupled to the display unit 8002, the touch-sensitive surface unit 8004, and the sensor units 8005. In some embodiments, processing unit 8006 includes detecting unit 8008, replacing unit 8010, determining unit 8012, switching unit 8014, and display enabling unit 8016.

Processing unit 8006 is configured to, while displaying the lower-level user interface, detect an input (e.g., with detecting unit 8008) on a portion of the device that is associated with user interface hierarchy navigation. Processing unit 8006 is further configured to, in response to detecting the input, in accordance with a determination that the input meets first transition criteria that include a criterion that a maximum intensity of the input is above a first intensity threshold and below a second intensity threshold, where the second intensity threshold is higher than the first intensity threshold, replace (e.g., with replacing unit 8010) display of the lower-level user interface with display of the intermediate-level user interface and, in accordance with a determination that the input meets second transition criteria that include a criterion that a maximum intensity of the input is above the second intensity threshold, replace (e.g., with replacing unit 8010) display of the lower-level user interface with display of the higher-level user interface.

In some embodiments, the portion of the device on which the input is detected (e.g., with detecting unit 8008) is a physical button.

In some embodiments, the portion of the device on which the input is detected (e.g., with detecting unit 8008) is a portion of the touch-sensitive surface unit that is associated with hierarchy navigation.

In some embodiments, the portion of the device on which the input is detected (e.g., with detecting unit 8008) is a portion of a touch screen display unit that includes an icon associated with hierarchy navigation.

In some embodiments, the input is a contact on a touch-sensitive surface unit.

In some embodiments, the input includes a contact detected (e.g., with detecting unit 8008) on the touch-sensitive surface unit and the input is a stationary gesture that does not include lateral movement of the contact on the touch-sensitive surface unit.

In some embodiments, the hierarchy includes exactly three levels in order from highest to lowest: the higher-level user interface; the intermediate-level user interface; and the lower-level user interface.

In some embodiments, the higher-level user interface is adjacent to the intermediate-level user interface in the hierarchy and the intermediate-level user interface is adjacent to the lower-level user interface in the hierarchy.

In some embodiments, the hierarchy includes more than three levels.

In some embodiments, the lower-level and intermediate-level user interfaces are user interfaces in a single application and the higher-level user interface is an application launch user interface.

In some embodiments, the lower-level, intermediate-level and higher-level user interfaces are user interfaces in a single application.

In some embodiments, the lower-level user interface is a media presentation interface, the intermediate-level user interface is a media collection display interface of a media player application, and the higher-level user interface is an application launch user interface that includes an icon representing the media player application.

In some embodiments, the lower-level user interface is a subfolder, the intermediate-level user interface is a folder containing the subfolder, and the higher-level user interface is an application launch interface that includes an icon representing the folder.

In some embodiments, replacing (e.g., with replacing unit 8010) display of the lower-level user interface with the higher-level user interface includes enabling display of (e.g., with display enabling unit 8016) an animated transition between the lower-level user interface and the higher-level user interface where the animated transition progresses at a rate that corresponds to the intensity of the input.

In some embodiments, replacing (e.g., with replacing unit 8010) display of the lower-level user interface with the higher-level user interface includes enabling display of (e.g., with display enabling unit 8016) an animated transition between the lower-level user interface and the higher-level user interface where the animated transition progresses in accordance with the intensity of the input.

In some embodiments, replacing (e.g., with replacing unit 8010) display of the lower-level user interface with the higher-level user interface includes enabling display of an animated transition between the lower-level user interface and the higher-level user interface that includes enabling display of (e.g., with display enabling unit 8016) a representation of the intermediate-level user interface.

In some embodiments, processing unit 8006 is further configured to determine (e.g., with determining unit 8012) whether the input has a duration longer than a respective time threshold, and replacing (e.g., with replacing unit 8008) display of the lower-level user interface with display of the higher-level user interface includes, in accordance with a determination that the input has a duration longer than the respective time threshold, switching (e.g., with switching unit 8014) from enabling display of the lower-level user interface to enabling display of a representation of the intermediate-level user interface and then enabling display of the higher-level user interface, and in accordance with a determination that the input has a duration shorter than the respective time threshold, replacing (e.g., with replacing unit 8008) display of the lower-level user interface with display of the higher-level user interface without enabling display of a representation the intermediate-level user interface.

The operations in the information processing methods described above are, optionally implemented by running one or more functional modules in information processing apparatus such as general purpose processors (e.g., as described above with respect to FIGS. 1A and 3) or application specific chips.

The operations described above with reference to FIGS. 6A-6D are, optionally, implemented by components depicted in FIGS. 1A-1B or FIG. 7. For example, detection operation 7920, replacing operation 7934, replacing operation 7936 and switching operation 7946 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Navigating User Interface Hierarchies

Many electronic devices have graphical user interfaces that include various user interface hierarchies and it is easy for a user to lose their place within the user interface hierarchy or become confused as to how to navigate through the user interface hierarchy. For example, a media player application includes several interfaces for users to navigate between. In this example, the media player application's user interface hierarchy includes a media presentation interface, a media collection display interface, and a user interface with an application launch icon for the media player application (e.g., a home or starting interface). The embodiments below improve on these methods by reducing the cognitive burden on a user and produce an intuitive and efficient human-machine interface by determining, based on a duration of a detected input, whether to navigate through a user interface hierarchy in accordance with an intensity of the detected input and provide visual feedback indicative of the navigation through the user interface hierarchy or to navigate through the user interface hierarchy using different feedback.

FIGS. 8A-8V illustrate exemplary user interfaces for navigating a user interface hierarchy using inputs on a touch-sensitive surface in accordance with some embodiments. The user interfaces in these figures are used to illustrate the processes described below, including the processes described below with reference to FIGS. 9A-9E. FIGS. 8C-8V include intensity diagrams that show the current intensity of the contact on the touch-sensitive surface relative to a plurality of intensity thresholds including a contact detection intensity threshold (e.g., "$IT_0$"), a first (light press) intensity threshold (e.g., "$IT_L$") and a second (deep press) intensity threshold (e.g., "$IT_D$").

Figure 8B:
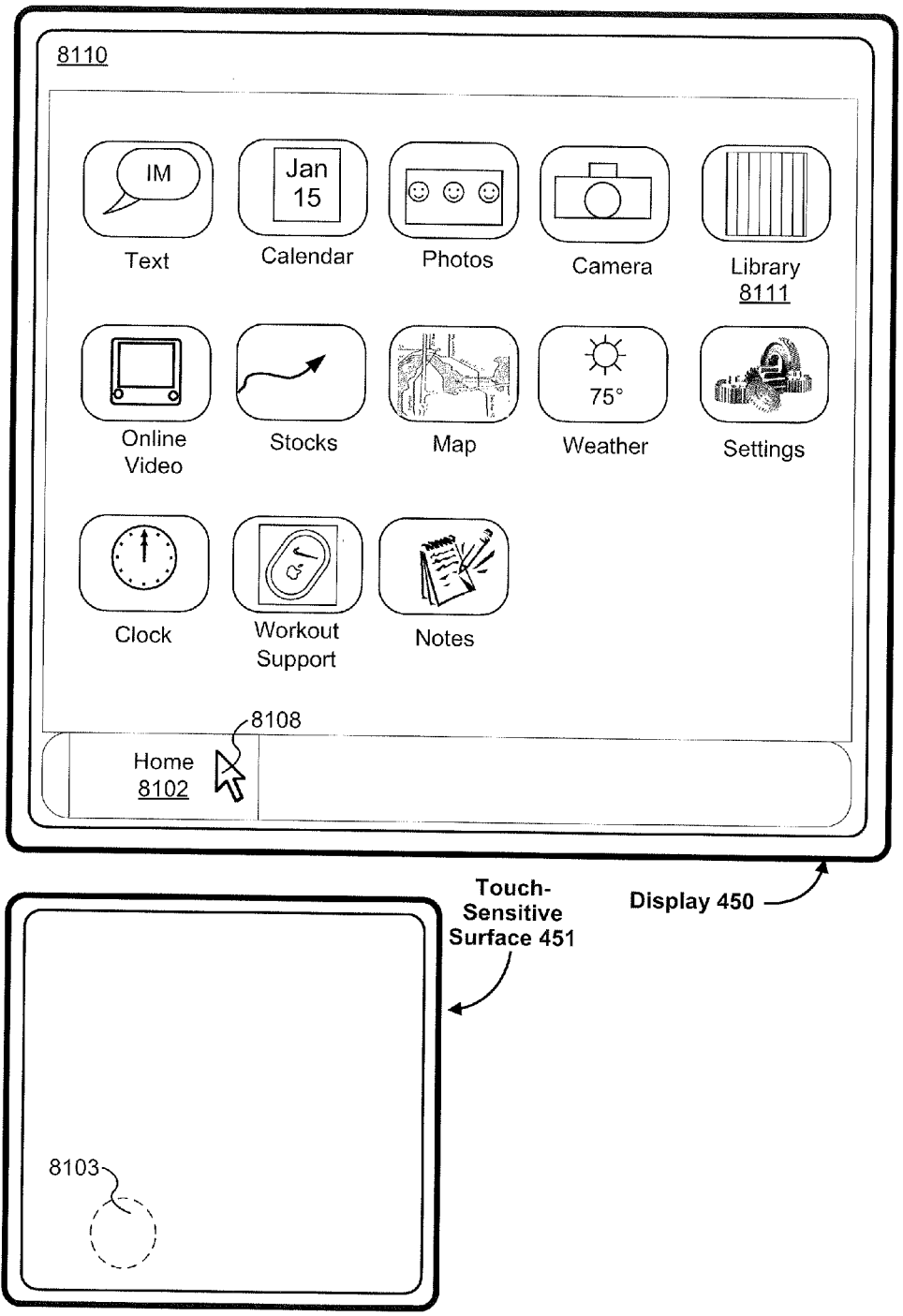
Figure 8C:
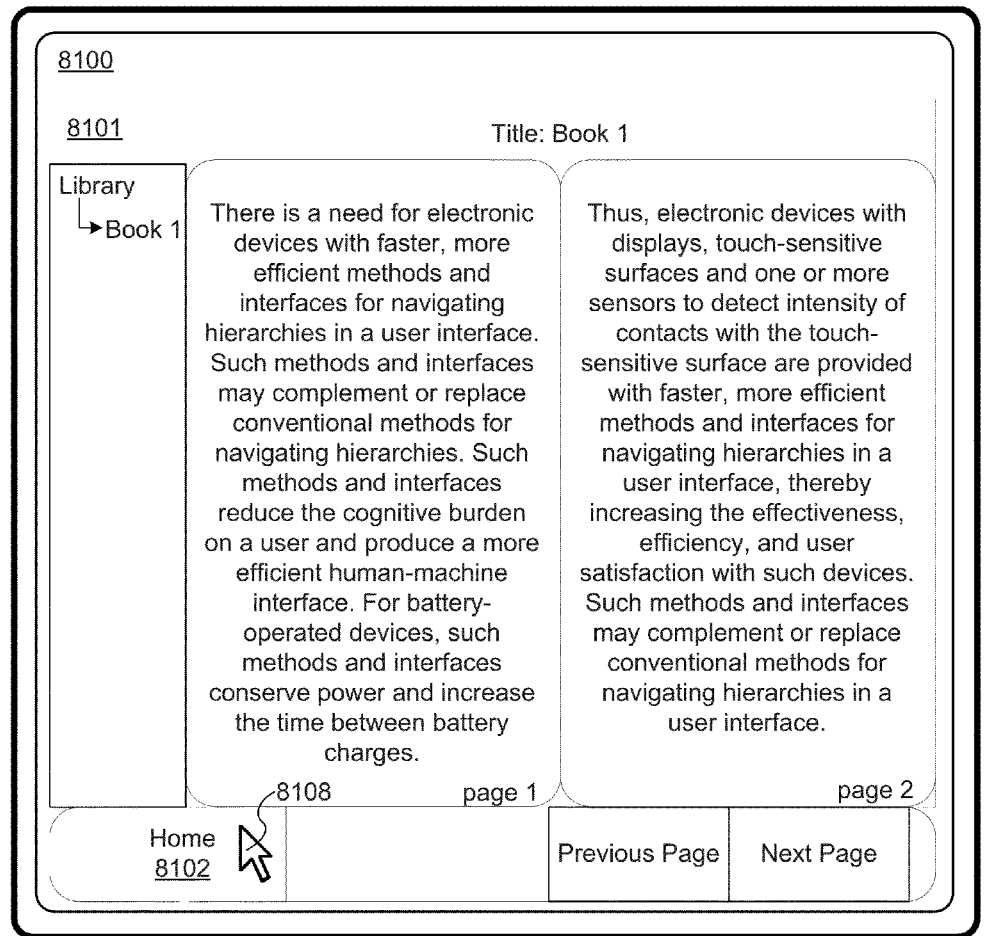
Figure 8C:
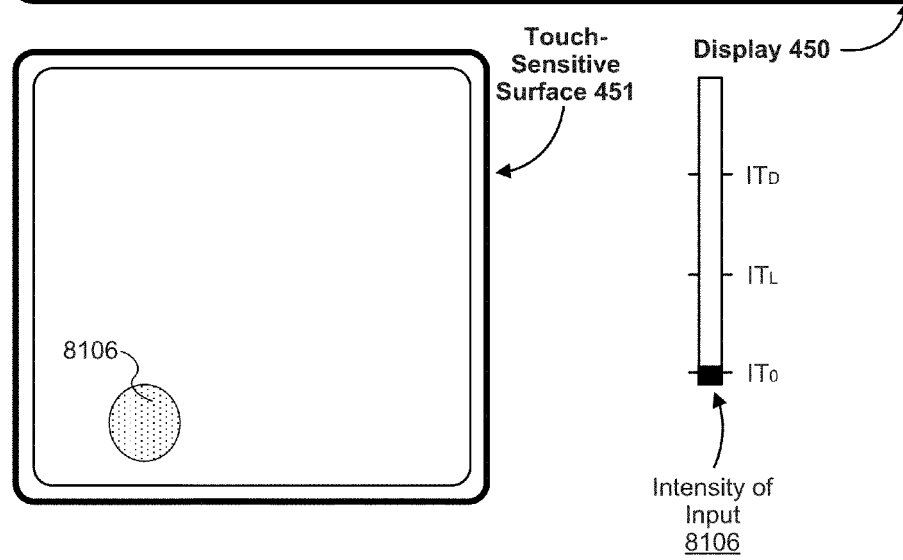

FIGS. 8A-8B illustrate an example of replacing display of a lower-level user interface with a higher-level user interface. In this example the duration of input 8103 is below a predefined threshold (e.g., a tap gesture). FIGS. 8A-8B illustrate user interfaces displayed on display 450 of a device (e.g., device 300) and responsive to inputs (e.g., a finger contact) on touch-sensitive surface 451. The interfaces in FIGS. 8A-8I include home icon 8102 and, in accordance with some embodiments, a cursor 8108 is a displayed representation of focus selector over home icon 8102, corresponding to input 8103 (e.g., a contact). In FIG. 8A, the device displays lower-level user interface 8100 including book 8101 and home icon 8102. FIG. 8A further illustrates the device detecting input 8103 on touch-sensitive surface 451. In FIG. 8B the device detects liftoff of input 8103 and, because the duration of input 8103 is below the predefined threshold, the device replaces display of lower-level interface 8100 with display of higher-level interface 8110.

Figure 8D:
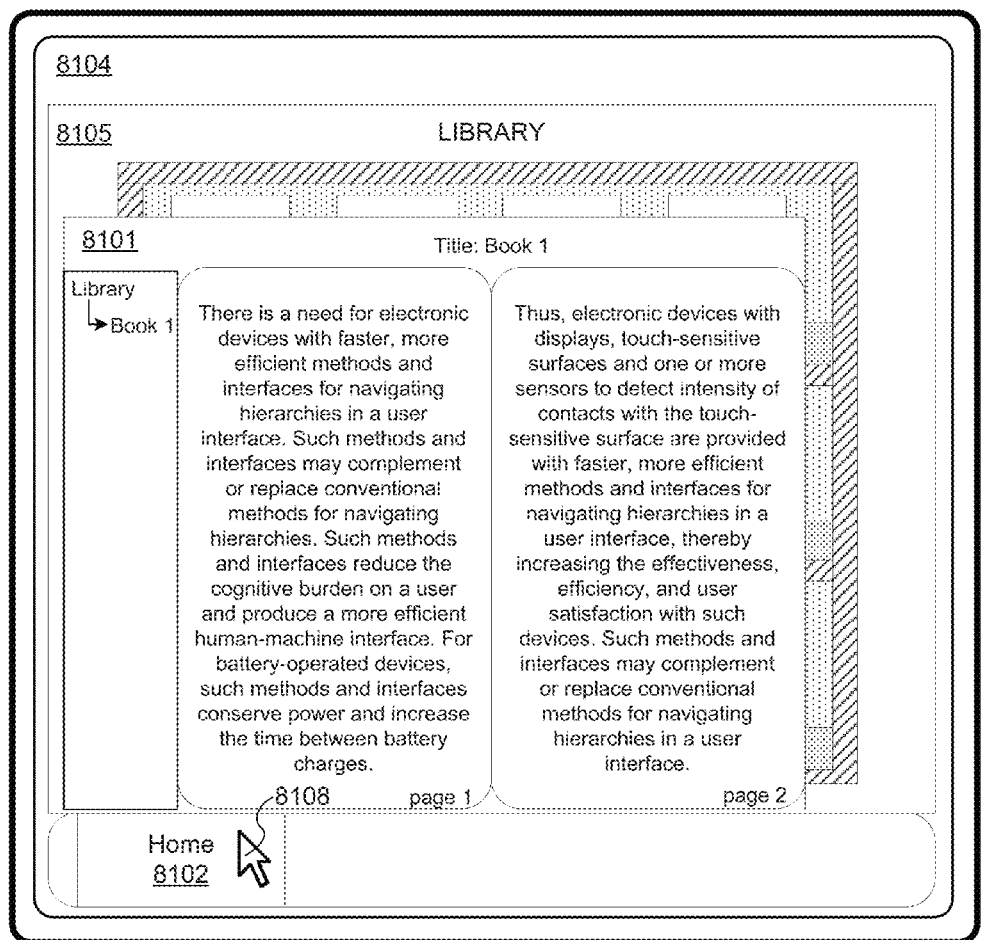
Figure 8D:
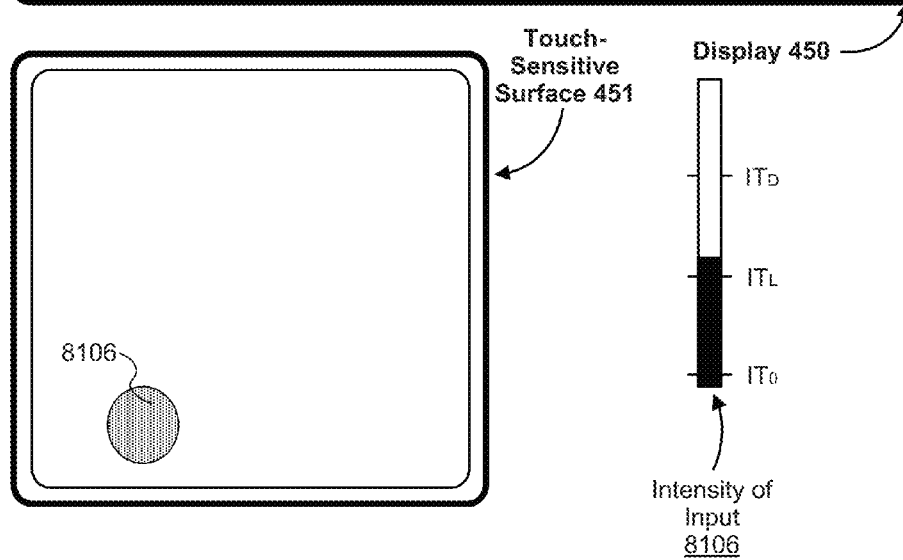
Figure 8E:
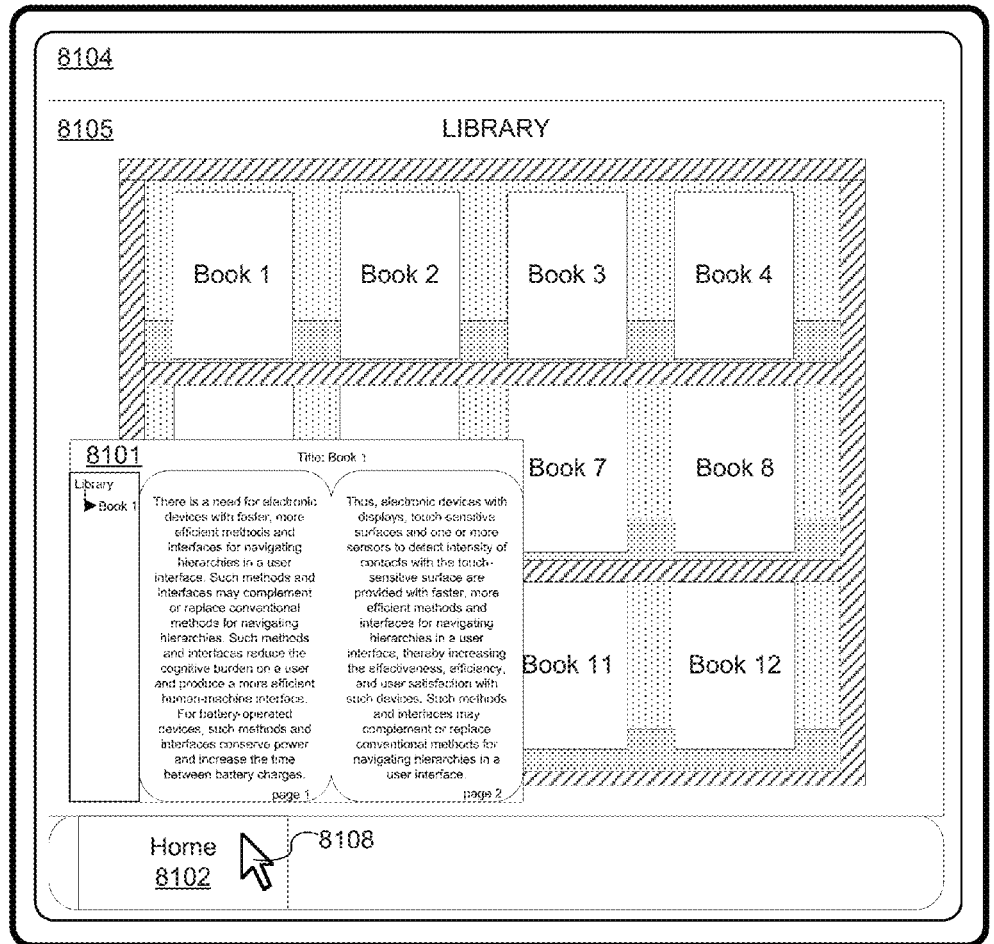
Figure 8E:
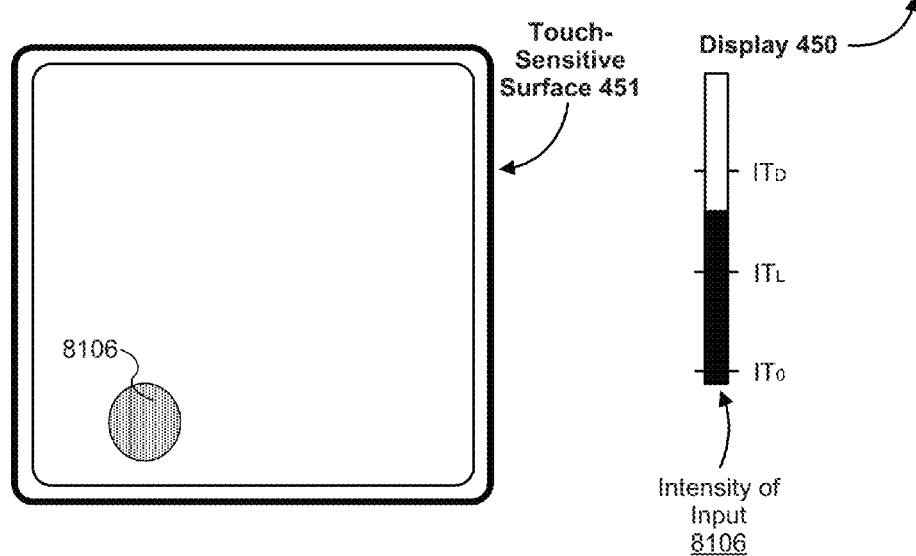
Figure 8F:
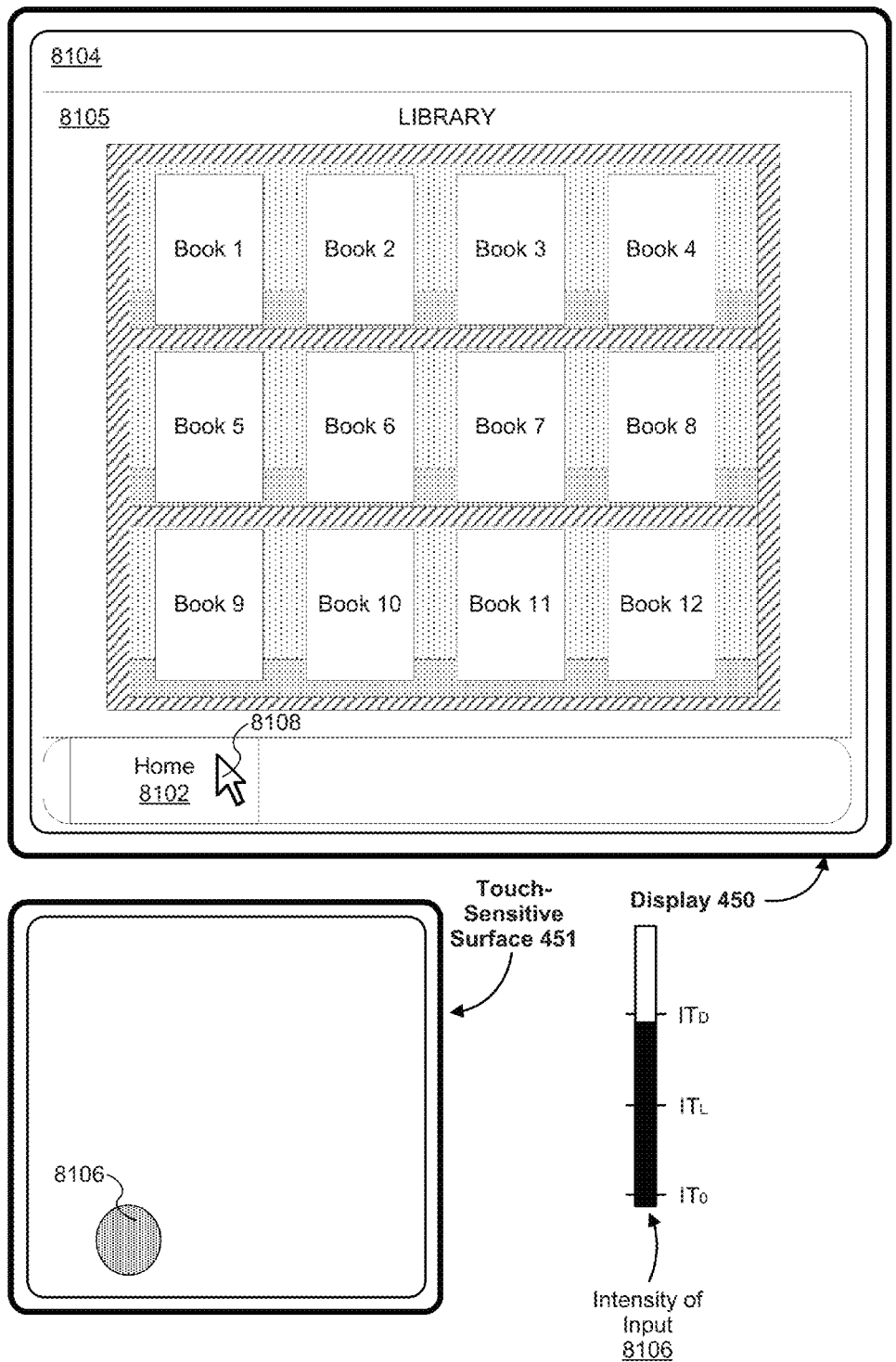
Figure 8G:
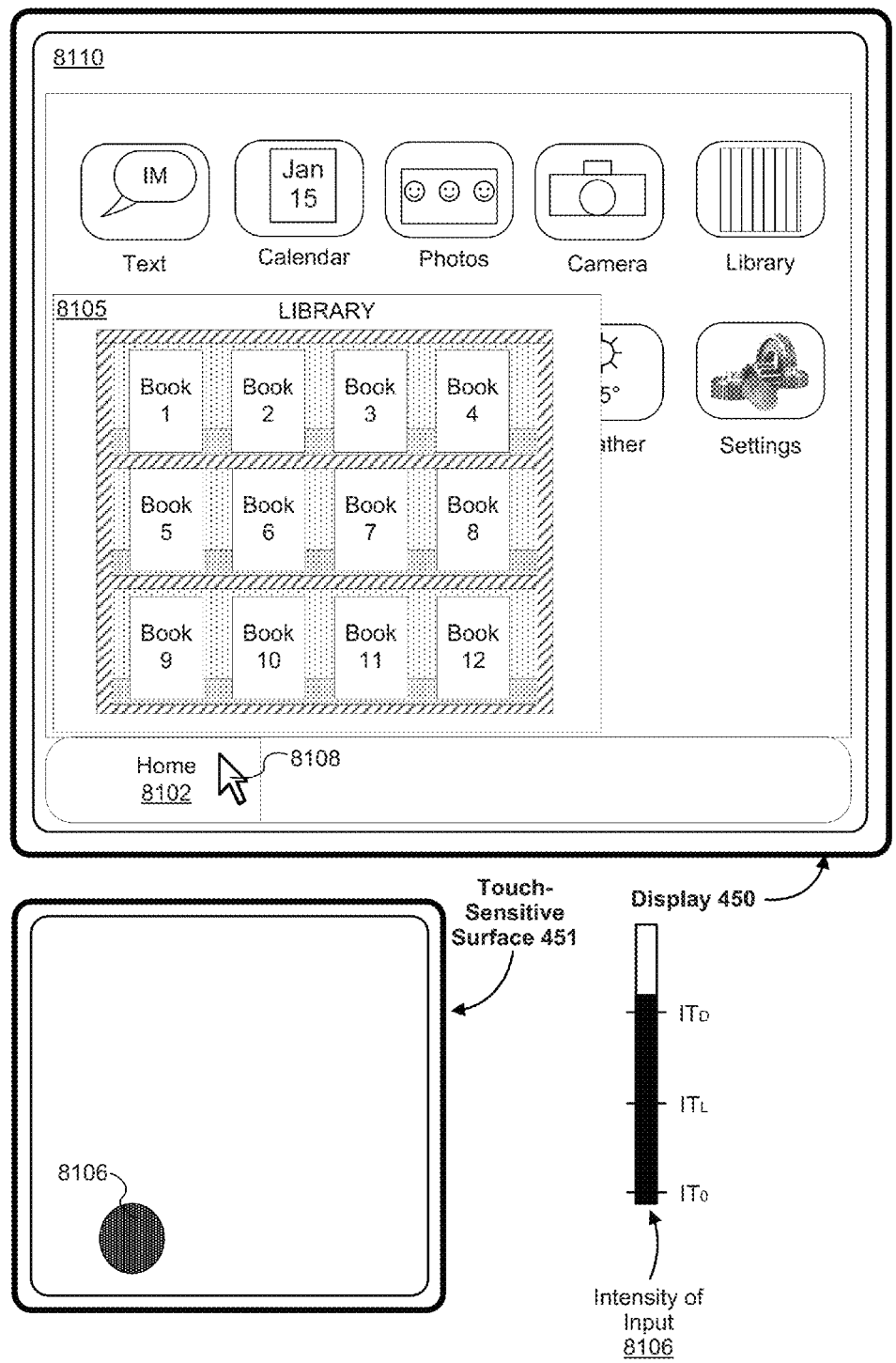
Figure 8H:
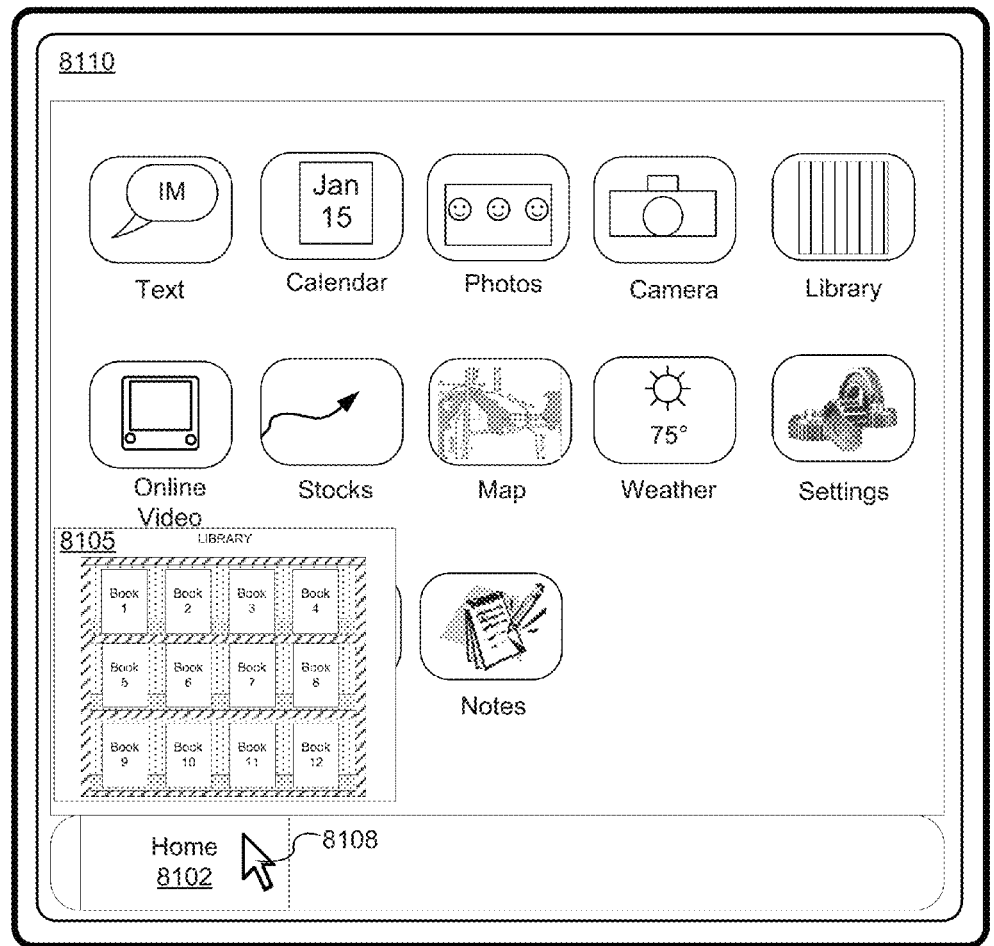
Figure 8H:
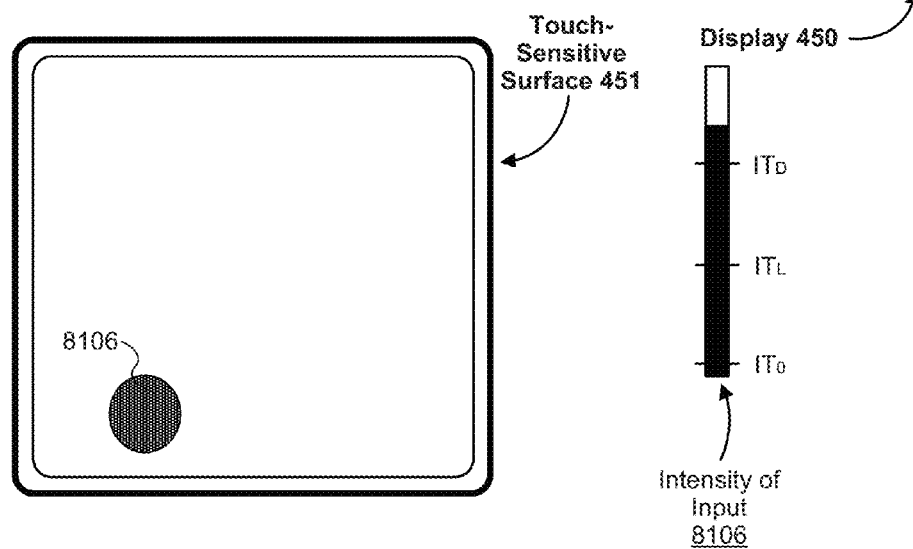
Figure 8I:
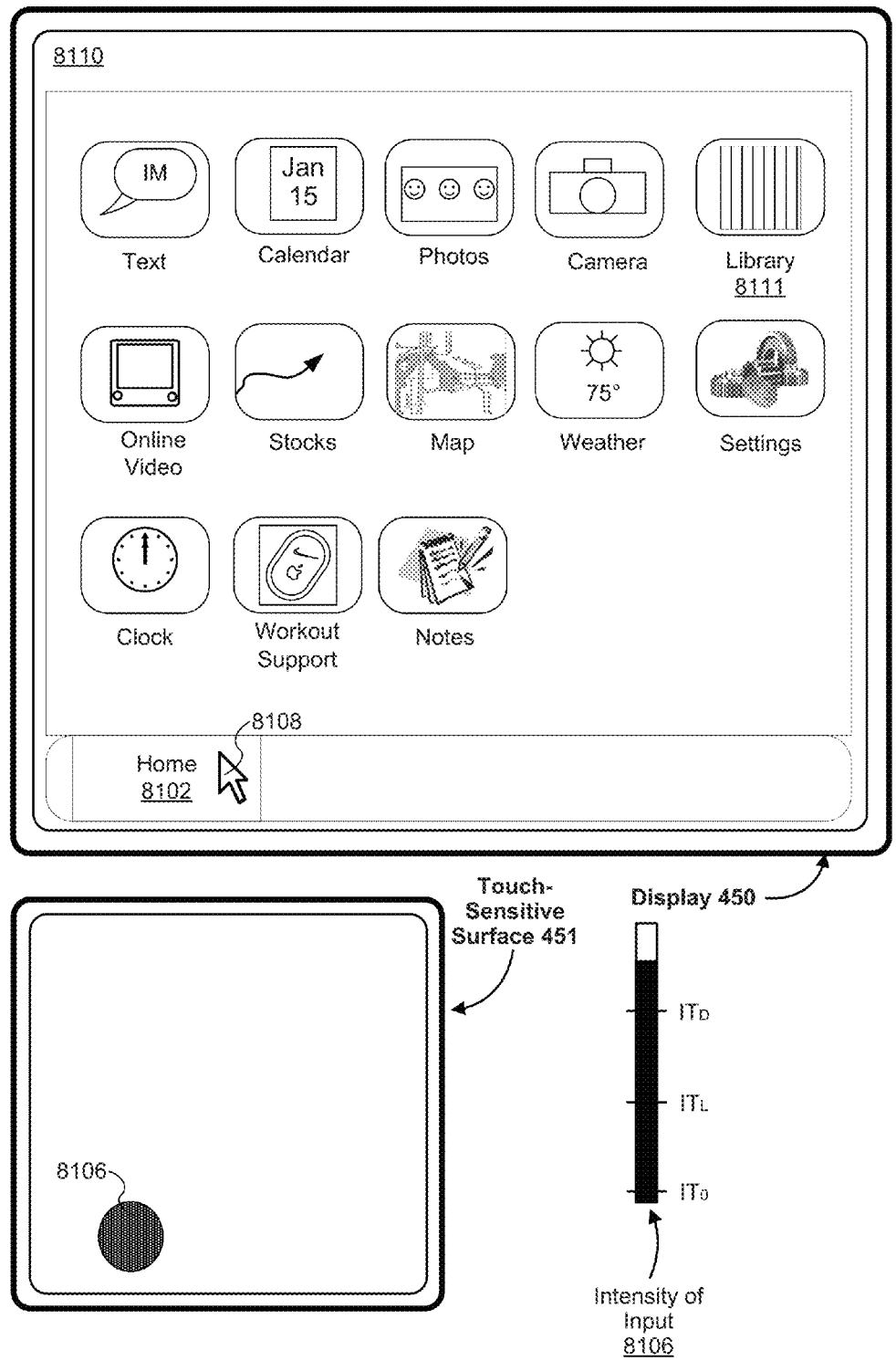

FIGS. 8C-8I illustrate an example of replacing display of lower-level user interface with a higher-level user interface including displaying an animated transition between the lower-level user interface and the higher-level user interface. In this example the duration of input 8106 is above a predefined threshold. In FIG. 8C the device displays lower-level user interface 8100 including book 8101 and home icon 8102. FIG. 8C further illustrates the device detecting input 8106 with intensity above $IT_0$ and below $IT_L$ on touch-sensitive surface 451. FIGS. 8D-8E illustrate an animated transition between lower-level user interface 8100 in FIG. 8C and intermediate-level user interface 8104 in FIG. 8F. FIGS. 8D-8E further illustrate the intensity of input 8106 increasing from slightly above $IT_L$ to slightly below $IT_D$. In FIG. 8F the intensity of input 8106 is above $IT_L$ and below $IT_D$ and the device displays intermediate-level user interface 8104 that includes library 8105. FIGS. 8G-8H illustrate an animated transition between intermediate-level user interface 8104 in FIG. 8F and higher-level user interface 8110 in FIG. 8I. FIGS. 8G-8H further illustrate the intensity of input 8106 above $IT_D$. In FIG. 8I, the device displays higher-level user interface 8110, which includes library launch icon 8111 and home icon 8102. FIG. 8I further illustrates input 8106 with intensity above $IT_D$.

The lower-level and intermediate-level user interfaces are shown in FIGS. 8C-8I as full-screen user interfaces for ease of illustration. However, in some embodiments, the lower-level user interface and/or the intermediate-level user interface are non-full-screen user interfaces such as drop-down menus, pop-over menus, or other user interfaces that are displayed over at least a portion the higher-level user interface while still displaying at least a portion of the higher-level user interface. For example, in FIG. 8C, lower-level user interface 8100 is, optionally, shifted laterally or reduced in size so as to reveal at least a portion of intermediate-level user interface 8104 (shown in FIG. 8F) and/or higher-level user interface 8110 (shown in FIG. 8I). Similarly in FIG. 8F, intermediate-level user interface 8104 is, optionally, shifted laterally or reduced in size so as to reveal at least a portion of higher-level user interface 8110 (shown in FIG. 8I). Using non-full-screen user interfaces instead of or in addition to full-screen user interfaces can provide a user with helpful context and a visual indication of what will happen if and when the user provides an input that is associated with user interface hierarchy navigation (e.g., a reminder that a tap on the home button will cause the device to redisplay the home screen).

In some embodiments, the device is an electronic device with a separate display (e.g., display 450) and a separate touch-sensitive surface (e.g., touch-sensitive surface 451). In some embodiments, the device is portable multifunction device 100, the display is touch-sensitive display system 112, and the touch-sensitive surface includes contact intensity sensor(s) 165 on the display (FIG. 1A).

In some implementations, a cursor 8108 is a displayed representation of a focus selector with a position on display 450 that is determined in accordance with contacts received by touch-sensitive surface 451. In other implementations the focus selector has a different displayed representation (e.g., a magnifying glass). Alternatively, in some implementations a representation of the focus selector is not displayed. For example, in implementations using a touch-sensitive display system, the position of the focus selector corresponds to the location on the display of a contact or gesture. Further, the focus selector is herein defined to be "over" a user interface object when the position of the focus selector corresponds to the location on the display of the user interface object.

Figure 8J:
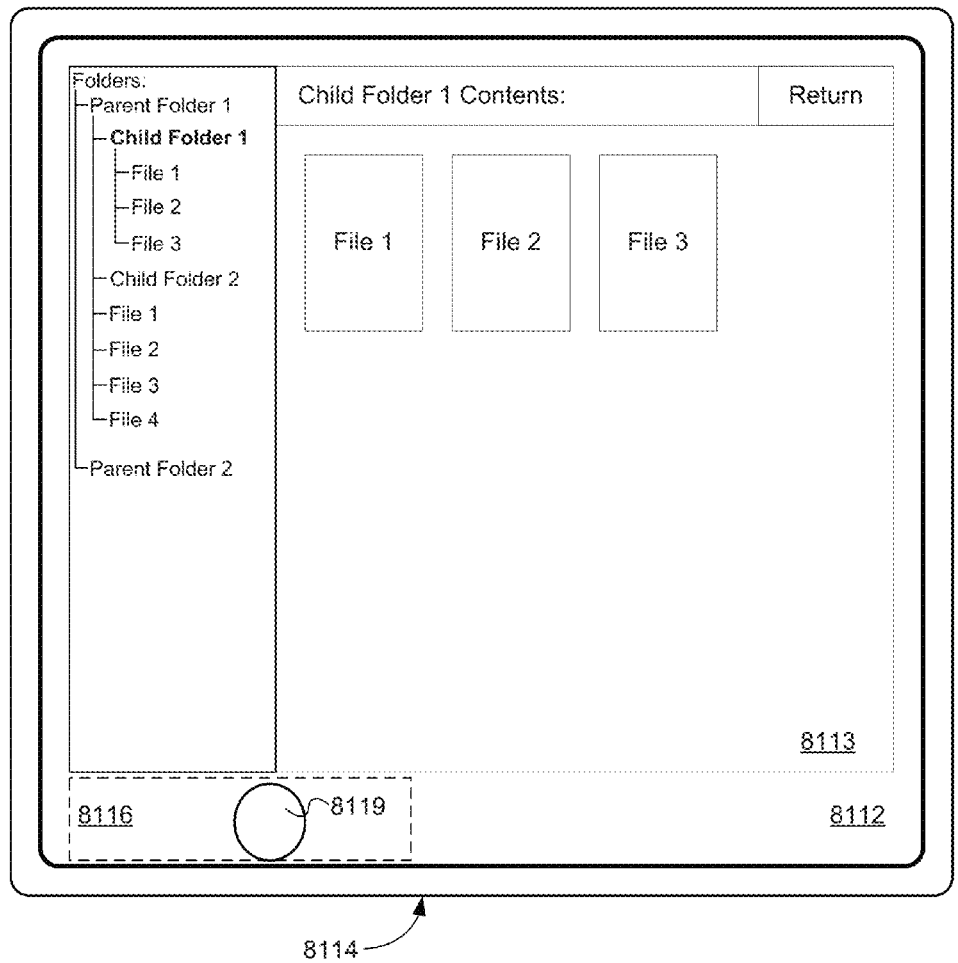
Figure 8K:
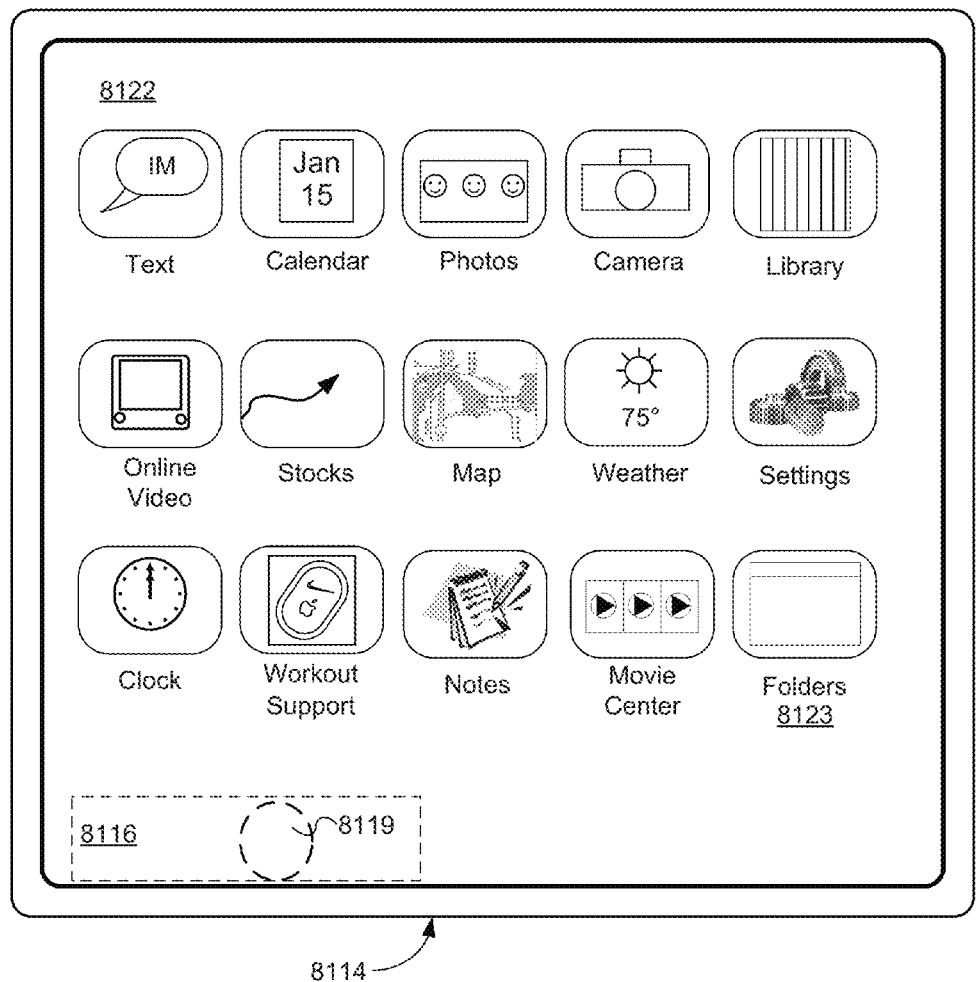

FIGS. 8J-8K illustrate an example of a user interface hierarchy that includes a portion of the touch-sensitive surface that is associated with hierarchy navigation. In this example the duration of input 8119 is below a predefined threshold (e.g., a tap gesture). FIGS. 8J-8K illustrate user interfaces displayed on touch-sensitive display 8114 of a device. The interfaces in FIGS. 8J-8K include portion 8116 of touch-sensitive display 8114 that is associated with hierarchy navigation. FIGS. 8J-8K also show input 8119 over portion 8116 of touch-sensitive display 8114. In FIG. 8J, the device displays lower-level user interface 8112 including child folder 1 contents 8113. In FIG. 8K the device detects liftoff of input 8119 and, because the duration of input 8119 is below the predefined threshold, the device replaces display of lower-level interface 8112 with display of higher-level interface 8122.

Figure 8L:
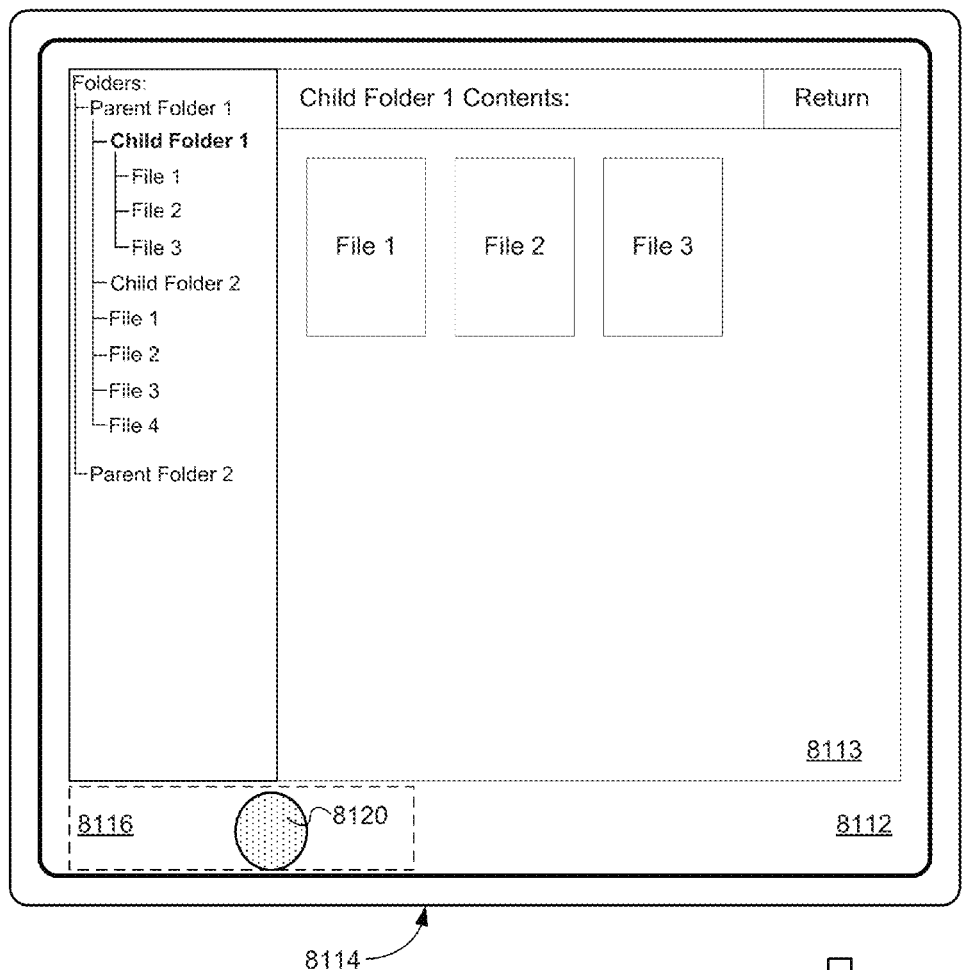
Figure 8L:
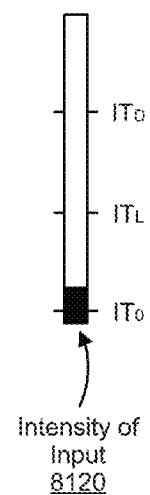
Figure 8M:
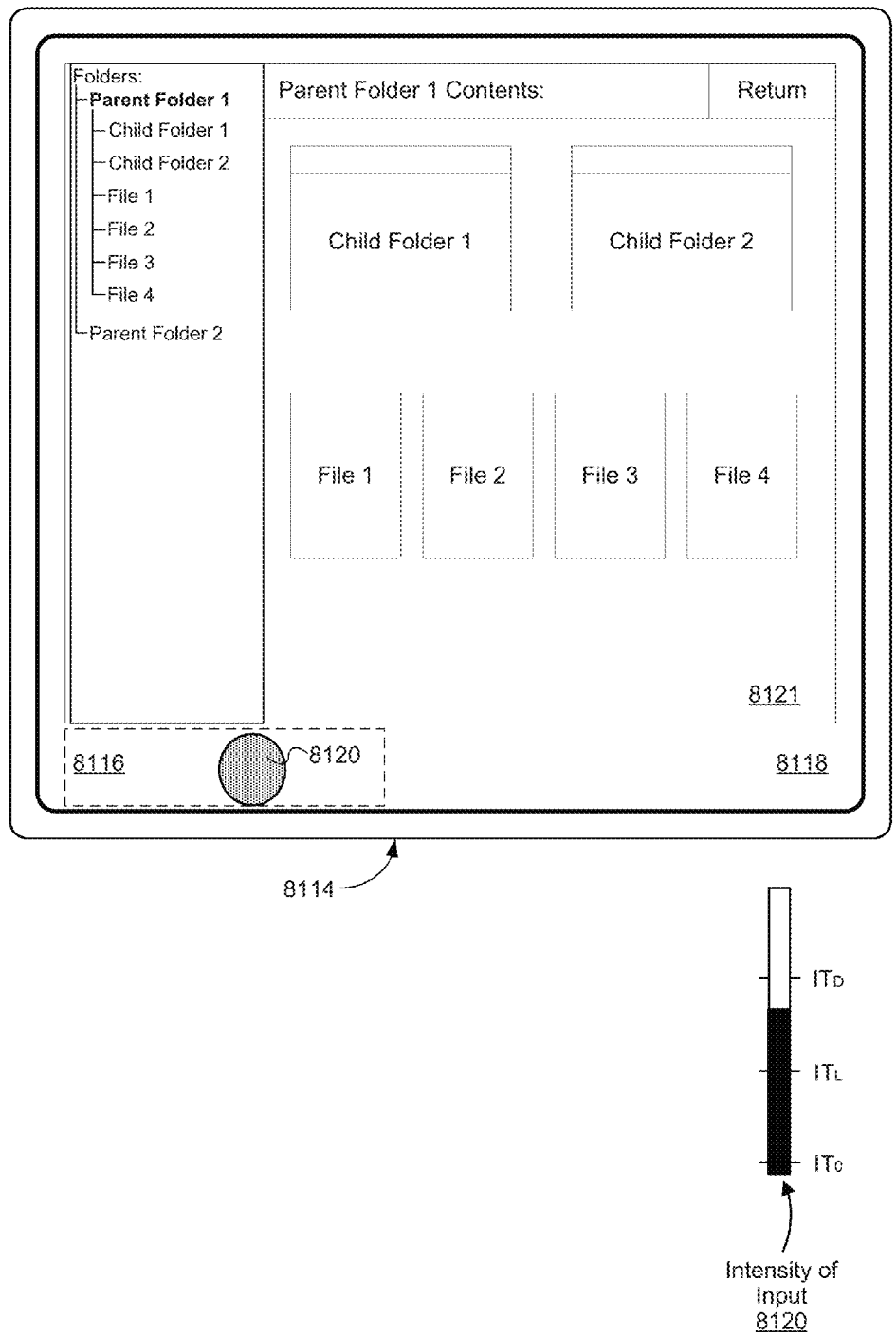
Figure 8N:
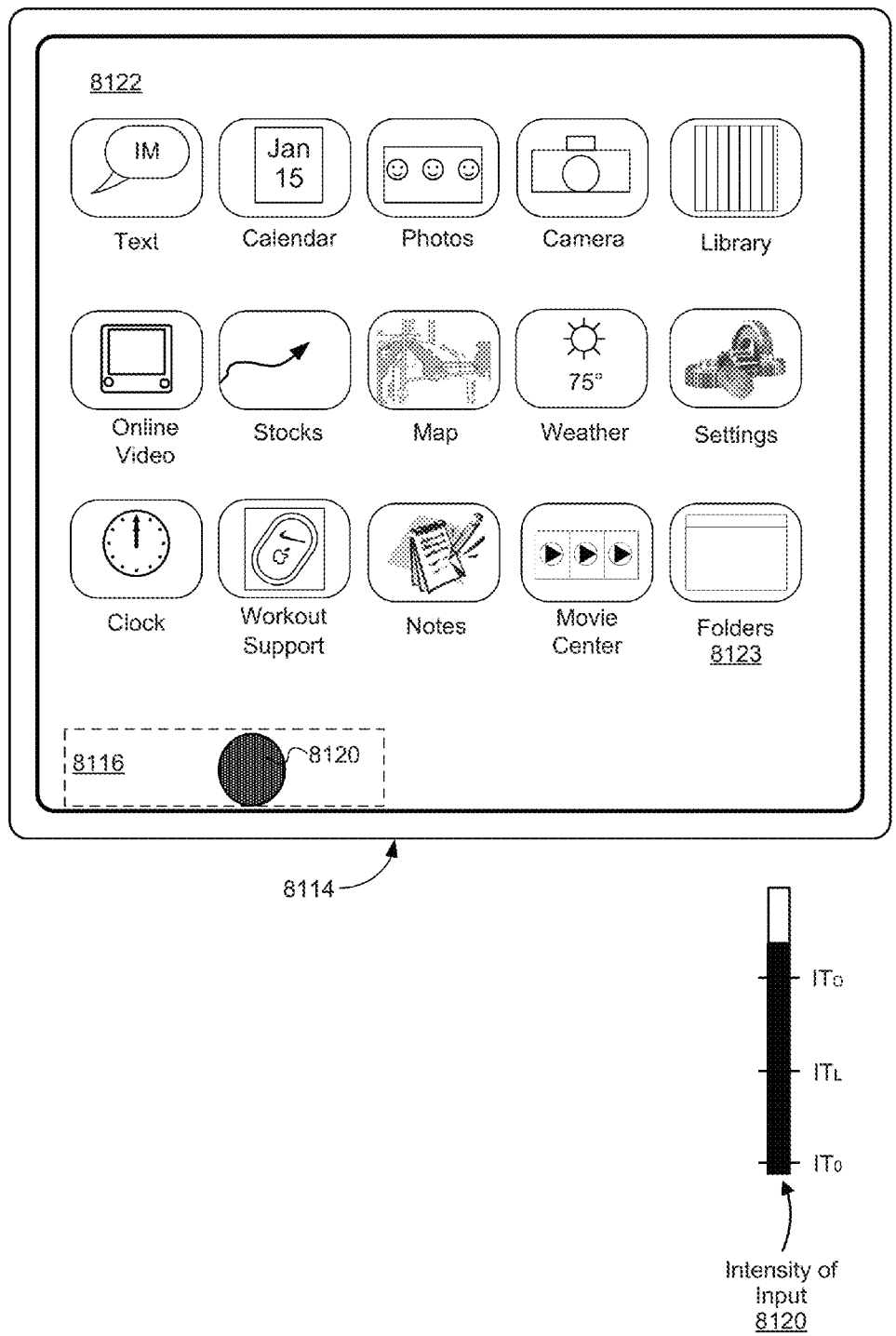

FIGS. 8L-8N illustrate another example of a user interface hierarchy that includes a portion of the touch-sensitive surface that is associated with hierarchy navigation. In this example the duration of input 8120 is above a predefined threshold. In FIG. 8L, the device displays lower-level user interface 8112 that includes child folder 1 contents 8113. FIG. 8L further illustrates input 8120 with intensity above $IT_0$ and below $IT_L$. In FIG. 8M, the device displays intermediate-level user interface 8118 that includes parent folder 1 contents 8121. FIG. 8M further illustrates input 8120 with intensity above $IT_L$ and below $IT_D$. In FIG. 8N, the device displays higher-level user interface 8122 that includes folders launch icon 8123. FIG. 8N further illustrates input 8120 with intensity above $IT_D$.

Figure 8O:
Figure 8P:
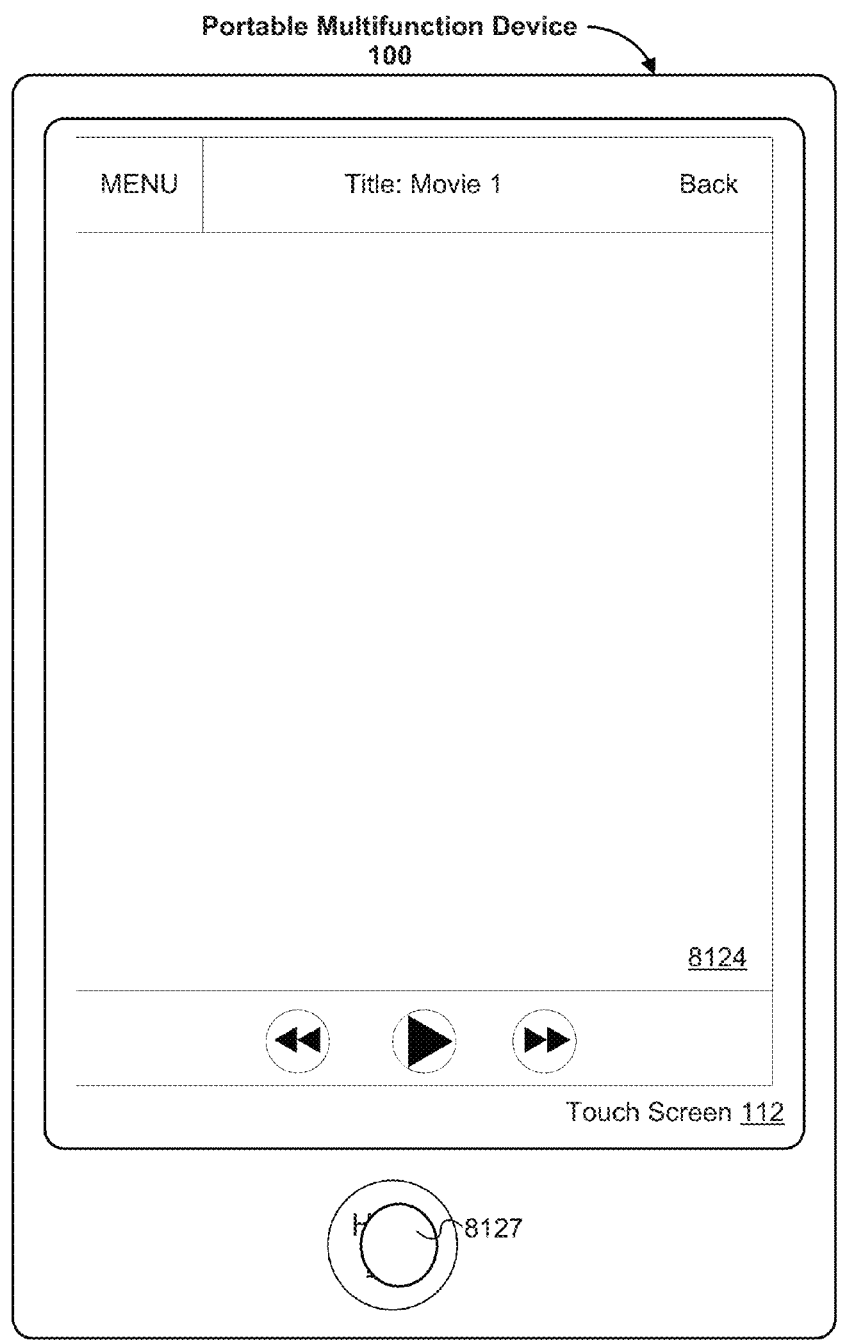
Figure 8Q:
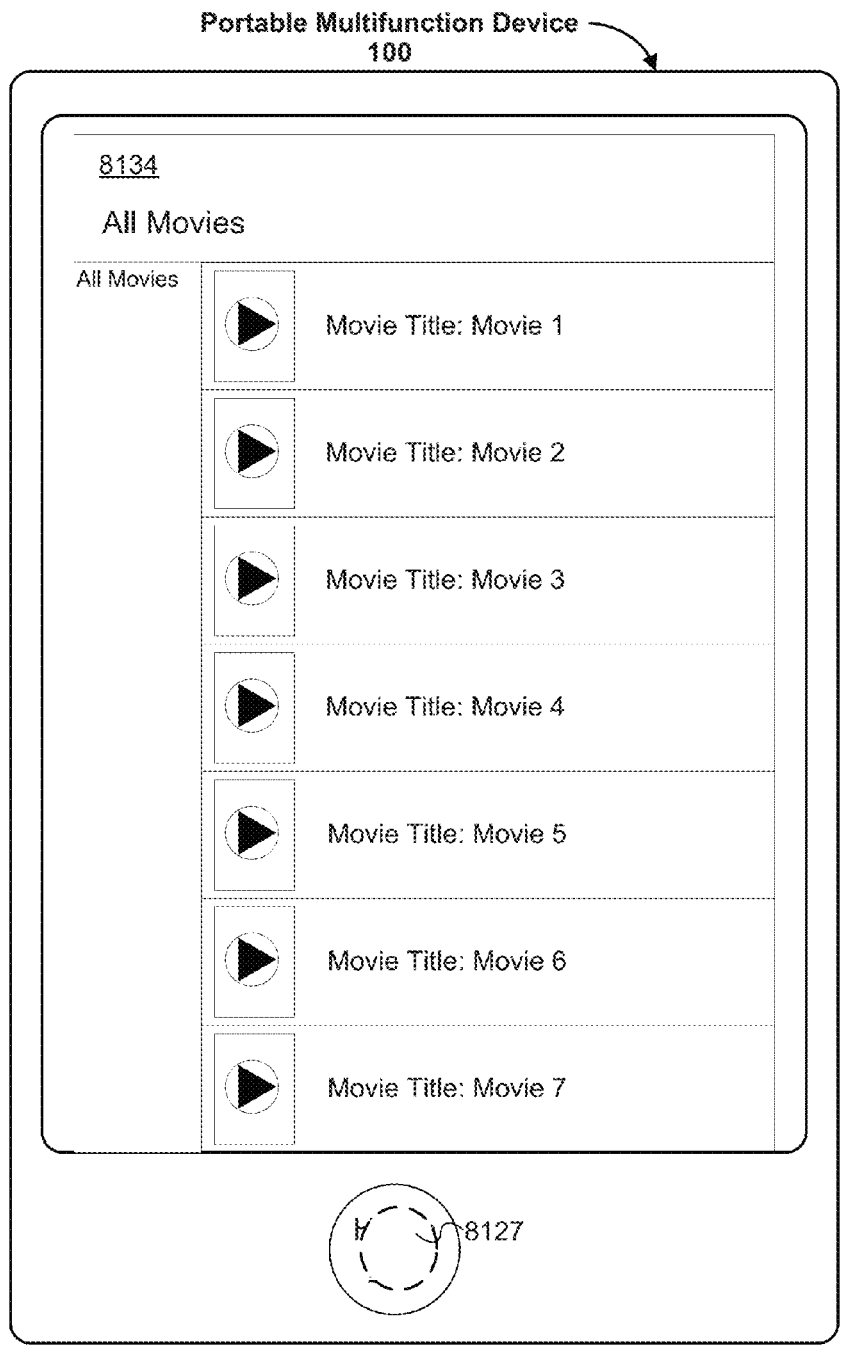

FIGS. 8O-8Q illustrate an example of navigating a user interface hierarchy on a portable multifunction device. In this example the duration of input 8127 is below a predefined threshold (e.g., a tap gesture). FIGS. 8O-8Q illustrate user interfaces displayed on touch screen 112 of portable multifunction device 100. The device in FIGS. 8O-8Q includes home button 204 associated with hierarchy navigation. In FIGS. 8O-8P, device 100 displays lower-level user interface 8124, a media presentation interface, on touch screen 112. FIG. 8P further illustrates input 8127 over home button 204. In FIG. 8Q the device detects liftoff of input 8127 and, because the duration of input 8127 is below the predefined threshold, the device replaces display of lower-level interface 8124 with display of higher-level interface 8134.

Figure 8R:
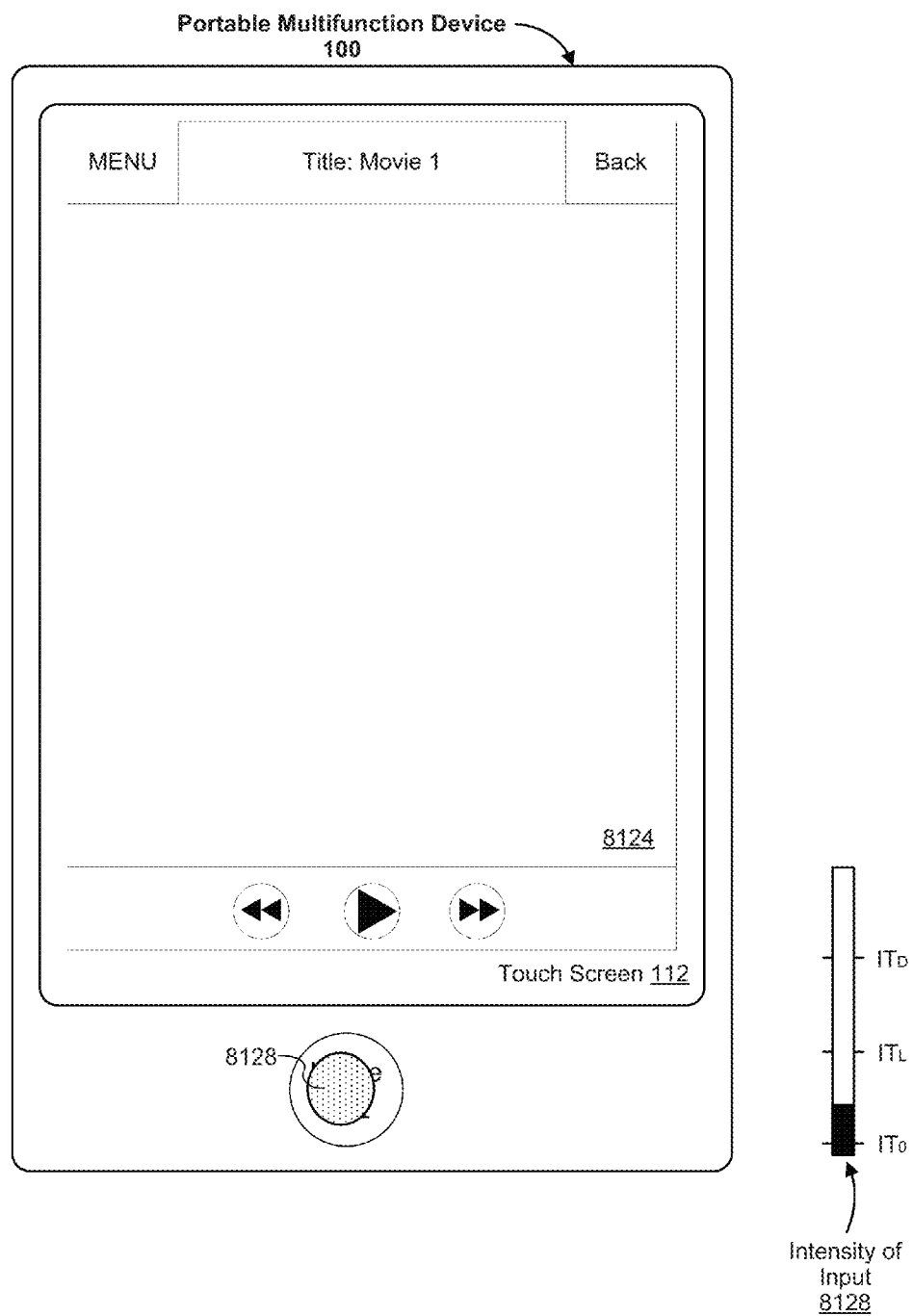
Figure 8S:
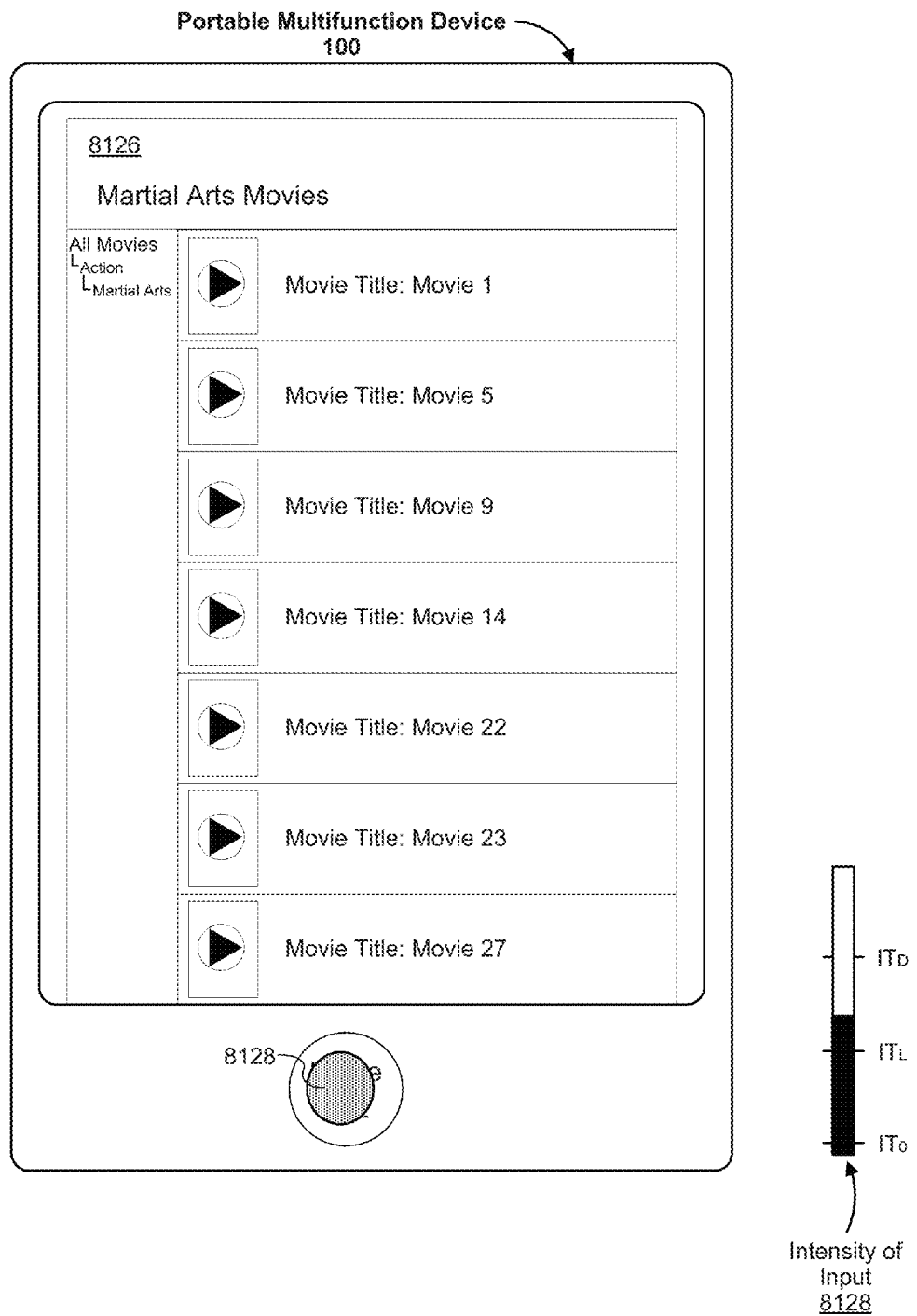
Figure 8T:
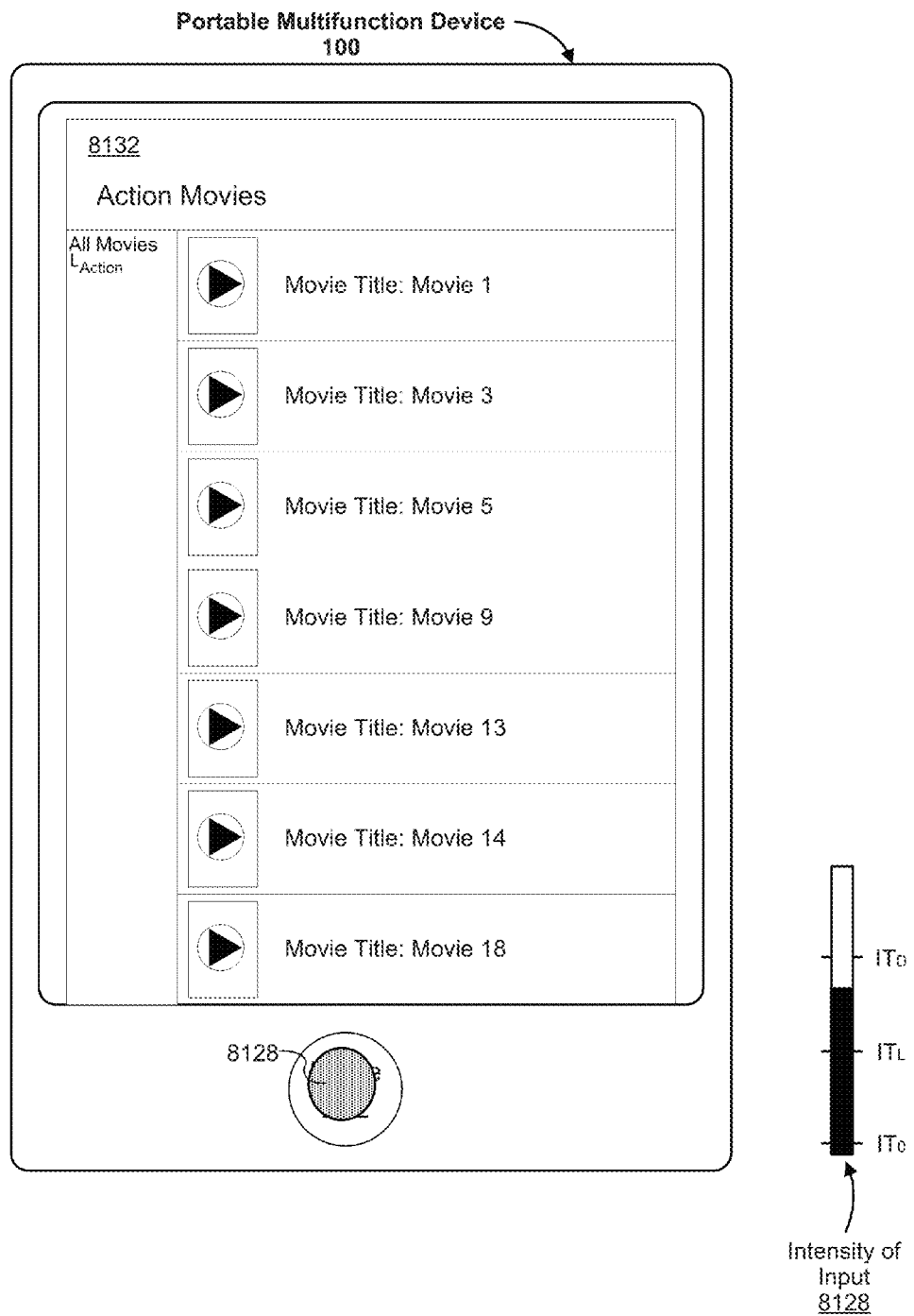
Figure 8U:
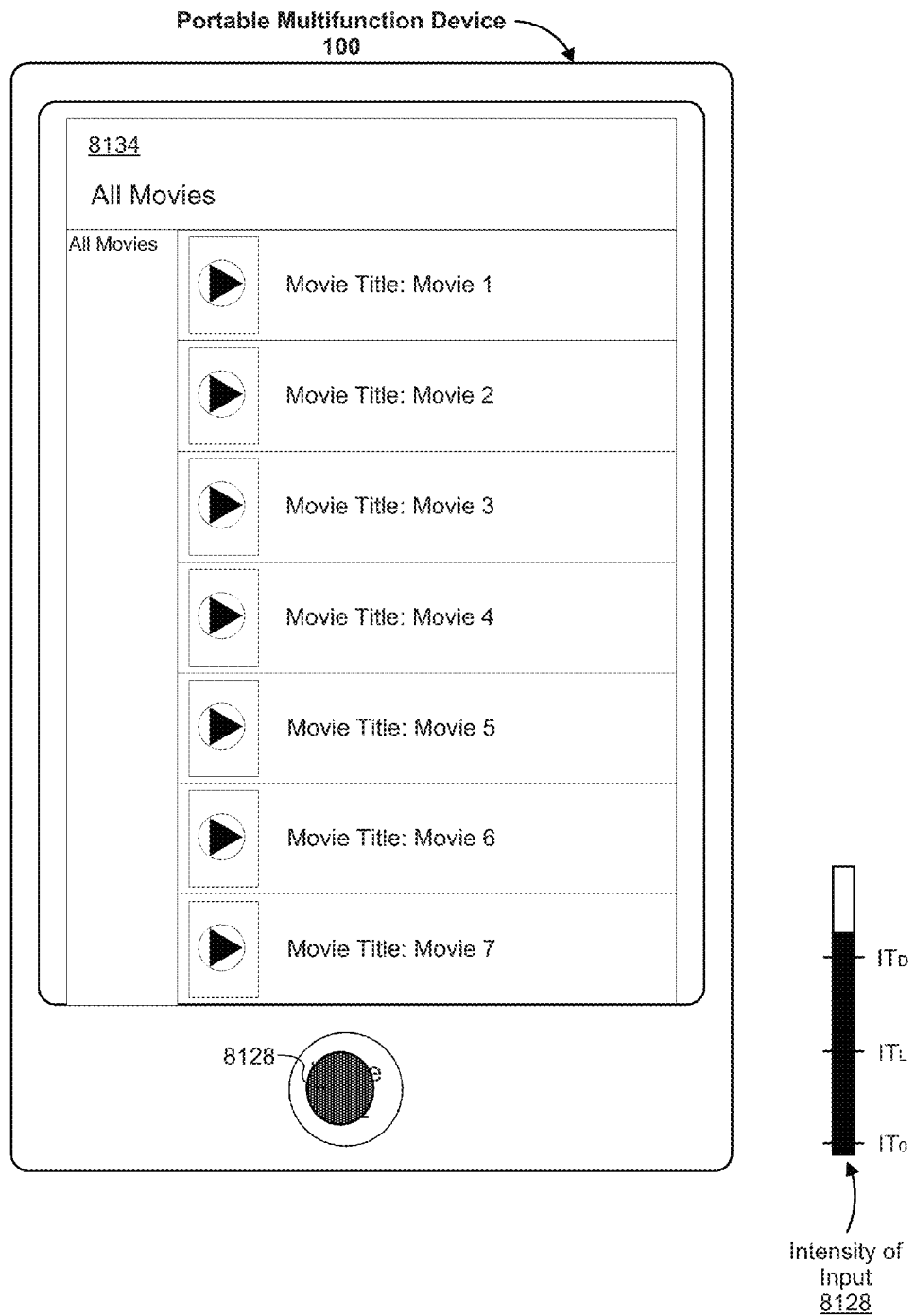
Figure 8V:
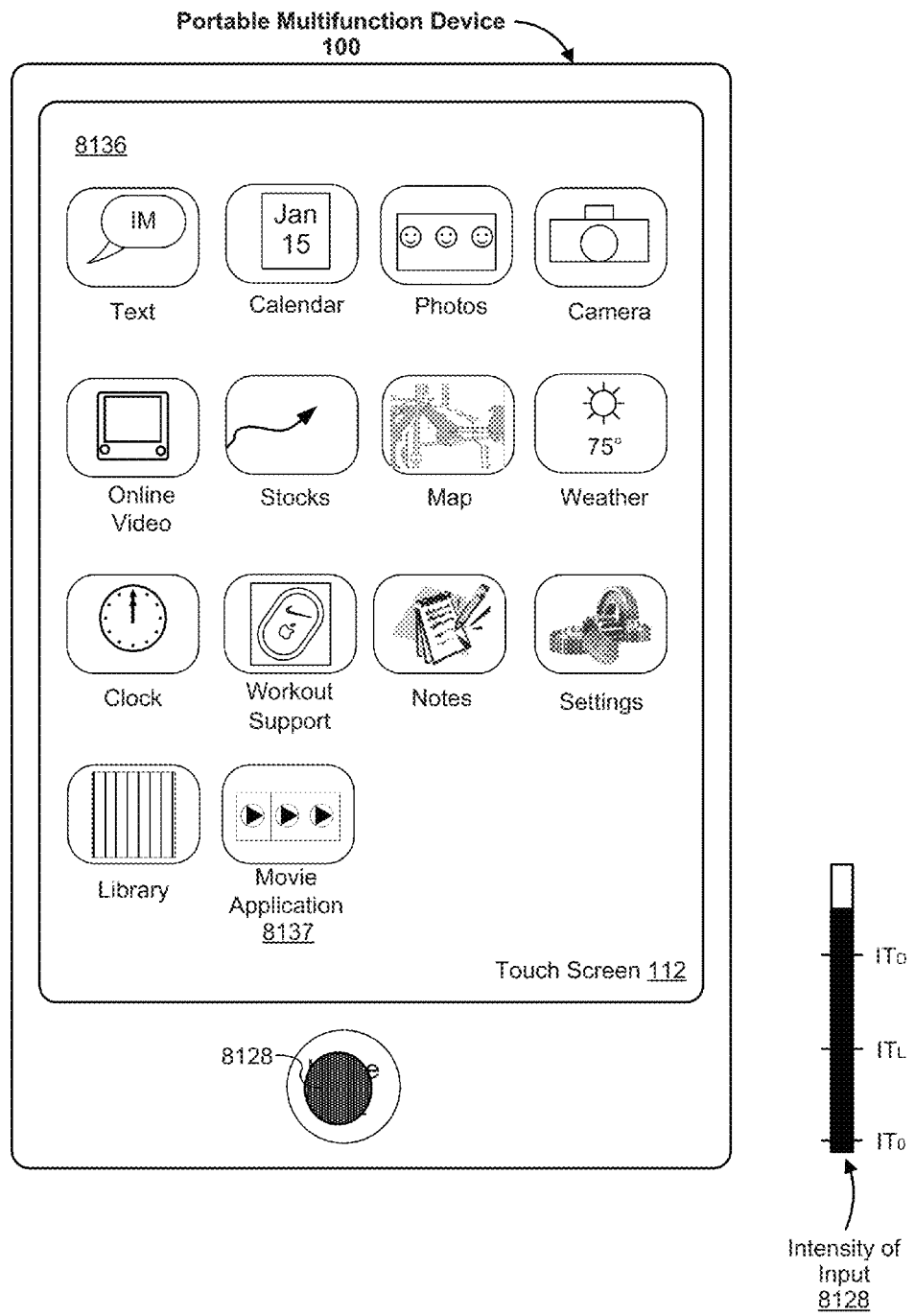
Figure 9B:
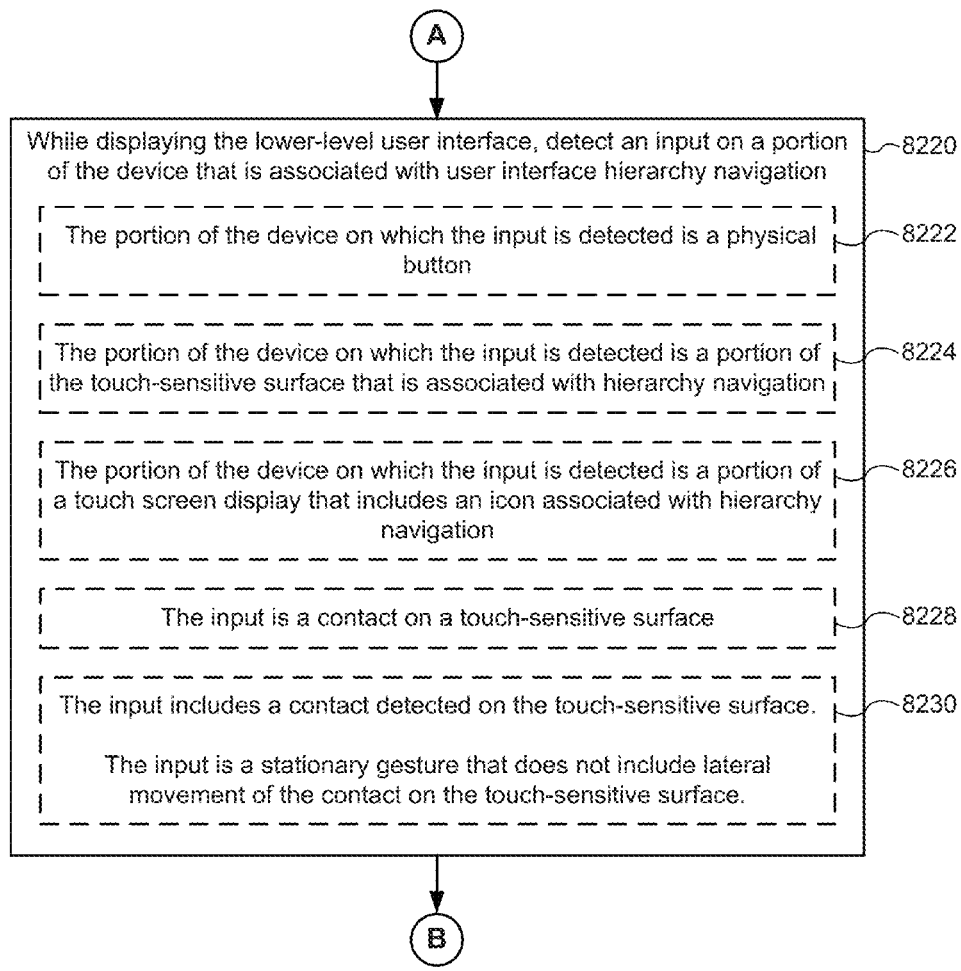
Figure 9C:
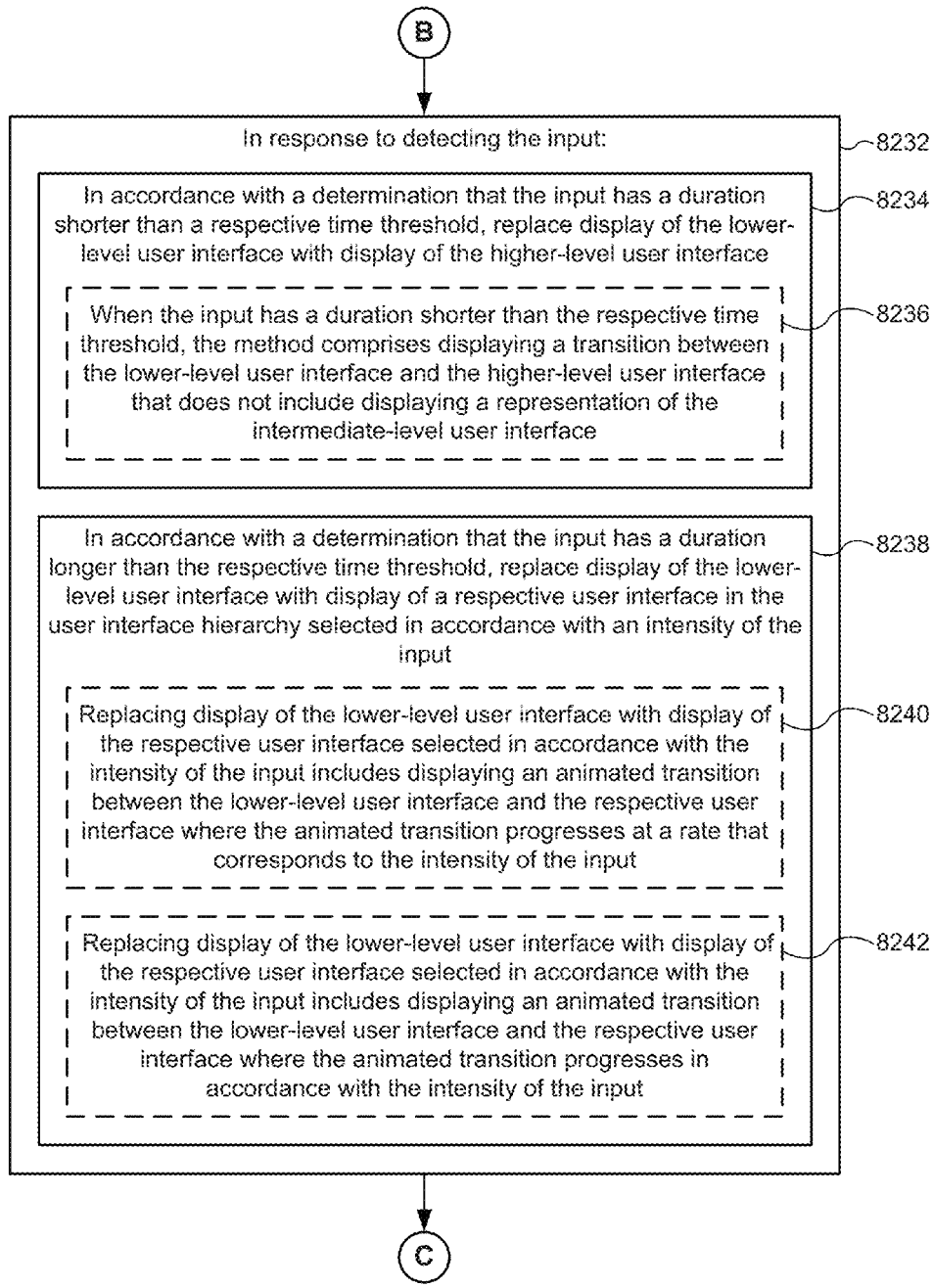
Figure 9D:
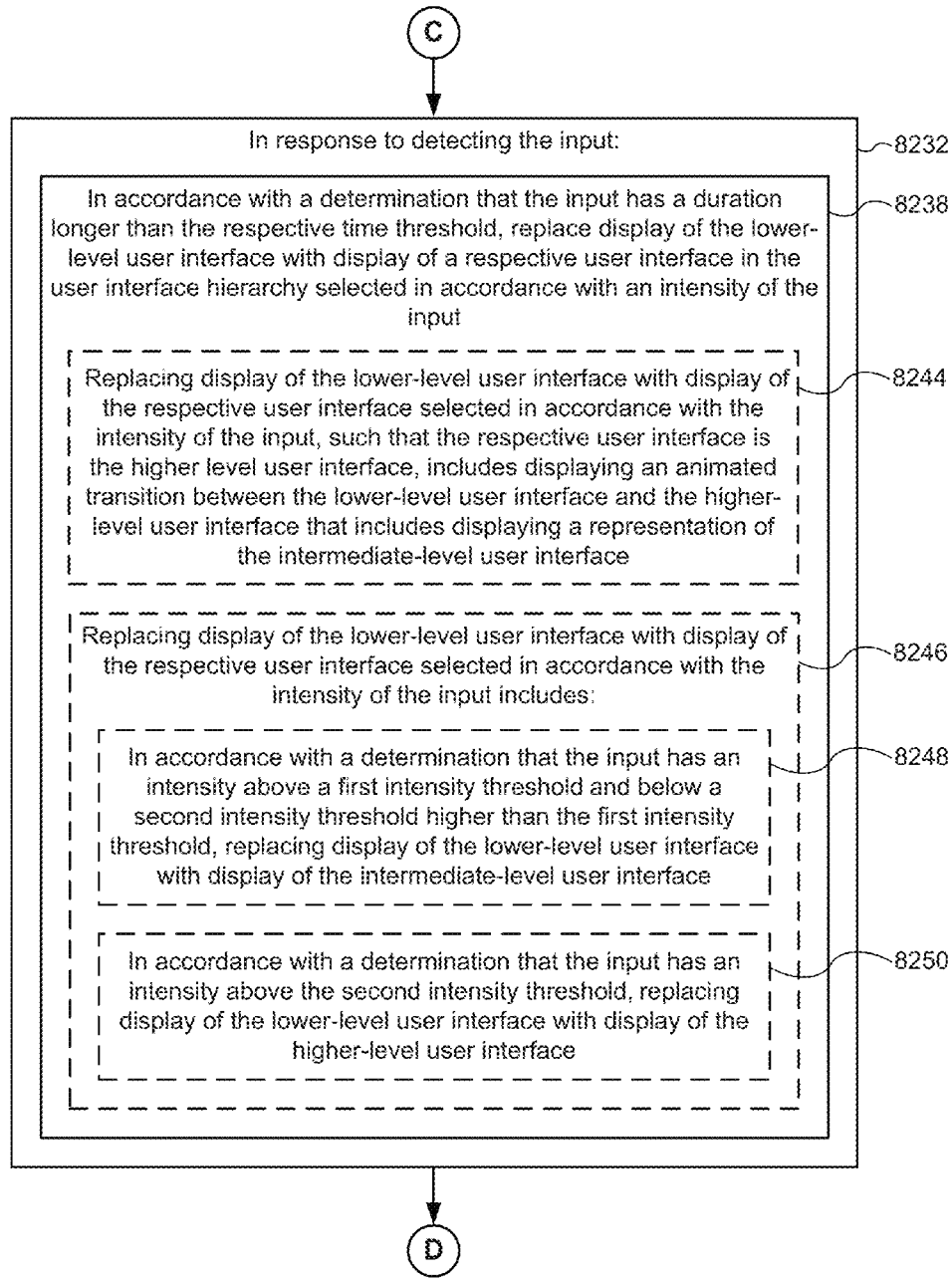
Figure 9E:
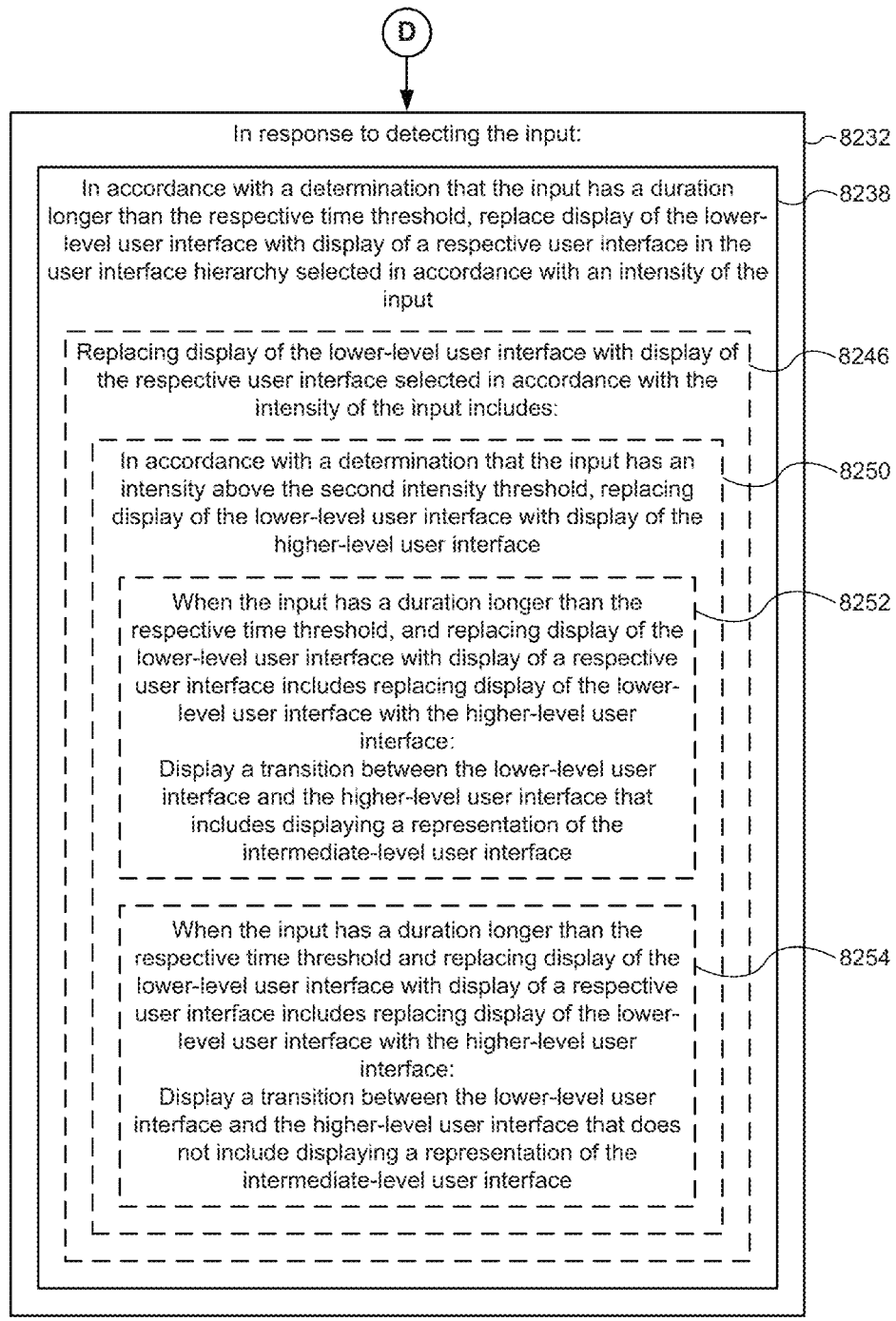

FIGS. 8R-8V illustrate an example of navigating a user interface hierarchy that includes more than three levels, on a portable multifunction device. In this example the duration of input 8128 is above a predefined threshold. In FIG. 8R, device 100 displays lower-level user interface 8124, a media presentation interface, on touch screen 112. FIG. 8R further illustrates input 8128, over home button 204, with intensity above $IT_0$ and below $IT_L$. In FIG. 8S, device 100 displays intermediate-level user interface 8126, a media collection display interface, on touch screen 112. FIG. 8S further illustrates input 8128 with intensity above $IT_L$ and below $IT_D$. In FIG. 8T, device 100 displays user interface 8132, another media collection display interface, on touch screen 112. In FIG. 8U, the device displays higher-level user interface 8134, another media collection display interface, on touch screen 112. FIG. 8U further illustrates input 8128 with intensity above $IT_D$. In FIG. 8V, the device displays user interface 8136 that includes movie application launch icon 8137 on touch screen 112.

FIGS. 9A-9E are flow diagrams illustrating method 8200 of navigating user interface hierarchies in accordance with some embodiments. Method 8200 is performed at an electronic device (e.g., device 300, FIG. 3, or portable multifunction device 100, FIG. 1A) with a display and a touch-sensitive surface. In some embodiments, the display is a touch screen display and the touch-sensitive surface is on the display. In some embodiments, the display is separate from the touch-sensitive surface. Some operations in method 8200 are, optionally, combined and/or the order of some operations is, optionally, changed.

As described below, method 8200 provides an intuitive way to navigate user interface hierarchies. The method reduces the cognitive burden on a user when navigating user interface hierarchies, thereby creating a more efficient human-machine interface. For battery-operated electronic devices, enabling a user to navigate user interface hierarchies faster and more efficiently conserves power and increases the time between battery charges.

The device displays (8202), on the display, a lower-level user interface that is part of a user interface hierarchy. The hierarchy includes (8204) at least three levels, including the lower-level user interface, an intermediate-level user interface and a higher-level user interface. The intermediate-level user interface is above the lower-level user interface in the hierarchy. The higher-level user interface is above both the intermediate-level user interface and the lower-level user interface in the hierarchy. In FIG. 8C, for example, the device displays lower-level user interface 8100 including book 8101. In this example, FIG. 8F illustrates intermediate-level user interface 8104 and FIG. 8I illustrates higher-level user interface 8110.

In some embodiments, the hierarchy includes (8206) exactly three levels in order from highest to lowest: the higher-level user interface; the intermediate-level user interface; and the lower-level user interface. For example, in these embodiments, lower-level user interface 8112 in FIG. 8L, intermediate-level user interface 8118 in FIG. 8M, and higher-level user interface 8122 in FIG. 8N are a complete user interface hierarchy with exactly three levels.

In some embodiments, the higher-level user interface is (8208) adjacent to the intermediate-level user interface in the hierarchy and the intermediate-level user interface is adjacent to the lower-level user interface in the hierarchy. For example, in these embodiments, lower-level user interface 8100 in FIG. 8C is adjacent to intermediate-level user interface 8104 in FIG. 8F and higher-level user interface 8110 in FIG. 8I is adjacent to intermediate-level user interface 8104 in FIG. 8F.

In some embodiments, the hierarchy includes (8210) more than three levels. For example, one or more levels above the higher-level user interface, one or more levels between the higher-level user interface and the intermediate-level user interface, one or more levels between the intermediate-level user interface and the lower-level user interface, and/or one or more levels below the lower-level user interface, or any combination thereof. FIGS. 8R-8V, for example, illustrate a user interface hierarchy with more than three levels. FIG. 8R illustrates lower-level user interface 8124, FIG. 8T illustrates intermediate-level user interface 8126, and FIG. 8U, in these embodiments, illustrates higher-level user interface 8134. In addition, FIG. 8S illustrates user interface 8132 between intermediate-level user interface 8126 and higher-level user interface 8134 and FIG. 8V illustrates user interface 8136 above higher-level user interface 8134.

In some embodiments, the lower-level and intermediate-level user interfaces are (8212) user interfaces in a single application (e.g., a book, music, video or other media application). The higher-level user interface is an application launch user interface. (e.g., a home screen). For example, FIGS. 8C-8I illustrate a user interface hierarchy involving a book application. FIG. 8C illustrates lower-level user interface 8100 including book 8101. FIG. 8F illustrates intermediate-level user interface 8104 including book library 8105. FIG. 8I illustrates higher-level user interface 8110 including book application launch icon 8111.

In some embodiments, the lower-level, intermediate-level and higher-level user interfaces are (8214) user interfaces in a single application. FIGS. 8R-8U illustrate an example where the lower-level, intermediate-level and higher-level user interfaces are user interfaces in a single application. FIG. 8R illustrates lower-level user interface 8124, FIG. 8S illustrates intermediate-level user interface 8126, and FIG. 8U, in these embodiments, illustrates higher-level user interface 8134, all of which are user interfaces for a movie application.

In some embodiments, the lower-level user interface is (8216) a media presentation interface (e.g., text, image, video or audio playback). The intermediate-level user interface is a media collection display interface (e.g., music/book/photo/video library, reading list, or playlist) of a media player application. The higher-level user interface is an application launch user interface (e.g., desktop or home screen) that includes an icon representing the media player application. For example, FIG. 8R illustrates lower-level user interface 8124 (a media presentation interface), FIG. 8S illustrates intermediate-level user interface 8126 (a media collection display interface), and FIG. 8V, in these embodiments, illustrates higher-level user interface 8136 (an application launch user interface).

In some embodiments, the lower-level user interface is (8218) a subfolder. The intermediate-level user interface is a folder containing the subfolder. The higher-level user interface is an application launch interface (e.g., a home-screen or desktop including one or more application launch icons) that includes an icon representing the folder. For example, FIG. 8L illustrates lower-level user interface 8112 including child folder 1 contents 8113 (a subfolder), FIG. 8M illustrates intermediate-level user interface 8118 including parent folder contents 8121 (a folder containing the subfolder), and FIG. 8N illustrates higher-level user interface 8122 that includes folders icon 8123 (an application launch interface that includes an icon representing the folder).

The device, while displaying the lower-level user interface, detects (8220) an input on a portion of the device that is associated with user interface hierarchy navigation (e.g., an icon on a touch-screen display, a region on a touch-sensitive surface, or a physical button with integrated intensity sensor(s)). For example, FIG. 8A illustrates lower-level user interface 8100 displayed on display 450 and input 8103 detected on touch-sensitive surface 451. FIG. 8A further illustrates a cursor 8108 is a displayed representation of a focus selector corresponding to input 8103, over home icon 8102.

In some embodiments, the portion of the device on which the input is detected is (8222) a physical button (e.g., home button 204, FIG. 8O). For example, FIG. 8P illustrates input 8127 over home button 204 of portable multifunction device 100.

In some embodiments, the portion of the device on which the input is detected is (8224) a portion of the touch-sensitive surface that is associated with hierarchy navigation. For example, in FIG. 8J, input 8119 is detected over portion 8116 of user interface 8112. In this example, portion 8116 of user interface 8112 is associated with hierarchy navigation.

In some embodiments, the portion of the device on which the input is detected is (8226) a portion of a touch screen display that includes an icon associated with hierarchy navigation (e.g., a "back" button in a user interface). For example, FIG. 8A illustrates input 8103 detected on touch-sensitive surface 451. FIG. 8A further illustrates a cursor is a displayed representation of a focus selector corresponding to input 8103, over home icon 8102. In this example, home icon 8102 is associated with hierarchy navigation.

In some embodiments, the input is (8228) a contact on a touch-sensitive surface. For example, in FIG. 8J input 8119 (e.g., a contact) is detected on touch-sensitive display 8114.

In some embodiments, the input includes a contact detected on the touch-sensitive surface. The input is (8230) a stationary gesture (e.g., a stationary press input) that does not include lateral movement of the contact on the touch-sensitive surface. For example, in FIG. 8J input 8119 is detected on touch-sensitive display 8114 and consists of a contact without any lateral movement.

In response to detecting the input (8232), in accordance with a determination that the input has a duration shorter than a respective time threshold (e.g., the input is a tap gesture), the device replaces (8234) display of the lower-level user interface with display of the higher-level user interface. In some embodiments, as long as the input has a duration shorter than the respective time threshold, the lower-level user interface is replaced with the higher-level user interface without consideration of an amount of intensity by which the input exceeds an input detection threshold. For example, in FIGS. 8A-8B input 8103 has a duration below a respective time threshold and the device replaces lower-level interface 8100 in FIG. 8A with higher-level interface 8110 in FIG. 8B.

In some embodiments, when the input has a duration shorter than the respective time threshold, the device displays (8236) a transition between the lower-level user interface and the higher-level user interface that does not include displaying a representation of the intermediate-level user interface. For example, FIGS. 8A-8B illustrate a transition between lower-level user interface 8100 in FIG. 8A and higher-level user interface 8110 in FIG. 8B, in response to the device detecting input 8103 with a duration shorter than a respective time threshold.

In response to detecting the input (8232), in accordance with a determination that the input has a duration longer than the respective time threshold (e.g., the input is a long press gesture), the device replaces (8238) display of the lower-level user interface with display of a respective user interface in the user interface hierarchy selected in accordance with an intensity of the input. In some of these embodiments, if the input is a tap gesture, the device responds as though a user had pressed a physical button quickly by performing a discrete operation (replacing display of the lower-level user interface with display of the higher-level user interface), whereas if the input is a long press gesture, the device provides intensity feedback by performing an operation that is based on a detected intensity of the input (replacing display of the lower-level user interface with display of a respective user interface in the user interface hierarchy, such as the intermediate-level user interface or the higher-level user interface, depending on the intensity of the input), where the detected intensity is within a range of contact intensity values that are detectable by the device. For example, in FIG. 8I input 8106 has intensity above $IT_D$ and the device replaces lower-level interface 8100 (in FIG. 8A) with intermediate-level interface 8104.

In some embodiments, replacing display of the lower-level user interface with display of the respective user interface selected in accordance with the intensity of the input includes (8240) displaying an animated transition between the lower-level user interface and the respective user interface where the animated transition progresses at a rate that corresponds to the intensity of the input. For example, a plurality of speeds of progressing through the animated transition are mapped to corresponding contact intensity values of a plurality of detectable contact intensity values, and the speed of progression of the animated transition increases as the intensity of the input increases. In these embodiments the animated transition illustrated in FIGS. 8C-8I progresses at a rate corresponding to the intensity of input 8106.

In some embodiments, replacing display of the lower-level user interface with display of the respective user interface selected in accordance with the intensity of the input includes (8242) displaying an animated transition between the lower-level user interface and the respective user interface where the animated transition progresses in accordance with the intensity of the input. For example, a plurality of states of the animation are mapped to corresponding contact intensity values of a plurality of detectable contact intensity values, and the animated transition progresses as the intensity of the input increases from a first intensity threshold to a second intensity threshold higher than the first intensity threshold. In these embodiments the animated transition illustrated in FIGS. 8C-8I progresses as the intensity of input 8106 increases from intensity above $IT_0$ and below $IT_L$ in FIG. 8C to intensity above $IT_D$ in FIG. 8I.

In some embodiments, replacing display of the lower-level user interface with display of the respective user interface selected in accordance with the intensity of the input, such that the respective user interface is the higher level user interface, includes (8244) displaying an animated transition between the lower-level user interface and the higher-level user interface that includes displaying a representation of the intermediate-level user interface. In these embodiments, if the transition is between two non-adjacent levels of the hierarchy (e.g., the lower-level user interface and the higher-level user interface), when displaying the animated transition, the device displays one or more interstitial user interfaces between the two non-adjacent levels of the hierarchy to provide context for the user as to the navigation within the hierarchy. For example, in accordance with these embodiments, the animated transition illustrated in FIGS. 8C-8I includes display of intermediate-level interface 8104 in FIG. 8F.

In some embodiments, replacing display of the lower-level user interface with display of the respective user interface selected in accordance with the intensity of the input (8246) includes, in accordance with a determination that the input has an intensity above a first intensity threshold (e.g., a single-step-transition intensity threshold) and below a second intensity threshold higher than the first intensity threshold, replacing (8248) display of the lower-level user interface with display of the intermediate-level user interface (e.g., if the input has an intensity between the first intensity threshold and the second intensity threshold, the respective user interface is the intermediate-level user interface). For example, in FIG. 8F the intensity of contact 8106 is above $IT_L$ and below $IT_D$ and the device replaces lower-level user interface 8100 in FIG. 8A with intermediate-level user interface 8104.

In some embodiments, replacing display of the lower-level user interface with display of the respective user interface selected in accordance with the intensity of the input (8246) includes, in accordance with a determination that the input has an intensity above the second intensity threshold (e.g., a multi-step-transition intensity threshold), replacing (8250) display of the lower-level user interface with display of the higher-level user interface (e.g., if the input has an intensity above the second intensity threshold, the respective user interface is the higher-level user interface). For example, in FIG. 8I the intensity of contact 8106 is above $IT_D$ and the device replaces lower-level user interface 8100 in FIG. 8A with higher-level user interface 8110.

In some embodiments, when the input has a duration longer than the respective time threshold, and replacing display of the lower-level user interface with display of a respective user interface includes replacing display of the lower-level user interface with the higher-level user interface, the device displays (8252) a transition between the lower-level user interface and the higher-level user interface that includes displaying a representation of the intermediate-level user interface. For example, in accordance with these embodiments, FIGS. 8C-8I illustrate a transition between display of lower-level user interface 8100 and higher-level user interface 8110 including display of intermediate-level interface 8104 in FIG. 8F.

Conversely, in some embodiments, when the input has a duration longer than the respective time threshold and replacing display of the lower-level user interface with display of a respective user interface includes replacing display of the lower-level user interface with the higher-level user interface, the device displays (8254) a transition between the lower-level user interface and the higher-level user interface that does not include displaying a representation of the intermediate-level user interface.

It should be understood that the particular order in which the operations in FIGS. 9A-9E have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., those listed in fifth paragraph of the Description of Embodiments) are also applicable in an analogous manner to method 8200 described above with respect to FIGS. 9A-9E. For example, the inputs, contacts, intensity thresholds, duration thresholds, user interfaces, focus selectors, icons, and buttons described above with reference to method 8200 optionally have one or more of the characteristics of the inputs, contacts, intensity thresholds, duration thresholds, user interfaces, focus selectors, icons, and buttons described herein with reference to other methods described herein (e.g., those listed in fifth paragraph of the Description of Embodiments). For brevity, these details are not repeated here.

Figure 10:
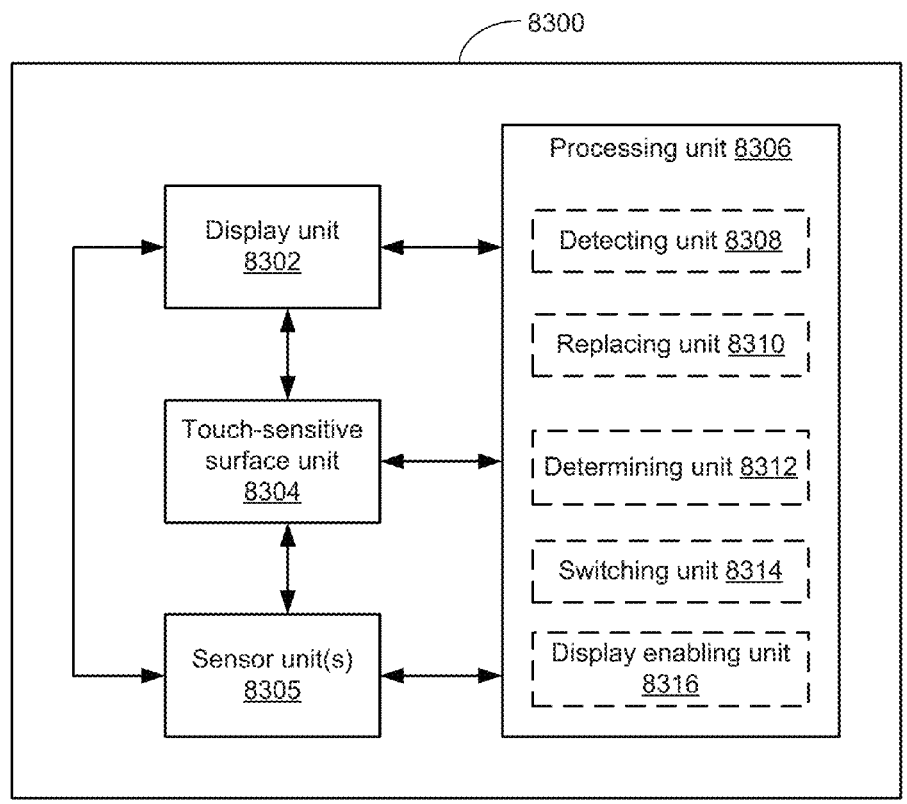
FIG. 10 is a functional block diagram of an electronic device in accordance with some embodiments.

In accordance with some embodiments, FIG. 10 shows a functional block diagram of an electronic device 8300 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 10 are, optionally, combined or separated into sub-blocks to implement the principles of the various described embodiments. Therefore, the description herein optionally supports any possible combination or separation or further definition of the functional blocks described herein.

As shown in FIG. 10, electronic device 8300 includes display unit 8302 configured to display a lower-level user interface that is part of a user interface hierarchy, where: the hierarchy includes at least three levels, including the lower-level user interface, an intermediate-level user interface and a higher-level user interface; the intermediate-level user interface is above the lower-level user interface in the hierarchy; and the higher-level user interface is above both the intermediate-level user interface and the lower-level user interface in the hierarchy. Electronic device 8300 further includes touch-sensitive surface unit 8304 configured to receive user inputs; one or more sensor units 8305 configured to detect intensity of contacts with the touch-sensitive surface unit; and a processing unit 8306 coupled to the display unit 8302, the touch-sensitive surface unit 8304, and the sensor units 8305. In some embodiments, processing unit

8306 includes detecting unit 8308, replacing unit 8310, determining unit 8312, switching unit 8314, and display enabling unit 8316.

Processing unit 8306 is configured to, while displaying the lower-level user interface, detect an input (e.g., with detecting unit 8308) on a portion of the device that is associated with user interface hierarchy navigation and, in response to detecting the input, in accordance with a determination that the input has a duration shorter than a respective time threshold, replace (e.g., with replacing unit 8310) display of the lower-level user interface with display of the higher-level user interface, and in accordance with a determination that the input has a duration longer than the respective time threshold, replace (e.g., with replacing unit 8310) display of the lower-level user interface with display of a respective user interface in the user interface hierarchy selected in accordance with an intensity of the input.

In some embodiments, the portion of the device on which the input is detected (e.g., with detecting unit 8308) is a physical button.

In some embodiments, the portion of the device on which the input is detected (e.g., with detecting unit 8308) is a portion of the touch-sensitive surface unit that is associated with hierarchy navigation.

In some embodiments, the portion of the device on which the input is detected (e.g., with detecting unit 8308) is a portion of a touch screen display unit that includes an icon associated with hierarchy navigation.

In some embodiments, the input is a contact on a touch-sensitive surface unit.

In some embodiments, the input includes a contact detected (e.g., with detecting unit 8308) on the touch-sensitive surface unit and the input is a stationary gesture that does not include lateral movement of the contact on the touch-sensitive surface unit.

In some embodiments, the hierarchy includes exactly three levels in order from highest to lowest: the higher-level user interface; the intermediate-level user interface; and the lower-level user interface.

In some embodiments, the higher-level user interface is adjacent to the intermediate-level user interface in the hierarchy and the intermediate-level user interface is adjacent to the lower-level user interface in the hierarchy.

In some embodiments, the hierarchy includes more than three levels.

In some embodiments, the lower-level and intermediate-level user interfaces are user interfaces in a single application and the higher-level user interface is an application launch user interface.

In some embodiments, the lower-level, intermediate-level and higher-level user interfaces are user interfaces in a single application.

In some embodiments, the lower-level user interface is a media presentation interface, the intermediate-level user interface is a media collection display interface of a media player application, and the higher-level user interface is an application launch user interface that includes an icon representing the media player application.

In some embodiments, the lower-level user interface is a subfolder, the intermediate-level user interface is a folder containing the subfolder, and the higher-level user interface is an application launch interface that includes an icon representing the folder.

In some embodiments, replacing (e.g., with replacing unit 8310) display of the lower-level user interface with the higher-level user interface includes enabling display of (e.g., with display enabling unit 8316) an animated transition between the lower-level user interface and the higher-level user interface where the animated transition progresses at a rate that corresponds to the intensity of the input.

In some embodiments, replacing (e.g., with replacing unit 8310) display of the lower-level user interface with the higher-level user interface includes enabling display of (e.g., with display enabling unit 8316) an animated transition between the lower-level user interface and the higher-level user interface where the animated transition progresses in accordance with the intensity of the input.

In some embodiments, replacing (e.g., with replacing unit 8310) display of the lower-level user interface with display of the respective user interface selected in accordance with the intensity of the input, such that the respective user interface is the higher level user interface, includes enabling display of (e.g., with display enabling unit 8316) an animated transition between the lower-level user interface and the higher-level user interface that includes enabling display of a representation of the intermediate-level user interface.

In some embodiments, replacing (e.g., with replacing unit 8310) display of the lower-level user interface with display of the respective user interface selected in accordance with the intensity of the input includes, in accordance with a determination that the input has an intensity above a first intensity threshold and below a second intensity threshold higher than the first intensity threshold, replacing (e.g., with replacing unit 8310) display of the lower-level user interface with display of the intermediate-level user interface, and, in accordance with a determination that the input has an intensity above the second intensity threshold, replacing (e.g., with replacing unit 8310) display of the lower-level user interface with display of the higher-level user interface.

In some embodiments, when the input has a duration longer than the respective time threshold, and replacing (e.g., with replacing unit 8310) display of the lower-level user interface with display of a respective user interface includes replacing display (e.g., with replacing unit 8310) of the lower-level user interface with the higher-level user interface, the processing unit is further configured to enable display of (e.g., with display enabling unit 8316) a transition between the lower-level user interface and the higher-level user interface that includes enabling display of (e.g., with display enabling unit 8316) a representation of the intermediate-level user interface.

In some embodiments, when the input has a duration longer than the respective time threshold and replacing (e.g., with replacing unit 8310) display of the lower-level user interface with display of a respective user interface includes replacing (e.g., with replacing unit 8310) display of the lower-level user interface with the higher-level user interface, the processing unit is further configured to enable display of (e.g., with display enabling unit 8316) a transition between the lower-level user interface and the higher-level user interface that does not include enabling display of (e.g., with display enabling unit 8316) a representation of the intermediate-level user interface.

In some embodiments, when the input has a duration shorter than the respective time threshold, the processing unit further configured to enable display of (e.g., with display enabling unit 8316) a transition between the lower-level user interface and the higher-level user interface that does not include enabling display of (e.g., with display enabling unit 8316) a representation of the intermediate-level user interface.

The operations in the information processing methods described above are, optionally implemented by running one or more functional modules in information processing apparatus such as general purpose processors (e.g., as described above with respect to FIGS. 1A and 3) or application specific chips.

The operations described above with reference to FIGS. 9A-9E are, optionally, implemented by components depicted in FIGS. 1A-1B or FIG. 10. For example, detection operation 8220, replacing operation 8234, replacing operation 8236 and switching operation 8246 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Gradually Displaying a User Interface on a Display

Many electronic devices display a graphical user interface on a display in response to a user action (e.g., moving a mouse or pressing a power button) subsequent to the display being in a low-power state (e.g., sleep mode or an off state) where the graphical user interface is not displayed on the display. However the transition between the low-power state and displaying the graphical user interface can be jarring to the user and/or unnecessarily consume power of the device when the user does not want the transition the device out of the low-power state. The embodiments described below improve on these methods by gradually displaying the graphical user interface in response to detecting a change in a characteristic of the contact (e.g., an increase in intensity of the contact) while a display of the device is in a low-power mode. If the input meets display-activation criteria (e.g., the contact exceeds a respective intensity threshold), the device gradually displays a respective user interface on the display (e.g., the respective user interface slides onto the display from an edge of the display) that was not displayed when the device was in the low-power mode. If the input fails to meet display-activation criteria, the device maintains the display in the low-power mode. Furthermore, in some embodiments, in response to detecting a reversal of the change in the characteristic of the contact (e.g., the intensity of the contact decreases subsequent to increasing in intensity), the device gradually ceases displaying the respective user interface (e.g., the respective user interface slides off of the display towards an edge of the display). Gradually displaying the graphical user interface in response to detecting the change in the characteristic of the contact provides an efficient and intuitive user interface that reduces the cognitive burden on the user and enables the user to cancel display of the graphical user interface if the user does not want to transition the device out of the low-power state after viewing the first portion of the gradual display of the user interface.

FIGS. 11A-11U illustrate exemplary user interfaces for gradually displaying a respective user interface on a display in accordance with some embodiments. The user interfaces in these figures are used to illustrate the processes described below, including the processes in FIGS. 12A-12D. FIGS. 11B-11L and 11S-11U include intensity diagrams that show the current intensity of the contact on the touch-sensitive surface relative to a plurality of intensity thresholds including a gradual display intensity threshold (e.g., "$IT_1$") and a display confirmation intensity threshold (e.g., "$IT_L$"). In some embodiments, operations similar to those described below with reference to "$IT_1$" are performed with reference to a different intensity threshold (e.g., "$IT_0$," "$IT_L$," or "$IT_D$").

In some embodiments, the device is an electronic device with a separate display (e.g., display 450) and a separate touch-sensitive surface (e.g., touch-sensitive surface 451). In some embodiments, the device is portable multifunction device 100, the display is a touch screen 112, and the touch-sensitive surface includes tactile output generators 167 on the display (FIG. 1A). For convenience of explanation, the embodiments described with reference to FIGS. 11A-11U and 12A-12D will be discussed with reference to portable multifunction device 100 with touch screen 112; however, analogous operations are, optionally, performed on a device with a display 450 and a separate touch-sensitive surface 451 in response to detecting the contacts described in FIGS. 11A-11U on touch-sensitive surface 451 while displaying the user interfaces shown in FIGS. 11A-11U on display 450.

FIG. 11A illustrates portable multifunction device 100 with a display (e.g., touch screen 112). In this example, touch screen 112 is in a low-power mode (e.g., off). FIG. 11A further illustrates menu button 204. In some embodiments, menu button is touch-sensitive (e.g., a contact is detected on menu button 204 via capacitive sensing). In some embodiments, the menu button is pressure sensitive but not touch-sensitive (e.g., a contact is detected on menu button 204 by an increase in intensity of the contact via one or more sensors).

Figure 11B:
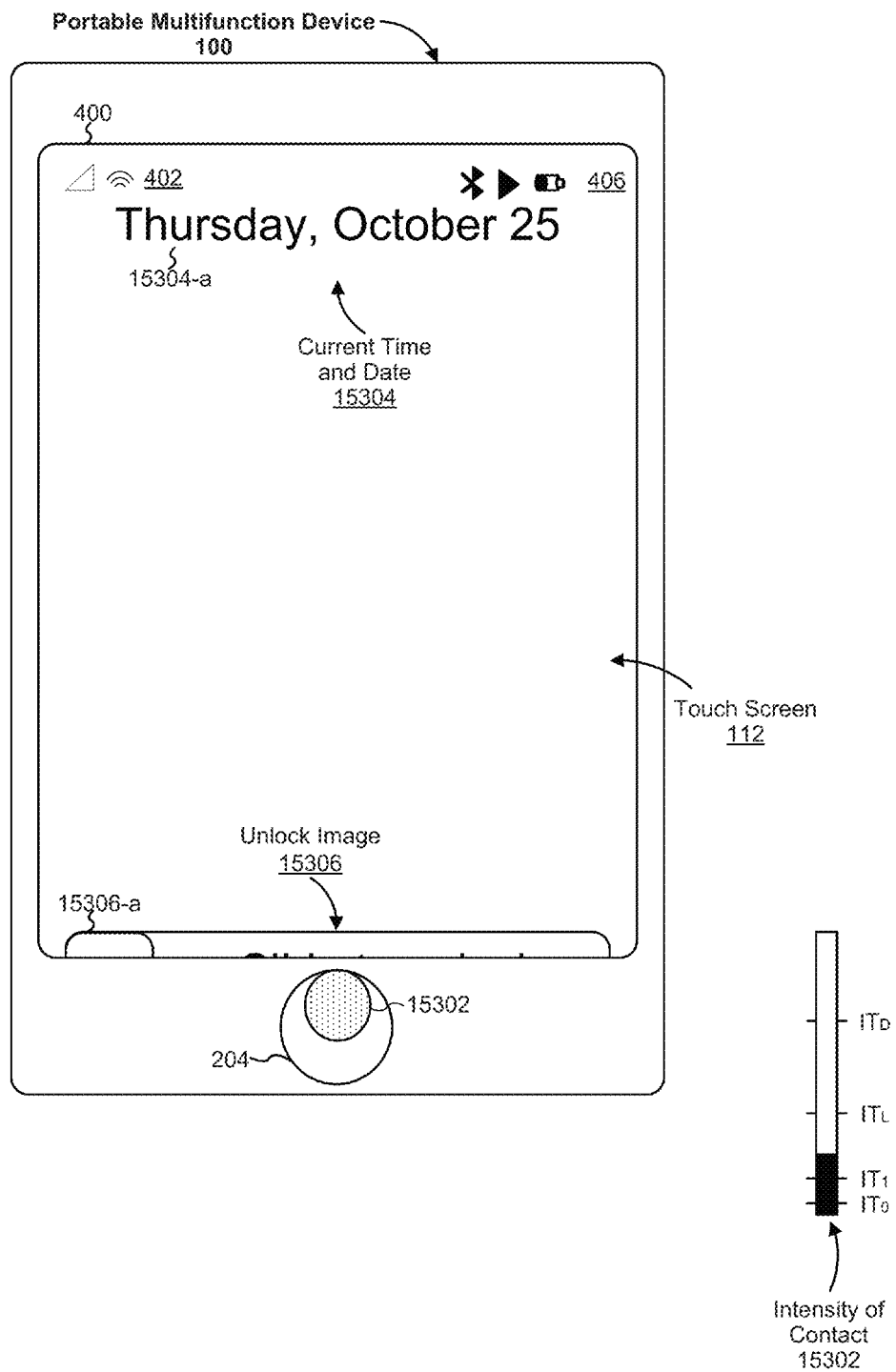
Figure 11C:
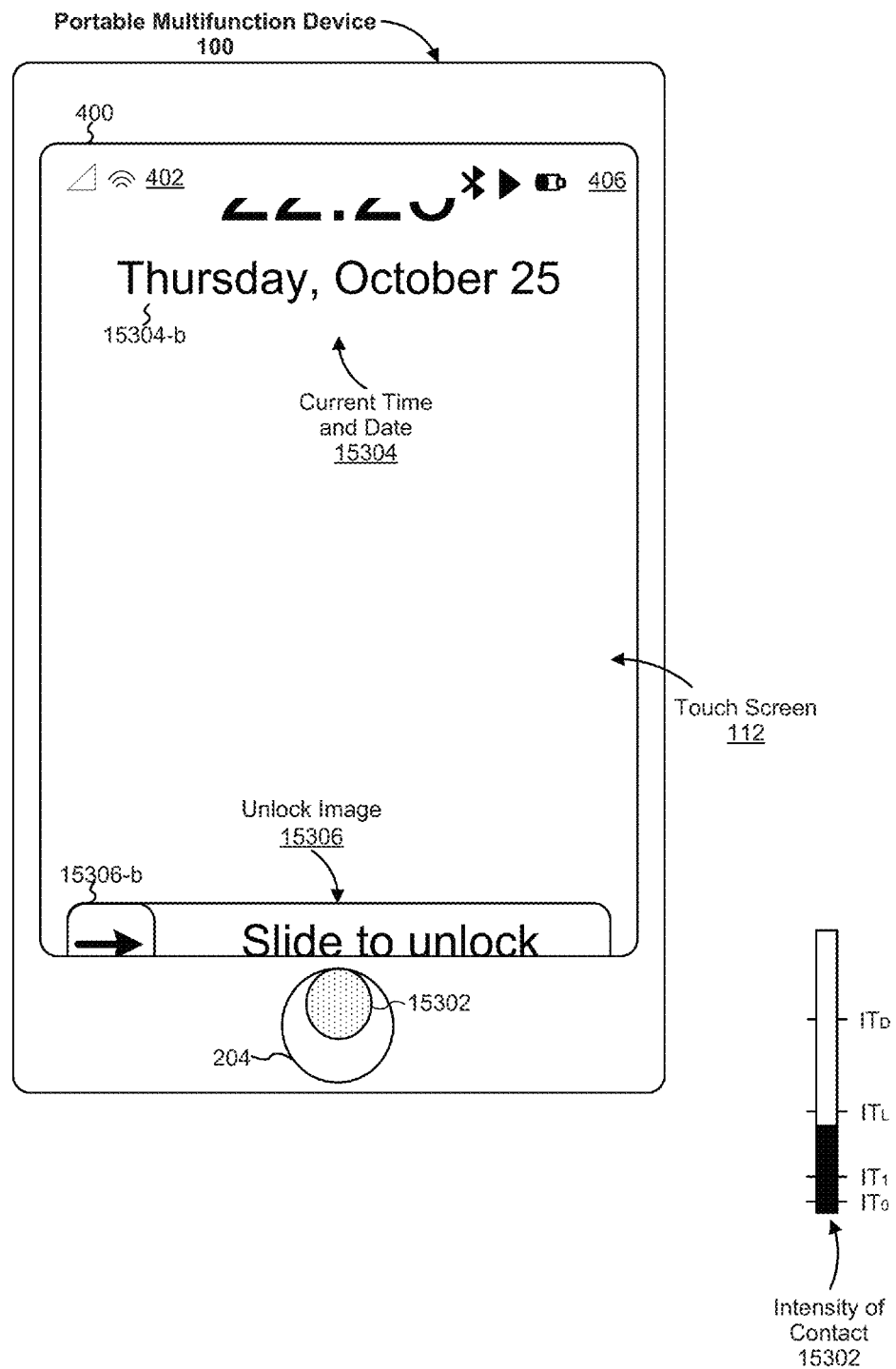
Figure 11D:
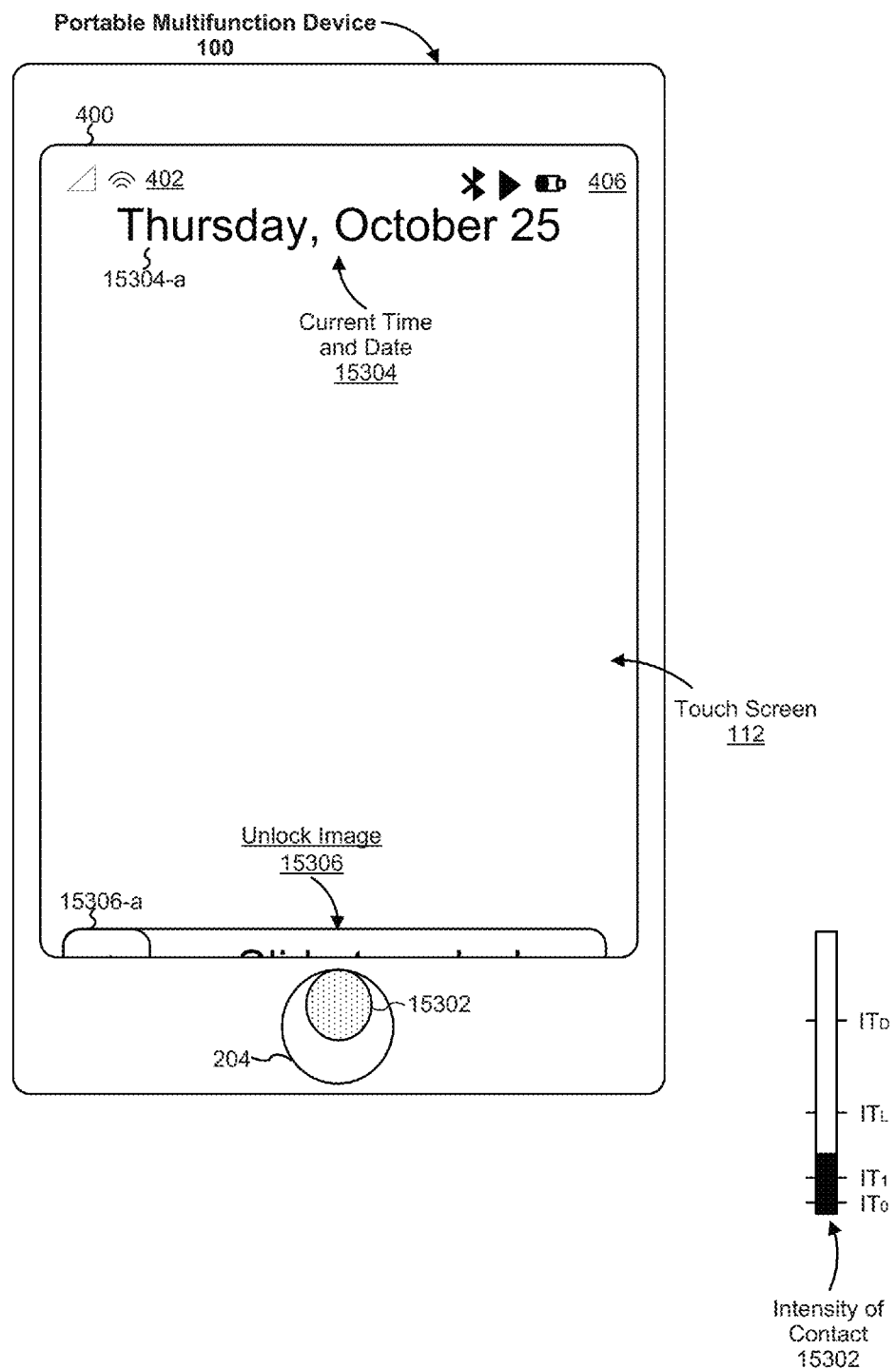
Figure 11E:
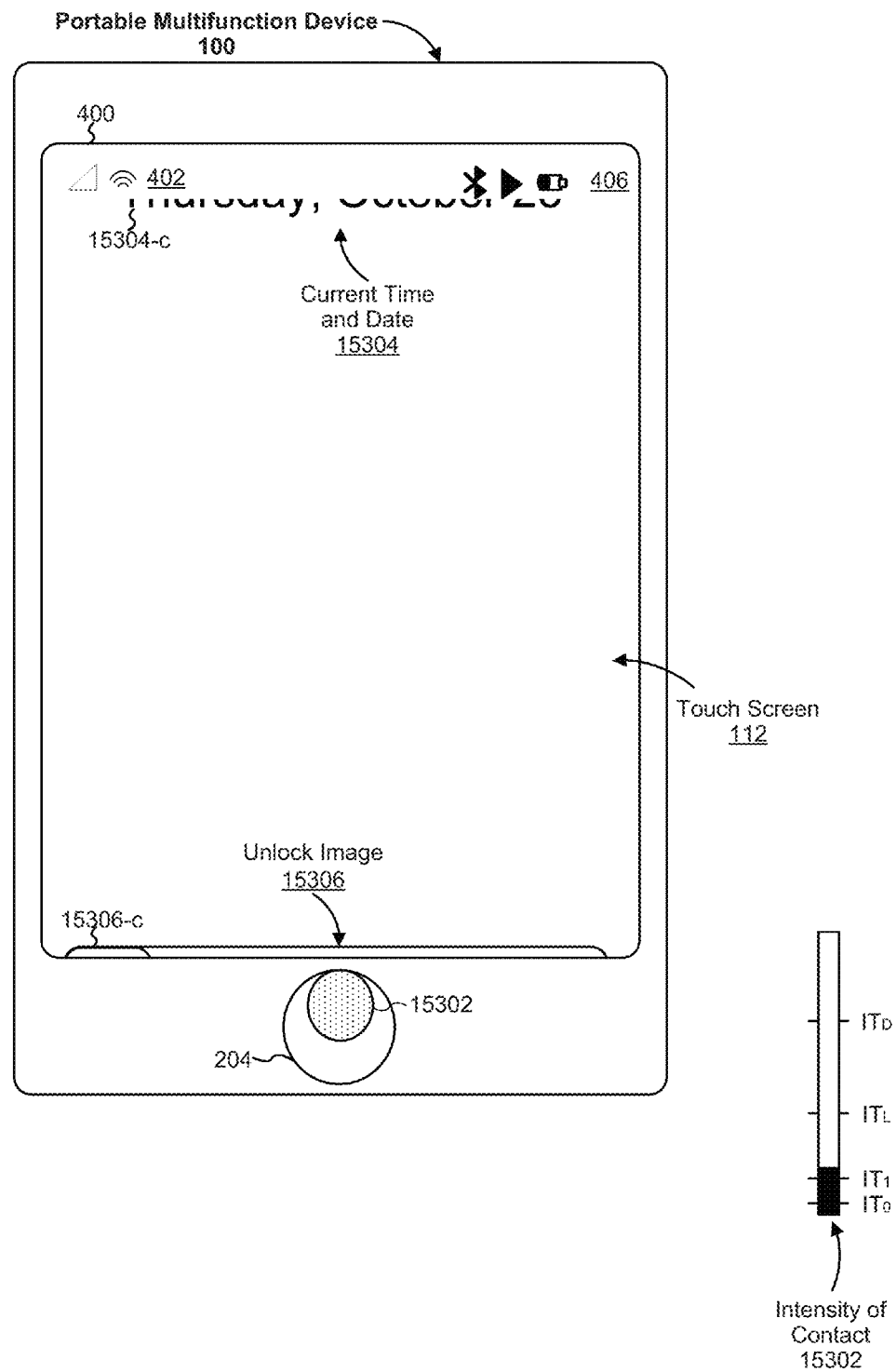

FIGS. 11B-11C illustrate detecting an input on a touch-sensitive surface (e.g., menu button 204) including detecting contact 15302 on menu button 204 and detecting a change in a characteristic (e.g., intensity) of contact 15302 (e.g., an increase in intensity of contact 15302). In this example, in response to detecting the input (e.g., contact 15302 on menu button 204) and in accordance with a determination that the input meets display-activation criteria (e.g., the intensity of contact 15302 is above $IT_1$), the device 100 gradually displays a respective user interface. FIGS. 11B-11C further illustrate user interface 400, including: a communication network signal indicator 402, a battery charge indicator 406, current time and date 15304, and unlock image 15306.

In some embodiments, the respective user interface is not the entire user interface. For example, in some embodiments, one or more objects or user interface portions are displayed even during low-power mode, while other user interface portions (herein called the respective user interface) are not displayed in the low-power mode and are gradually displayed in response to a user input and in accordance a determination that the input meets display-activation criteria.

Figure 11F:
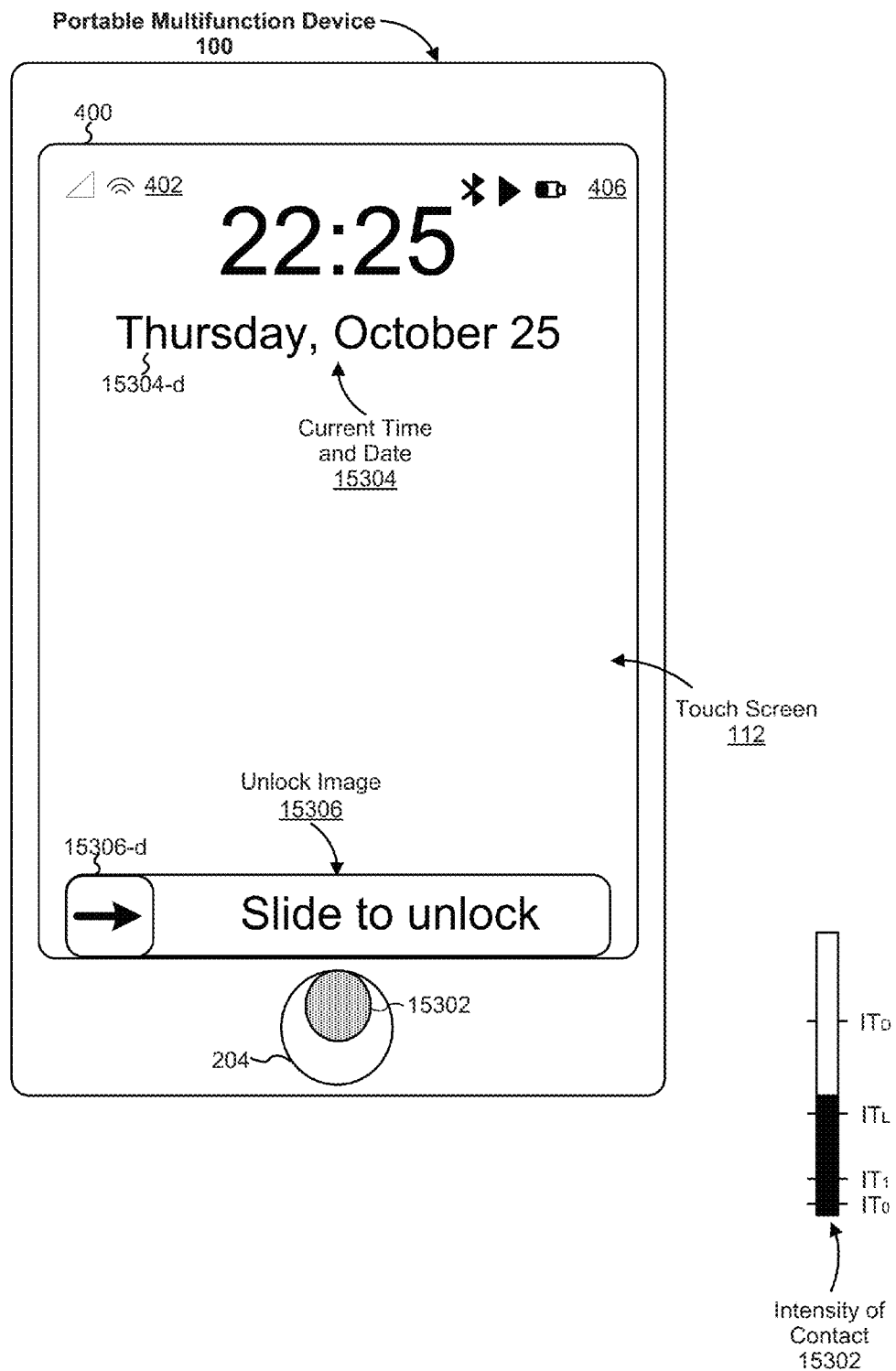

FIGS. 11B-11C and 11F illustrate gradually displaying the respective user interface 400 on touch screen 112 by sliding the current time and date 15304 from a top edge of touch screen 112 towards the center of touch screen 112 (e.g., current time and date 15304 moves from position 15304-a in FIG. 11B through intermediate position 15304-*b* in FIG. 11C to fully displayed position 15304-*d* in FIG. 11F) and by sliding unlock image 15306 from a bottom edge of touch screen 112 towards the center of touch screen 112 (e.g., unlock image 15306 moves from position 15306-*a* in FIG. 11B through intermediate position 15306-*b* in FIG. 11C to fully displayed position 15306-*d* in FIG. 11F). FIGS. 11B-11C and 11F further illustrate the intensity of contact 15302 increasing from below $IT_L$ in FIGS. 11B-11C to above $IT_L$ in FIG. 11F.

FIGS. 11B-11E illustrate detecting a reversal of the change in the characteristic (e.g., the intensity) of the contact after at least partially displaying the respective user interface on the display (e.g., current time and date 15304 and unlock image 15306 are partially displayed on touch screen 112 in positions 15304-*b* and 15306-*b*, respectively, in FIG. 11C). In this example, the intensity of contact 15302 increases between FIGS. 11B-11C; then, the intensity of contact 15302 decreases between FIGS. 11C-11D (e.g., a reversal of the change in the intensity of contact 15302). FIG. 11D-11E further illustrate gradually ceasing to display the respective user interface in response to detecting the reversal of the change in the characteristic (e.g., the intensity) of the contact. In this example, the device gradually ceases to display the respective user interface 400 by sliding the current time and date 15304 from position 15304-*b* in FIG. 11C towards the top edge of touch screen 112 (e.g., through intermediate positions 15304-*a* in FIG. 11D and 15304-*c* in FIG. 11E) and by sliding the unlock image 15306 from position 15306-*b* in FIG. 11C towards the bottom edge of touch screen 112 (e.g., through intermediate positions 15306-*a* in FIG. 11D and 15306-*c* in FIG. 11E). FIGS. 11C-11E further illustrate reversing the gradual appearance of the respective user interface by gradually ceasing to display the respective user interface in accordance with a determination that the characteristic (e.g., the intensity of contact 15302) did not meet or exceed a respective (display confirmation) threshold (e.g., the intensity of contact 15302 does not meet or exceed a display confirmation intensity threshold $IT_L$ in FIGS. 11B-11E) prior to detecting the reversal of the change in the characteristic of the contact (e.g., the decrease in the intensity of contact 15302 between FIGS. 11C-11D).

Figure 11G:
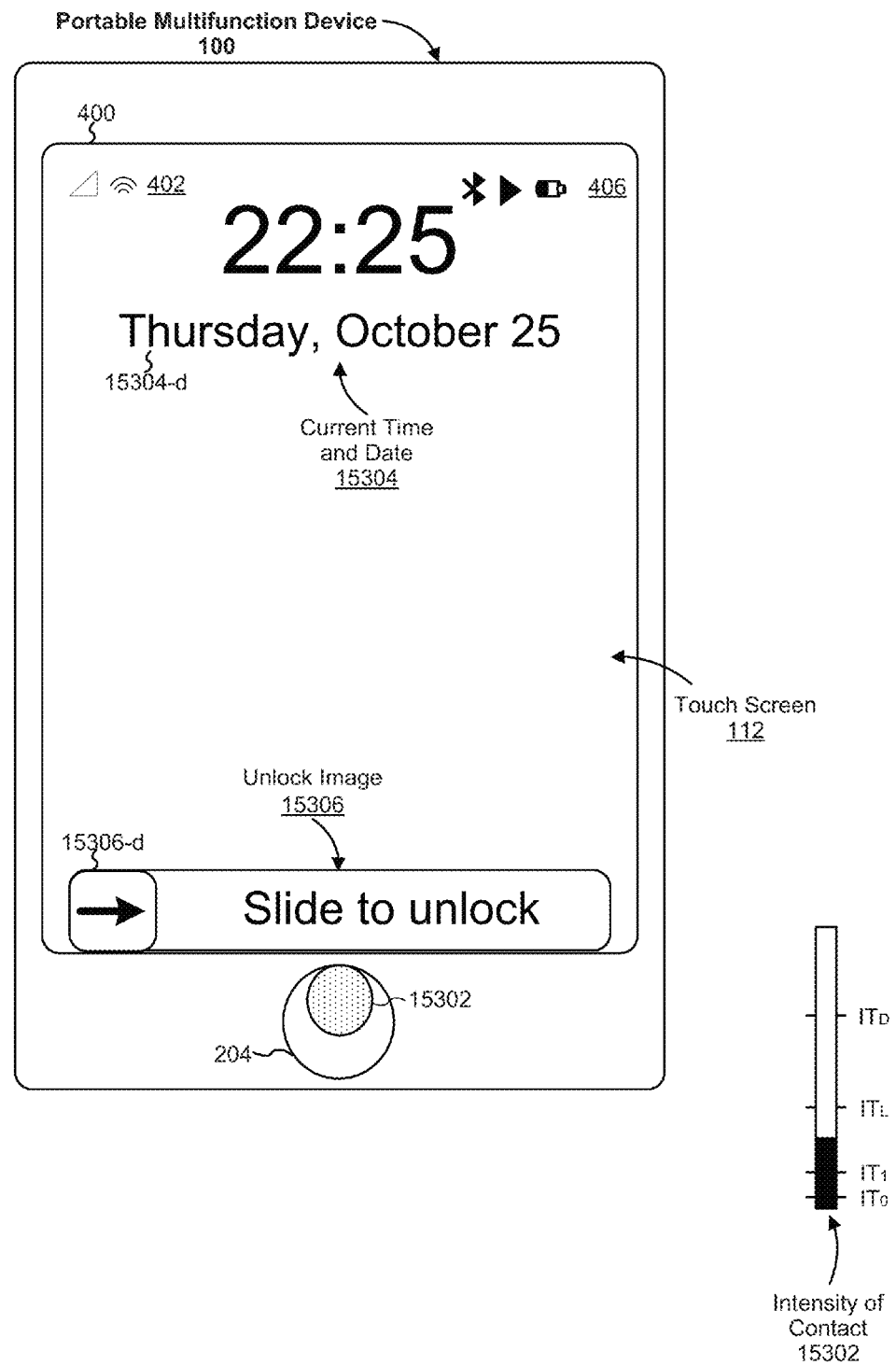
Figure 11H:
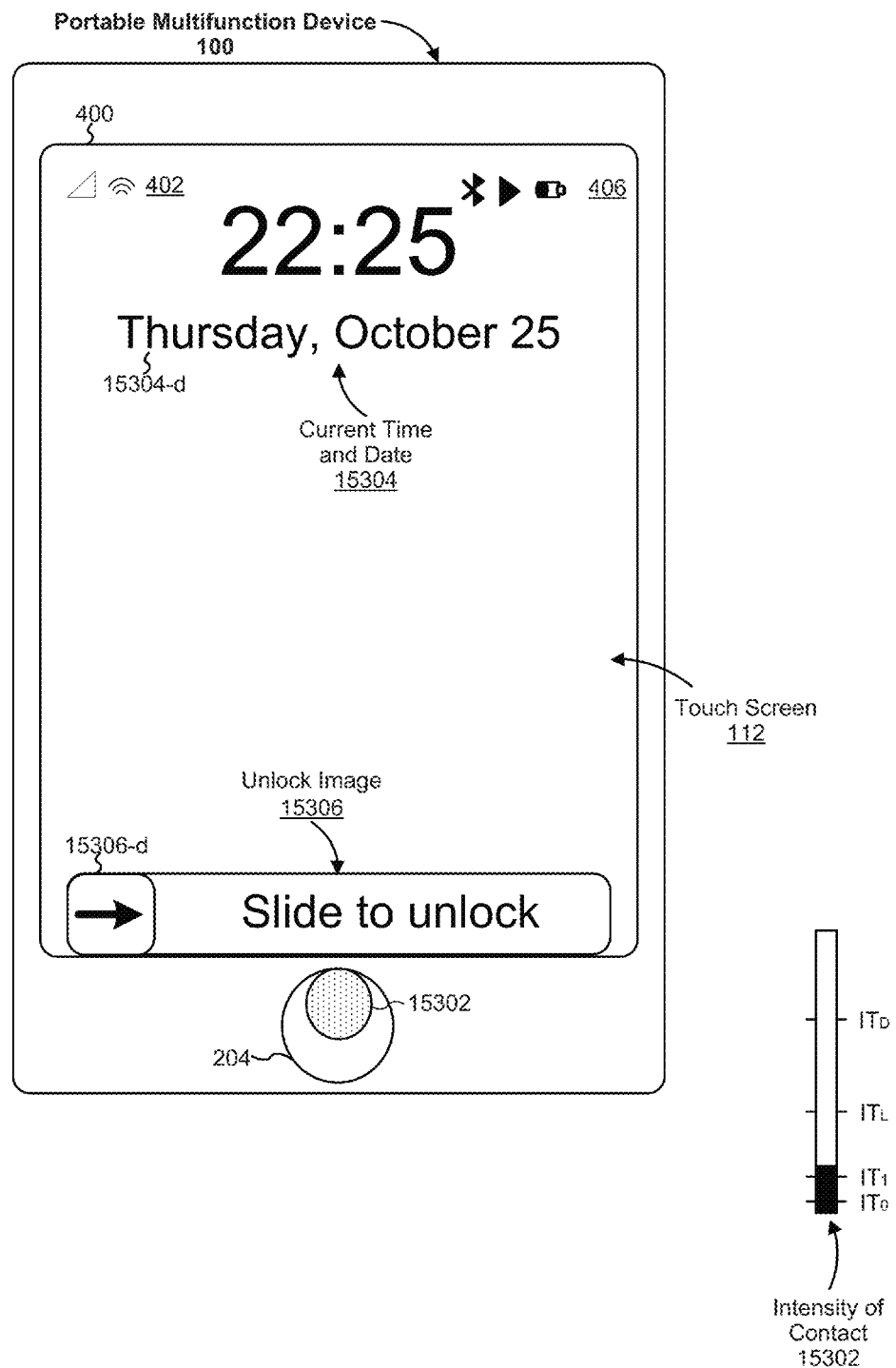
Figure 11I:
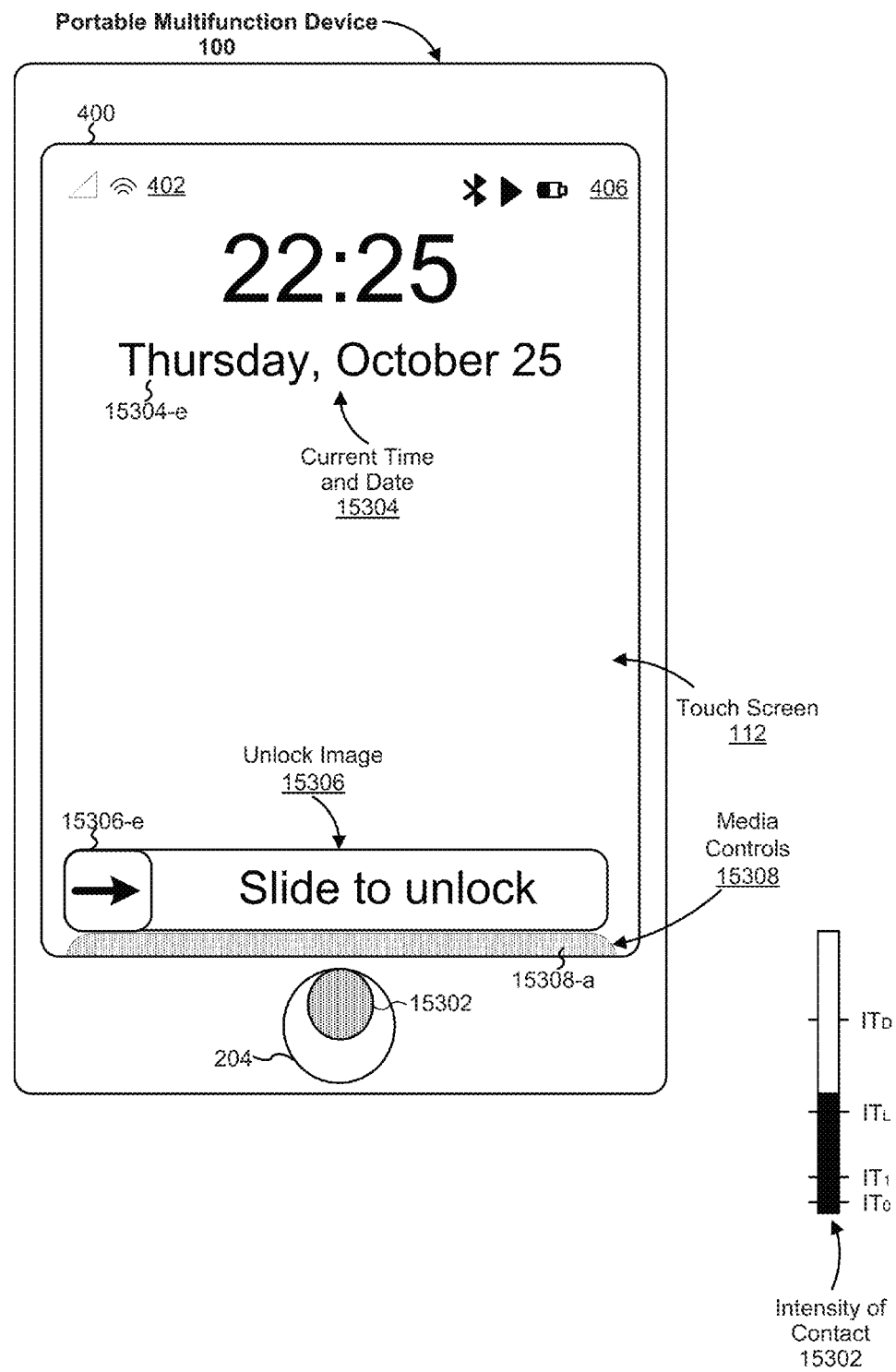
Figure 11J:
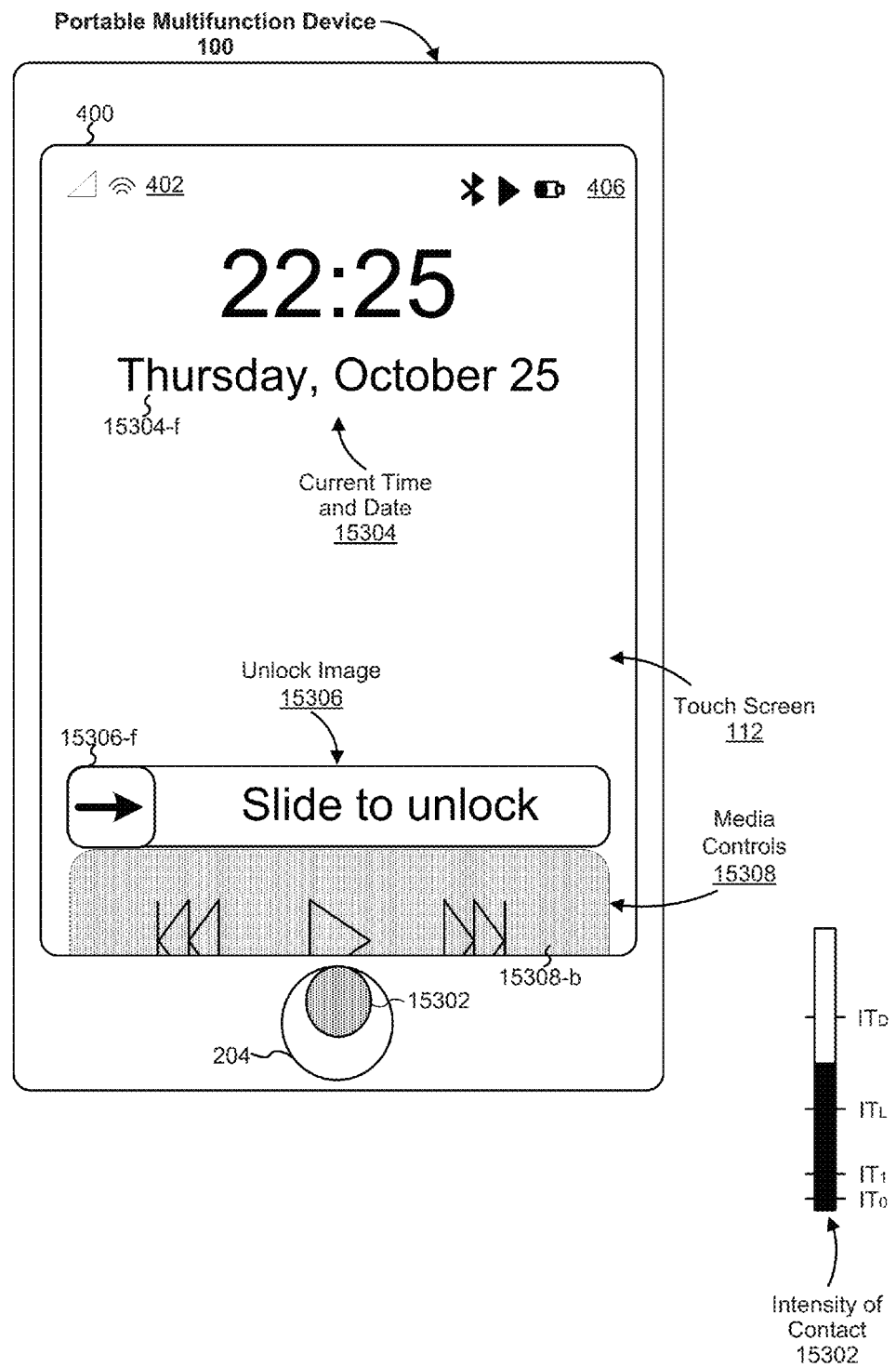
Figure 11K:
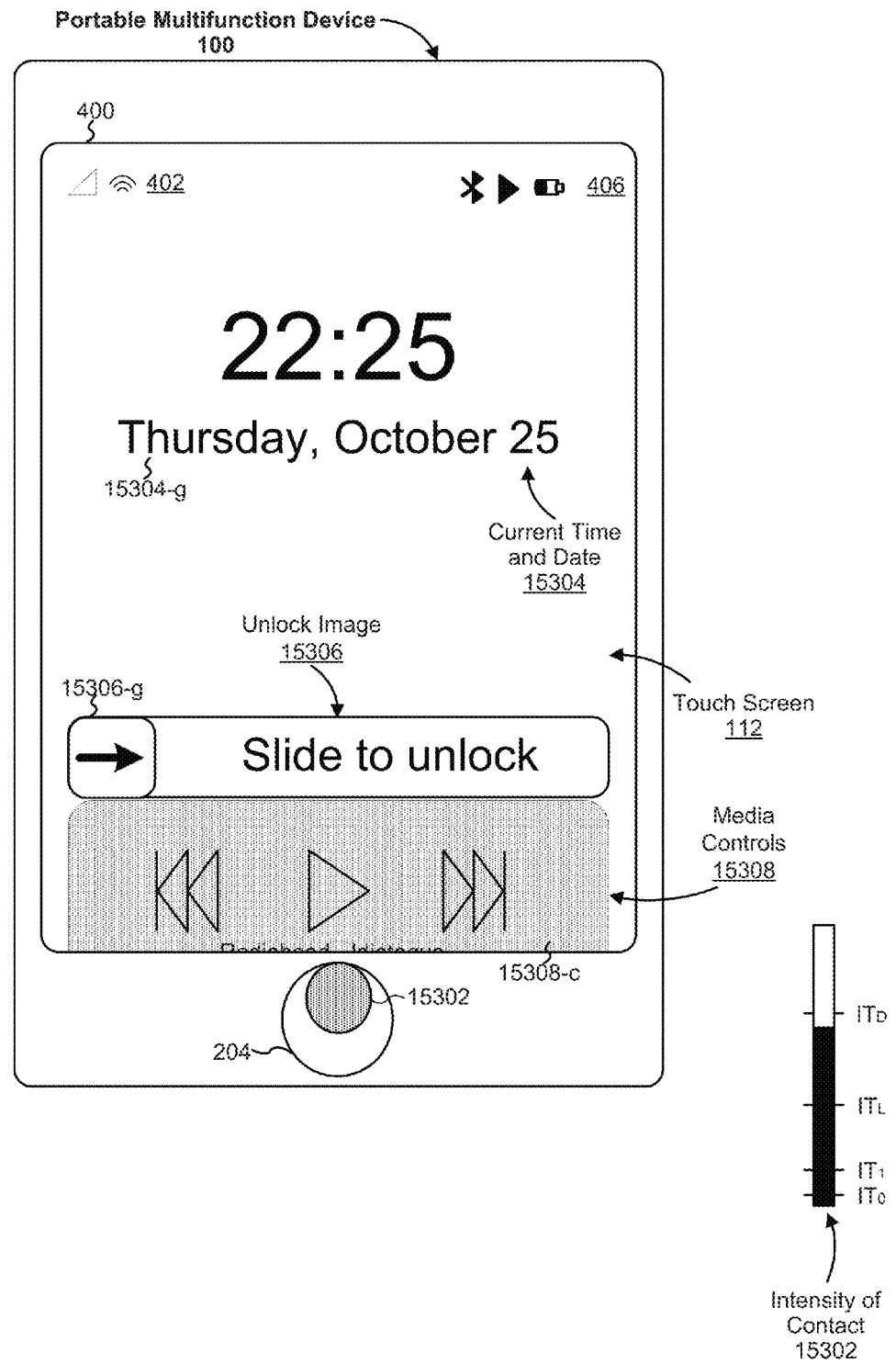
Figure 11L:
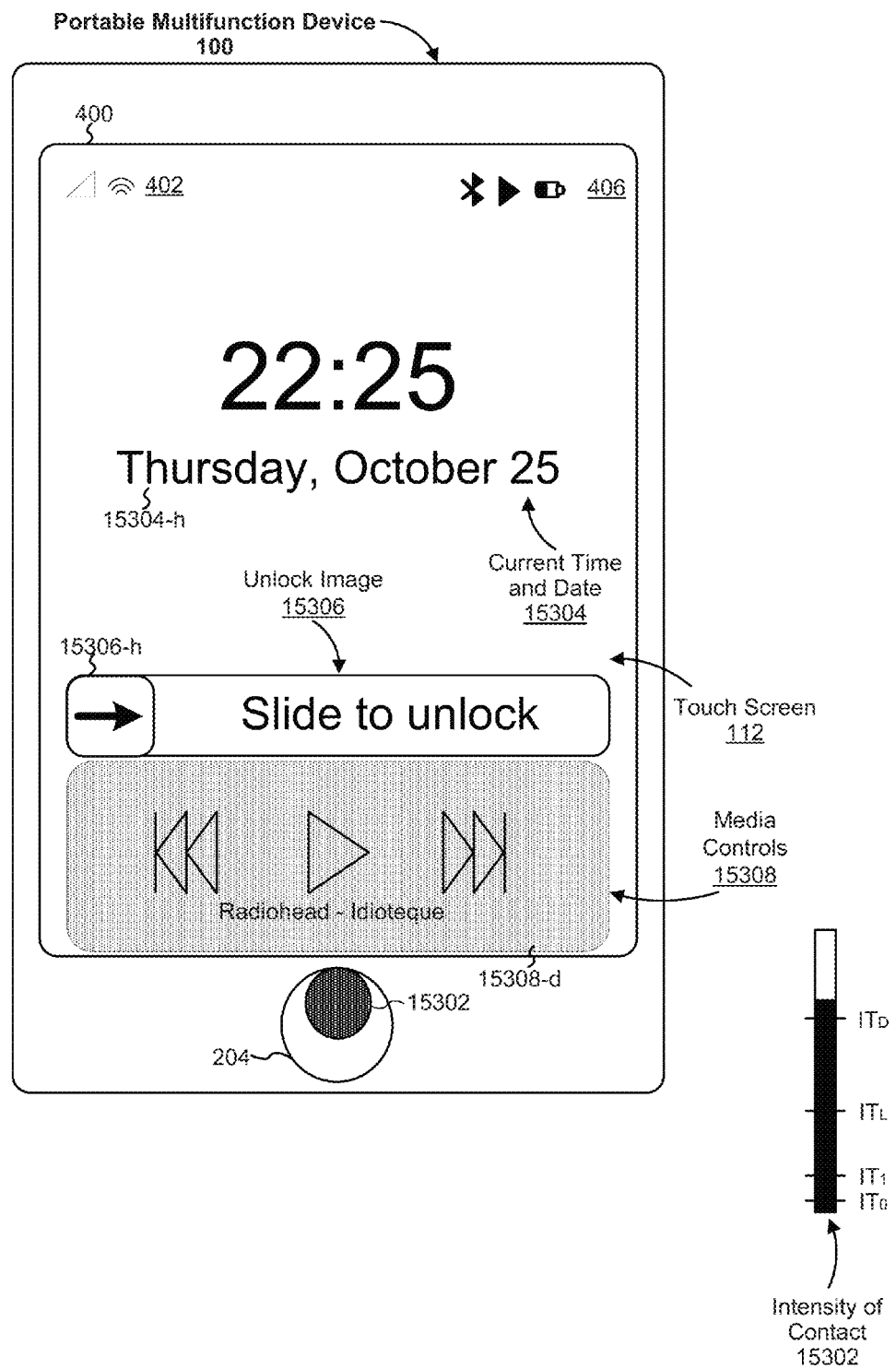

FIGS. 11B-11C and 11F-11H illustrate detecting a reversal of the change in the characteristic (e.g., the intensity) of the contact after at least partially displaying the respective user interface on the display (e.g., in FIG. 11C current time and date 15304 and unlock image 15306 are partially displayed on touch screen 112 in positions 15304-*b* and 15306-*b*, respectively). In this example, the intensity of contact 15302 increases between FIGS. 11B-11C and 11F (e.g., above $IT_L$ in FIG. 11F); then, the intensity of contact 15302 decreases between FIGS. 11F-11G (e.g., below $IT_L$ in FIG. 11G). FIGS. 11G-11H illustrate maintaining display of the respective user interface 400 (e.g., current time and date 15304 remains in position 15304-*d* and unlock image 15306 remains in position 15306-*d*) in accordance with a determination that the characteristic (e.g., the intensity of contact 15302) met or exceeded display confirmation intensity threshold (e.g., the intensity of contact 15302 exceeds $IT_L$ in FIG. 11F) prior to detecting the reversal of the change in the characteristic (e.g., the decrease in the intensity of contact 15302 between FIGS. 11F-11G).

FIGS. 11I-11L illustrate gradually displaying an additional portion of the respective user interface 400 (e.g., media controls 15308) by sliding media controls 15308 onto touch screen 112 from a bottom edge of touch screen 112 in accordance with a change in the characteristic (e.g., an increase in intensity) of the contact (e.g., contact 15302) and in accordance with a determination that the characteristic (e.g., the intensity of contact 15302) exceeds the display confirmation intensity threshold (e.g., "$IT_L$"). In this example, media controls 15308 are gradually displayed on touch screen 112 by sliding media controls 15308 from the bottom edge of touch screen 112 towards the center of touch screen 112 (e.g., media controls 15308 move from position 15308-*a* in FIG. 11I through intermediate positions 15308-*b* and 15308-*c* in FIGS. 11J-11K, respectively, to fully displayed position 15308-*d* in FIG. 11L). FIGS. 11I-11L further illustrate current time and date 15304 and unlock image 15306 moving from fully displayed positions 15304-*d* and 15306-*d*, respectively, in FIG. 11F towards the center of touch screen to final positions 15304-*h* and 15306-*h*, respectively, in FIG. 11L, however in some embodiments, current time and date do not move when the additional portion of the respective user interface is displayed. In this example, media controls 15308 are fully displayed on touch screen 112 in FIG. 11L in accordance with a determination that the characteristic (e.g., the intensity of contact 15302) exceeds a second threshold such as deep press intensity threshold (e.g., "$IT_D$").

Figure 11M:
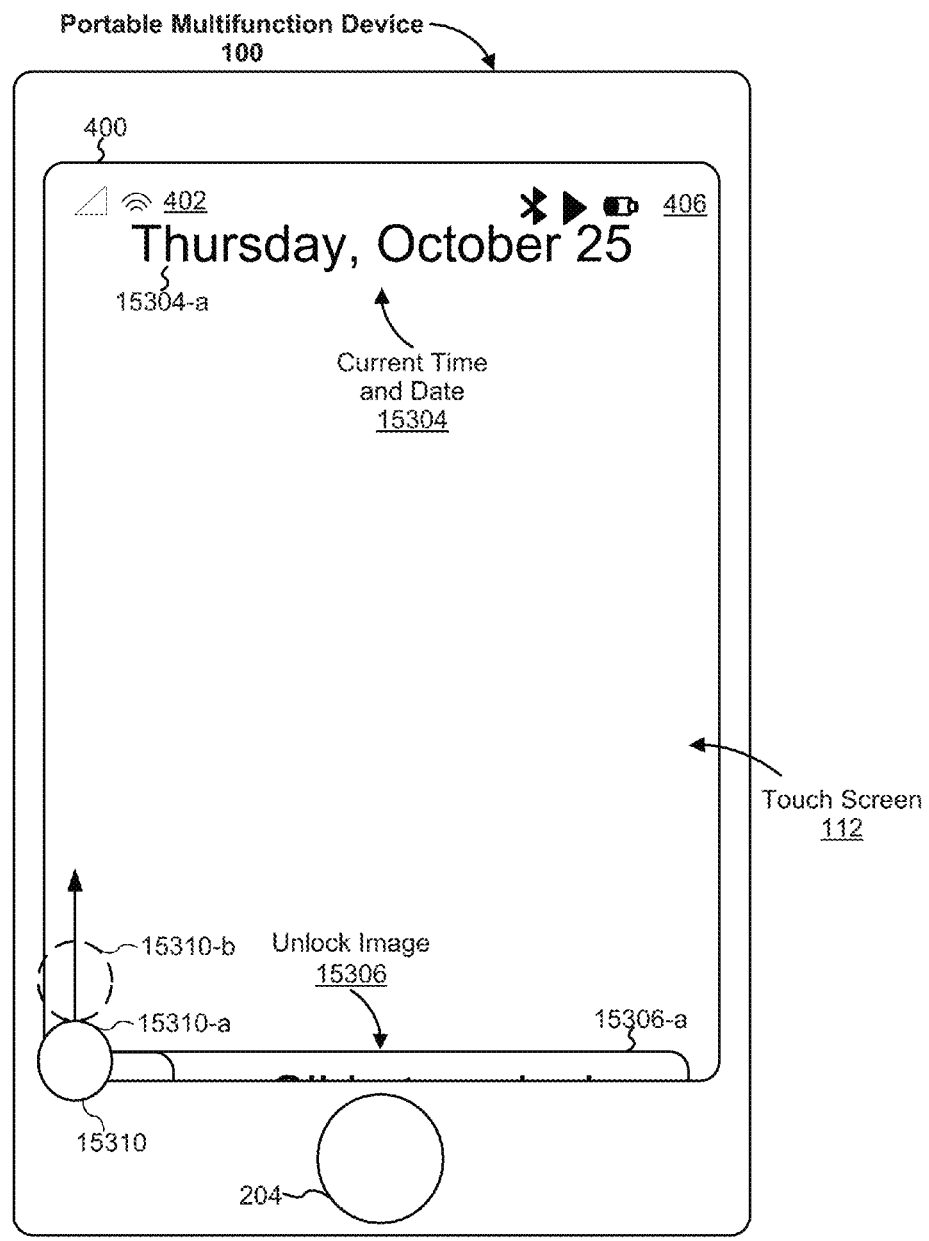
Figure 11N:
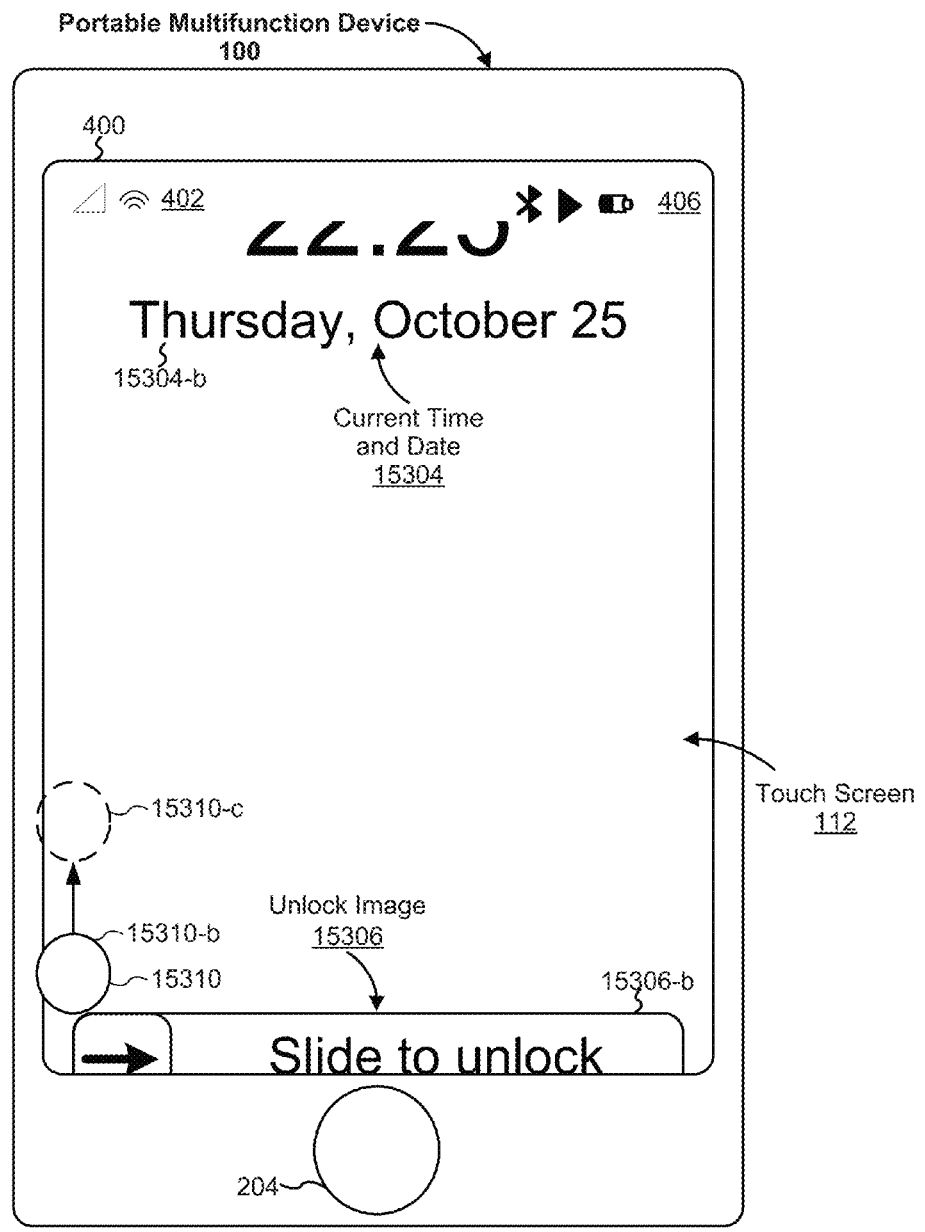
Figure 11O:
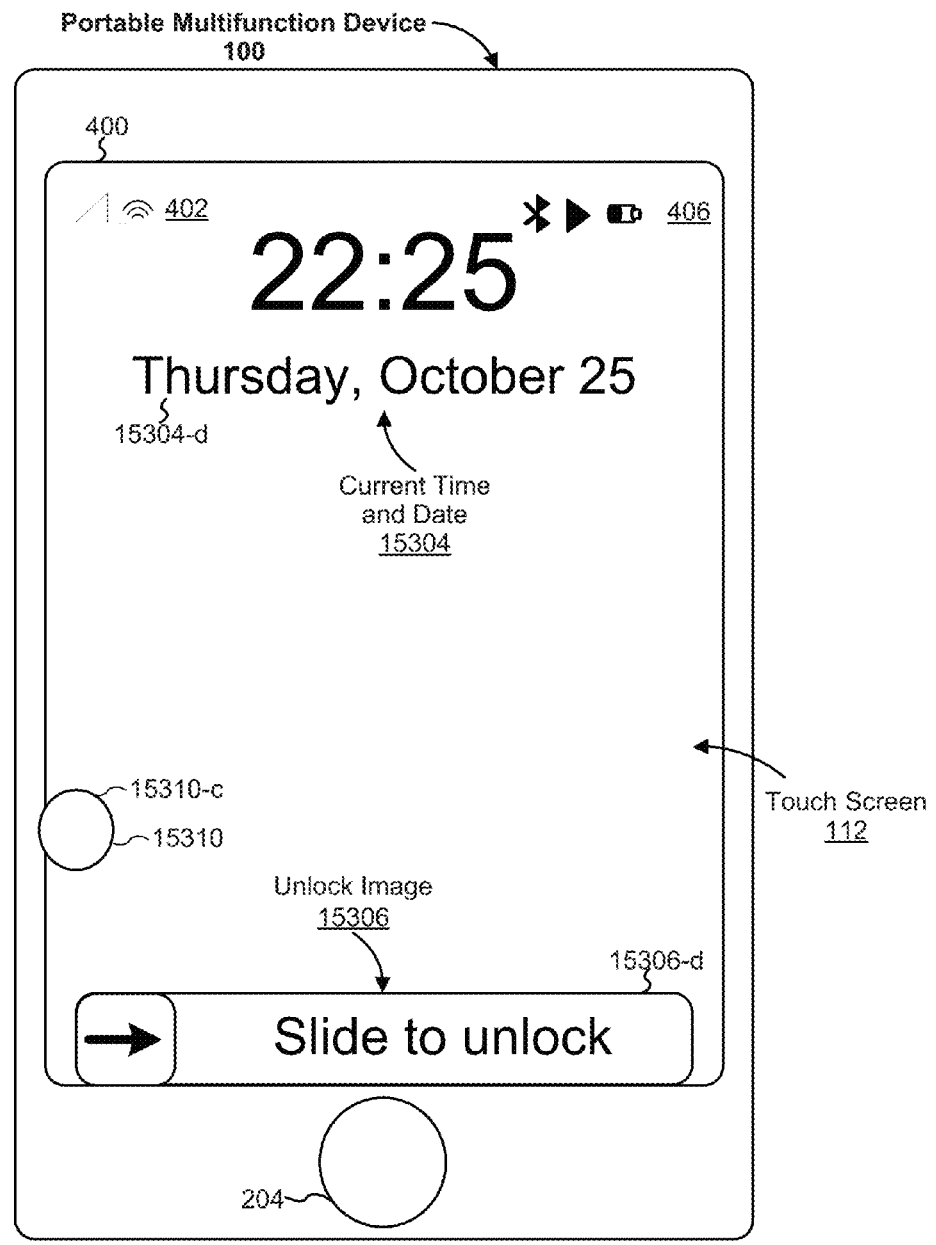

FIGS. 11M-11O illustrate gradually displaying the user interface 400 (e.g., including current time and date 15304 and unlock image 15306) on touch screen 112 in accordance with the change in a characteristic (e.g., a change in the position) of contact 15302 on touch screen 112. In this example, user interface 400 is gradually displayed in response to detecting contact 15302 on touch screen 112 and in accordance with a determination that contact 15302 meets display-activation criteria (e.g., contact 15302 on moves by more than a predefined amount or contact 15302 moves from an edge of touch screen 112 in a predefined direction by more than a predefined amount). In this example, user interface 400 is gradually displayed in accordance with the change in the position of contact 15310 (e.g., contact 15310 moves vertically from position 15310-*a* at the bottom edge of touch screen 112 in FIG. 11M through intermediate position 15310-*b* in FIG. 11N to position 15310-*c* in FIG. 11O, a total movement distance of approximately 25% of a longitudinal distance of touch screen 112). FIGS. 11M-11O further illustrate gradually displaying user interface 400 by sliding current time and date 15304 from a top edge of touch screen 112 towards the center of touch screen 112 (e.g., current time and date 15304 moves from position 15304-*a* in FIG. 11M through intermediate position 15304-*b* in FIG. 11N to fully displayed position 15304-*d* in FIG. 11O) and unlock image 15306 from a bottom edge of touch screen 112 towards the center of touch screen 112 (e.g., unlock image 15306 moves from position 15306-*a* in FIG. 11M through intermediate position 15306-*b* in FIG. 11N to fully displayed position 15306-*d* in FIG. 11O).

Figure 11P:
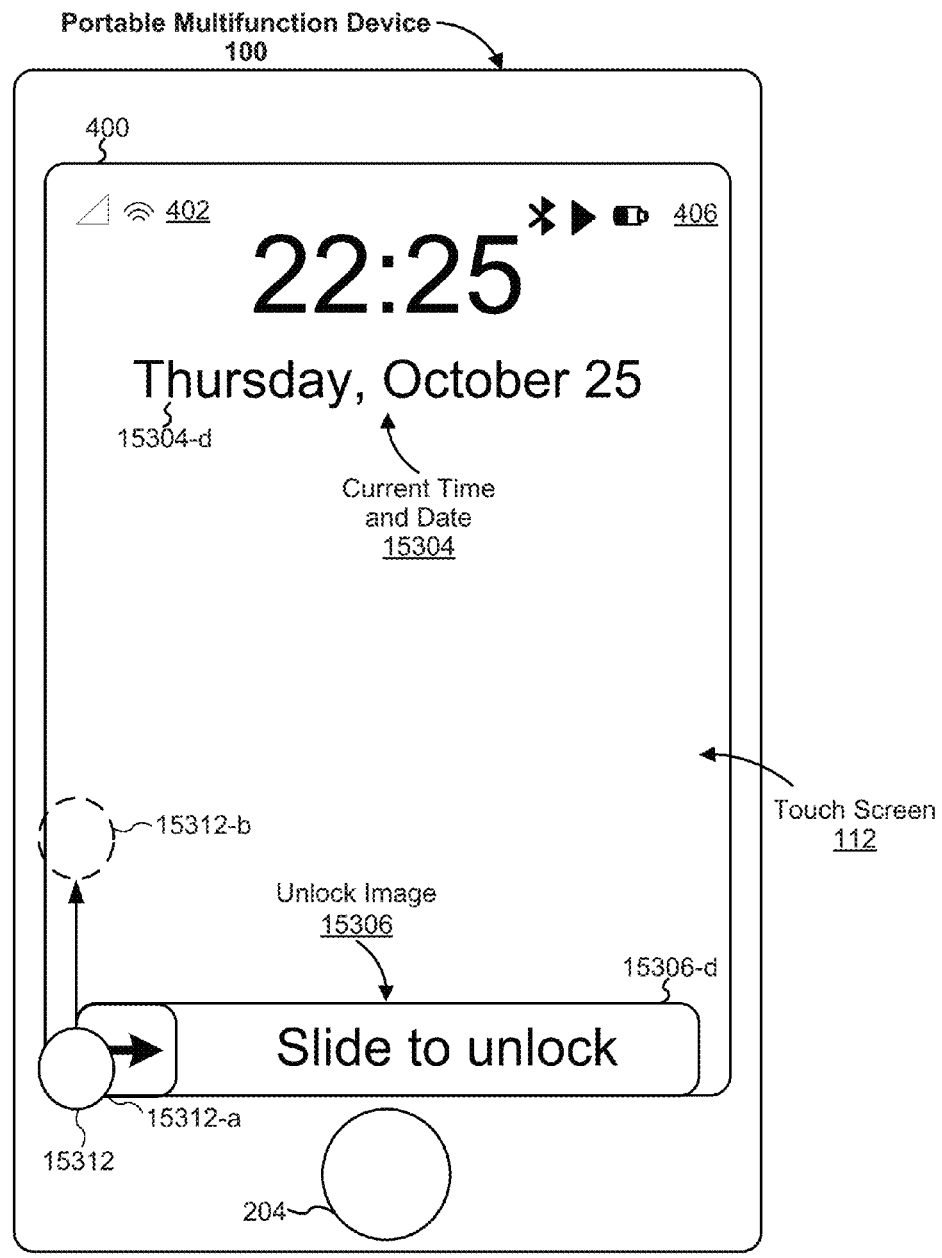
Figure 11Q:
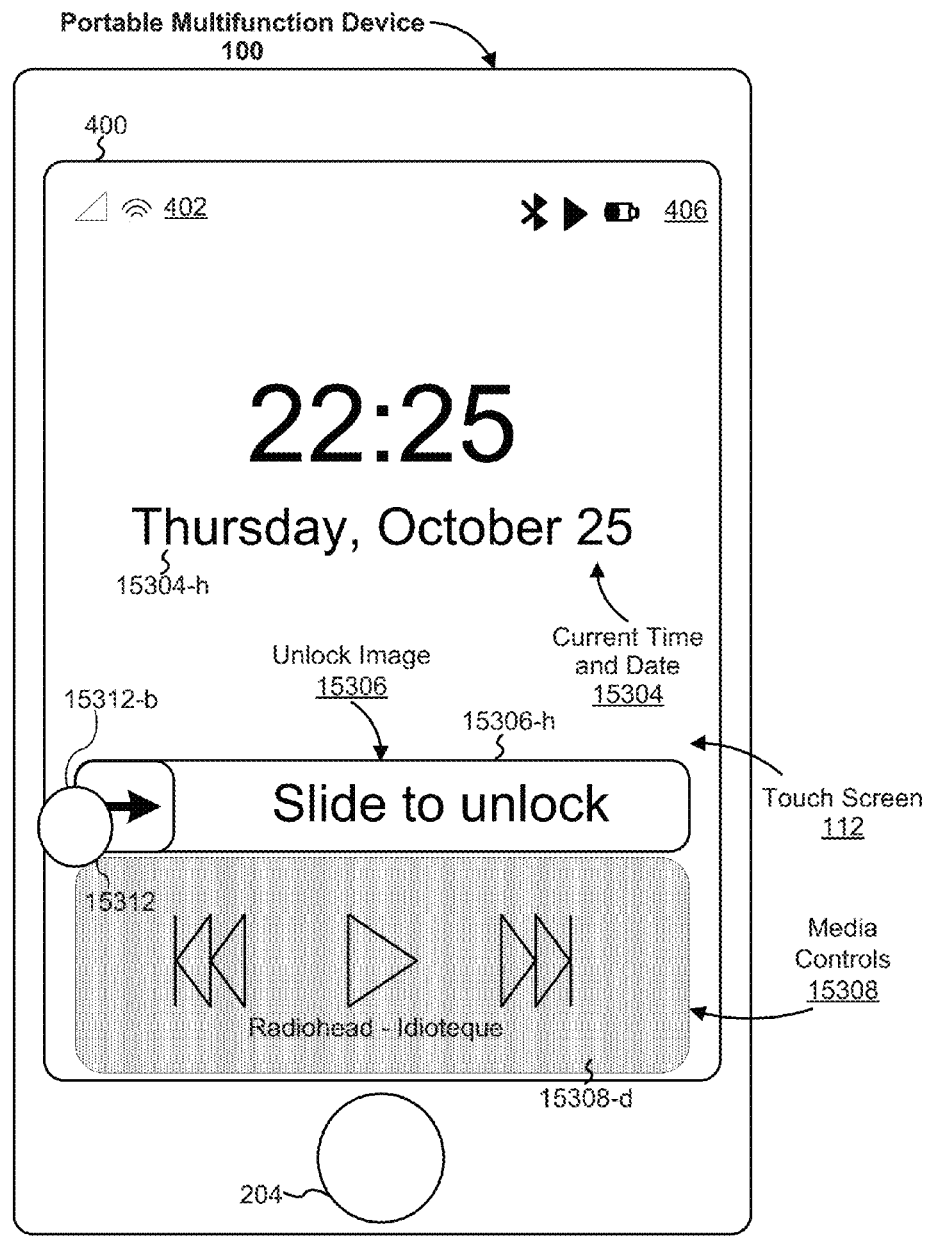

FIGS. 11P-11Q illustrate gradually displaying an additional portion (e.g., media controls 15308) of the respective user interface 400 in response to detecting a second input on the touch screen (e.g., contact 15312) subsequent to detecting a first user input (e.g., contact 15310 in FIGS. 11M-11O) and in accordance with a change in the position of contact 15312 on touch screen 112 (e.g., contact 15312 moves from position 15312-*a* in FIG. 11P to position 15312-*b* in FIG. 11Q). In this example, the additional portion (e.g., media controls 15308) of the respective user interface 400 is gradually displayed in response to detecting contact 15312 on touch screen 112 and in accordance with a determination that contact 15312 meets display-activation criteria (e.g., movement of contact 15312 on touch screen 112 by more than a predefined amount or movement of contact 15312 from an edge of touch screen 112 in a predefined direction by more than a predefined amount). FIG. 11Q further illustrates media controls 15308 at fully displayed position 15312-b on touch screen 112.

FIGS. 11R-11U illustrate gradually fading in respective user interface 400 (e.g., including current time and date 15304 and image unlock 15304) on touch screen 112. In this example, the respective user interface 400 gradually fades in on touch screen 112 in accordance with the intensity of contact 15314 (e.g., an increase in intensity of contact 15314 between $IT_1$ to $IT_L$). FIG. 11U illustrates user interface 400 fully faded in on touch screen 112 in accordance with a determination that the characteristic (e.g., intensity) of contact 15314 meets or exceeds the display confirmation intensity threshold (e.g., "$IT_L$").

FIGS. 12A-12D are flow diagrams illustrating a method 15400 of gradually displaying a respective user interface on a display in accordance with some embodiments. The method 15400 is performed at an electronic device (e.g., device 300, FIG. 3, or portable multifunction device 100, FIG. 1A) with a display and a touch-sensitive surface. In some embodiments, the display is a touch screen display and the touch-sensitive surface is on the display. In some embodiments, the display is separate from the touch-sensitive surface. Some operations in method 15400 are, optionally, combined and/or the order of some operations is, optionally, changed.

As described below, the method 15400 provides an intuitive way to gradually display a respective user interface on a display, for example while transitioning from a low-power mode. The method reduces the cognitive burden on a user when gradually displaying a respective user interface on a display, thereby creating a more efficient human-machine interface. For battery-operated electronic devices, enabling a user to gradually display a respective user interface on a display faster and more efficiently conserves power and increases the time between battery charges.

While a display is in a low-power mode (e.g., the backlight of the display is off and/or the display is off), the device detects (15402) an input on a touch-sensitive surface. FIG. 11A, for example, shows touch screen 112 in the low-power mode. FIG. 11B, for example, shows an input (e.g., contact 15302) detected on a touch-sensitive surface (e.g., button 204).

Detecting the input includes (15404) detecting a contact on the touch-sensitive surface and detecting a change in a characteristic of the contact. FIGS. 11A-11B, for example, show the device detecting an input including contact 15302 on menu button 204 and a change in a characteristic (e.g., intensity) of contact 15302 (e.g., an increase in intensity of contact 15302).

In some embodiments, the change in the characteristic is (15406) a change in intensity of the contact. FIGS. 11B-11C, for example, show a change in the intensity of contact 15302 (e.g., an increase in intensity of contact 15302). In some embodiments, the change in the characteristic is (15408) a change in position of the contact on the touch-sensitive surface (e.g., a vertical or horizontal component of movement of the contact on the touch-sensitive surface starting from an edge of the display). FIGS. 11M-11O, for example, show a change in position of contact 15310 on touch screen 112 (e.g., contact 15310 moves vertically starting from position 15310-a in FIG. 11M at an edge of touch screen 112 through intermediate position 15310-b in FIG. 11N to final position 15310-c in FIG. 11O).

In response to detecting (15410) the input and in accordance with a determination that the input meets (15412) the display-activation criteria, the device gradually displays (15414) a respective user interface on the display in accordance with the change in the characteristic of the contact, where the respective user interface was not displayed on the display when the display was in the low-power mode. In some embodiments, gradually displaying the respective user interface in accordance with the change in the characteristic of the contact includes determining a current display state of the respective user interface (e.g., a display state parameter that varies between 0% and 100%) based on a current value of the characteristic (e.g., where a plurality of values of the characteristic are mapped to corresponding values of the display state between 0% displayed and 100% displayed).

As noted above, in some embodiments, the respective user interface is not the entire user interface. For example, in some embodiments, one or more objects or user interface portions are displayed even during low-power mode, while other user interface portions (herein called the respective user interface) are not displayed in the low-power mode and are gradually displayed in response to a user input and in accordance a determination that the input meets display-activation criteria.

In some embodiments, the value of the display state parameter corresponds to a brightness of a backlight of the display between a low-power mode and a normal-operation mode. In some embodiments, the value of the display state parameter corresponds to an amount of the respective user interface that has been translated onto the display. As one example, a slow change in the characteristic will result in a corresponding slow transition (through a plurality of intermediate display states) to displaying the respective user interface on the display. As another example, a fast change in the characteristic will result in a corresponding fast transition (through a plurality of intermediate display states) to displaying the respective user interface on the display. In either of these examples, the respective user interface is gradually displayed on the display by displaying a plurality of intermediate display states over time rather than simply switching from the respective user interface being "off" of the display to the respective user interface being "on" the display.

FIGS. 11B-11C, for example, show gradually displaying a respective user interface 400 (e.g., including current time and date 15304 and unlock image 15306) on touch screen 112 that was not displayed on touch screen 112 when the touch screen was in the low-power mode (e.g., touch screen 112 is in the low-power mode in FIG. 11A) in accordance with the change in the characteristic (e.g., intensity) of the input (e.g., the intensity of contact 15302 increases between FIGS. 11B-11C). The device gradually displays respective user interface 400 on touch screen 112, for example, in response to detecting the input (e.g., contact 15302 is detected on home button 204 in FIGS. 11B-11C) and in accordance with a determination that the input (e.g., contact 15302) meets display-activation criteria (e.g., the intensity of contact 15302 meets or exceeds $IT_1$).

In some embodiments, gradually displaying the respective user interface includes (15416) gradually increasing the brightness of the display (e.g., gradually increasing the brightness of a backlight of the display). In some embodiments, gradually displaying the respective user interface includes (15418) gradually fading in the user interface on the display. FIGS. 11R-11U, for example, show the device 100 gradually displaying the respective user interface 400 (e.g., including current time and date 15304 and unlock image 15306) by fading in the user interface 400 on touch screen 112. In some embodiments, gradually displaying the respective user interface includes (15420) sliding the respective user interface onto the display from an edge of the display. FIGS. 11B-11C and 11F, for example, show gradually displaying the respective user interface 400 (e.g., including current time and date 15304 and unlock image 15306) by sliding the respective user interface 500 onto touch screen 112 from an edge of touch screen 112 (e.g., current time and date 15304 slides onto touch screen 112 from a top edge of touch screen 112 into fully displayed position 15304-*d* in FIG. 11F, and unlock image 15306 slides onto touch screen 112 from a bottom edge of touch screen 112 into fully displayed position 15306-*d* in FIG. 11F).

In some embodiments, gradually displaying the respective user interface includes (15422) displaying an animation of the respective user interface gradually appearing on the display, and the animation progresses (15424) from a starting point to an ending point determined based on a current value of the characteristic. For example, a plurality of speeds of progression through the animation are mapped to corresponding intensity values of the contact in a range of detectable intensity values, or a plurality of speeds of progression through the animation are mapped to corresponding distances of the contact from an edge of the display. FIGS. 11B-11C and 11F, for example, show the device 100 displaying an animation of the respective user interface 400 (e.g., including current time and date 15304 and unlock image 15306) gradually appearing on touch screen 112 (e.g., the respective user interface 400 slides onto touch screen 112 from an edge of touch screen 112). FIGS. 11B-11C and 11F, for example, show the animation progressing from a starting point (e.g., current time and date 15304 partially displayed at position 15304-*a* and unlock image 15306 partially displayed at position 15306-*a* in FIG. 11B) to an ending point (e.g., current time and date 15304 fully displayed at position 15304-*d* and unlock image 15306 fully displayed at position 15306-*d* in FIG. 11F) determined based on a current value of the characteristic (e.g., the intensity of contact 15302).

In some embodiments, gradually displaying the respective user interface includes (15422) displaying an animation of the respective user interface gradually appearing on the display, and the animation progresses (15426) from a starting point to an ending point in accordance with a progression of the respective characteristic from a first threshold (e.g., "$IT_1$") to a second threshold (e.g., "$IT_L$"). For example, a plurality of stages of the animation are mapped to corresponding intensity values of the contact in a range of detectable intensity values, or a plurality of stages of the animation are mapped to corresponding distances of the contact from an edge of the display. FIGS. 11B-11C and 11F, for example, show the device 100 displaying an animation of the respective user interface 400 (e.g., including current time and date 15304 and unlock image 15306) gradually appearing on touch screen 112 (e.g., the respective user interface 400 slides onto touch screen 112 from an edge of touch screen 112). FIGS. 11B-11C and 11F, for example, show the animation progressing from a starting point (e.g., current time and date 15304 partially displayed at position 15304-*a* and unlock image 15306 partially displayed at position 15306-*a* in FIG. 11B) to an ending point (e.g., current time and date 15304 fully displayed at position 15304-*d* and unlock image 15306 fully displayed at position 15306-*d* in FIG. 11F) in accordance with a progression of the respective characteristic (e.g., the intensity of contact 15302) from a gradual display threshold (e.g., "$IT_1$") to a display confirmation threshold (e.g., "$IT_L$"). In some embodiments, the progression is mapped to a change in position of a contact (e.g., change in position of contact 15310 in FIGS. 11M-11O), where a first position on the touch-sensitive surface (e.g., the position of contact 15310 proximate to an edge of touch screen 112 in FIG. 11M) corresponds to the first threshold and a second position on the touch-sensitive surface (e.g., the position of contact 15310 on touch screen 112 in FIG. 11O) corresponds to the second threshold.

In some embodiments, the respective user interface (e.g., an unlock screen) includes (15428) one or more of: media player controls, camera controls, a current time, a current date, a communication network signal indicator, a background image, a battery charge indicator, a device event notification, and an unlock image. FIG. 11L, for example, shows respective user interface 400 including a communication network signal indicator 402, a battery charge indicator 406, current time and date 15304, unlock image 15306 and media controls 15308 on touch screen 112.

In some embodiments, the display-activation criteria are met (15430) when the contact has an intensity above a respective intensity threshold. FIG. 11B, for example, shows the intensity of contact 15302 above the gradual display intensity threshold (e.g., "$IT_1$"). In some embodiments, the display-activation criteria are met (15432) when the contact moves on the display (e.g., in a predefined direction) by more than a predefined amount. FIGS. 11M-11O, for example, show contact 15310 moving on touch screen 112 by more than a predefined amount (e.g., contact 15310 moves from position 15310-*a* in FIG. 11M to position 15310-*c* in FIG. 11O). In some embodiments, the display-activation criteria are met (15434) when the contact moves from an edge of the display in a predefined direction by more than a predefined amount. FIGS. 11M-11O, for example, show contact 15310 moving from an edge of touch screen 112 (e.g., from position 15310-*a* at the bottom edge of touch screen 112 in FIG. 11M) in a predefined direction (e.g., contact 15310 moves vertically between FIGS. 11M-11O) by more than a predefined amount (e.g., 25% of a longitudinal distance of touch screen 112 between FIGS. 11M-11O).

Figure 11R:
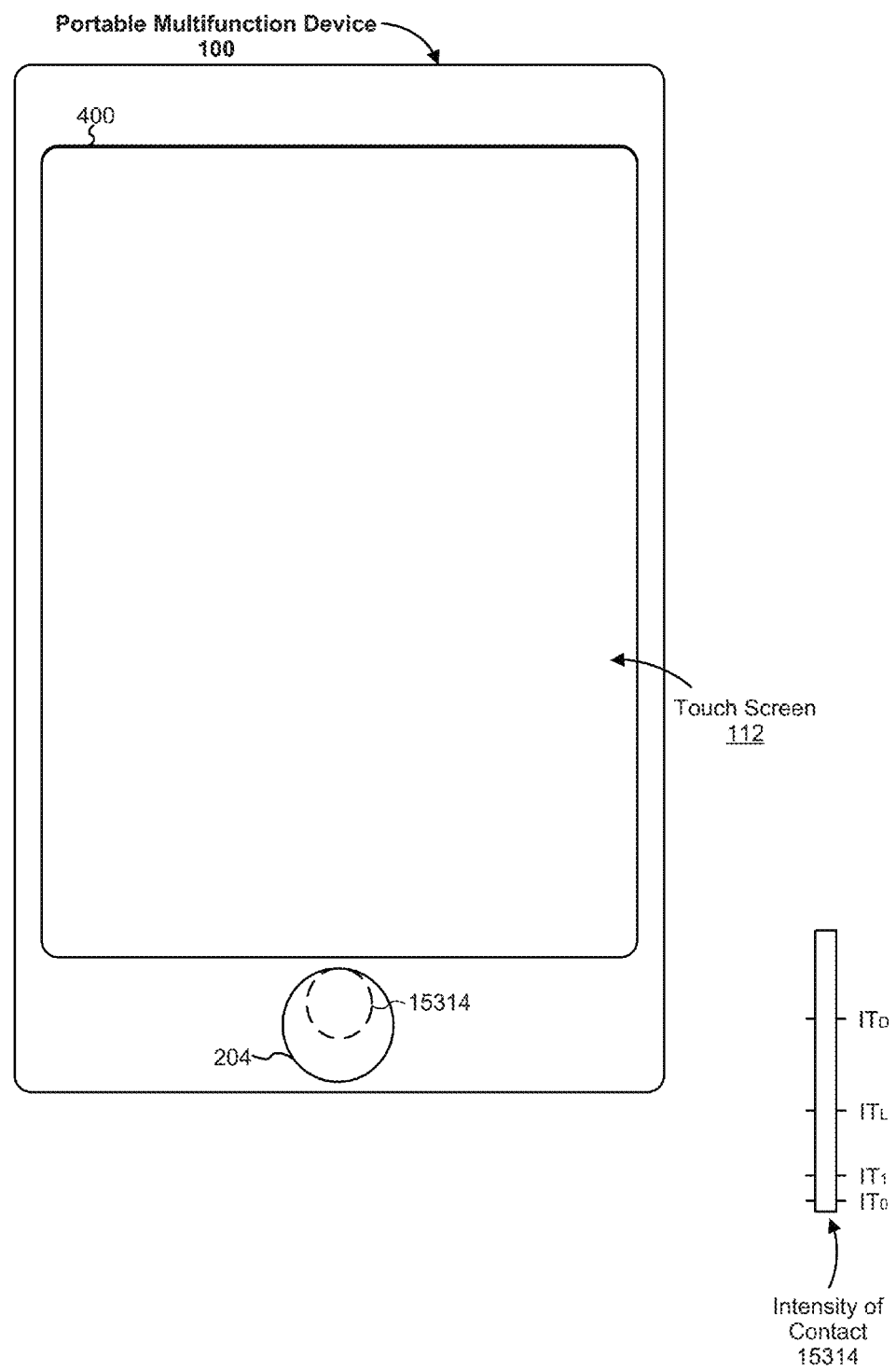
Figure 11S:
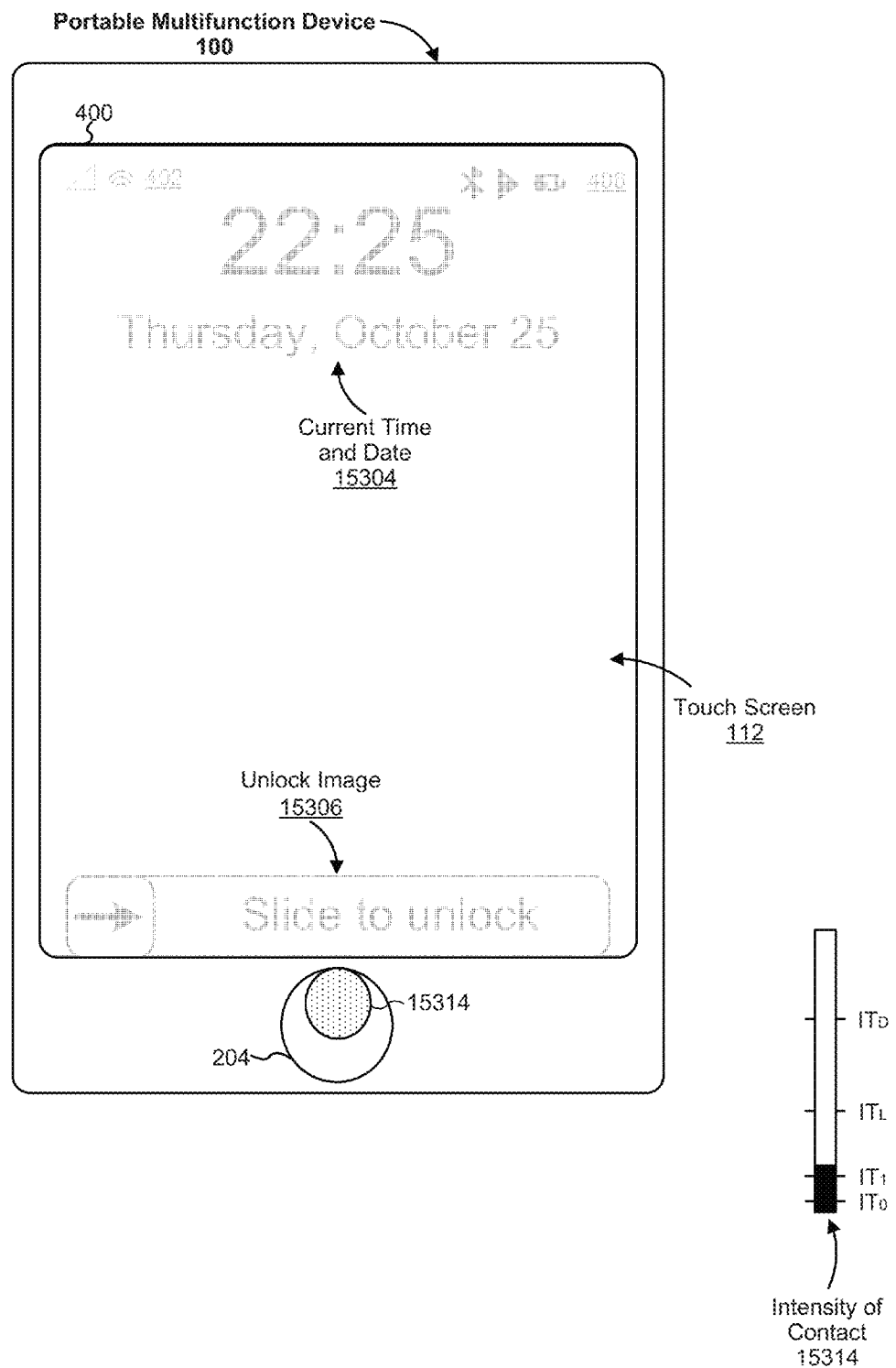
Figure 11T:
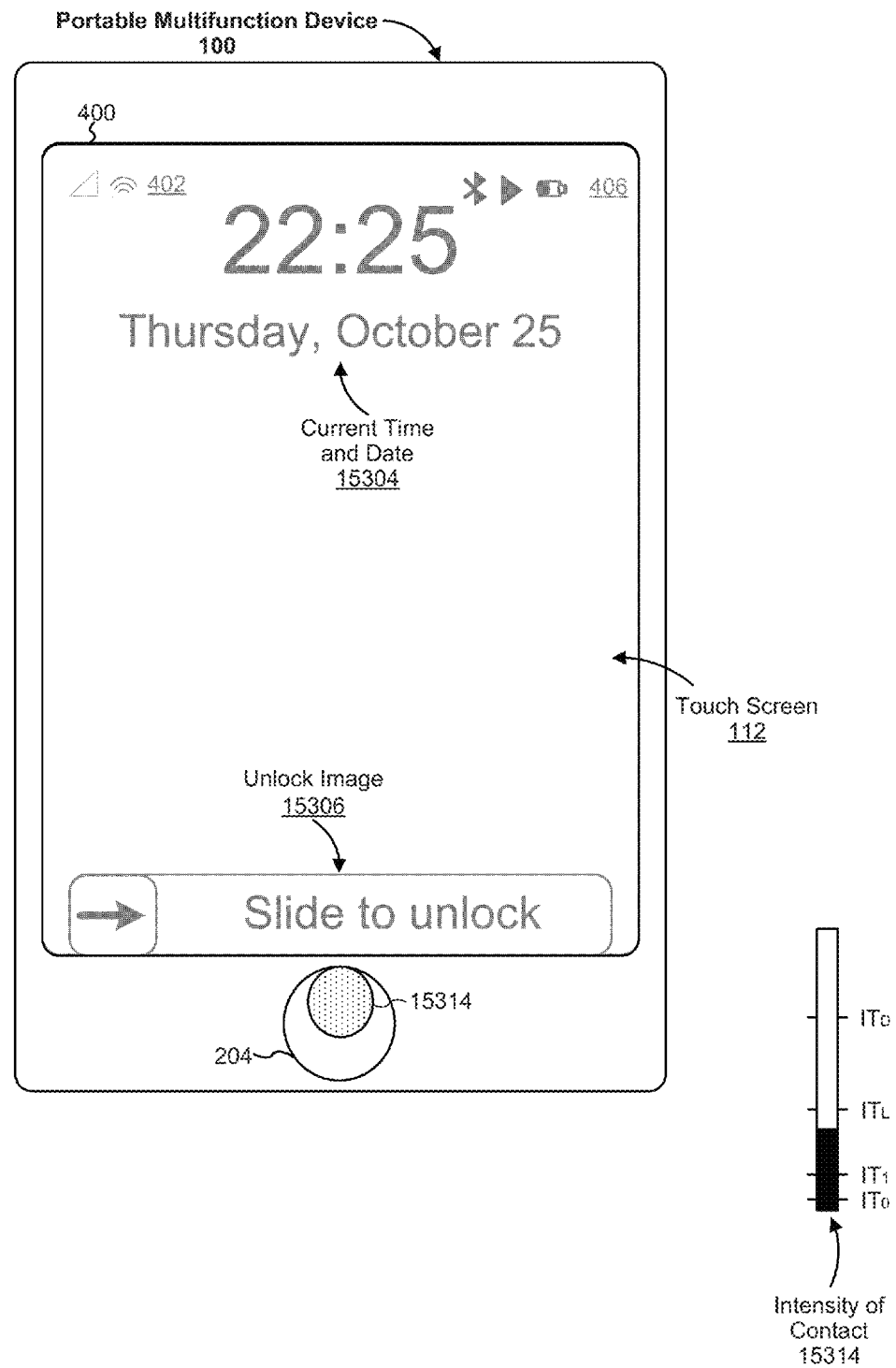
Figure 11U:
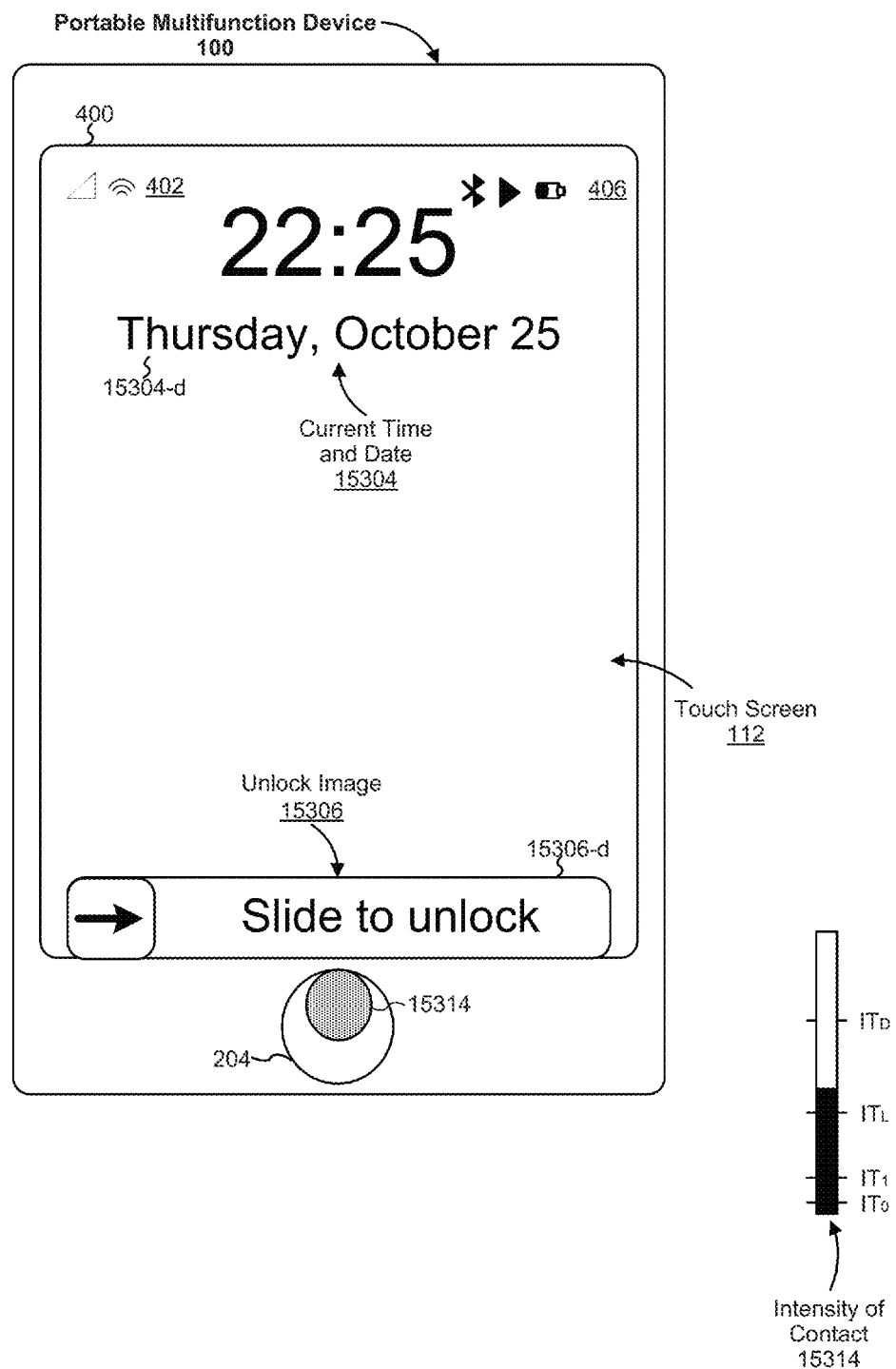
Figure 12A:
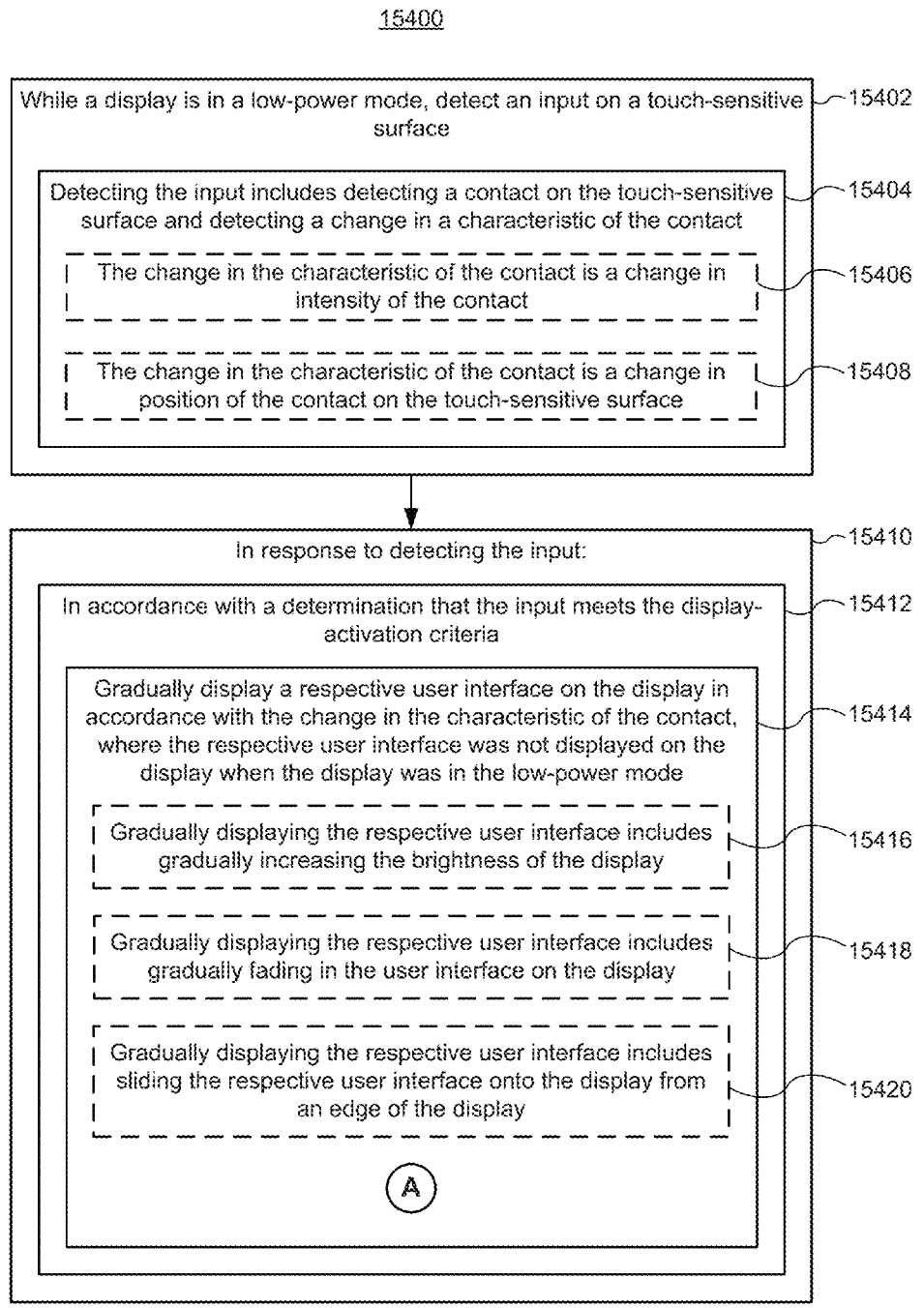
FIGS. 12A-12D are flow diagrams illustrating a method of gradually displaying a respective user interface on a display in accordance with some embodiments.
Figure 12B:
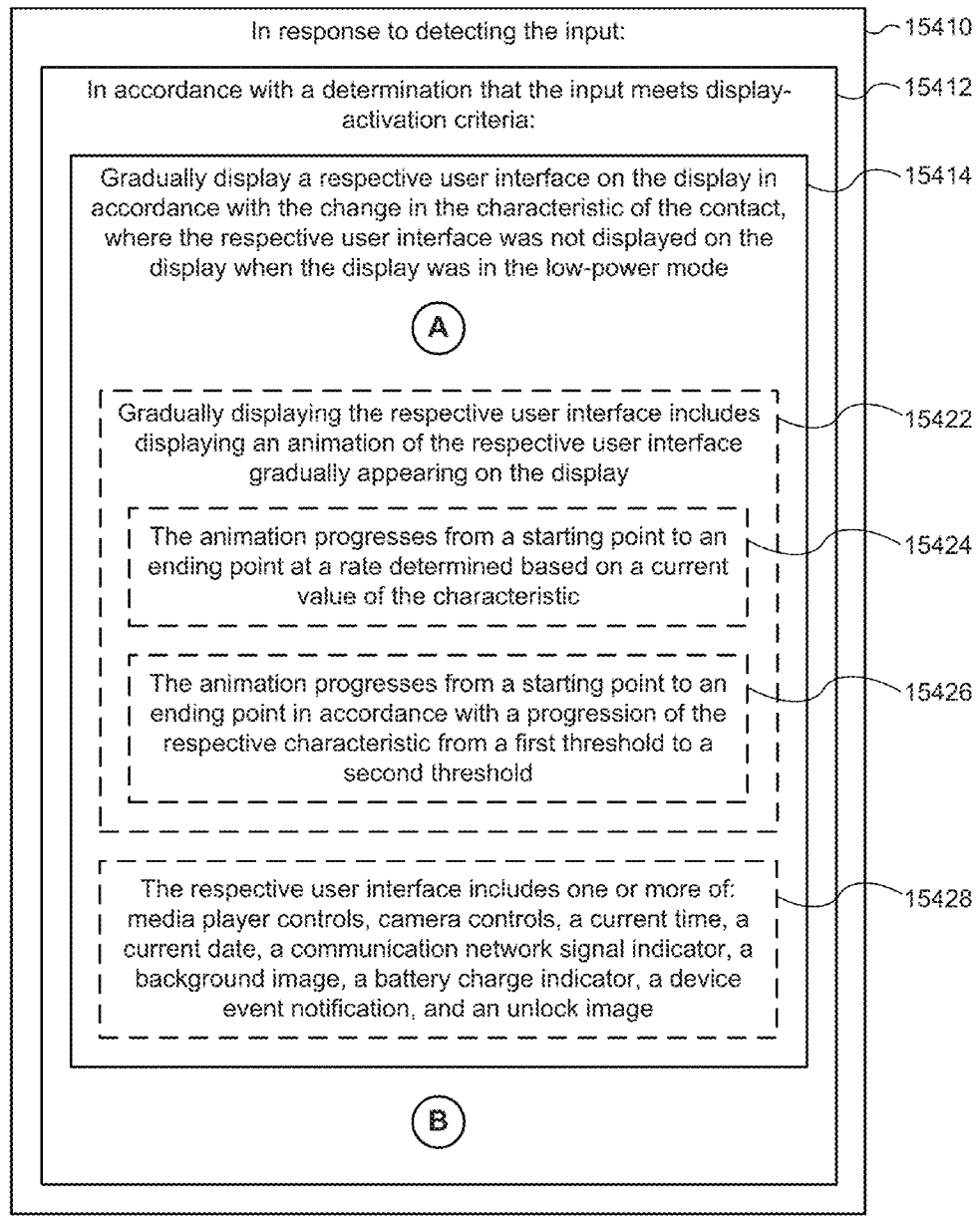
Figure 12C:
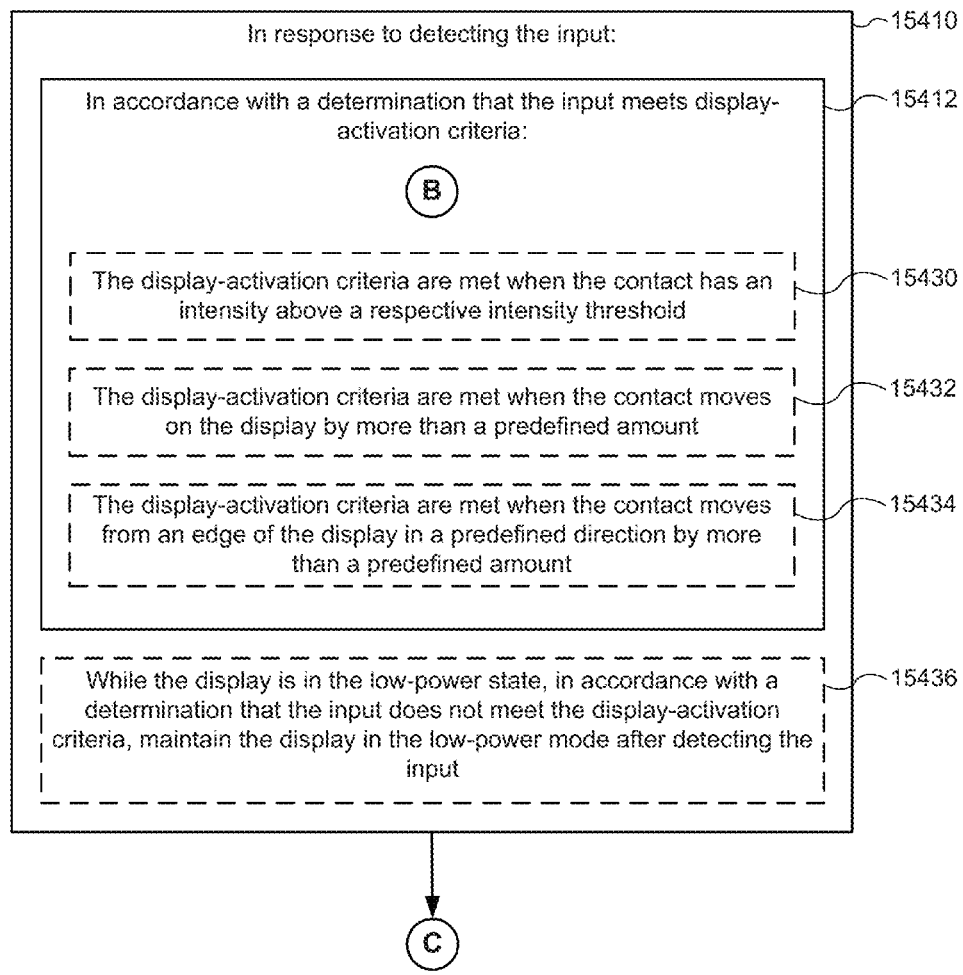
Figure 12D:
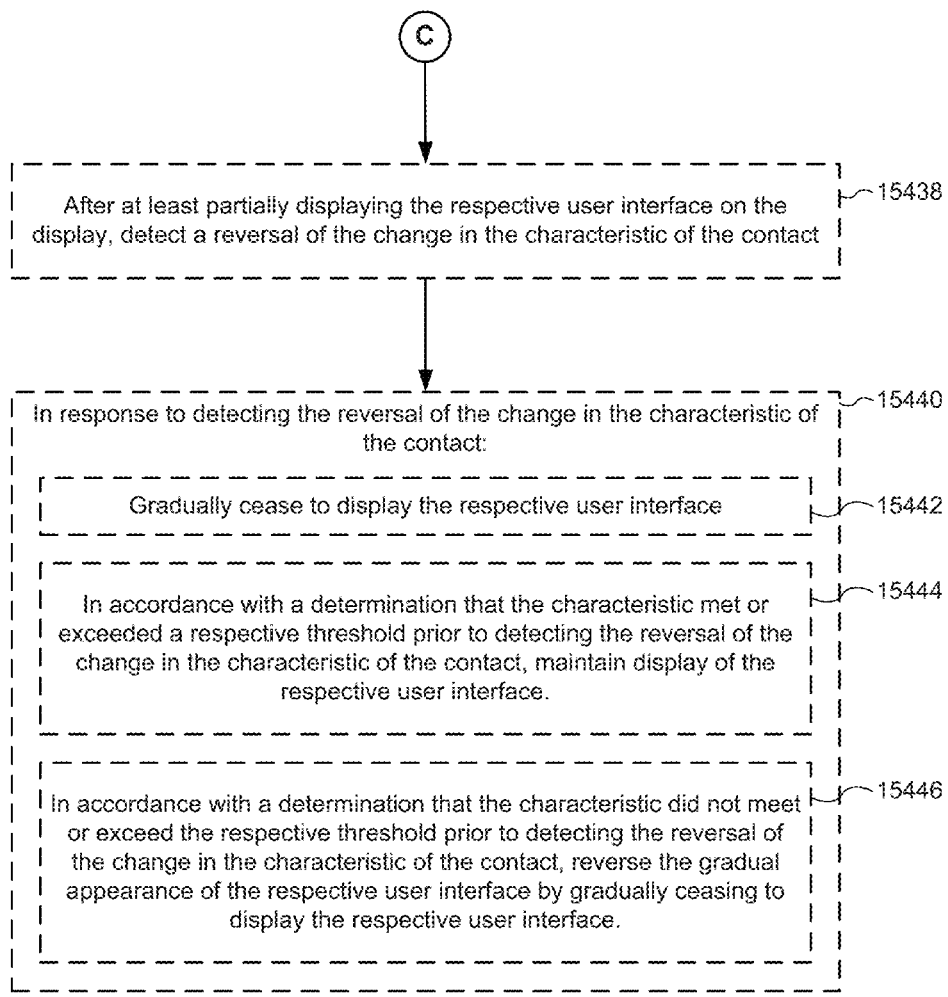

In some embodiments, while the display is in the low-power state, in accordance with a determination that the input does not meet the display-activation criteria, the device maintains (15436) the display in the low-power state after detecting the input. For example, if an accidental contact is detected on the display (e.g., a contact with an intensity below a respective intensity threshold or a contact that starts in the middle of the touch-sensitive surface rather than at an edge of the touch-sensitive surface), the display does not wake up; however, if a contact meets the display-activation criteria, the display slowly wakes up, gradually displaying the respective user interface. In some embodiments, in accordance with a determination that a second input does not meet the display-activation criteria, the device maintains the display in the low-power mode after detecting the second input. FIG. 11R, for example, shows the device maintaining touch screen 112 in the low-power state (e.g., off) after detecting an input (e.g., contact 15314) in accordance with a determination that contact 15314 does not meet the display-activation criteria (e.g., an intensity above the gradual display intensity threshold—$IT_1$).

In some embodiments, after at least partially displaying the respective interface on the display, the device detects (15438) a reversal of the change in the characteristic of the contact. FIGS. 11B-11C, for example, show the device detecting a change in the characteristic (e.g., intensity) of contact 15302 (e.g., the intensity of contact 15302 increases) and partially displaying the respective user interface 400 (e.g., including current time and date 15304 and unlock image 15306) on touch screen 112. Subsequently, FIGS. 11C-11D, for example, show the device detecting a reversal in the change of the characteristic (e.g., intensity) of contact 15302 (e.g., the intensity of contact 15302 decreases).

In some embodiments, in response to detecting (15440) the reversal of the change in the characteristic of the contact, the device gradually ceases (15442) to display the respective user interface. FIGS. 11D-11E, for example, show the device 100 gradually ceasing to display the respective user interface 400 (e.g., including current time and date 15304 and unlock image 15306) on touch screen 112 (e.g., current time and date 15304 moves from position 15304-b in FIG. 11C to position 15304-c in FIG. 11E, and unlock image 15306 moves from position 15306-b in FIG. 11C to position 15306-c in FIG. 11E) in response to detecting the reversal of the change in the characteristic (e.g., intensity) of contact 15302 (e.g., the intensity of contact 15302 decreases between FIGS. 11C-11D).

In some embodiments, in response to detecting (15440) the reversal of the change in the characteristic of the contact and in accordance with a determination that the characteristic met or exceeded a respective threshold (e.g., a display confirmation threshold) prior to detecting the reversal of the change in the characteristic of the contact, the device maintains (15444) display of the respective user interface. FIGS. 11G-11H, for example, show the device 100 maintaining display of the respective user interface 400 (e.g., current time and date 15304 and unlock image 15306 are maintained at positions 15304-d and 15306-d, respectively) in response to detecting the reversal of the change in the characteristic (e.g., intensity) of contact 15302 (e.g., the intensity of contact 15302 decreases between FIGS. 11F-11G) and in accordance with a determination that the intensity of contact 15302 met or exceeded a display confirmation intensity threshold (e.g., "$IT_L$") prior to detecting the reversal of the change in the intensity of contact 15302 (e.g., the intensity of contact 15302 exceeds $IT_L$ in FIG. 11F).

In some embodiments, in response to detecting (15440) the reversal of the change in the characteristic of the contact and in accordance with a determination that the characteristic did not meet or exceed the respective threshold (e.g., a display confirmation threshold) prior to detecting the reversal of the change in the characteristic of the contact, the device reverses (15446) the gradual appearance of the respective user interface by gradually ceasing to display the respective user interface (e.g., gradually dimming the display backlight, or sliding the user interface off of the display). FIGS. 11B-11E, for example, show the device 100 reversing the gradual appearance of the respective user interface 400 (e.g., including current time and date 15304 and unlock image 15306) on touch screen 112 (e.g., current time and date 15304 moves from position 15304-b in FIG. 11C to position 15304-c in FIG. 11E, and unlock image 15306 moves from position 15306-b in FIG. 11C to position 15306-c in FIG. 11E) in response to detecting the reversal of the change in the characteristic (e.g., intensity) of contact 15302 (e.g., the intensity of contact 15302 decreases between FIGS. 11C-11D) and in accordance with a determination that the intensity of contact 15302 did not meet or exceed a display confirmation intensity threshold (e.g., "$IT_L$") prior to detecting the reversal of the change in the intensity of contact 15302 (e.g., the intensity of contact 15302 does not exceed $IT_L$ in FIGS. 11B-11E).

It should be understood that the particular order in which the operations in FIGS. 12A-12D have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., those listed in fifth paragraph of the Description of Embodiments) are also applicable in an analogous manner to method 15400 described above with respect to FIGS. 12A-12D. For example, the contacts, intensity thresholds and animations described above with reference to method 15400 optionally have one or more of the characteristics of the contacts, intensity thresholds and animations described herein with reference to other methods described herein (e.g., those listed in fifth paragraph of the Description of Embodiments). For brevity, these details are not repeated here.

Figure 13:
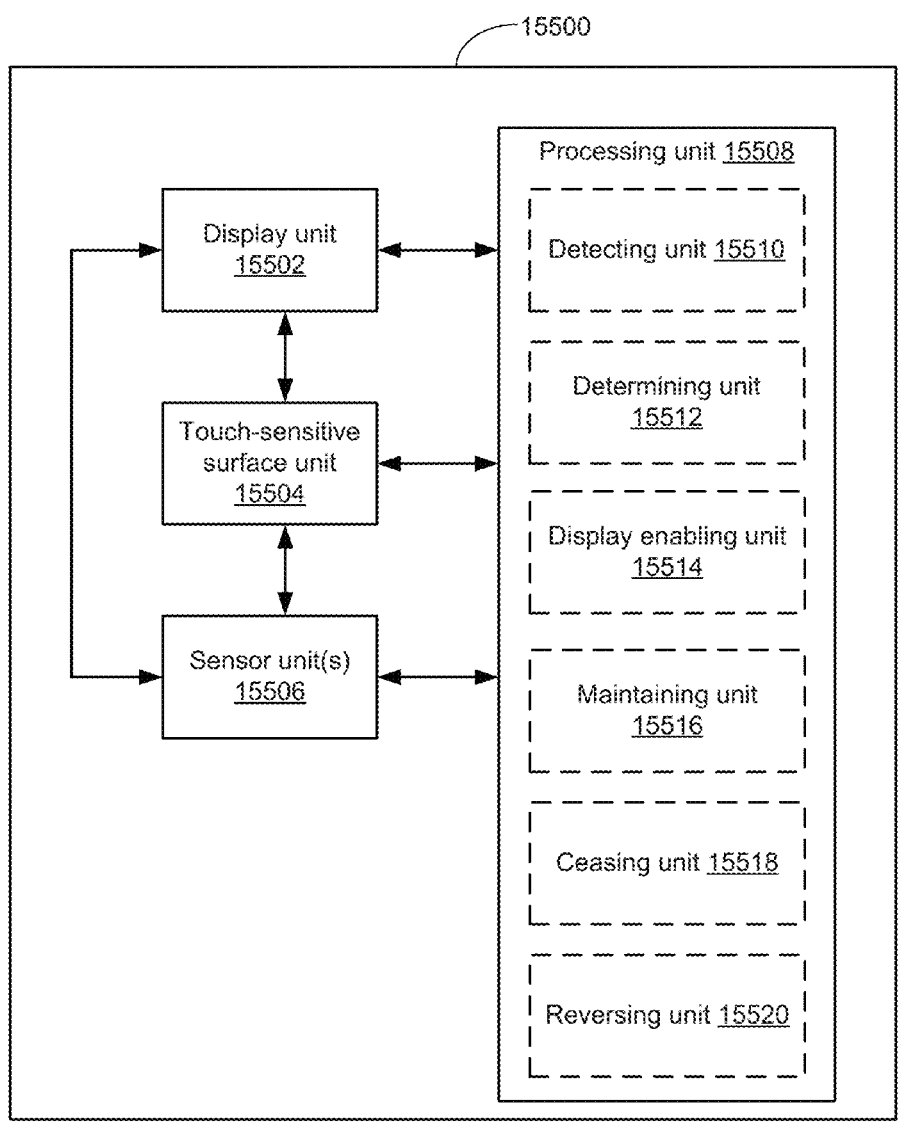
FIG. 13 is a functional block diagram of an electronic device in accordance with some embodiments.

In accordance with some embodiments, FIG. 13 shows a functional block diagram of an electronic device 15500 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 13 are, optionally, combined or separated into sub-blocks to implement the principles of the various described embodiments. Therefore, the description herein optionally supports any possible combination or separation or further definition of the functional blocks described herein.

As shown in FIG. 13, an electronic device 15500 includes a display unit 15502 configured to display information; a touch-sensitive surface unit 15504 configured to receive contacts; one or more sensor units 15506 configured to detect intensity of contacts with the touch-sensitive surface unit 15504; and a processing unit 15508 coupled to the display unit 15502, the touch-sensitive surface unit 15504 and the one or more sensor units 15506. In some embodiments, the processing unit 15508 includes a detecting unit 15510, a determining unit 15512, a display enabling unit 15514, a maintaining unit 15516, a ceasing unit 15518, and a reversing unit 15520. In some embodiments, a display control unit replaces and is configured to perform the operations of the display enabling unit 15514, the maintaining unit 15516, the ceasing unit 15518, and the reversing unit 15520.

The processing unit is configured to: while the display unit 15502 is in a low-power mode, detect (e.g., with the detecting unit 15510) an input on the touch-sensitive surface unit 15504, wherein detecting the input includes detecting a contact on the touch-sensitive surface unit 15504 and detecting a change in a characteristic of the contact. The processing unit is further configured to: in response to detecting (e.g., with the detecting unit 15510) the input and in accordance with a determination (e.g., with the determining unit 15512) that the input meets display-activation criteria, gradually display (e.g., with the display enabling unit 15514) a respective user interface on the display unit 15502 in accordance with the change in the characteristic of the contact, wherein the respective user interface was not displayed on the display unit 15502 when the display unit 15502 was in the low-power mode.

In some embodiments, the display-activation criteria are met when the contact has an intensity above a respective intensity threshold. In some embodiments, the display-activation criteria are met when the contact moves on the display unit 15502 by more than a predefined amount. In some embodiments, the display-activation criteria are met when the contact moves from an edge of the display unit 15502 in a predefined direction by more than a predefined amount.

In some embodiments, the processing unit 15508 is further configured to, while the display unit 15502 is in the low-power state and in accordance with a determination (e.g., with the determining unit 15512) that the input does not meet the display-activation criteria, maintain (e.g., with the maintaining unit 15516) the display unit 15502 in the low-power mode after detecting (e.g., with the detecting unit 15510) the input.

In some embodiments, the change in the characteristic of the contact is a change in intensity of the contact. In some embodiments, the change in the characteristic of the contact is a change in position of the contact on the touch-sensitive surface unit 15504.

In some embodiments, the processing unit 15508 is further configured to, after at least partially displaying (e.g., with the display enabling unit 15514) the respective user interface on the display unit 15502: detect (e.g., with the detecting unit 15510) a reversal of the change in the characteristic of the contact; and in response to detecting the reversal of the change in the characteristic of the contact, gradually cease (e.g., with the ceasing unit 15518) to display the respective user interface.

In some embodiments, the processing unit 15508 is further configured to, after at least partially displaying (e.g., with the display enabling unit 15514) the respective user interface on the display unit 15502: detect (e.g., with the detecting unit 15510) a reversal of the change in the characteristic of the contact; and in response to detecting the reversal of the change in the characteristic of the contact: in accordance with a determination (e.g., with the determining unit 15512) that the characteristic met or exceeded a respective threshold prior to detecting the reversal of the change in the characteristic of the contact, maintain (e.g., with the maintaining unit 15516) display of the respective user interface; and in accordance with a determination (e.g., with the determining unit 15512) that the characteristic did not meet or exceed the respective threshold prior to detecting the reversal of the change in the characteristic of the contact, reverse (e.g., with the reversing unit 15520) the gradual appearance of the respective user interface by gradually ceasing (e.g., with the ceasing unit 15518) to display the respective user interface.

In some embodiments, gradually displaying (e.g., with the display enabling unit 15514) the respective user interface includes gradually increasing the brightness of the display unit 15502. In some embodiments, gradually displaying (e.g., with the display enabling unit 15514) the respective user interface includes gradually fading in the user interface on the display unit 15502. In some embodiments, gradually displaying (e.g., with the display enabling unit 15514) the respective user interface includes sliding the respective user interface onto the display from an edge of the display unit 15502.

In some embodiments, gradually displaying (e.g., with the display enabling unit 15514) the respective user interface includes displaying an animation of the respective user interface gradually appearing on the display unit 15502; and the animation progresses from a starting point to an ending point at a rate determined based on a current value of the characteristic.

In some embodiments, gradually displaying (e.g., with the display enabling unit 15514) the respective user interface includes displaying an animation of the respective user interface gradually appearing on the display unit 15502; and the animation progresses from a starting point to an ending point in accordance with a progression of the respective characteristic from a first threshold to a second threshold.

In some embodiments, the respective user interface includes one or more of: media player controls, camera controls, a current time, a current date, a communication network signal indicator, a background image, a battery charge indicator, a device event notification, and an unlock image.

The operations in the information processing methods described above are, optionally implemented by running one or more functional modules in information processing apparatus such as general purpose processors (e.g., as described above with respect to FIGS. 1A and 3) or application specific chips.

The operations described above with reference to FIGS. 12A-12D are, optionally, implemented by components depicted in FIGS. 1A-1B or FIG. 13. For example, detecting operation 15404, determining operation 15412, displaying operation 15420, maintaining operation 15436, and ceasing operation 15442 are, optionally, implemented by event sorter 170, event recognizer 180, and event handler 190. Event monitor 171 in event sorter 170 detects a contact on touch screen 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B

It should be understood that the particular order in which the operations have been described above is merely exemplary and is not intended to indicate that the described order is the only order in which the operations could be performed. One of ordinary skill in the art would recognize various ways to reorder the operations described herein. Additionally, it should be noted that the various processes separately described herein (e.g., those listed in fifth paragraph of the Description of Embodiments) can be combined with each other in different arrangements. For example, the contacts, user interface objects, tactile sensations, intensity thresholds, and/or focus selectors described above with reference to any one of the various processes separately described herein (e.g., those listed in fifth paragraph of the Description of Embodiments) optionally have one or more of the characteristics of the contacts, gestures, user interface objects, tactile sensations, intensity thresholds, and focus selectors described herein with reference to one or more of the other methods described herein (e.g., those listed in fifth paragraph of the Description of Embodiments). For brevity, all of the various possible combinations are not specifically enumerated here, but it should be understood that the claims described above may be combined in any way that is not precluded by mutually exclusive claim features.

The foregoing description, for purpose of explanation, has been described with reference to specific embodiments. However, the illustrative discussions above are not intended to be exhaustive or to limit the various described embodiments to the precise forms disclosed. Many modifications and variations are possible in view of the above teachings. The embodiments were chosen and described in order to best explain the principles of the various described embodiments and their practical applications, to thereby enable others skilled in the art to best utilize the various described embodiments with various modifications as are suited to the particular use contemplated.

What is claimed is:

1. A method, comprising:
at an electronic device with a touch-sensitive surface and a display, wherein the device includes one or more sensors to detect intensities of contacts with the touch-sensitive surface:
displaying, on the display, a lower-level user interface that is part of a user interface hierarchy, wherein:
the hierarchy includes at least three levels, including the lower-level user interface, an intermediate-level user interface and a higher-level user interface;
the intermediate-level user interface is above the lower-level user interface in the hierarchy; and
the higher-level user interface is above both the intermediate-level user interface and the lower-level user interface in the hierarchy;
while displaying the lower-level user interface without concurrently displaying other user interfaces in the hierarchy, detecting an input on a portion of the device that is associated with user interface hierarchy navigation;
in response to detecting the input:
in accordance with a determination that the input has a duration shorter than a respective time threshold, replacing display of the lower-level user interface with display of the higher-level user interface; and
in accordance with a determination that the input has a duration longer than the respective time threshold, replacing display of the lower-level user interface with display of a respective user interface in the user interface hierarchy selected in accordance with an intensity of the input.

2. The method of claim 1, wherein the portion of the device on which the input is detected is a physical button.

3. The method of claim 1, wherein the portion of the device on which the input is detected is a portion of the touch-sensitive surface that is associated with hierarchy navigation.

4. The method of claim 1, wherein the portion of the device on which the input is detected is a portion of a touch screen display that includes an icon associated with hierarchy navigation.

5. The method of claim 1, wherein the input is a contact on the touch-sensitive surface.

6. The method of claim 1, wherein:
the input includes a contact detected on the touch-sensitive surface; and
the input is a stationary gesture that does not include lateral movement of the contact on the touch-sensitive surface.

7. The method of claim 1, wherein the hierarchy includes exactly three levels in order from highest to lowest:
the higher-level user interface;
the intermediate-level user interface; and
the lower-level user interface.

8. The method of claim 1, wherein:
the higher-level user interface is adjacent to the intermediate-level user interface in the hierarchy; and
the intermediate-level user interface is adjacent to the lower-level user interface in the hierarchy.

9. The method of claim 1, wherein the hierarchy includes more than three levels.

10. The method of claim 1, wherein:
the lower-level and intermediate-level user interfaces are user interfaces in a single application; and
the higher-level user interface is an application launch user interface.

11. The method of claim 1, wherein the lower-level, intermediate-level and higher-level user interfaces are user interfaces in a single application.

12. The method of claim 1, wherein:
the lower-level user interface is a media presentation interface;
the intermediate-level user interface is a media collection display interface of a media player application; and
the higher-level user interface is an application launch user interface that includes an icon representing the media player application.

13. The method of claim 1, wherein:
the lower-level user interface is a subfolder;
the intermediate-level user interface is a folder containing the subfolder; and
the higher-level user interface is an application launch interface that includes an icon representing the folder.

14. The method of claim 1, wherein replacing display of the lower-level user interface with display of the respective user interface selected in accordance with the intensity of the input includes displaying an animated transition between the lower-level user interface and the respective user interface where the animated transition progresses at a rate that corresponds to the intensity of the input.

15. The method of claim 1, wherein replacing display of the lower-level user interface with display of the respective user interface selected in accordance with the intensity of the input includes displaying an animated transition between the lower-level user interface and the respective user interface where the animated transition progresses in accordance with the intensity of the input.

16. The method of claim 1, wherein replacing display of the lower-level user interface with display of the respective user interface selected in accordance with the intensity of the input, such that the respective user interface is the higher level user interface, includes displaying an animated transition between the lower-level user interface and the higher-level user interface that includes displaying a representation of the intermediate-level user interface.

17. The method of claim 1, wherein replacing display of the lower-level user interface with display of the respective user interface selected in accordance with the intensity of the input includes:
in accordance with a determination that the input has an intensity above a first intensity threshold and below a second intensity threshold higher than the first intensity threshold, replacing display of the lower-level user interface with display of the intermediate-level user interface; and in accordance with a determination that the input has an intensity above the second intensity threshold, replacing display of the lower-level user interface with display of the higher-level user interface.

18. The method of claim 17, wherein, when the input has a duration longer than the respective time threshold, and replacing display of the lower-level user interface with display of a respective user interface includes replacing display of the lower-level user interface with the higher-level user interface, the method includes displaying a transition between the lower-level user interface and the higher-level user interface that includes displaying a representation of the intermediate-level user interface.

19. The method of claim 17, wherein, when the input has a duration longer than the respective time threshold and replacing display of the lower-level user interface with display of a respective user interface includes replacing display of the lower-level user interface with the higher-level user interface, the method comprises displaying a transition between the lower-level user interface and the higher-level user interface that does not include displaying a representation of the intermediate-level user interface.

20. The method of claim 1, wherein, when the input has a duration shorter than the respective time threshold, the method comprises displaying a transition between the lower-level user interface and the higher-level user interface that does not include displaying a representation of the intermediate-level user interface.

21. An electronic device, comprising:
a display;
a touch-sensitive surface;
one or more sensors to detect intensities of contacts with the touch-sensitive surface;
one or more processors;
memory; and
one or more programs, wherein the one or more programs are stored in the memory and configured to be executed by the one or more processors, the one or more programs including instructions for:
displaying, on the display, a lower-level user interface that is part of a user interface hierarchy, wherein:
the hierarchy includes at least three levels, including the lower-level user interface, an intermediate-level user interface and a higher-level user interface;
the intermediate-level user interface is above the lower-level user interface in the hierarchy; and
the higher-level user interface is above both the intermediate-level user interface and the lower-level user interface in the hierarchy;
while displaying the lower-level user interface without concurrently displaying other user interfaces in the hierarchy, detecting an input on a portion of the device that is associated with user interface hierarchy navigation;
in response to detecting the input:
in accordance with a determination that the input has a duration shorter than a respective time threshold, replacing display of the lower-level user interface with display of the higher-level user interface; and
in accordance with a determination that the input has a duration longer than the respective time threshold, replacing display of the lower-level user interface with display of a respective user interface in the user interface hierarchy selected in accordance with an intensity of the input.

22. A non-transitory computer readable storage medium storing one or more programs, the one or more programs comprising instructions which, when executed by an electronic device with a display, a touch-sensitive surface and one or more sensors to detect intensities of contacts with the touch-sensitive surface, cause the device to:
display, on the display, a lower-level user interface that is part of a user interface hierarchy, wherein:
the hierarchy includes at least three levels, including the lower-level user interface, an intermediate-level user interface and a higher-level user interface;
the intermediate-level user interface is above the lower-level user interface in the hierarchy; and
the higher-level user interface is above both the intermediate-level user interface and the lower-level user interface in the hierarchy;
while displaying the lower-level user interface without concurrently displaying other user interfaces in the hierarchy, detect an input on a portion of the device that is associated with user interface hierarchy navigation;
in response to detecting the input:
in accordance with a determination that the input has a duration shorter than a respective time threshold, replace display of the lower-level user interface with display of the higher-level user interface; and
in accordance with a determination that the input has a duration longer than the respective time threshold, replace display of the lower-level user interface with display of a respective user interface in the user interface hierarchy selected in accordance with an intensity of the input.

23. The device of claim 21, wherein the portion of the device on which the input is detected is a physical button.

24. The device of claim 21, wherein the portion of the device on which the input is detected is a portion of the touch-sensitive surface that is associated with hierarchy navigation.

25. The device of claim 21, wherein the portion of the device on which the input is detected is a portion of a touch screen display that includes an icon associated with hierarchy navigation.

26. The device of claim 21, wherein the input is a contact on the touch-sensitive surface.

27. The device of claim 21, wherein:
the input includes a contact detected on the touch-sensitive surface; and
the input is a stationary gesture that does not include lateral movement of the contact on the touch-sensitive surface.

28. The device of claim 21, wherein the hierarchy includes exactly three levels in order from highest to lowest:
the higher-level user interface;
the intermediate-level user interface; and
the lower-level user interface.

29. The device of claim 21, wherein:
the higher-level user interface is adjacent to the intermediate-level user interface in the hierarchy; and
the intermediate-level user interface is adjacent to the lower-level user interface in the hierarchy.

30. The device of claim 21, wherein the hierarchy includes more than three levels.

31. The device of claim 21, wherein:
the lower-level and intermediate-level user interfaces are user interfaces in a single application; and the higher-level user interface is an application launch user interface.

32. The device of claim 21, wherein the lower-level, intermediate-level and higher-level user interfaces are user interfaces in a single application.

33. The device of claim 21, wherein:
the lower-level user interface is a media presentation interface;
the intermediate-level user interface is a media collection display interface of a media player application; and
the higher-level user interface is an application launch user interface that includes an icon representing the media player application.

34. The device of claim 21, wherein:
the lower-level user interface is a subfolder;
the intermediate-level user interface is a folder containing the subfolder; and
the higher-level user interface is an application launch interface that includes an icon representing the folder.

35. The device of claim 21, wherein replacing display of the lower-level user interface with display of the respective user interface selected in accordance with the intensity of the input includes displaying an animated transition between the lower-level user interface and the respective user interface where the animated transition progresses at a rate that corresponds to the intensity of the input.

36. The device of claim 21, wherein replacing display of the lower-level user interface with display of the respective user interface selected in accordance with the intensity of the input includes displaying an animated transition between the lower-level user interface and the respective user interface where the animated transition progresses in accordance with the intensity of the input.

37. The device of claim 21, wherein replacing display of the lower-level user interface with display of the respective user interface selected in accordance with the intensity of the input, such that the respective user interface is the higher level user interface, includes displaying an animated transition between the lower-level user interface and the higher-level user interface that includes displaying a representation of the intermediate-level user interface.

38. The device of claim 21, wherein replacing display of the lower-level user interface with display of the respective user interface selected in accordance with the intensity of the input includes:
in accordance with a determination that the input has an intensity above a first intensity threshold and below a second intensity threshold higher than the first intensity threshold, replacing display of the lower-level user interface with display of the intermediate-level user interface; and
in accordance with a determination that the input has an intensity above the second intensity threshold, replacing display of the lower-level user interface with display of the higher-level user interface.

39. The device of claim 38, wherein, when the input has a duration longer than the respective time threshold, and replacing display of the lower-level user interface with display of a respective user interface includes replacing display of the lower-level user interface with the higher-level user interface, the device includes instructions for displaying a transition between the lower-level user interface and the higher-level user interface that includes displaying a representation of the intermediate-level user interface.

40. The device of claim 38, wherein, when the input has a duration longer than the respective time threshold and replacing display of the lower-level user interface with display of a respective user interface includes replacing display of the lower-level user interface with the higher-level user interface, the device includes instructions for displaying a transition between the lower-level user interface and the higher-level user interface that does not include displaying a representation of the intermediate-level user interface.

41. The device of claim 21, wherein, when the input has a duration shorter than the respective time threshold, the device includes instructions for displaying a transition between the lower-level user interface and the higher-level user interface that does not include displaying a representation of the intermediate-level user interface.

42. The non-transitory computer readable storage medium of claim 22, wherein the portion of the device on which the input is detected is a physical button.

43. The non-transitory computer readable storage medium of claim 22, wherein the portion of the device on which the input is detected is a portion of the touch-sensitive surface that is associated with hierarchy navigation.

44. The non-transitory computer readable storage medium of claim 22, wherein the portion of the device on which the input is detected is a portion of a touch screen display that includes an icon associated with hierarchy navigation.

45. The non-transitory computer readable storage medium of claim 22, wherein the input is a contact on the touch-sensitive surface.

46. The non-transitory computer readable storage medium of claim 22, wherein:
the input includes a contact detected on the touch-sensitive surface; and
the input is a stationary gesture that does not include lateral movement of the contact on the touch-sensitive surface.

47. The non-transitory computer readable storage medium of claim 22, wherein the hierarchy includes exactly three levels in order from highest to lowest:
the higher-level user interface;
the intermediate-level user interface; and
the lower-level user interface.

48. The non-transitory computer readable storage medium of claim 22, wherein:
the higher-level user interface is adjacent to the intermediate-level user interface in the hierarchy; and
the intermediate-level user interface is adjacent to the lower-level user interface in the hierarchy.

49. The non-transitory computer readable storage medium of claim 22, wherein the hierarchy includes more than three levels.

50. The non-transitory computer readable storage medium of claim 22, wherein:
the lower-level and intermediate-level user interfaces are user interfaces in a single application; and
the higher-level user interface is an application launch user interface.

51. The non-transitory computer readable storage medium of claim 22, wherein the lower-level, intermediate-level and higher-level user interfaces are user interfaces in a single application.

52. The non-transitory computer readable storage medium of claim 22, wherein:
the lower-level user interface is a media presentation interface;
the intermediate-level user interface is a media collection display interface of a media player application; and the higher-level user interface is an application launch user interface that includes an icon representing the media player application.

53. The non-transitory computer readable storage medium of claim 22, wherein:
the lower-level user interface is a subfolder;
the intermediate-level user interface is a folder containing the subfolder; and
the higher-level user interface is an application launch interface that includes an icon representing the folder.

54. The non-transitory computer readable storage medium of claim 22, wherein replacing display of the lower-level user interface with display of the respective user interface selected in accordance with the intensity of the input includes displaying an animated transition between the lower-level user interface and the respective user interface where the animated transition progresses at a rate that corresponds to the intensity of the input.

55. The non-transitory computer readable storage medium of claim 22, wherein replacing display of the lower-level user interface with display of the respective user interface selected in accordance with the intensity of the input includes displaying an animated transition between the lower-level user interface and the respective user interface where the animated transition progresses in accordance with the intensity of the input.

56. The non-transitory computer readable storage medium of claim 22, wherein replacing display of the lower-level user interface with display of the respective user interface selected in accordance with the intensity of the input, such that the respective user interface is the higher level user interface, includes displaying an animated transition between the lower-level user interface and the higher-level user interface that includes displaying a representation of the intermediate-level user interface.

57. The non-transitory computer readable storage medium of claim 22, wherein replacing display of the lower-level user interface with display of the respective user interface selected in accordance with the intensity of the input includes:

in accordance with a determination that the input has an intensity above a first intensity threshold and below a second intensity threshold higher than the first intensity threshold, replacing display of the lower-level user interface with display of the intermediate-level user interface; and in accordance with a determination that the input has an intensity above the second intensity threshold, replacing display of the lower-level user interface with display of the higher-level user interface.

58. The non-transitory computer readable storage medium of claim 57, wherein, when the input has a duration longer than the respective time threshold, and replacing display of the lower-level user interface with display of a respective user interface includes replacing display of the lower-level user interface with the higher-level user interface, the one or more programs include instructions which, when executed by the device, cause the device to display a transition between the lower-level user interface and the higher-level user interface that includes displaying a representation of the intermediate-level user interface.

59. The non-transitory computer readable storage medium of claim 57, wherein, when the input has a duration longer than the respective time threshold and replacing display of the lower-level user interface with display of a respective user interface includes replacing display of the lower-level user interface with the higher-level user interface, the one or more programs include instructions which, when executed by the device, cause the device to display a transition between the lower-level user interface and the higher-level user interface that does not include displaying a representation of the intermediate-level user interface.

60. The non-transitory computer readable storage medium of claim 22, wherein, when the input has a duration shorter than the respective time threshold, the one or more programs include instructions which, when executed by the device, cause the device to display a transition between the lower-level user interface and the higher-level user interface that does not include displaying a representation of the intermediate-level user interface.

* * * * *